US012678001B2

(12) United States Patent
Conrad

(10) Patent No.: US 12,678,001 B2
(45) Date of Patent: Jul. 14, 2026

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 432 days.

(21) Appl. No.: 18/381,576

(22) Filed: Oct. 18, 2023

(65) Prior Publication Data

US 2025/0127349 A1 Apr. 24, 2025

(51) Int. Cl.
*A47L 5/24* (2006.01)
*A47L 9/12* (2006.01)
*A47L 9/16* (2006.01)
*A47L 9/22* (2006.01)
*A47L 9/28* (2006.01)
*A47L 9/32* (2006.01)
*B04C 9/00* (2006.01)

(52) U.S. Cl.
CPC ................. *A47L 5/24* (2013.01); *A47L 9/125* (2013.01); *A47L 9/1641* (2013.01); *A47L 9/1691* (2013.01); *A47L 9/22* (2013.01); *A47L 9/2884* (2013.01); *A47L 9/322* (2013.01); *B04C 9/00* (2013.01); *B04C 2009/002* (2013.01); *B04C 2009/005* (2013.01)

(58) Field of Classification Search
CPC .......... A47L 5/24; A47L 9/125; A47L 9/1641; A47L 9/1691; A47L 9/22; A47L 9/2884; A47L 9/322; B04C 9/00; B04C 2009/002; B04C 2009/005
See application file for complete search history.

(56) References Cited

U.S. PATENT DOCUMENTS

| | | | |
|---|---|---|---|
| 1,757,239 A | 5/1930 | Engberg et al. |
| 4,050,113 A | 9/1977 | Wright |
| 5,089,738 A | 2/1992 | Bergqvist et al. |
| 5,267,371 A | 12/1993 | Soler |
| 5,358,290 A | 10/1994 | Fleet |

(Continued)

FOREIGN PATENT DOCUMENTS

| | | |
|---|---|---|
| CA | 2275675 A1 | 12/1999 |
| CA | 2288544 A1 | 5/2000 |

(Continued)

OTHER PUBLICATIONS

International Search Report and Written Opinion, received in connection to International Patent Application No. PCT/CA2024/051237, mailed on Dec. 20, 2024.

(Continued)

*Primary Examiner* — Marc Carlson
(74) *Attorney, Agent, or Firm* — Philip C. Mendes Da Costa; SMART & BIGGAR LP

(57) ABSTRACT

A hand vacuum cleaner has an airflow path from a dirty air inlet to a clean air outlet and an air treatment member provided in the airflow path. The air treatment member has a front end, a rear end, and a centrally positioned longitudinal axis extending between the front and rear ends. The hand vacuum cleaner further has a pistol grip handle and a motor and fan assembly. The motor and fan assembly has a volume and a motor axis of rotation. At least 50% of the volume is positioned in the pistol grip handle.

20 Claims, 47 Drawing Sheets

(56) References Cited

U.S. PATENT DOCUMENTS

| | | | | |
|---|---|---|---|---|
| 5,974,625 | A | 11/1999 | Garner | |
| 6,098,244 | A | 8/2000 | Conrad | |
| 6,099,661 | A | 8/2000 | Conrad | |
| 6,101,672 | A | 8/2000 | Conrad | |
| 6,123,779 | A | 9/2000 | Conrad | |
| 6,129,775 | A | 10/2000 | Conrad | |
| 6,135,708 | A | 10/2000 | Conrad | |
| 6,168,716 | B1 | 1/2001 | Conrad | |
| 6,170,119 | B1 | 1/2001 | Conrad | |
| 6,173,474 | B1 | 1/2001 | Conrad | |
| 6,174,127 | B1 | 1/2001 | Conrad | |
| 6,183,641 | B1 | 2/2001 | Conrad | |
| 6,224,325 | B1 | 5/2001 | Conrad | |
| 6,231,645 | B1 | 5/2001 | Conrad | |
| 6,238,177 | B1 | 5/2001 | Conrad | |
| 6,243,917 | B1 | 6/2001 | Conrad | |
| 6,251,296 | B1 | 6/2001 | Conrad | |
| 6,261,052 | B1 | 7/2001 | Conrad | |
| 6,261,379 | B1 | 7/2001 | Conrad | |
| 6,280,143 | B1 | 8/2001 | Parker | |
| 6,307,358 | B1 | 10/2001 | Conrad | |
| 6,312,594 | B1 | 11/2001 | Conrad | |
| 6,328,527 | B1 | 12/2001 | Conrad | |
| 6,334,234 | B1 | 1/2002 | Conrad | |
| 6,344,064 | B1 | 2/2002 | Conrad | |
| 6,440,197 | B1 | 8/2002 | Conrad | |
| 6,457,205 | B1 | 10/2002 | Conrad | |
| 6,533,834 | B2 | 3/2003 | Conrad | |
| 6,599,340 | B2 | 7/2003 | Conrad | |
| 6,782,585 | B1 | 8/2004 | Conrad | |
| 7,329,294 | B2 | 2/2008 | Conrad | |
| 7,740,675 | B2 | 6/2010 | Conrad | |
| 7,749,293 | B2 | 7/2010 | Conrad | |
| 7,776,120 | B2 | 8/2010 | Conrad | |
| 7,803,207 | B2 | 9/2010 | Conrad | |
| 7,811,345 | B2 | 10/2010 | Conrad | |
| 7,867,308 | B2 | 1/2011 | Conrad | |
| 7,941,895 | B2 | 5/2011 | Conrad | |
| 8,127,398 | B2 | 3/2012 | Conrad | |
| 8,146,201 | B2 | 4/2012 | Conrad | |
| 8,151,407 | B2 | 4/2012 | Conrad | |
| 8,176,596 | B2 | 5/2012 | Conrad | |
| 8,192,515 | B2 | 6/2012 | Conrad | |
| 8,292,979 | B2 | 10/2012 | Conrad | |
| 8,296,900 | B2 | 10/2012 | Conrad | |
| 8,302,250 | B2 | 11/2012 | Dyson et al. | |
| 8,347,455 | B2 | 1/2013 | Dyson et al. | |
| 8,349,428 | B2 | 1/2013 | Conrad | |
| 8,370,993 | B2 | 2/2013 | Conrad | |
| 8,375,508 | B2 | 2/2013 | Conrad | |
| 8,448,291 | B2 | 5/2013 | Conrad | |
| 8,479,358 | B2 | 7/2013 | Conrad | |
| 8,486,170 | B2 | 7/2013 | Conrad | |
| 8,510,907 | B2 | 8/2013 | Conrad | |
| 8,533,904 | B2 | 9/2013 | Conrad | |
| 8,561,257 | B2 | 10/2013 | Conrad | |
| 8,567,005 | B2 | 10/2013 | Conrad | |
| 8,578,550 | B2 | 11/2013 | Conrad | |
| 8,578,553 | B2 | 11/2013 | Conrad | |
| 8,590,102 | B2 | 11/2013 | Conrad | |
| 8,607,407 | B2 | 12/2013 | Conrad | |
| 8,621,709 | B2 | 1/2014 | Conrad | |
| 8,640,304 | B2 | 2/2014 | Conrad | |
| 8,646,147 | B2 | 2/2014 | Conrad | |
| 8,659,184 | B2 | 2/2014 | Conrad | |
| 8,677,554 | B2 | 3/2014 | Conrad | |
| 8,677,558 | B2 | 3/2014 | Conrad | |
| 8,713,751 | B2 | 5/2014 | Conrad | |
| 8,813,305 | B2 | 8/2014 | Conrad | |
| 8,834,209 | B2 | 9/2014 | Conrad | |
| 8,869,344 | B2 | 10/2014 | Conrad | |
| 8,869,345 | B2 | 10/2014 | Conrad | |
| 8,869,348 | B2 | 10/2014 | Conrad | |
| 8,875,340 | B2 | 11/2014 | Conrad | |
| 8,875,342 | B2 | 11/2014 | Conrad | |
| 9,027,198 | B2 | 5/2015 | Conrad | |
| 9,027,203 | B2 | 5/2015 | Conrad | |
| 9,066,642 | B2 | 6/2015 | Conrad | |
| 9,119,513 | B2 | 9/2015 | Conrad | |
| 9,161,666 | B2 | 10/2015 | Conrad | |
| 9,161,669 | B2 | 10/2015 | Conrad | |
| 9,167,944 | B2 | 10/2015 | Conrad | |
| 9,204,769 | B2 | 12/2015 | Conrad | |
| 9,204,773 | B2 | 12/2015 | Conrad | |
| 9,215,960 | B2 | 12/2015 | Conrad | |
| 9,226,633 | B2 | 1/2016 | Conrad | |
| 9,227,151 | B2 | 1/2016 | Conrad | |
| 9,227,201 | B2 | 1/2016 | Conrad | |
| 9,232,881 | B2 | 1/2016 | Conrad | |
| 9,238,235 | B2 | 1/2016 | Conrad | |
| 9,295,995 | B2 | 3/2016 | Conrad | |
| 9,314,138 | B2 | 4/2016 | Conrad | |
| 9,314,139 | B2 | 4/2016 | Conrad | |
| 9,320,401 | B2 | 4/2016 | Conrad | |
| 9,326,652 | B2 | 5/2016 | Conrad | |
| 9,364,127 | B2 | 6/2016 | Conrad | |
| 9,427,122 | B2 | 8/2016 | Conrad | |
| 9,427,126 | B2 | 8/2016 | Conrad | |
| 9,433,332 | B2 | 9/2016 | Conrad | |
| 9,451,852 | B2 | 9/2016 | Conrad | |
| 9,451,855 | B2 | 9/2016 | Conrad | |
| 9,456,721 | B2 | 10/2016 | Conrad | |
| 9,492,045 | B2 | 11/2016 | Conrad | |
| 9,526,394 | B2 | 12/2016 | Conrad | |
| 9,572,463 | B2 | 2/2017 | Conrad | |
| 9,591,952 | B2 | 3/2017 | Conrad | |
| 9,591,958 | B2 | 3/2017 | Conrad | |
| 9,711,986 | B2 * | 7/2017 | Sunderland | H01M 50/296 |
| 9,775,484 | B2 | 10/2017 | Conrad | |
| 9,801,513 | B2 | 10/2017 | Conrad | |
| 9,820,621 | B2 | 11/2017 | Conrad | |
| 9,962,047 | B2 | 5/2018 | Conrad | |
| 10,064,530 | B2 | 9/2018 | Krebs et al. | |
| 10,076,183 | B2 | 9/2018 | Conrad | |
| 10,149,587 | B2 | 12/2018 | Conrad | |
| 10,159,393 | B2 | 12/2018 | Conrad | |
| 10,201,260 | B2 | 2/2019 | Conrad | |
| 10,214,349 | B2 | 2/2019 | Conrad | |
| 10,251,519 | B2 * | 4/2019 | Conrad | A47L 5/225 |
| 10,357,136 | B2 | 7/2019 | Conrad | |
| 10,537,216 | B2 | 1/2020 | Conrad | |
| 10,537,219 | B2 | 1/2020 | Conrad | |
| 10,568,477 | B2 | 2/2020 | Conrad | |
| 10,575,693 | B2 | 3/2020 | Conrad | |
| 10,667,663 | B2 | 6/2020 | Conrad | |
| 10,687,679 | B2 | 6/2020 | Conrad | |
| 10,729,294 | B2 | 8/2020 | Conrad | |
| 10,791,890 | B2 | 10/2020 | Conrad | |
| 10,791,896 | B2 | 10/2020 | Conrad | |
| 10,888,205 | B2 | 1/2021 | Conrad | |
| 10,932,634 | B2 | 3/2021 | Conrad | |
| 10,959,588 | B2 | 3/2021 | Conrad | |
| 11,013,378 | B2 | 5/2021 | Conrad | |
| 11,108,254 | B2 | 8/2021 | Conrad | |
| 11,135,602 | B2 | 10/2021 | Conrad | |
| 11,154,169 | B2 | 10/2021 | Conrad | |
| 11,198,085 | B2 | 12/2021 | Conrad | |
| 11,213,179 | B2 | 1/2022 | Conrad | |
| 11,246,462 | B2 | 2/2022 | Conrad | |
| 11,285,495 | B2 | 3/2022 | Conrad | |
| 11,318,482 | B2 | 5/2022 | Conrad | |
| 11,478,116 | B2 | 10/2022 | Conrad | |
| 11,478,117 | B2 | 10/2022 | Conrad | |
| 11,529,034 | B2 | 12/2022 | Conrad | |
| 11,534,041 | B2 | 12/2022 | Conrad | |
| 11,534,043 | B2 | 12/2022 | Conrad | |
| 11,534,702 | B2 | 12/2022 | Conrad | |
| 11,547,258 | B2 | 1/2023 | Conrad | |
| 11,571,097 | B2 | 2/2023 | Conrad | |
| 11,612,290 | B2 | 3/2023 | Conrad | |
| 11,641,995 | B2 | 5/2023 | Conrad | |
| 11,707,170 | B2 | 7/2023 | Conrad | |
| 11,737,625 | B2 | 8/2023 | Conrad | |
| 11,745,131 | B2 | 9/2023 | Conrad | |

(56) References Cited

U.S. PATENT DOCUMENTS

| | | | | |
|---|---|---|---|---|
| 11,793,374 | B2 | 10/2023 | Conrad | |
| 11,819,178 | B2 * | 11/2023 | Conrad | A47L 5/24 |
| 11,839,343 | B2 | 12/2023 | Conrad | |
| 11,841,024 | B2 | 12/2023 | Conrad | |
| 11,857,142 | B2 | 1/2024 | Conrad | |
| 11,950,745 | B2 | 4/2024 | Conrad | |
| 12,053,143 | B2 | 8/2024 | Conrad | |
| 12,075,966 | B2 | 9/2024 | Conrad | |
| 2001/0027587 | A1 | 10/2001 | Conrad | |
| 2002/0162188 | A1 | 11/2002 | Harmen | |
| 2003/0201754 | A1 | 10/2003 | Conrad | |
| 2004/0216266 | A1 | 11/2004 | Conrad | |
| 2006/0196004 | A1 | 9/2006 | Conrad | |
| 2008/0172992 | A1 | 7/2008 | Conrad | |
| 2008/0178416 | A1 | 7/2008 | Conrad | |
| 2008/0178418 | A1 | 7/2008 | Conrad | |
| 2008/0179133 | A1 | 7/2008 | Conrad | |
| 2008/0196366 | A1 | 8/2008 | Conrad | |
| 2008/0216281 | A1 | 9/2008 | Conrad | |
| 2009/0038108 | A1 * | 2/2009 | Shaanan | A47L 5/14 15/246 |
| 2010/0175217 | A1 | 7/2010 | Conrad | |
| 2010/0229323 | A1 | 9/2010 | Conrad | |
| 2010/0229325 | A1 | 9/2010 | Conrad | |
| 2010/0229326 | A1 | 9/2010 | Conrad | |
| 2010/0229334 | A1 | 9/2010 | Conrad | |
| 2010/0229335 | A1 | 9/2010 | Conrad | |
| 2010/0251507 | A1 | 10/2010 | Conrad | |
| 2011/0219567 | A1 | 9/2011 | Conrad | |
| 2011/0219579 | A1 | 9/2011 | Conrad | |
| 2014/0237768 | A1 | 8/2014 | Conrad | |
| 2014/0366312 | A1 * | 12/2014 | Christensen | A47L 5/24 15/344 |
| 2015/0155606 | A1 * | 6/2015 | Stickney | H01M 50/204 429/90 |
| 2018/0263439 | A1 * | 9/2018 | Dimbylow | A47L 9/00 |
| 2019/0200824 | A1 * | 7/2019 | Campbell-Hill | A47L 9/1608 |
| 2019/0343356 | A1 * | 11/2019 | Kim | A47L 9/165 |
| 2019/0365174 | A1 * | 12/2019 | Conrad | A47L 9/127 |
| 2020/0163503 | A1 * | 5/2020 | Conrad | A47L 9/2889 |
| 2020/0214521 | A1 * | 7/2020 | Percy-Raine | A47L 5/24 |
| 2020/0253437 | A1 | 8/2020 | Conrad et al. | |
| 2020/0260925 | A1 * | 8/2020 | Conrad | A47L 9/16 |
| 2020/0305671 | A1 | 10/2020 | Conrad | |
| 2021/0228032 | A1 * | 7/2021 | Conrad | A47L 5/225 |
| 2021/0290023 | A1 * | 9/2021 | Conrad | A47L 9/1691 |
| 2021/0330157 | A1 | 10/2021 | Conrad | |
| 2021/0386258 | A1 * | 12/2021 | Conrad | A47L 9/1691 |
| 2022/0142424 | A1 * | 5/2022 | Bradley | A47L 9/1683 |
| 2022/0142432 | A1 * | 5/2022 | Brook | A47L 5/24 |
| 2022/0142440 | A1 | 5/2022 | Conrad | |
| 2022/0151446 | A1 | 5/2022 | Conrad | |
| 2022/0372718 | A1 * | 11/2022 | Aihiokhai | A47L 9/1418 |
| 2023/0017024 | A1 * | 1/2023 | Conrad | A47L 5/24 |
| 2023/0098664 | A1 | 3/2023 | Conrad | |
| 2023/0263350 | A1 | 8/2023 | Conrad | |
| 2023/0309767 | A1 | 10/2023 | Conrad | |
| 2023/0348169 | A1 | 11/2023 | Conrad | |
| 2024/0008701 | A1 | 1/2024 | Conrad | |
| 2024/0016351 | A1 | 1/2024 | Conrad | |
| 2024/0032745 | A1 * | 2/2024 | Jonsson | A47L 9/22 |
| 2024/0041284 | A1 | 2/2024 | Conrad | |
| 2024/0138634 | A1 | 5/2024 | Conrad | |
| 2024/0172909 | A1 | 5/2024 | Conrad | |
| 2024/0180373 | A1 | 6/2024 | Conrad | |
| 2024/0180379 | A1 | 6/2024 | Conrad | |
| 2024/0245271 | A1 | 7/2024 | Conrad | |
| 2024/0335077 | A1 | 10/2024 | Conrad | |
| 2024/0358212 | A1 * | 10/2024 | Conrad | A47L 9/1616 |
| 2024/0382056 | A1 | 11/2024 | Conrad | |
| 2025/0127349 | A1 * | 4/2025 | Conrad | A47L 9/1625 |
| 2025/0241496 | A1 * | 7/2025 | Conrad | A47L 9/2884 |
| 2025/0366686 | A1 * | 12/2025 | Gray | A47L 9/1641 |

FOREIGN PATENT DOCUMENTS

| | | | | |
|---|---|---|---|---|
| CA | 2258416 | A1 | 7/2000 | |
| CA | 2258419 | A1 | 7/2000 | |
| CA | 2258421 | A1 | 7/2000 | |
| CA | 2258422 | A1 | 7/2000 | |
| CA | 2258423 | A1 | 7/2000 | |
| CA | 2258426 | A1 | 7/2000 | |
| CA | 2330801 | A1 | 7/2001 | |
| CA | 2338193 | A1 | 7/2002 | |
| CA | 2339514 | A1 | 9/2002 | |
| CA | 2342673 | A1 | 9/2002 | |
| CA | 2342993 | A1 | 9/2002 | |
| CA | 2658014 | A1 | 9/2010 | |
| CA | 2658022 | A1 | 9/2010 | |
| CA | 2658160 | A1 | 9/2010 | |
| CA | 2658366 | A1 | 9/2010 | |
| CA | 2658397 | A1 | 9/2010 | |
| CA | 2658497 | A1 | 9/2010 | |
| CA | 2658643 | A1 | 9/2010 | |
| CA | 2658644 | A1 | 9/2010 | |
| CN | 107260059 | A | 10/2017 | |
| CN | 108852158 | A * | 11/2018 | A47L 9/322 |
| CN | 108852159 | A * | 11/2018 | A47L 9/322 |
| CN | 209003800 | U * | 6/2019 | |
| CN | 209153419 | U | 7/2019 | |
| CN | 209391852 | U * | 9/2019 | |
| CN | 110786771 | A * | 2/2020 | A47L 5/12 |
| CN | 210989962 | U | 7/2020 | |
| CN | 113287967 | A * | 8/2021 | A47L 9/10 |
| EP | 3865037 | A1 * | 8/2021 | A47L 9/322 |
| JP | 57-112745 | U | 7/1982 | |
| JP | 0668654 | U | 9/1994 | |
| WO | 2000010718 | A1 | 3/2000 | |
| WO | WO-2017108089 | A1 * | 6/2017 | A47L 9/0626 |
| WO | WO-2024240722 | A1 * | 11/2024 | A47L 9/322 |

OTHER PUBLICATIONS

U.S. Appl. No. 09/343,479, filed Jun. 30, 1999.

English machine translation of JPH06-68654U, published on Sep. 27, 1994.

English machine translation of JPS57-112745U, published on Jul. 12, 1982.

* cited by examiner

SURFACE CLEANING APPARATUS

FIELD

This disclosure relates generally to surface cleaning apparatus. In a preferred embodiment, the surface cleaning apparatus comprises a portable surface cleaning apparatus, such as a hand vacuum cleaner.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic hand vacuum cleaners, including battery operated cyclonic hand vacuum cleaners, are known in the art.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with one aspect of this disclosure, which may be used alone or in combination with any other aspect, a hand vacuum cleaner has a motor and fan assembly that is at least partially and, optionally, substantially or fully positioned interior of a handle and, optionally, the hand grip portion of the handle, which may be a pistol grip handle.

In accordance with this aspect, there is provided a hand vacuum cleaner having an airflow path from a dirty air inlet to a clean air outlet, and an air treatment member provided in the airflow path. The air treatment member has a front end, a rear end, and a centrally positioned longitudinal axis extending between the front and rear ends. The hand vacuum cleaner has a pistol grip handle and a motor and fan assembly. The motor and fan assembly has a volume and a motor axis of rotation, and at least 50% of the volume is positioned in the pistol grip handle.

In accordance with another aspect of this disclosure, which may be used alone or in combination with any other aspect, a hand vacuum cleaner is provided wherein one or more energy storage members is located forward of the motor and fan assembly, and optionally upstream thereof. In accordance with this aspect, the operating components of the hand vacuum cleaner (the air treatment member(s), an optional pre-motor filter, the energy storage member(s) and the motor and fan assembly are arranged linearly and the motor and fan assembly is at least partially and, optionally, substantially or fully positioned interior of a handle.

In accordance with this aspect, there is provided a hand vacuum cleaner having an airflow path from a dirty air inlet to a clean air outlet, and an air treatment member provided in the airflow path. The air treatment member has a front end, a rear end, and a centrally positioned longitudinal axis extending between the front and rear ends. The hand vacuum cleaner has an energy storage member housing positioned rearward of the air treatment member. The longitudinal axis extends through the energy storage member housing. The hand vacuum cleaner has a motor and fan assembly positioned rearward of the energy storage member housing, the motor and fan assembly having a motor axis of rotation. The longitudinal axis extends through the motor and fan assembly.

In accordance with another aspect of this disclosure, which may be used alone or in combination with any other aspect, a hand vacuum cleaner has one or more energy storage members which are at least partially and, optionally, substantially or fully positioned interior of an air treatment member, which may be an air treatment chamber. The air treatment member may be a first or a second stage air treatment member.

In accordance with this aspect, there is provided a hand vacuum cleaner has an airflow path from a dirty air inlet to a clean air outlet, and an air treatment member provided in the airflow path. The air treatment member has a front end, a rear end and a centrally positioned longitudinal axis extending between the front and rear ends. The hand vacuum cleaner has an energy storage member housing positioned at least partially internal of the air treatment member, and a motor and fan assembly. The motor and fan assembly has a motor axis of rotation.

In accordance with another aspect of this disclosure, which may be used alone or in combination with any other aspect, a hand vacuum cleaner has one or more energy storage members which are at least partially and, optionally, substantially or fully positioned interior of a second stage air treatment member. The second stage air treatment member may be a single cyclone or a plurality of cyclones in parallel.

In accordance with this aspect, there is provided a hand vacuum cleaner has an airflow path from a dirty air inlet to a clean air outlet, and a first air treatment stage including a first stage air treatment member provided in the airflow path. The first stage air treatment member has a front end, a rear end, and a centrally positioned longitudinal axis extending between the front and rear ends. The hand vacuum cleaner includes a second air treatment stage including a second stage air treatment member provided in the airflow path and an energy storage member housing positioned at least partially internal of the second air treatment stage. The hand vacuum cleaner includes a motor and fan assembly, the motor and fan assembly having a motor axis of rotation.

In accordance with this aspect, there is also provided a hand vacuum cleaner has an airflow path from a dirty air inlet to a clean air outlet, and an air treatment stage including a plurality of air treatment members in parallel provided in the airflow path. The hand vacuum cleaner has an energy storage member housing positioned at least partially internal of the air treatment stage, and a motor and fan assembly, the motor and fan assembly having a motor axis of rotation.

In accordance with another aspect of this disclosure, which may be used alone or in combination with any other aspect, a hand vacuum cleaner has motor and fan assembly that is at least partially and, optionally, substantially or fully positioned interior of an air treatment member. The air treatment member may be a first or a second stage air treatment member.

In accordance with this aspect, there is provided a hand vacuum cleaner has an airflow path from a dirty air inlet, which is provided at a front end of the hand vacuum cleaner, to a clean air outlet, and a first air treatment stage including a first stage air treatment member provided in the airflow path. The first stage air treatment member has a front end, a rear end, and a centrally positioned longitudinal axis extending between the front and rear ends. The hand vacuum cleaner has a second air treatment stage including a second stage air treatment member provided in the airflow path. The hand vacuum cleaner has a motor and fan assembly positioned at least partially internal of the second air treatment stage, the motor and fan assembly having a motor axis of rotation.

In accordance with this aspect, there is also provided a hand vacuum cleaner has an airflow path from a dirty air inlet to a clean air outlet, and an air treatment stage including a plurality of air treatment members in parallel provided in the airflow path. The hand vacuum cleaner has a motor and fan assembly positioned at least partially internal of the air treatment stage, the motor and fan assembly having a motor axis of rotation.

In accordance with another aspect of this disclosure, which may be used alone or in combination with any other aspect, a hand vacuum cleaner has one or more pre-motor filters which are at least partially and, optionally, substantially or fully positioned interior of a second stage air treatment member. The second stage air treatment member may be a single cyclone or a plurality of cyclones in parallel.

In accordance with this aspect, there is provided a hand vacuum cleaner has an airflow path from a dirty air inlet, which is provided at a front end of the hand vacuum cleaner, to a clean air outlet, and a first air treatment stage including a first stage air treatment member provided in the airflow path. The first stage air treatment member has a front end, a rear end, and a centrally positioned longitudinal axis extending between the front and rear ends. The hand vacuum cleaner has a second air treatment stage including a second stage air treatment member provided in the airflow path. The hand vacuum cleaner has a motor and fan assembly having a motor axis of rotation. The hand vacuum cleaner has a post-motor filter housing positioned at least partially internal of the second air treatment stage.

In accordance with this aspect, there is also provided a hand vacuum cleaner has an airflow path from a dirty air inlet to a clean air outlet, and an air treatment stage including a plurality of air treatment members in parallel provided in the airflow path. The hand vacuum cleaner has a motor and fan assembly having a motor axis of rotation. The hand vacuum cleaner has a post-motor filter housing positioned at least partially internal of the air treatment stage.

In accordance with another aspect of this disclosure, which may be used alone or in combination with any other aspect, a hand vacuum cleaner is provided wherein the motor and fan assembly is located forward of the air treatment chamber and, if the hand vacuum cleaner has a plurality of air treatment stages, each of which comprises an air treatment chamber, then the motor and fan assembly is located forward of the first air treatment stage.

In accordance with this aspect, there is provided a hand vacuum cleaner has a first air treatment stage including a first stage air treatment member. The first stage air treatment member has a first stage air treatment member air inlet, a first stage air treatment member air outlet, a front end, a rear end, and a centrally positioned longitudinal axis extending between the front and rear ends. The hand vacuum cleaner has an airflow path from a dirty air inlet, which is provided at a front end of the hand vacuum cleaner, to a clean air outlet. The airflow path includes an inlet passage upstream of the first stage air treatment member air inlet. The hand vacuum cleaner has a motor and fan assembly having a motor axis of rotation. The motor and fan assembly is positioned forward of a rear end of the first stage air treatment member. The hand vacuum cleaner has a pistol grip handle. When the hand vacuum cleaner is oriented with the dirty air inlet above the pistol grip handle, the pistol grip handle extends downwardly from a lower surface of the hand vacuum cleaner.

In accordance with another aspect of this disclosure, which may be used alone or in combination with any other aspect, a hand vacuum cleaner is provided wherein the motor and fan assembly is located forward of the rear end of the air treatment chamber and, if the hand vacuum cleaner has a plurality of air treatment stages, each of which comprises an air treatment chamber, then the motor and fan assembly is located forward of the rear end of the first air treatment stage or the second air treatment stage.

In accordance with this aspect, there is provided a hand vacuum cleaner has a first air treatment stage including a first stage air treatment member. The first stage air treatment member has a first stage air treatment member air inlet, a first stage air treatment member air outlet, a front end, a rear end, and a centrally positioned longitudinal axis extending between the front and rear ends. The rear end of the first stage air treatment member is openable. The hand vacuum cleaner has an airflow path from a dirty air inlet, which is provided at a front end of the hand vacuum cleaner, to a clean air outlet. The airflow path includes an inlet passage upstream of the first stage air treatment member air inlet. The hand vacuum cleaner has a motor and fan assembly having a motor axis of rotation. The motor and fan assembly is positioned forward of a rear end of the first stage air treatment member. The hand vacuum cleaner has a pistol grip handle.

In accordance with another aspect of this disclosure, which may be used alone or in combination with any other aspect, the motor and fan assembly is provided at an elevation of a lower end of the handle, and optionally below or at a lower end of the handle. A conduit, which may be a forward side of a finger grip area, may connect the motor and fan assembly with the air treatment assembly of the hand vacuum cleaner.

In accordance with this aspect, there is provided a hand vacuum cleaner has an airflow path from a dirty air inlet to a clean air outlet, a main body, and a first stage air treatment member provided in the airflow path rearward of the main body. The first stage air treatment member has a front end, a rear end, and a centrally positioned longitudinal axis extending between the front and rear ends. The hand vacuum cleaner has a handle having a lower end that is positioned below the dirt air inlet. A finger grip area positioned forward of the handle. The hand vacuum cleaner has a motor and fan assembly, the motor and fan assembly having a motor axis of rotation. A plane that is transverse to the longitudinal axis extends through one of the main body and the air treatment member, the finger grip area, and the motor and fan assembly.

In accordance with this aspect, there is also provided a hand vacuum cleaner has an airflow path from a dirty air inlet to a clean air outlet, and a first stage air treatment member provided in the airflow path. The first stage air treatment member has a front end, a rear end, and a centrally positioned longitudinal axis extending between the front and rear ends. The hand vacuum cleaner has a handle having a lower end that is positioned below the dirty air inlet. A finger grip area positioned forward of the handle, and a finger guard is positioned forward of the finger grip area. The hand vacuum cleaner has a motor and fan assembly, the motor and fan assembly having a motor axis of rotation. A plane that is transverse to the longitudinal axis extends through the finger grip area and the motor and fan assembly.

In accordance with this aspect, there is also provided a hand vacuum cleaner has an airflow path from a dirty air inlet to a clean air outlet, a first stage air treatment member provided in the airflow path, and a second stage air treatment member provided in the airflow path. The hand vacuum cleaner has a handle having a lower end that is positioned below the dirty air inlet. A finger grip area is positioned forward of the handle. The hand vacuum cleaner has a motor and fan assembly. A plane that is transverse to the longitudinal axis extends through the second stage air treatment member, the finger grip area, and the motor and fan assembly.

In accordance with another aspect of this disclosure, which may be used alone or in combination with any other aspect, a hand vacuum cleaner is provided wherein one or more, or all, of the energy storage members is located forward of the rear end of the air treatment chamber and, if the hand vacuum cleaner has a plurality of air treatment stages, each of which comprises an air treatment chamber, then the motor and fan assembly is located forward of the rear end of the first air treatment stage or the second air treatment stage. Optional, some or all of the energy storage members are located forward of the air treatment chamber and, if the hand vacuum cleaner has a plurality of air treatment stages, each of which comprises an air treatment chamber, then some or all of the energy storage members are located forward of the first air treatment stage or the second air treatment stage.

In accordance with this aspect, there is provided a hand vacuum cleaner has an airflow path from a dirty air inlet to a clean air outlet, and an air treatment member provided in the airflow path. The air treatment member has a front end, a rear end, and a centrally positioned longitudinal axis extending between the front and rear ends. The hand vacuum cleaner has an energy storage member housing positioned forward of the air treatment member. The longitudinal axis extends through the energy storage member housing. The hand vacuum cleaner has a motor and fan assembly having a motor axis of rotation.

In accordance with this aspect, there is also provided a hand vacuum cleaner has an airflow path from a dirty air inlet to a clean air outlet, and a first stage air treatment member provided in the airflow path. The air treatment member having a front end, a rear end and a centrally positioned longitudinal axis extending between the front and rear ends. The hand vacuum cleaner has a second stage air treatment member provided in the airflow path downstream of the first stage air treatment member. The hand vacuum cleaner has an energy storage member housing positioned forward of a rear end of the second stage air treatment member. The longitudinal axis extends through the energy storage member housing. The hand vacuum cleaner has a motor and fan assembly having a motor axis of rotation, and a main body that houses at least one of a pre-motor filter, the energy storage member housing and a post motor filter housing. A handle extends downwardly from a lower surface of one of the main body and the first stage air treatment member and the second stage air treatment member.

In accordance with this aspect, there is also provided a hand vacuum cleaner has an airflow path from a dirty air inlet to a clean air outlet, and a first stage air treatment member provided in the airflow path. The air treatment member has a front end, a rear end, and a centrally positioned longitudinal axis extending between the front and rear ends. The hand vacuum cleaner has an energy storage member housing positioned forward of a rear end of the first stage air treatment member. The longitudinal axis extends through the energy storage member housing. The hand vacuum cleaner has a motor and fan assembly having a motor axis of rotation, and a main body that houses at least one of a pre-motor filter, the energy storage member housing, and a post motor filter housing. A handle extends downwardly from a lower surface of one of the main body and the first stage air treatment member. The motor and fan assembly is at least partially positioned in the handle or the motor and fan assembly is positioned at a lower end of the handle.

In accordance with this aspect, there is provided a hand vacuum cleaner having a pistol grip handle and a motor and fan assembly. The motor and fan assembly has a volume and at least 50% of the volume is positioned in the pistol grip handle. The handle is positioned of the air treatment chamber. If the hand vacuum cleaner has a plurality of air treatment stages, each of which comprises an air treatment chamber, then the handle is located rearward of one or all of the air treatment stages.

In accordance with this aspect, there is provided a hand vacuum cleaner has an airflow path from a dirty air inlet, which is provided at a front end of the hand vacuum cleaner, to a clean air outlet, and a first air treatment stage including a first stage air treatment member. The first stage air treatment member has a first stage air treatment member air inlet, a first stage air treatment member air outlet, a front end, a rear end, and a centrally positioned longitudinal axis extending between the front and rear ends. The first stage air treatment member is provided at a rear end of the hand vacuum cleaner. The hand vacuum cleaner has a main body that houses at least one of a pre-motor filter, an energy storage member housing, a post motor filter housing, and a second stage air treatment member. The hand vacuum cleaner has a motor and fan assembly having a motor axis of rotation, and a pistol grip handle. When the hand vacuum cleaner is oriented with the dirty air inlet above the pistol grip handle, the pistol grip handle extends downwardly from a lower surface of one of the main body and the first stage air treatment member and the second stage air treatment member. The motor and fan assembly is at least partially positioned in the handle.

In accordance with this aspect, there is provided a hand vacuum cleaner having an air treatment chamber and a motor and fan assembly. The motor and fan assembly is at least partially and, optionally, substantially or fully positioned interior of the air treatment chamber. If the hand vacuum cleaner has a plurality of air treatment stages, each of which comprises an air treatment chamber, then the motor and fan assembly is at least partially and, optionally, substantially or fully positioned interior of one or all of the air treatment stages.

In accordance with this aspect, there is provided a hand vacuum cleaner has an airflow path from a dirty air inlet, which is provided at a front end of the hand vacuum cleaner, to a clean air outlet, and a first air treatment stage including a first stage air treatment member provided in the airflow path. The first stage air treatment member has a front end, a rear end, and a centrally positioned longitudinal axis extending between the front and rear ends. The hand vacuum cleaner has a motor and fan assembly positioned at least partially internal of the first air treatment stage, the motor and fan assembly having a motor axis of rotation.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIGS. 164 and 165 are schematic cross-sectional views of a hand vacuum cleaner similar to the hand vacuum cleaner of FIG. 17 with the motor nested in the air treatment member; and, FIGS. 166-168 are schematic cross-sectional views of a hand vacuum cleaner similar to the hand vacuum cleaner of FIG. 9 with the motor nested in the air treatment member.

Figure 1:
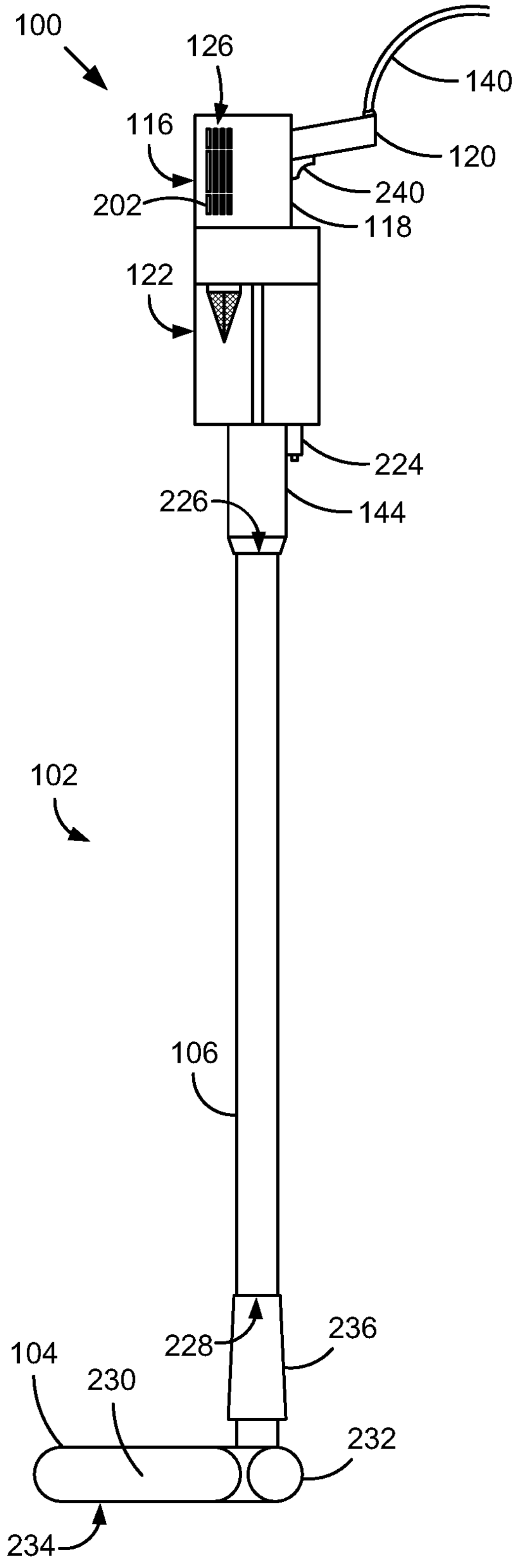
FIG. 1 is a schematic side view of an example hand vacuum cleaner attached to a wand and surface cleaning head.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatus, methods and compositions are described below to provide an example of an embodiment of each claimed invention. No embodiment described below limits any claimed invention and any claimed invention may cover apparatuses and methods that differ from those described below. The claimed inventions are not limited to apparatus, methods and compositions having all of the features of any one apparatus, method or composition described below or to features common to multiple or all of the apparatus, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms “an embodiment”, “embodiment”, “embodiments”, “the embodiment”, “the embodiments”, “one or more embodiments,” “some embodiments”, and “one embodiment” mean “one or more (but not all) embodiments of the present invention(s)”, unless expressly specified otherwise.

The terms “including”, “comprising”, and variations thereof mean “including but not limited to”, unless expressly specified otherwise. A listing of items does not imply that any or all of the items are mutually exclusive, unless expressly specified otherwise. The terms “a”, “an”, and “the” mean “one or more”, unless expressly specified otherwise.

As used herein and in the claims, two or more parts are said to be “coupled”, “connected”, “attached”, or “fastened” where the parts are joined or operate together either directly or indirectly (i.e., through one or more intermediate parts), so long as a link occurs. As used herein and in the claims, two or more parts are said to be “directly coupled”, “directly connected”, “directly attached”, or “directly fastened” where the parts are connected in physical contact with each other. None of the terms “coupled”, “connected”, “attached”, and “fastened” distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

As used herein and in the claims, two elements are said to be "parallel" where those elements are parallel and spaced apart, or where those elements are collinear.

Some elements herein may be identified by a part number, which is composed of a base number followed by an alphabetical or subscript-numerical suffix (e.g., 300*a*, or 3001). Multiple elements herein may be identified by part numbers that share a base number in common and that differ by their suffixes (e.g., 3001, 3002, and 3003). All elements with a common base number may be referred to collectively or generically using the base number without a suffix (e.g., 300).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies. For example, the expressions "substantially perpendicular" and "substantially parallel" mean within 10% of perpendicular and parallel, respectively.

General Description of a Hand Vacuum Cleaner

FIGS. 1 to 4 show an example embodiment of a surface cleaning apparatus 100. FIGS. 5 to 8, FIGS. 9 to 12, FIGS. 13 to 16, and FIGS. 17 to 20 each show additional example embodiments of the surface cleaning apparatus 100. Each illustrated embodiment exemplifies a different body type of the surface cleaning apparatus 100. The following is a general discussion of these embodiments which provides a basis for understanding several of the features that are discussed herein. As discussed in detail subsequently, each of the features may be used in other embodiments.

In the embodiments illustrated, the surface cleaning apparatus 100 is a hand-held vacuum cleaner, which is commonly referred to as a "hand vacuum cleaner" or a "handvac". As used herein, a hand-held vacuum cleaner or hand vacuum cleaner or handvac is a vacuum cleaner that can be operated generally one-handedly to clean a surface while its weight is held by the same one hand. This is contrasted with upright and canister vacuum cleaners, the weight of which is supported by a surface (e.g., floor below) during use. Optionally, surface cleaning apparatus 100 could be removably mountable on a base so as to form, for example, an upright vacuum cleaner, a canister vacuum cleaner, a stick vac, a wet-dry vacuum cleaner and the like.

Optionally, the hand vacuum 100 can be removably mounted to a base, such as base 102 in FIGS. 1, 5, 9, 13, and 17 (either removably or in a fixed manner) so as to form, for example, an upright vacuum cleaner, a canister vacuum cleaner, a stick vac, a wet-dry vacuum cleaner and the like. In the illustrated examples, the base 102 of the surface cleaning apparatus 100 includes a surface cleaning head 104 and an elongate rigid wand 106. In this configuration, the surface cleaning apparatus 100 can be used to clean a floor or other surface in a manner analogous to a conventional upright-style vacuum cleaner.

As exemplified in the illustrated embodiments, the hand vacuum 100 has a front end 108, a rear end 110, an upper end 112, and a lower end 114. The hand vacuum 100 may include a main body 116 having a main body housing 118 and a handle 120, an air treatment member 122 connected to the main body 116 (e.g., fixed or removably connected), a dirty air inlet 124, a clean air outlet 126, an airflow path 128 extending between the inlet 124 and outlet 126, and a suction motor 130 to generate vacuum suction through the airflow path 128 (see example airflow path in FIGS. 4, 8, 12, 16, 20). Optionally, the hand vacuum 100 may include a pre-motor filter 132 and/or a post-motor filter 134. The pre-motor filter 132 and post-motor filter 134 may respectively be positioned in the main body 116 within a pre-motor filter housing 136 and a post-motor filter housing 138, which may be integrally formed as part of the main body housing 118 or removably positioned therein.

Power can be supplied to the hand vacuum 100 by an optional electrical cord 140 (see e.g., FIG. 1) that can be connected to a standard wall electrical outlet. Alternatively, or in addition, the power source for the hand vacuum 100 can be one or more onboard energy storage members 142 (see e.g., FIGS. 8, 12, 16, 20), including, for example, one or more batteries. The one or more batteries may be any type of battery including, for example, solid state batteries, one or more capacitors, super capacitors or ultra capacitors.

Figure 2:
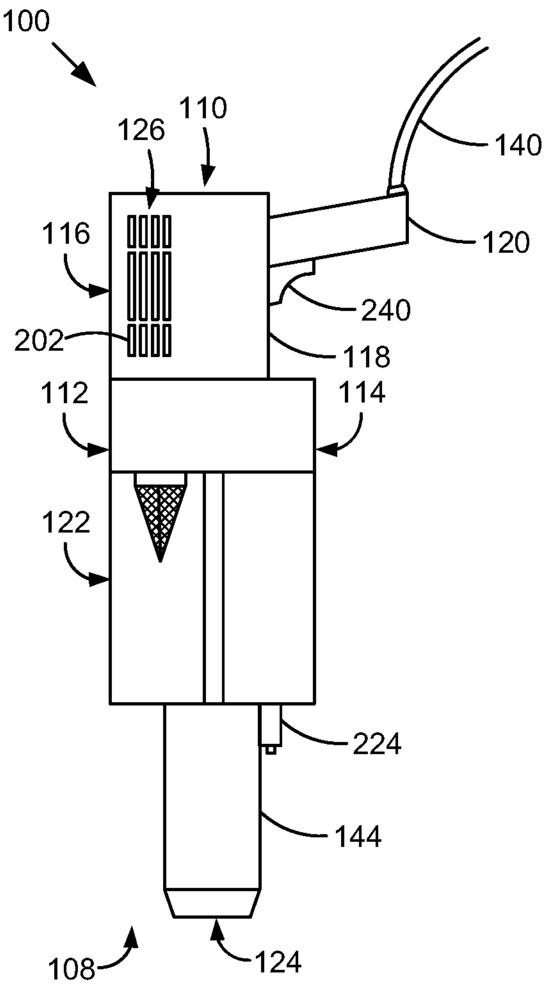
FIG. 2 is a schematic side view of the hand vacuum cleaner of FIG. 1.
Figure 3:
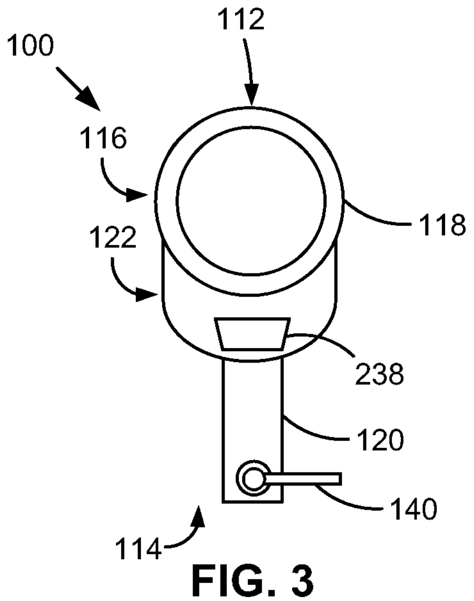
FIG. 3 is a schematic rear view of the hand vacuum cleaner of FIG. 1.
Figure 10:
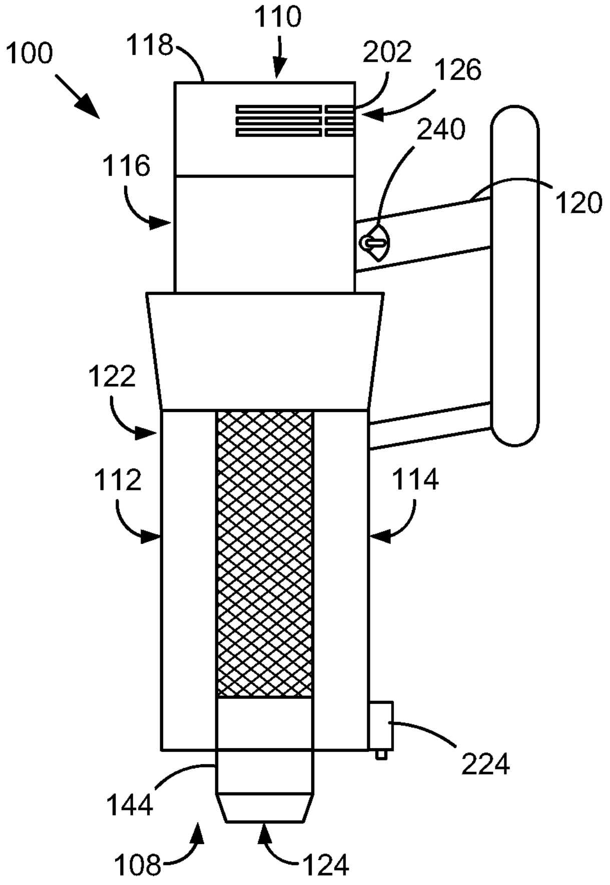
FIG. 10 is a schematic side view of the hand vacuum cleaner of FIG. 9.
Figure 11:
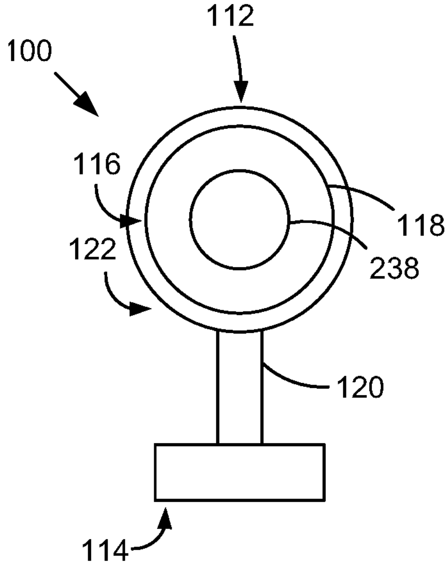
FIG. 11 is a schematic rear view of the hand vacuum cleaner of FIG. 9.
Figure 18:
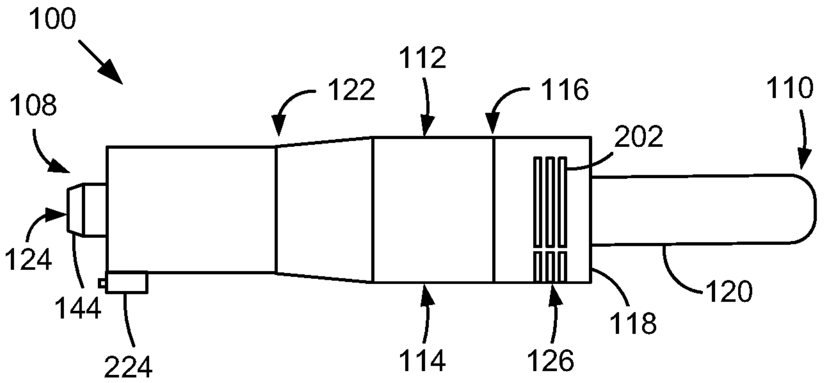
FIG. 18 is a schematic side view of the hand vacuum cleaner of FIG. 17.
Figure 19:
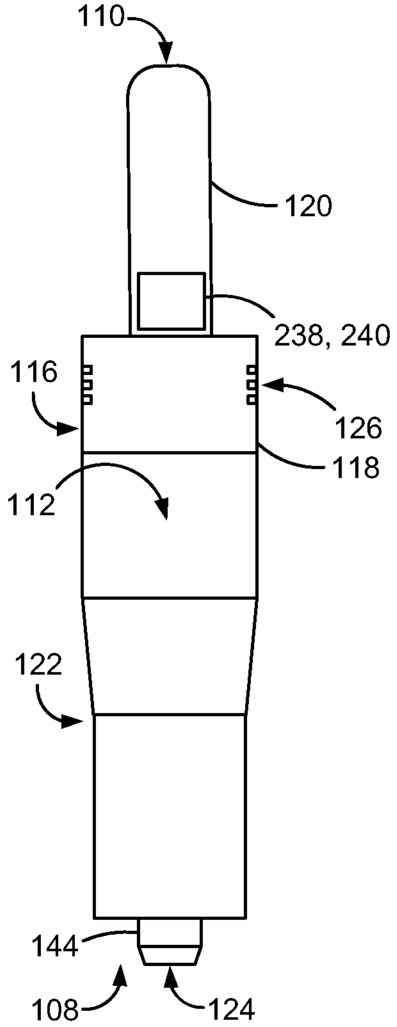
FIG. 19 is a schematic top view of the hand vacuum cleaner of FIG. 17.

The dirty air inlet 124 may be provided at the front end 108 and may be positioned proximate the upper end 112 (see e.g., FIGS. 6 and 14), lower end 114, or any position therebetween, such as positioned centrally between the upper and lower ends 112, 114, e.g., through the center of the front wall of the air treatment assembly (see e.g., FIGS. 2, 10, and 18). The hand vacuum 100 includes an air inlet conduit 144. As exemplified, the air inlet conduit 144 is a generally linear member having a sidewall 146 extending between axially opposed ends. The air inlet conduit 144 extends along a conduit axis 148 that is oriented in a longitudinal forward/backward direction. The conduit axis 148 is generally horizontal when the hand vacuum 100 is oriented with the upper end 108 above the lower end 110.

The dirty air inlet 124 may be provided at one of the axially opposed ends of the air inlet conduit 144, e.g., the front end, such that the dirty air inlet 124 is positioned forward of the air treatment member 122 as shown. Optionally, the end of the air inlet conduit 144 having the dirty air inlet 124 can be used as a nozzle to directly clean a surface. A dirty air outlet 150 may be provided proximate the other of the axially opposed ends of the air inlet conduit 144, e.g., the rear end, such as at the axially opposed end or in the sidewall 146 of the air inlet conduit 144 proximate the end. The dirty air outlet 150 introduces dirty air into the air treatment assembly, which is also referred to as an air treatment member 122. It will be appreciated that the air inlet conduit 144, dirty air inlet 124, and/or dirty air outlet 150 may be provided in different locations.

The air treatment member 122 may be configured to treat the air in a desired manner, including, for example, removing dirt particles and other debris and/or water from the air flow. The air treatment member 122 may include at least one cleaning stage and may optionally include two or more cleaning stages arranged in series with each other. Each cleaning stage may comprise one or more air treatment chambers, some or all of which may be cyclone chambers. Accordingly, the cleaning stages may be cyclonic (see e.g., FIGS. 4, 8, 12, 20) or non-cyclonic such as a non-cyclonic air treatment chamber, which may be referred to as a non-cyclonic momentum separator chamber (see e.g., FIG.

16). Alternately or in addition a bag, a porous physical filter media (such as foam or felt) or other air treating means may be used. Each cyclonic cleaning stage may include a cyclone unit that has one or a plurality of cyclone chambers arranged in parallel with each other, and optionally one or more dirt collection chambers that are external to the cyclone chamber (s), of any suitable configuration. Alternately, the cyclone chamber may include an internal dirt collection region without a separate external dirt collection chamber.

The air treatment member 122 may be provided toward the front end 108 or rear end 110 of the hand vacuum 100. As exemplified, the air treatment member 122 may have a central axis 152 oriented in the longitudinal forward/backward direction. If the air treatment chamber is a cyclone, then the central axis 152 is a cyclone axis of rotation (see e.g., FIGS. 4, 8, 12, 20). If the air treatment chamber is non-cyclonic, then the axis is the longitudinal axis of the air treatment chamber. As used herein, "central" means the axis is centrally located in the air treatment chamber a plane that is transverse to the axis and generally equally spaced from opposed lateral sides of, e.g., a cyclone or an air treatment chamber. As exemplified, the air treatment member 122 has a forward end wall 154, an opposed rearward end wall 156 that is spaced apart from the forward end wall 154 along the central axis 152, and a sidewall 157 extending between the forward and rearward end walls 154, 156. When the hand vacuum 100 is oriented with the upper end 112 above the lower end 114 (e.g., positioned with a bottom that is generally planar and is generally parallel to a horizontal surface), the central axis 152 of the air treatment member 122 may be oriented horizontally. The central axis 152 may be parallel to the conduit axis 148 of the air inlet conduit 144 (see e.g., FIGS. 4, 8, 16) and, in some embodiments, coaxial with the conduit axis 148 (see e.g., FIGS. 12, 20) and in others it may extend transversely thereto (i.e., in the lateral direction).

FIGS. 4, 8, 12, and 20 show example embodiments of the hand vacuum 100 wherein the air treatment member 122 includes a first cyclonic stage comprising a single first stage cyclone chamber 158. It will be appreciated that while the following discussion is of embodiments wherein the first cyclonic stage is a single first stage cyclone, the first cyclonic stage may comprise a plurality of cyclones in parallel. Further, if the first stage uses a non-cyclonic air treatment chamber, such as a non-cyclonic momentum separator, then the first stage may be referred to as a first air treatment stage.

As shown, the central axis 152 is the cyclone axis of rotation about which air circulates when within the first stage cyclone chamber 158. The first stage cyclone chamber 158 has a sidewall 164 extending between a front end wall 162 and a rear end wall 164. As shown, the front end wall 162 of the first stage cyclone chamber 158 may be a common wall with the forward end wall 154 of the air treatment member 122 (see e.g., FIGS. 4, 12, 20) or may be spaced from the forward end wall 154 of the air treatment member 122 (see e.g., FIG. 8). The rear end wall 164 of the first stage cyclone chamber 158 may be a common wall with the rearward end wall 156 of the air treatment member 122 (see e.g., FIGS. 4, 8) or may be spaced from the rearward end wall 156 of the air treatment member 122 (see e.g., FIGS. 16, 20).

As exemplified, dirty air enters the first stage cyclone chamber 158 through a cyclone air inlet 166 and exits through a cyclone air outlet 168. The cyclone air inlet 166 may be a tangential air inlet and may be provided in the front end wall 162, rear end wall 164, or sidewall 160 of the first stage cyclone chamber 158. The cyclone air outlet 168 may be provided in the front end wall 162 or the rear end wall 164 of the first stage cyclone chamber 158. An axially extending porous member 170, such as a screen or mesh, may be positioned over the cyclone air outlet 168 and extend axially inwardly into the first stage cyclone chamber 158 from the rear end wall 164 and/or front end wall 162. Optionally, the cyclone air outlet 168 may include a cyclone air outlet conduit 172 extending axially inwardly into the first stage cyclone chamber 158 from the rear end wall 164 and/or front end wall 162, and the porous member 170 may extend from the distal end of the cyclone air outlet conduit 172 (see e.g., FIG. 8). The airflow path 128 may pass through the porous member 170 to separate at least some particulate matter from the air as it travels to the cyclone air outlet 168. The porous member 170 may have any shape, such as cylindrical (see e.g., FIGS. 12, 20), conical (see e.g., FIGS. 4, 8), of frusto-conical, for example. The first stage cyclone chamber 158 can optionally be a cyclone with unidirectional air flow (i.e., a "uniflow" cyclone chamber wherein the cyclone air inlet 166 and cyclone air outlet 168 are at opposite ends of the cyclone chamber). Alternatively, the first stage cyclone chamber 158 may be configured so that the cyclone air inlet 166 and cyclone air outlet 168 are located toward the same end of the cyclone chamber (e.g., an inverted configuration if the hand vac is oriented vertically with the air inlets and outlets at the lower end).

The cyclone air inlet 166 of the first stage cyclone chamber 158 is fluidly connected with the dirty air outlet 150 of the air inlet conduit 144. The cyclone air inlet 166 may be in fluid flow communication with the dirty air outlet 150 of the air inlet conduit 144 through a corresponding aperture in the front end wall 162 of the air treatment member 122 (see e.g., FIGS. 4, 12) or through a corresponding aperture in the sidewall 160 of the air treatment member 122 (see e.g., FIG. 8). In embodiments, the air inlet conduit 144 may extend centrally through the first stage cyclone chamber 158 interior of the porous member 170. In such embodiments, the cyclone air inlet 166 may be in communication with the dirty air outlet 150 of the air inlet conduit 144 through an additional conduit (not shown) extending radially outwardly from the air inlet conduit 144 at the dirty air outlet 150 and through the porous member 170 (see e.g., FIG. 20). As exemplified, the cyclone air inlet 166 may be a tangential air inlet that is used to redirect the air from the air inlet conduit 144 to the first stage cyclone chamber 158 such that, for example, dirty air is introduced into the first stage cyclone chamber 158 in a tangential direction, e.g., along the sidewall 160 thereof. Alternately, the cyclone air inlet 166 may be an axial air inlet that is used to introduce dirty air into the first stage cyclone chamber 158 in the axial direction thereof.

The air exiting the first stage cyclone chamber 158 may then travel downstream to the suction motor 130 through any intervening elements, such as the pre-motor filter 132 and/or energy storage member(s) 142. Optionally, as exemplified in FIGS. 12 and 20, the air treatment member 122 may include a second air treatment stage, such as one or more second stage cyclone chambers 180. The first and second air treatment stages are arranged in in series with each other such that air exiting the first air treatment stage flows into the second air treatment stage. The second air treatment stage may comprise a single second stage cyclone chamber 180, which may generally have the same configuration as the first stage cyclone chamber 158. Alternately, as exemplified, the second cyclonic stage 174 may include a plurality of cyclones chambers 180 arranged in parallel with each other. It will be appreciated that, if the second stage uses a non-cyclonic air treatment chamber or chambers, such as a non-cyclonic momentum separator, then the second stage may be referred to as a second air treatment stage.

As shown, the second cyclonic stage 174 may be rearward of the first stage cyclone chamber 158 such that the airflow path travels rearwardly from the cyclone air outlet 168 of the first stage cyclone chamber 158 to the second stage cyclone chamber(s) 180. In such embodiments, a front end wall 176 of the second stage cyclone chamber(s) 180 may be a common wall with the rear end wall 164 of the first stage cyclone chamber 158 and a rear end wall 178 of the second stage cyclone chamber(s) 180 may a common wall with the rearward end wall 156 of the air treatment member 122. As shown, the front end wall 176 of the second cyclonic stage 174 may be substantially the same shape and size as the rear end wall 164 of the first stage cyclone chamber 158, and the rear end wall 178 of the second cyclonic stage 174 may be larger in size (or, optionally, the same size or smaller in size) than the front end wall 176.

Alternatively, one or more of the second stage cyclone chamber(s) 180 may be forward of the first stage cyclone chamber 158 such that the airflow path travels forwardly to the one or more of the second stage cyclone chamber(s) 180 from the first stage cyclone chamber 158. In such embodiments, the front end wall 176 of the one or more of the second stage cyclone chamber(s) 180 may be a common wall with the forward end wall 154 of the air treatment member 122, and the rear end wall 178 of the one or more of the second stage cyclone chamber(s) 180 may be a common wall with the front end wall 162 of the first stage cyclone chamber 158. In such embodiments, the rear end wall 178 of the second cyclonic stage 174 may be substantially the same shape and size as the front end wall 162 of the first stage cyclone chamber 158, and the front end wall 176 of the second cyclonic stage 174 may be larger in size or smaller in size than the rear end wall 178 or the same size as the rear end wall 178.

Each cleaning stage of the air treatment member 122 may include at least one dirt collection region. For example, as exemplified in FIG. 16, if the first cleaning stage of the air treatment member 122 is a non-cyclonic air treatment chamber including the porous member 170, shown as a pleated filter, air may pass radially inwardly through the porous member 170, and particulate matter separated by the porous member 170 may collect in a dirt collection region 182 defined between the sidewall 157 of the air treatment member 122 and the porous member 170. If the air treatment member 122 includes one or more cyclonic cleaning stages, each cyclonic cleaning stage may similarly have a corresponding dirt collection region. The dirt collection region of each cyclonic cleaning stage may be internal to the cyclonic cleaning stage similar to the non-cyclonic cleaning stage of FIG. 16, such that particulate matter separated by the porous member 170 remains in the cyclone chamber. Additionally, or in the alternative, the dirt collection region of each cyclonic cleaning stage may be external to the cyclonic cleaning stage, such as in an external dirt collection chamber. In such embodiments, each cyclonic cleaning stage may be in communication with the dirt collection chamber by one or more dirt outlets of the cyclone chamber which allow particulate matter to pass from the cyclone chamber to the external dirt collection chamber. If the air treatment member 122 comprise more than one cleaning stage, then the cleaning stages may share a common dirt collection region or may have their own separate dirt collection regions that are fluidically isolated from each other.

Figure 12:
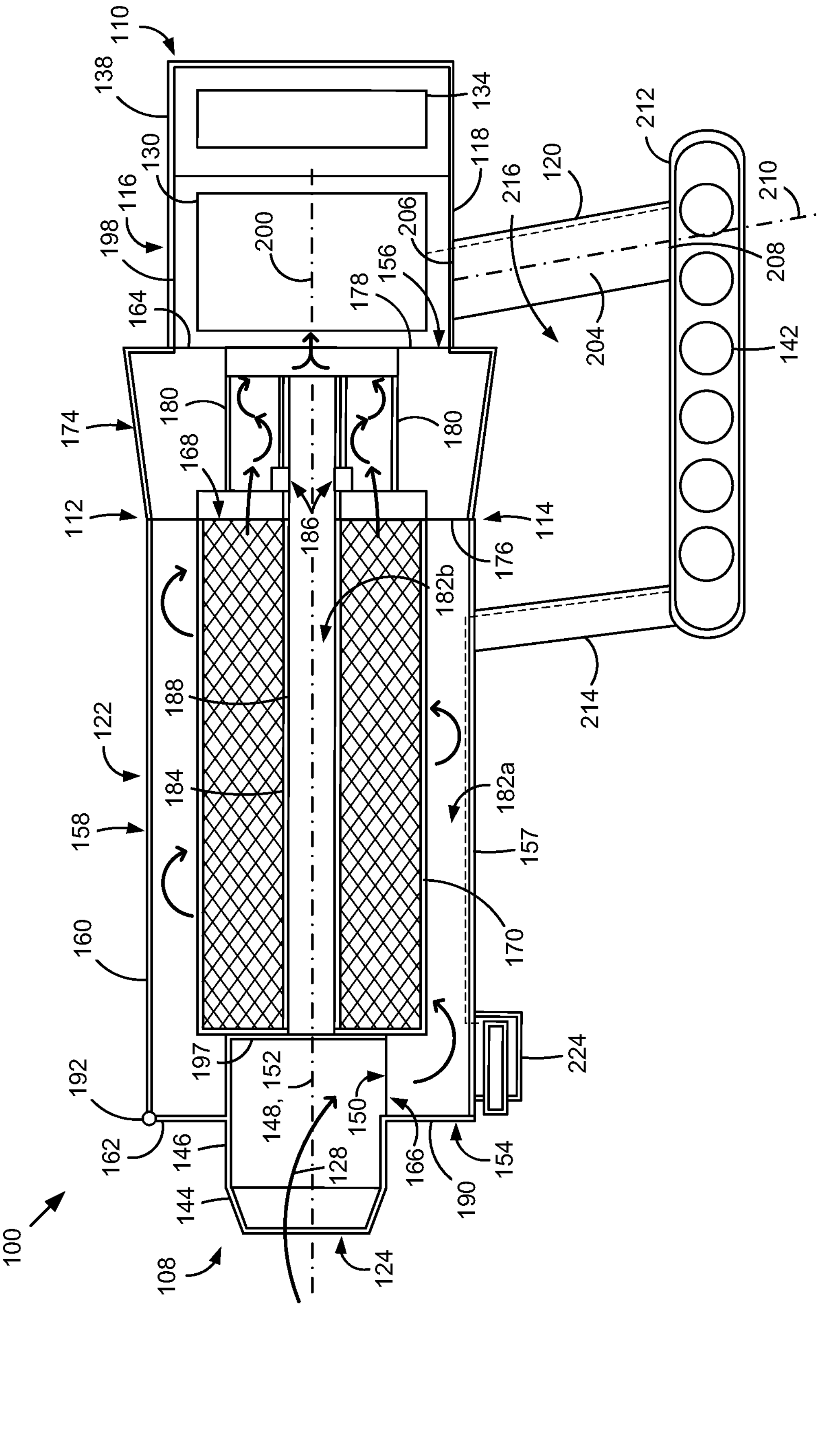
FIG. 12 is a schematic cross-sectional view of the hand vacuum cleaner of FIG. 9.
Figure 13:
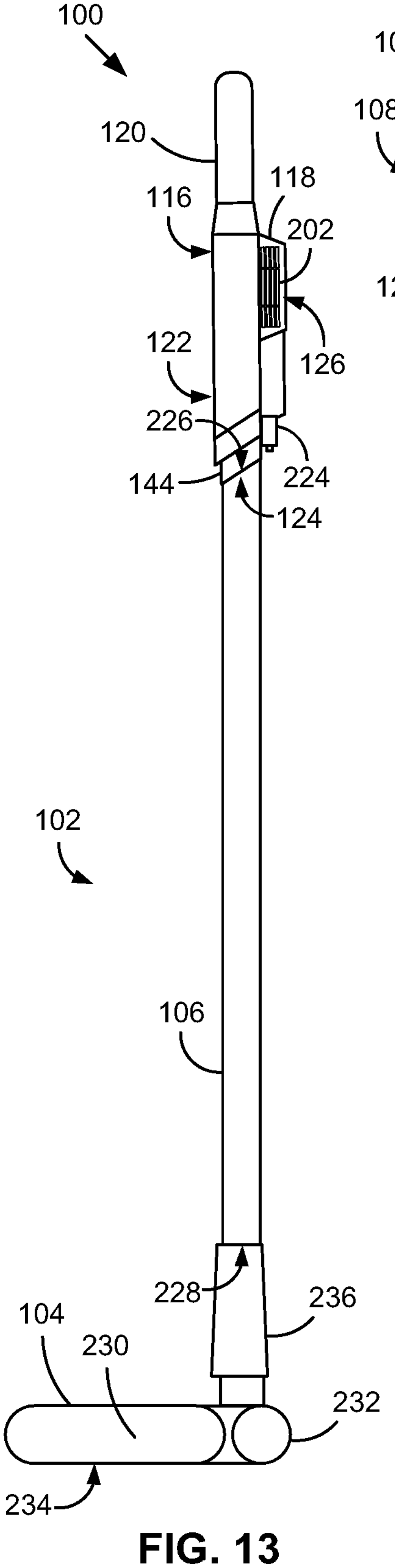
FIG. 13 is a schematic side view of another example hand vacuum cleaner attached to the wand and surface cleaning head.
Figure 14:
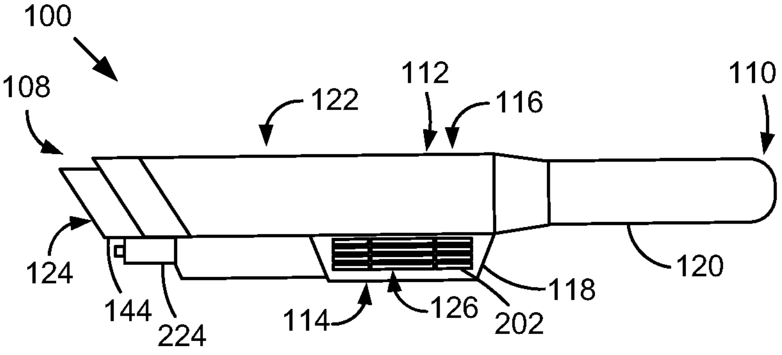
FIG. 14 is a schematic side view of the hand vacuum cleaner of FIG. 13.
Figure 15:
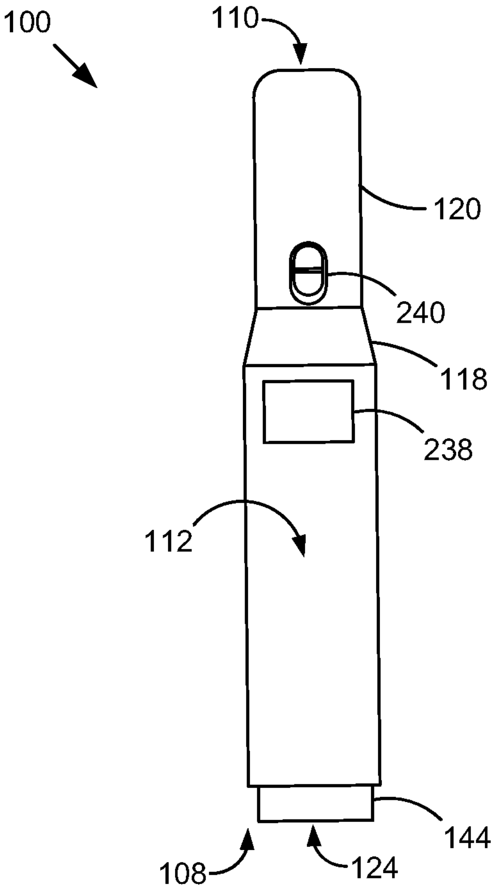
FIG. 15 is a schematic top view of the hand vacuum cleaner of FIG. 13.
Figure 20:
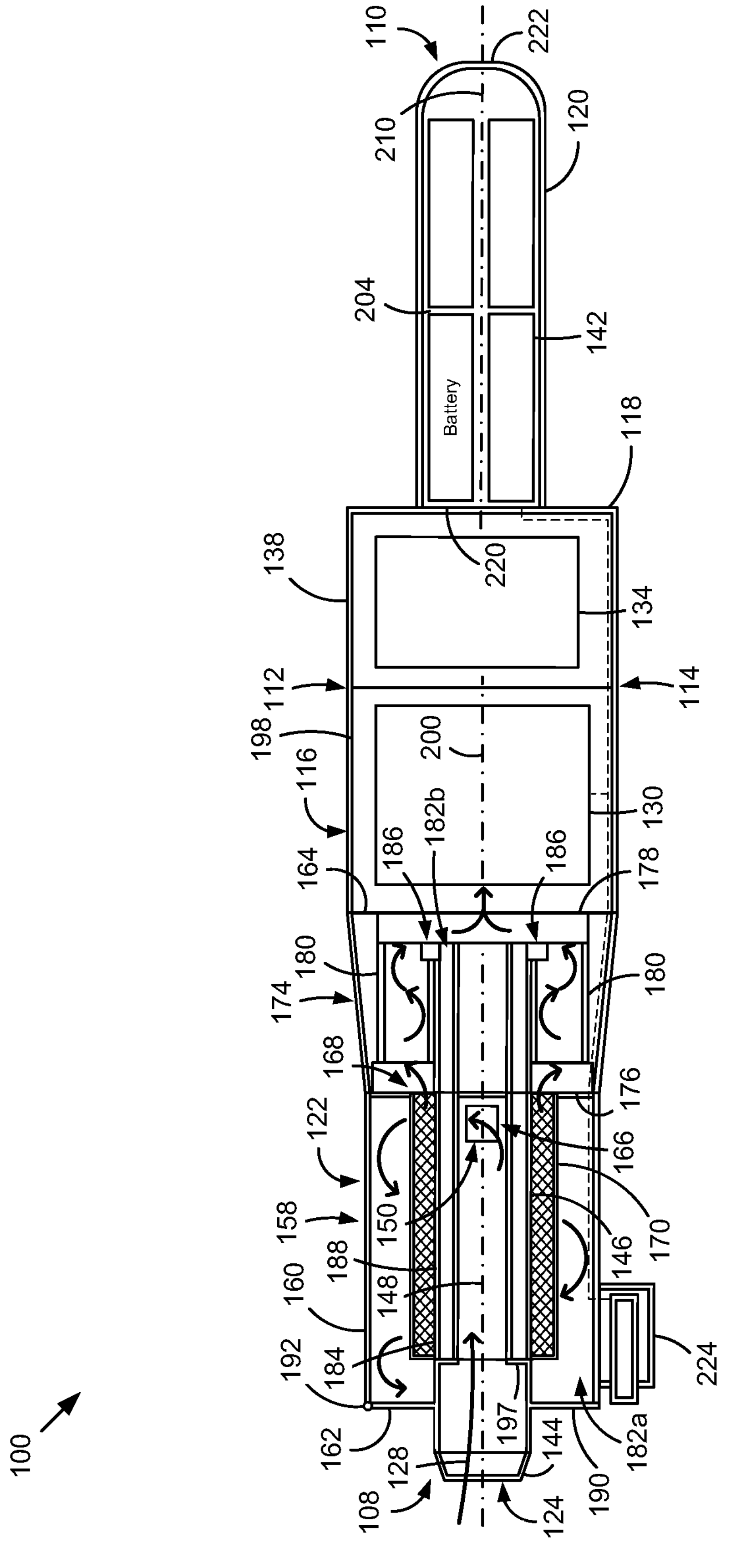
FIG. 20 is a schematic cross-sectional view of the hand vacuum cleaner of FIG. 17.

As exemplified in FIGS. 12 and 20, the dirt collection region 182*a* of the first stage cyclone chamber 158 may be internal to the first stage cyclone chamber 158 between the sidewall 160 of the first stage cyclone chamber 158 and the porous member 170. As exemplified in FIGS. 4 and 8, the dirt collection region 182*a* of the first stage cyclone chamber 158 may additionally, or alternatively, be an external dirt collection chamber 184. The dirt collection chamber 184 may have any position relative to the first stage cyclone chamber 158 such as partially, optionally entirely, forward, rearward, at a lateral side, above, and/or below the first stage cyclone chamber 158 (i.e., when the hand vacuum 100 is oriented as shown in FIG. 1 with the upper end 112 above the lower end 114). In the example shown in FIG. 4, the dirt collection chamber 184 is below the first stage cyclone chamber 158 and defined by the sidewall 160 of the first stage cyclone chamber 158 and the sidewall 157 of the air treatment member 122. In the example shown in FIG. 8, the dirt collection chamber 184*a* is forward of the first stage cyclone chamber 158 and defined between the front end wall 162 of the first stage cyclone chamber 158 and the forward end wall 154 of the air treatment member 122. As exemplified, the first stage cyclone chamber 158 may be in communication with the dirt collection chamber 184 via one or more dirt outlets 186 in the sidewall 160 of the first stage cyclone chamber 158.

Figure 102:
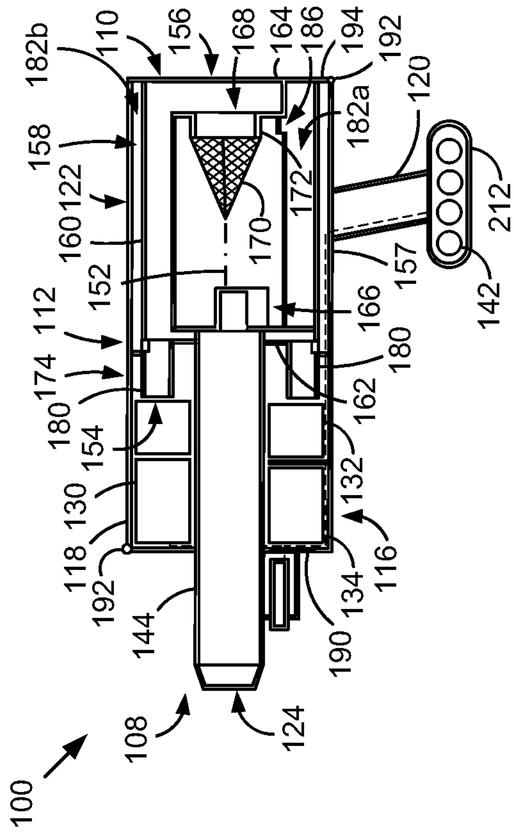
FIG. 102 is a schematic cross-sectional view of the hand vacuum cleaner of FIG. 101 with the motor forward of the air treatment member.
Figure 99:
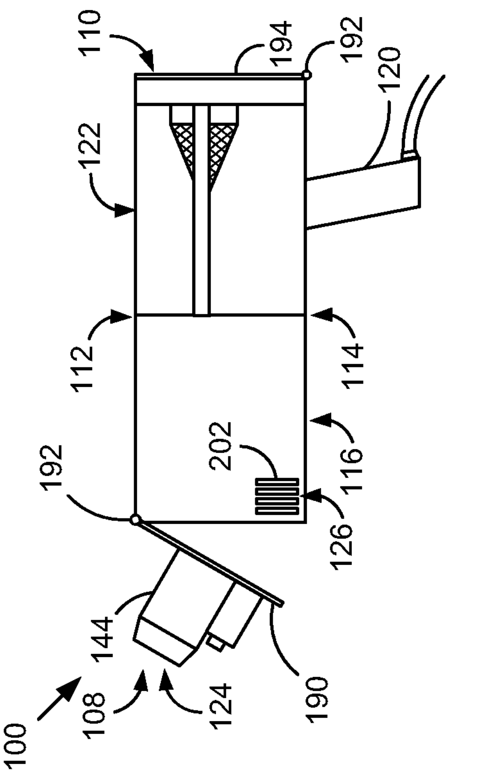
FIG. 99 is a schematic side view of a hand vacuum cleaner similar to the hand vacuum cleaner of FIG. 1.
Figure 101:
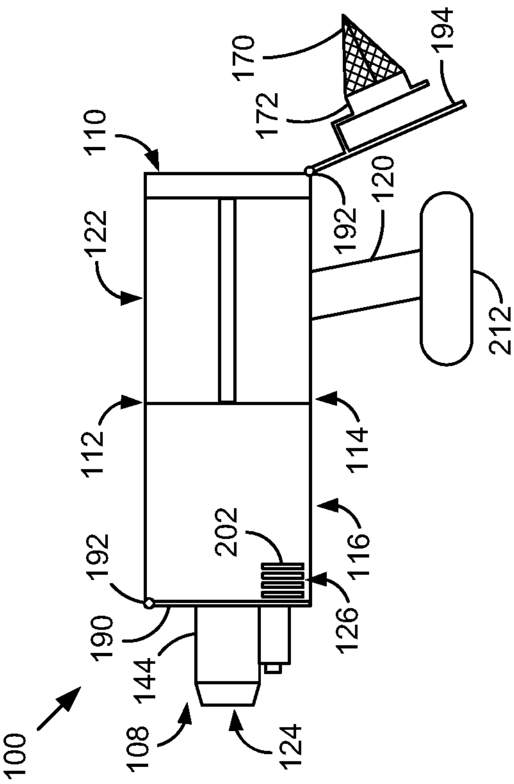
FIG. 101 is a schematic side view of a hand vacuum cleaner similar to the hand vacuum cleaner of FIG. 1.
Figure 103:
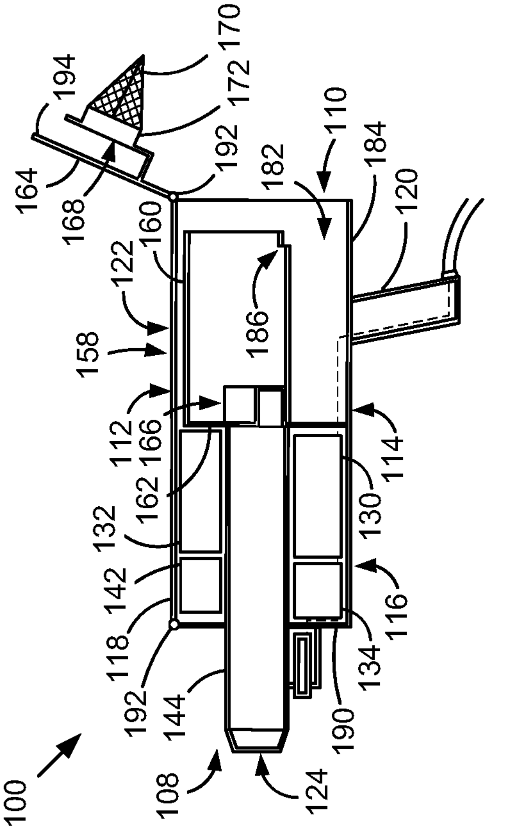
FIGS. 103-106 are schematic cross-sectional views of a hand vacuum cleaner similar to the hand vacuum cleaner of FIG. 1 with the motor forward of the air treatment member.
Figure 104:
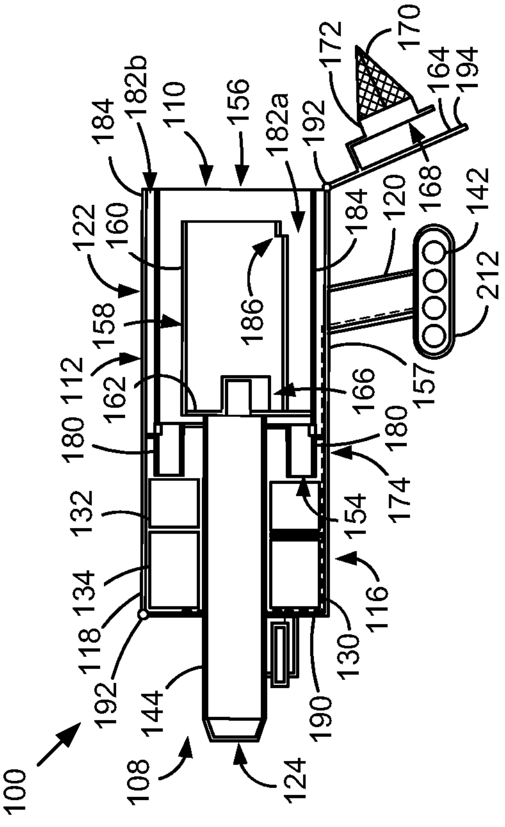
Figure 105:
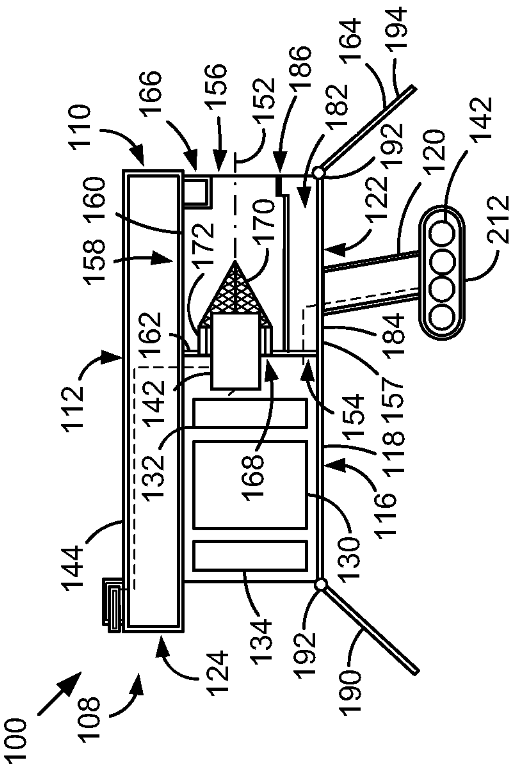
Figure 106:
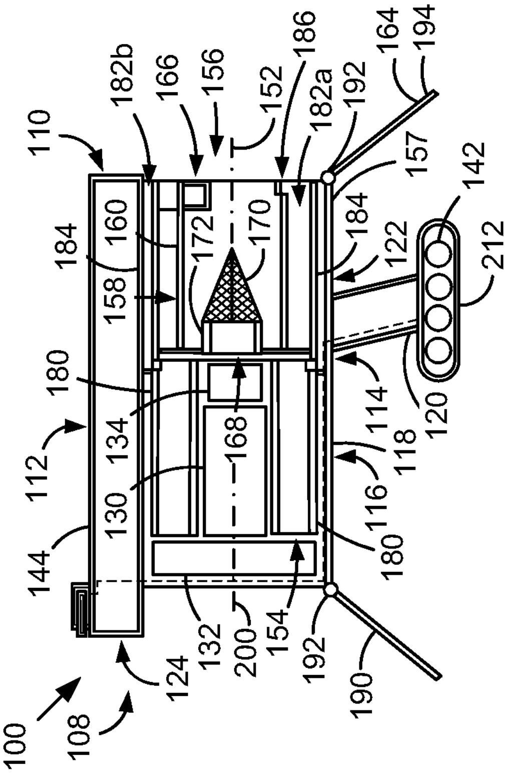
Figure 107:
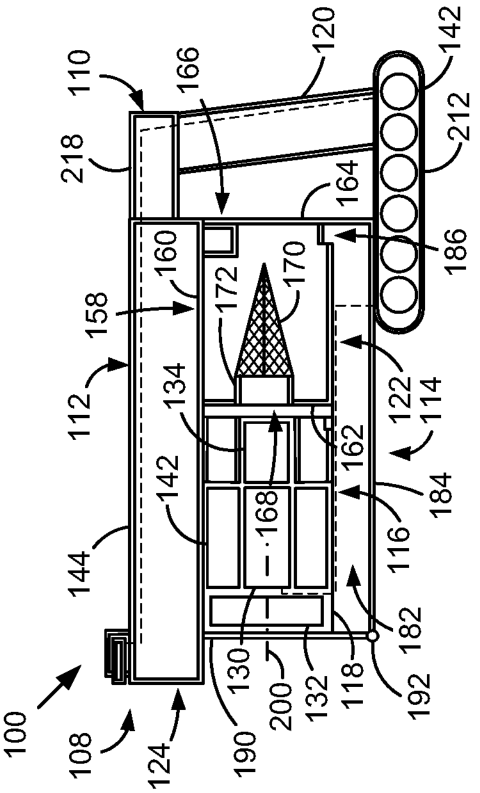
FIGS. 107-110 are schematic cross-sectional views of a hand vacuum cleaner similar to the hand vacuum cleaner of FIG. 5 with the motor forward of the air treatment member.
Figure 108:
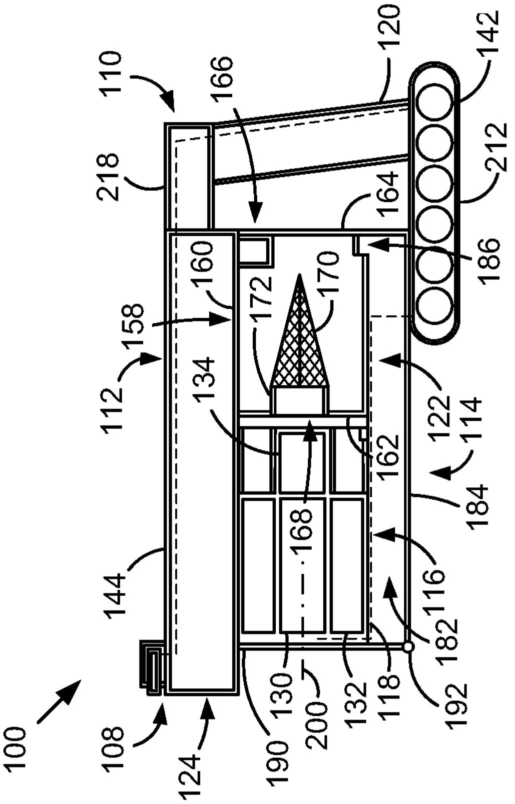

Optionally, if a second cyclonic stage 174 is present, a dirt collection region 182*b* of the second cyclonic stage 174 may similarly be internal or external to the second stage cyclone chamber 180. As exemplified in FIGS. 12 and 20, the dirt collection region 182*b* of the second stage cyclone chamber 180 may be external to the second stage cyclone chamber 180. Each cyclone 180 in the plurality of cyclones in the second cyclonic stage 174 may have a dirt outlet 186 in communication with a common dirt collection chamber 184. As described previously, the dirt collection chamber 184 may have any position relative to the second stage cyclone chamber 180. As exemplified, the dirt collection chamber 184 is defined by a central conduit 188 extending from the second cyclonic stage 174 into the first stage cyclone chamber 158 internal to the porous member 170. The dirt collection region 182*b* internal to the dirt collection chamber 184 may be the volume defined by the central conduit 188 (see e.g., FIG. 12). In some embodiments, the air inlet conduit 144 may extend internally through the central conduit 188 in the porous member 170 similar to as described previously. In such embodiments, the dirt collection region 182*b* internal to the dirt collection chamber 184 may be the annular volume defined between the central conduit 188 and the air inlet conduit 144 (see e.g., FIG. 20). In alternate embodiments, the dirt collection chamber 184 of the second cyclonic stage 174 may be provided at least partially surrounding the first stage cyclone chamber 158 such that the dirt collection region 182*b* of the second cyclonic stage 174 may be defined between the sidewall 160 of the first stage cyclone chamber 158 and the sidewall 157 of the air treatment chamber 122 (see e.g., FIG. 102). The dirt collection chamber 184 may be internal or adjacent an external dirt collection chamber of the first cyclonic stage.

The dirt outlet 186 in the first stage cyclone chamber 158 and in each cyclone 180 in the second cyclonic stage 174 may be of any suitable configuration. As shown, the dirt outlet 186 may be a slot that is provided in the sidewall 160 of the first stage cyclone chamber 158 or the sidewall of each cyclone 180 toward the rear end (see e.g., FIGS. 4, 20) and/or forward end (see e.g., FIGS. 8, 12). The slot dirt outlet 186 can extend around at least a portion of the perimeter of the respective sidewall and may have any suitable height in the axial direction. Any number of slot dirt outlets 186 having any position may be used. In use, particulate matter may be thrown from the cyclonic airflow path within the cyclone/cyclone chamber through the dirt outlet 186 (i.e., momentum separation) and/or fall through the dirt outlet 186 under the force of gravity into the dirt collection chamber(s) 184.

At least a portion of the air treatment member 122 can be openable for emptying. For example, the forward end wall 154, rearward end wall 156, or optionally both end walls, can be openable for emptying one or more of the dirt collection region(s) 182 in the first stage cyclone chamber 158, second cyclonic stage 174, and dirt collection chamber (s) of the first and/or second cyclonic stages. As exemplified in FIGS. 4, 8, 12, and 20, the forward end wall 154 of the air treatment member 122 may be a front door 190 that is openably connected (e.g., pivotally openable or removably mounted) to the sidewall 157 of the air treatment member 122 using any suitable mechanism, including a hinge 192 or other suitable device. Optionally, the front door 190 can be secured in the closed position using any suitable type of locking mechanism, including a latch mechanism that can be released by a user. The actuator for opening/releasing the front door 190 can be provided on the air treatment member 122 itself, on the main body 116, or on any other portion of the hand vacuum 100. Additionally, or alternatively, the rearward end wall 156 of the air treatment member 122 may be a rear door 194 openably configured similarly to the front door 190.

Figure 4:
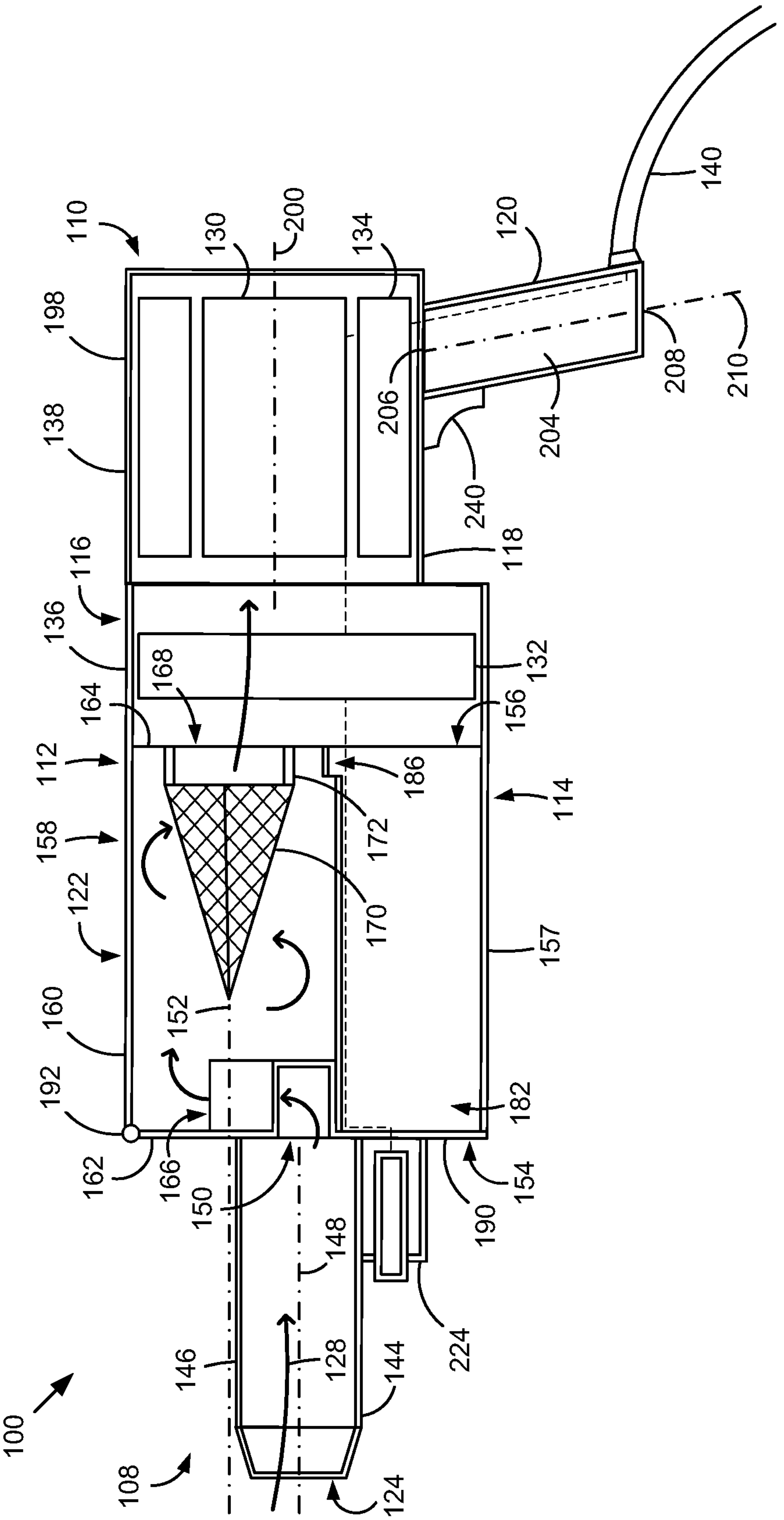
FIG. 4 is a schematic cross-sectional view of the hand vacuum cleaner of FIG. 1.
Figure 5:
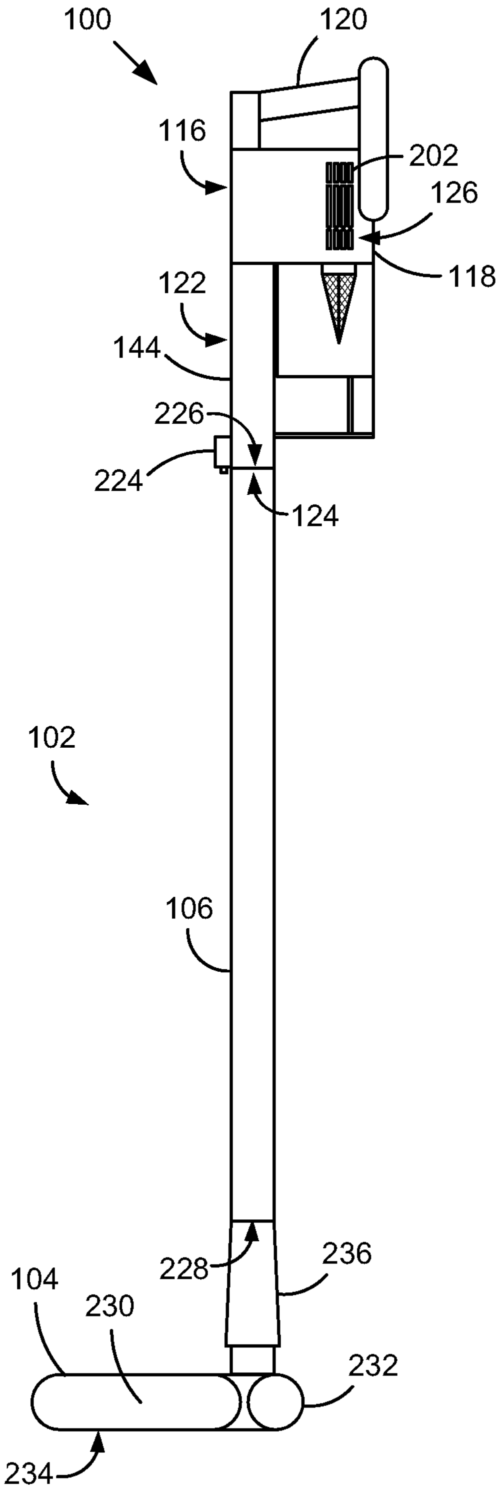
FIG. 5 is a schematic side view of another example hand vacuum cleaner attached to the wand and surface cleaning head.
Figure 6:
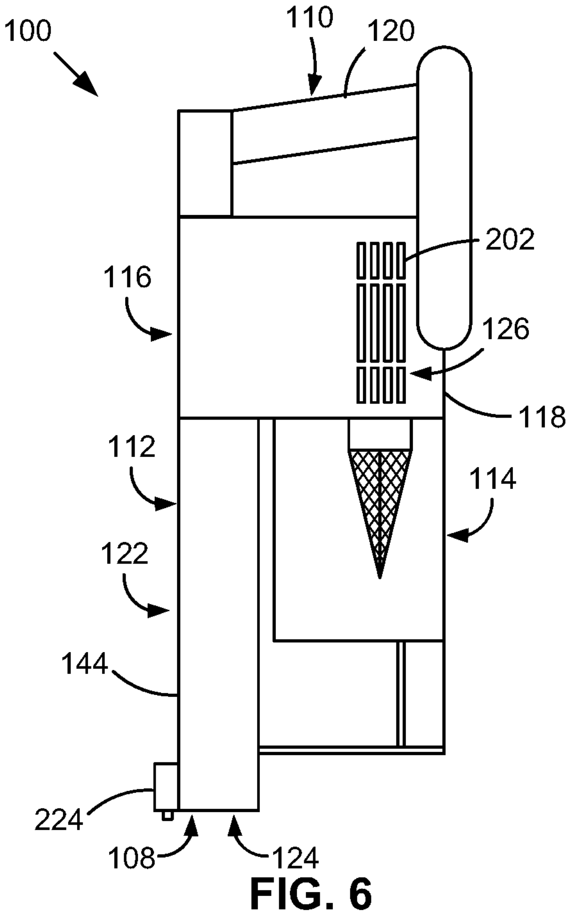
FIG. 6 is a schematic side view of the hand vacuum cleaner of FIG. 5.
Figure 7:
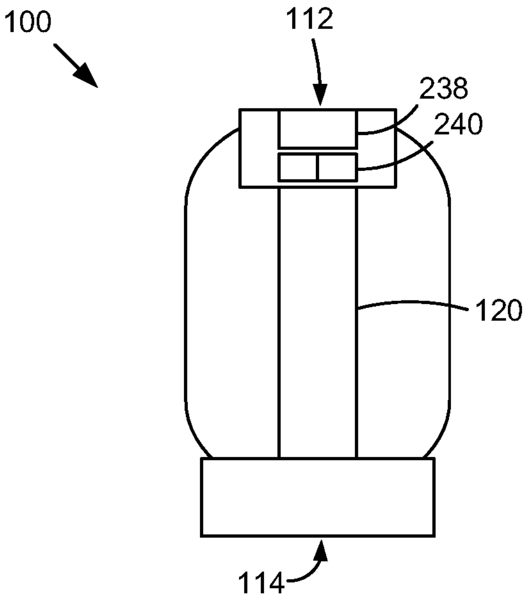
FIG. 7 is a schematic rear view of the hand vacuum cleaner of FIG. 5.

As described, the front end wall 162 of the first stage cyclone chamber 158 may be a common wall with the forward end wall 154 of the air treatment member 122 (see e.g., FIGS. 4, 12, 20). In such embodiments, opening the front door 190 may open the first stage cyclone chamber 158 for emptying the dirt collection region 182*a* therein. Alternately, the front end wall 162 of the first stage cyclone chamber 158 may be discrete and spaced from the forward end wall 154 of air treatment member 122 (see e.g., FIG. 8). In such embodiments, the front end wall 162 may be coupled to the forward end wall 154 by a connecting member 196 such that opening the front door 190 simultaneously moves the front end wall 162 of the first stage cyclone chamber 158 to open the first stage cyclone chamber 158 for emptying the dirt collection region 182*a* therein.

In any embodiment, the external dirt collection chamber 184 of the first stage cyclone chamber 158 may be openable by moving the front door 190 to the open position. For example, in FIG. 4 the dirt collection chamber 184 is enclosed at one end by a portion of the forward end wall 154 of the air treatment member 122 between the sidewall 160 of the first stage cyclone chamber 158 and the sidewall 157 of the air treatment member 122. As another example, in FIG. 8, the dirt collection chamber 184 is enclosed at one end by the forward end wall 154 of the air treatment member 122 and enclosed at the opposed end by the front end wall 162 of the first stage cyclone chamber 158, with the connecting member 196 extending through the dirt collection chamber 184. In such examples, opening the front door 190 may simultaneously open the first stage cyclone chamber 158 and the external dirt collection chamber 184 for emptying the dirt collection region 182*a* therein.

In any embodiment, the external dirt collection chamber 184 of the second cyclonic stage 174 may be openable by moving the front door 190 to the open position. For example, the central conduit 188 for the second cyclonic stage extends to the front door 190 or front wall 162. Alternately, in some embodiments, the air inlet conduit 144 may be moveable with the front door 190 and the central conduit 188 defining the dirt collection chamber 184 may be enclosed at one end by the air inlet conduit 144 (see e.g., FIG. 12). In some embodiments, only a portion of the air inlet conduit 144 may be moveable with the front door 190 and the central conduit 188 defining the dirt collection chamber 184 may be enclosed at one end by the moveable portion of the air inlet conduit 144 (see e.g., FIG. 20). For example, as shown in FIG. 12, the end of the air inlet conduit 144 that is axially opposed to the dirty air inlet 124 may be fully closed by a barrier wall 197 and, when the front door 190 is in the closed position, the barrier wall 197 may close the central conduit 188. In such examples, the barrier wall 197 may additionally extend radially outwardly from the sidewall 146 of the air inlet conduit 144 to close the central conduit 188 if the central conduit 188 is larger in cross-section than the air inlet conduit 144. As shown in FIG. 20, the moveable portion of the air inlet conduit 144 may be include the barrier wall 197 extending radially inwardly and/or radially outwardly from the sidewall 146 of the air inlet conduit 144. As shown, the barrier wall 197 may be positioned such that, when the front door 190 is in the closed position, the barrier wall 197 may close the annular space between the central conduit 188 and the fixed portion of the air inlet conduit 144 while permitting airflow between the moveable and fixed portions of the air inlet conduit 144. In such examples, opening the front door 190 may simultaneously open the first stage cyclone chamber 158 and the external dirt collection chamber 184 of the second cyclonic stage 174 for emptying the dirt collection regions 182*a*, 182*b* therein.

Accordingly, in the example embodiments described herein, opening the front door 190 of the air treatment member 122 (and/or rear door in alternate embodiments) may concurrently open the first stage cyclone chamber 158, the dirt collection chamber 184 of the first stage cyclone chamber 158, and/or the dirt collection chamber 184 of the second cyclonic stage 174 and/or the second stage cyclone chambers 180 for simultaneously emptying the dirt collection regions 182 therein. In this arrangement, a user may hold the hand vacuum 100 via the handle 120 with one hand and open the front door 190 with the other hand to empty the dirt collection regions 182. Additionally, or alternatively, the air treatment member 122 may be fully removable from the main body 116, including the first stage cyclone chamber 158 and dirt collection chamber(s) 184, for simultaneously emptying the dirt collection region(s) 182 therein. This may also allow access to additional portions of the hand vacuum 100 that would otherwise be concealed for cleaning, inspection and the like.

As exemplified, the suction motor 130 may be positioned within a motor housing 198, which may be part of the main body 116. As discussed subsequently, the suction motor 130 may be forward or rearward of the air treatment member 122. In the embodiments illustrated in FIGS. 1 to 20, the suction motor 130 is rearward of the air treatment member 122. In any embodiment, the suction motor 130 may be positioned internal, partially internal, or external to the air treatment member 122, such as fully nested in the first or second cleaning or air treatment stages or partially nested in one or both of the first or second cleaning stages. In the illustrated embodiments, the suction motor 130 is external to the air treatment member 122. The suction motor 130 may be at any other position within the hand vacuum cleaner 100, such as partially or fully nested in the pre-motor filter 132, post-motor filter 134, and/or handle 120.

The suction motor 130 used in the hand vacuum 100 may be of any suitable design and configuration that is sufficient to impart a desired air flow through the hand vacuum 100. For example, the suction motor 130 may include a fan and/or impeller (i.e., a motor and fan assembly), which rotates about a motor axis 200 of rotation to help generate the desired air flow. When the hand vacuum 100 is oriented with the upper end 112 above the lower end 114, the motor axis 200 of the suction motor 130 may be oriented horizontally. The motor axis 200 may be parallel to the central axis 152 of the air treatment member 122 and/or the conduit axis 148 of the air inlet conduit 144 (see e.g., FIGS. 4, 16) and, in some embodiments, coaxial with the central axis 152 and/or conduit axis 148 (see e.g., FIGS. 12, 20). Alternately, when the surface cleaning apparatus 100 is oriented with the upper end 112 above the lower end 114, the motor axis 200 of the suction motor 130 may be oriented vertically. The motor axis 200 may extend transversely to the central axis 152 of the air treatment member 122 and/or the conduit axis 148 of the air inlet conduit 144 (see e.g., FIG. 8).

As exemplified in FIGS. 1-2, 5-6, 9-10, 13-14, and 17-18, the clean air outlet 126 may be provided as part of the main body 116. The clean air outlet 126 includes a grill 202, which may be oriented such that air exiting the clean air outlet 126 travels generally upwardly, generally laterally outwardly, and/or at an inclined angle generally rearwardly from the hand vacuum 100. Such directional airflow exiting the clean air outlet 126 may beneficially avoid the exhaust airflow impacting the user or the surface to be cleaned. The clean air outlet 126 may be at any position rearward of the dirty air inlet 124 such as proximate the rear end 110 (see e.g., FIGS. 2, 10) or at any other position intermediate the front and rear ends 108, 110 (see e.g., FIGS. 6, 14, 18), and may be at any position between the upper and lower ends 112, 114, such as proximate the upper end 112 (see e.g., FIG. 2) or proximate the lower end 114 (see e.g., FIGS. 6, 10, 14, 18). Any other position of the clean air outlet 126 may be possible, such as in the handle 120, below handle 120, or in the sidewall 157 of the air treatment chamber 122.

Optionally, one or more pre-motor filters 132 may be provided in the hand vacuum 100 at any position in the airflow path 128 upstream from the suction motor 130, such as in the pre-motor filter housing 136 in the main body 116, annularly around the suction motor 130, and/or partially nested or fully nested in the air treatment chamber 122, or in the handle 120, for example. The pre-motor filter 132 may be formed from foam or any other suitable physical, porous filter media and have any suitable shape, such as cylindrical, or a generally flat, slab-like filter. An optional felt filter layer can be provided on one side of the pre-motor filter 132, and preferably is positioned adjacent the downstream side but may be provided on the upstream side.

Optionally, one or more post-motor filters 134 may, alternatively or in addition to the pre-motor filter 132, be provided in the hand vacuum 100 at any position in the airflow path 128 downstream from the suction motor 130, such as in the post-motor filter housing 138 in the main body 116, annularly or partially annularly around the suction motor 130, and/or partially nested or fully nested in the air treatment chamber 122, or in the handle 120, for example. The post-motor filter 134 may be a physical foam media filter or may be any other suitable physical porous filter media, including, for example, a felt filter, a HEPA filter, a paper filter, other physical filter media, an electrostatic filter, and the like.

The hand vacuum 100 in accordance with the example embodiments described herein may include any suitable type of carry handle as part of the main body 116. As exemplified, the handle 120 may be located proximate the rear end 110 of the hand vacuum 100.

Figure 8:
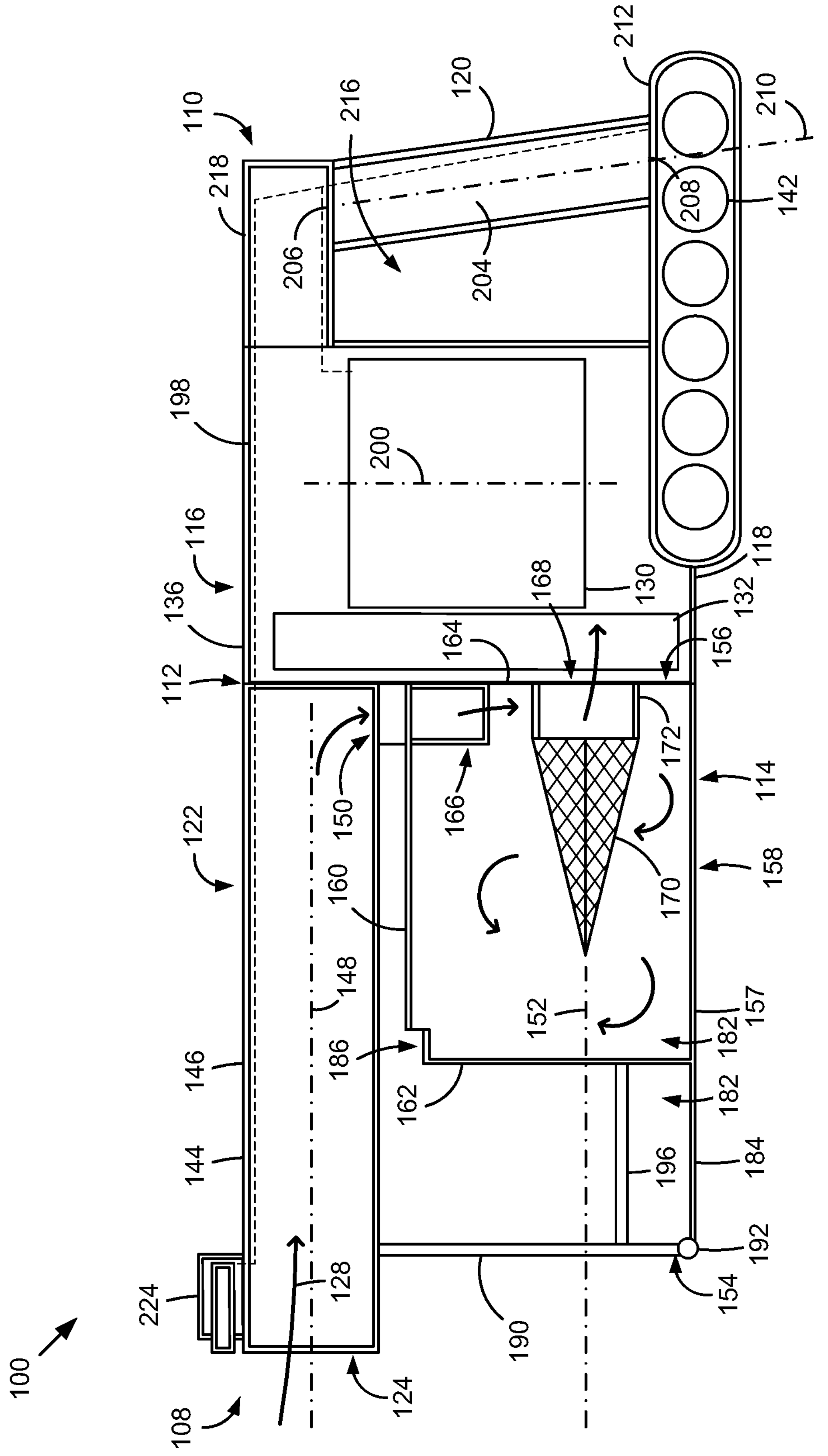
FIG. 8 is a schematic cross-sectional view of the hand vacuum cleaner of FIG. 5.
Figure 9:
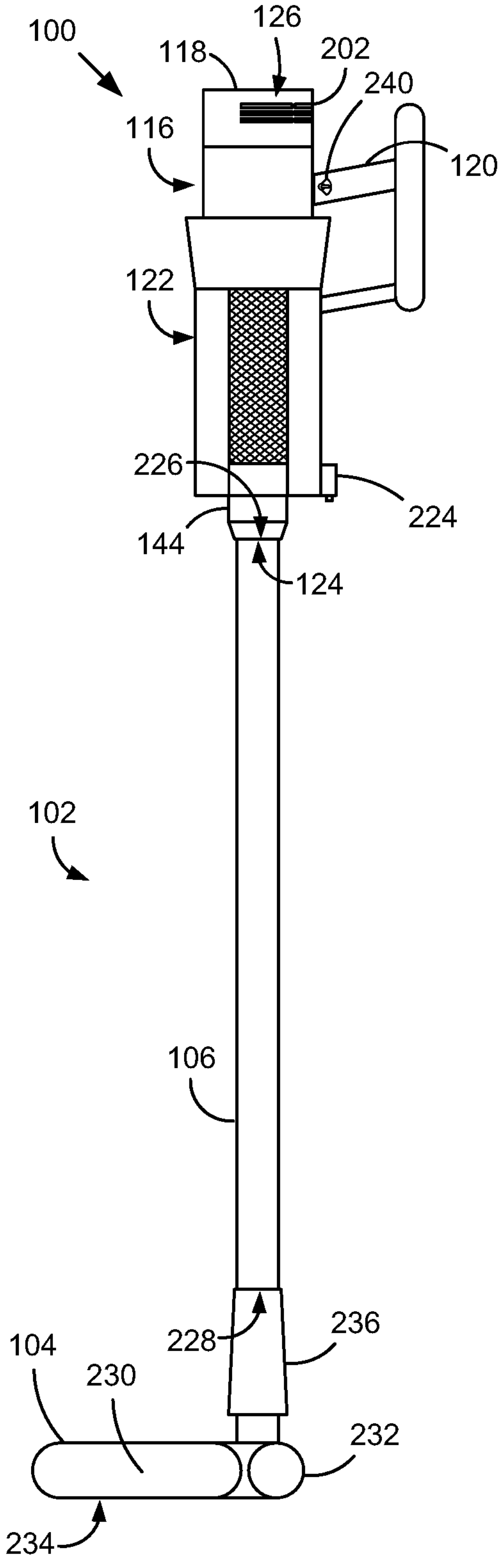
FIG. 9 is a schematic side view of another example hand vacuum cleaner attached to the wand and surface cleaning head.

The handle 120 may be a pistol-grip style handle having an elongate hand grip portion 204 extending downwardly and rearwardly along a hand grip axis 210 between an upper end 206 and a lower end 208 (see e.g., FIGS. 4, 8, 12). When the hand vacuum 100 is oriented so that the upper end 112 is disposed above the lower end 114 as exemplified in FIG. 1, the hand grip axis 210 may form an acute angle from vertical. The angle can be any suitable angle, and preferably is between about 5-85°, and may be between about 20-60°.

In some examples, the upper end 206 of the handle 120 may be coupled to a lower side of the main body 116 such that the handle 120 extends downwardly and rearwardly from the lower side of the main body 116 (see e.g., FIGS. 4, 12). In some examples, the lower end 208 of the handle 120 may include a lower member 212, which may function as a stand and/or housing for various elements of the hand vacuum 100 (see e.g., FIG. 12). In some examples, the handle 120 may extend upwardly and forwardly to the main body 116 from a rearward end of the lower member 212 and a finger guard 214 may extend upwardly and forwardly to the main body 116 from a forward end of the lower member 212. In such examples, a finger gap 216 for receiving the fingers of a user is formed between the hand grip portion 204 of the handle 120 and the finger guard 214. The finger gap 216 in such examples is bounded by the hand grip portion 204, the finger guard 214, the lower member 212, and lower side of the main body 116. The finger guard 214 may improve the function of the lower member 212 as a stand, may function as a secondary handle (i.e., a different handle for one-handed use or a supplementary handle for two-handed use), improve the strength of the coupling of the handle 120 to the main body 116, reduce torque experienced by the user holding the handle 120, and/or house various elements of the hand vacuum 100. The handle 120, lower member 212, and/or finger guard 214 may be hollow to house components of the hand vacuum 100 and/or form part of the airflow path 128 as discussed subsequently.

In some examples, the upper end 206 of the handle 120 may include an upper member 218 and the lower end 208 of the handle 120 may include the lower member 212. Each of the upper and lower members 206, 208 (e.g., flanges) may be coupled to a rear end of the main body 116 (see e.g., FIG. 8) such that one or more of the conduit axis 148, central axis 152, and motor axis 200 intersect the handle 120. In such examples, the finger gap 216 for receiving the fingers of a user is formed between the hand grip portion 204 of the handle 120 and the main body 116. The finger gap 216 in such examples is bounded by the hand grip portion 204, the upper member 218, the lower member 212, and the rear end of the main body 116. The handle 120, lower member 212, and/or upper member 218 may be hollow to house components of the hand vacuum 100 and/or form part of the airflow path 128.

Figure 16:
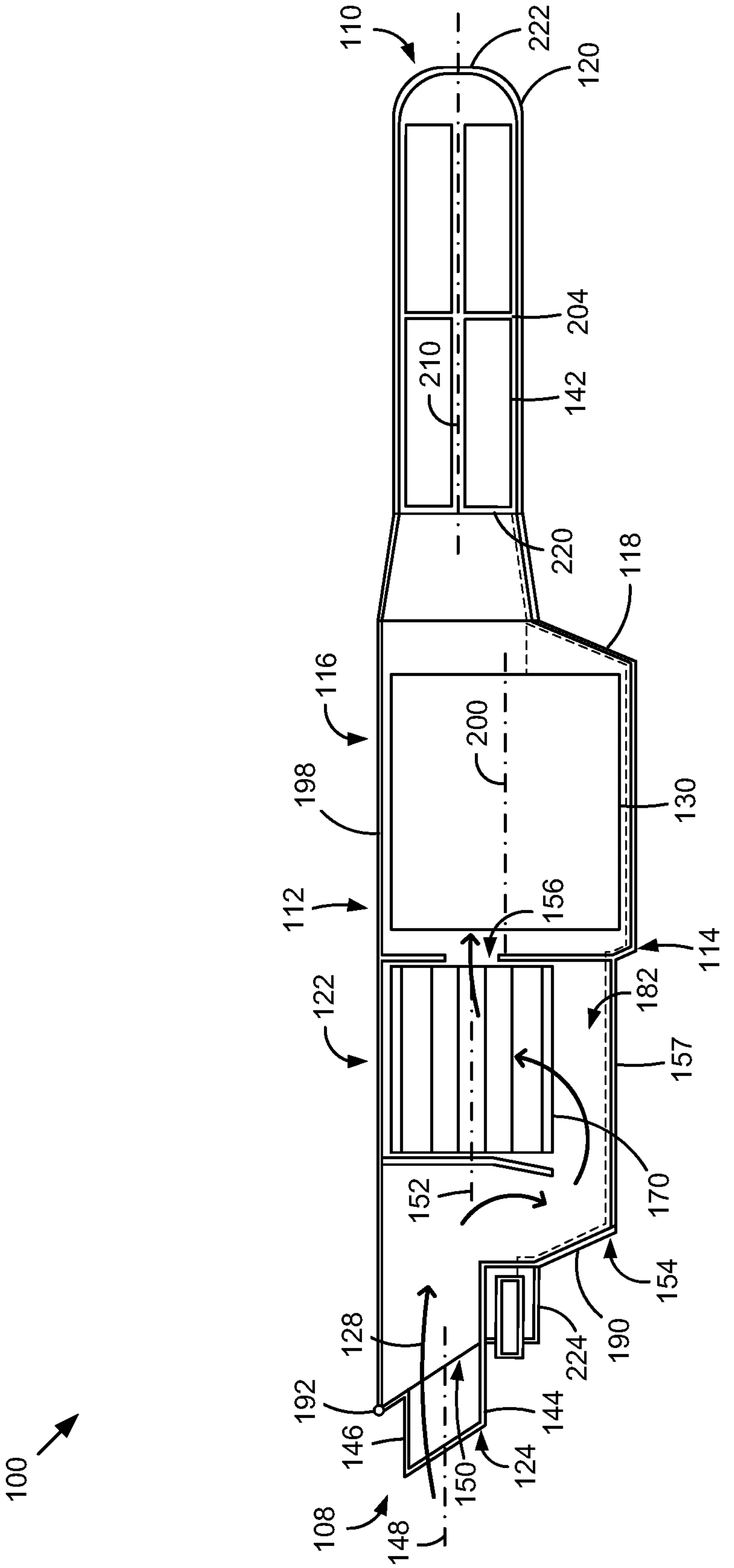
FIG. 16 is a schematic cross-sectional view of the hand vacuum cleaner of FIG. 13.
Figure 17:
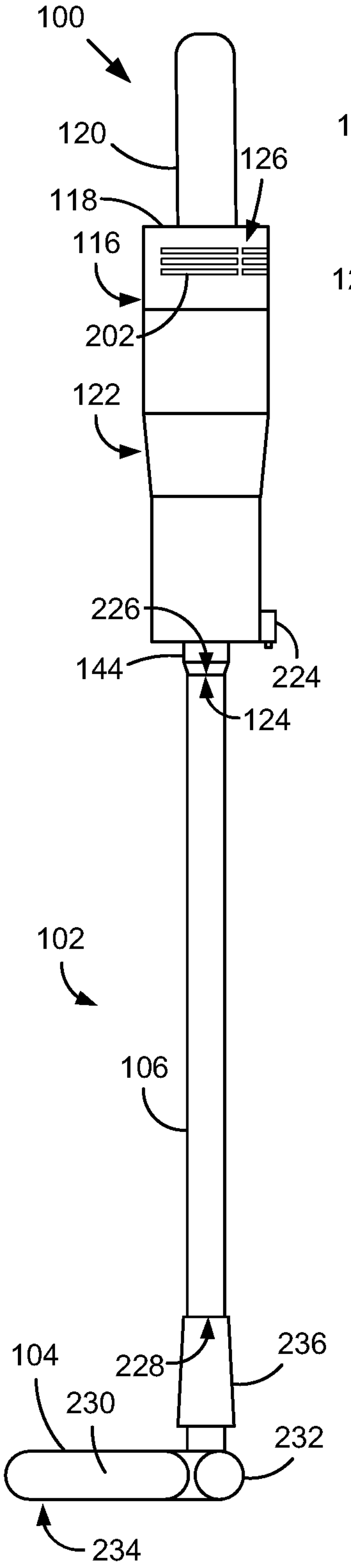
FIG. 17 is a schematic side view of another example hand vacuum cleaner attached to the wand and surface cleaning head.

Alternately, the handle 120 may be a wand-style handle, wherein the elongate hand grip portion 204 extends axially rearwardly along the hand grip axis 210 between a forward end 220 and a rearward end 222 (see e.g., FIGS. 16, 20). When the hand vacuum 100 is oriented so that the upper end 112 is disposed above the lower end 114 as exemplified in FIG. 16, the hand grip axis 210 may be oriented horizontally. The hand grip axis 210 may be parallel to the conduit axis 148 of the air inlet conduit 144, central axis 152 of the air treatment member 122, and/or motor axis 200 of the suction motor 130 (see e.g., FIG. 16) and, in some embodiments, coaxial with the conduit axis 148, central axis 152, and/or motor axis 200 (see e.g., FIG. 20).

Optionally, the hand vacuum 100 may be powered by an electrical cord 140, such as illustrated in FIG. 2. In such embodiments, the suction motor 130 may run on AC power supplied from a wall socket. Alternatively, or in addition to being powered by an electrical cord 140, the hand vacuum 100 may include one or more onboard power sources. The power sources may be one or more energy storage members 142 of any suitable type, including, for example one or more batteries and/or capacitors, such as super capacitors or ultra capacitors. The batteries may be any type including, for example, solid state batteries. Optionally, the batteries may be rechargeable or may be replaceable, non-rechargeable batteries. If both an electrical cord 140 and onboard power source are present, the cord 140 may optionally be detachable from the hand vacuum 100. The batteries or capacitors may be provided in a removable housing, such as a removable battery pack.

The energy storage members 142 used in the surface cleaning apparatus 100 may be provided at a single location, for example as one large battery pack, such as in the lower member 212 of the handle 120 (see e.g., FIGS. 8, 12), in the hand grip portion 204 of the handle 120 (see e.g., FIGS. 16, 20), in the main body housing 108, partially nested or fully nested in the air treatment chamber 122, or at any other location. Alternatively, energy storage members 142 may be provided in multiple locations within the hand vacuum 100, and optionally within the wand 106, surface cleaning head 104, and other auxiliary tools. Positioning energy storage members 142 at two or more locations may help distribute the weight of the batteries and may affect the hand feel and/or perceived balance of the hand vacuum 100.

Optionally, energy storage members 142 may be positioned generally opposite each other on opposite sides of a central plane or axis of the hand vacuum 100, for example toward the upper end 112 and lower end 114 of the hand vacuum 100. In this configuration, the weight of one energy storage member 142 may at least partially offset/counterbalance the weight of the opposing energy storage member 142. For example, providing upper and lower energy storage members 142 may help reduce the torque experienced by the user if they rotate the hand vacuum 100 about the longitudinally extending central axis 152.

If the energy storage member(s) 142 is/are a battery pack, each battery pack may include any suitable number of cells, and may include, for example, 3 cell 18560 lithium ion batteries. If two battery packs are connected in series, they may create a 6 cell 22V Li-ion power source. Any number of cells may be used to create a power source having a desired voltage and current, and any type of battery may be used, including NiMH, alkaline and the like.

Additionally, or as an alternative to the energy storage members 142 being onboard power sources, the wand 106 that is connectable to the surface cleaning apparatus 100 and/or the surface cleaning head 104 that is connectable to the wand 106 may be configured to include one or more energy storage members 142. Providing energy storage members 142 in the wand 106 and/or the surface cleaning head 104 may help provide some additional power (e.g., to the suction motor) when the hand vacuum 100 is connected to the wand 106 and/or to the surface cleaning head 104 via the wand 106. For example, the extra power in the additional energy storage members 142 may be used to help power a brush motor, lights, or other such features that require power in the surface cleaning head 104 and/or help power the suction motor 130. If the energy storage members 142 are supported in the wand 106 and/or the surface cleaning head 104, the additional mass of those energy storage members 142 can be left behind when a user detaches the hand vacuum 100 for above floor cleaning. This may help reduce the weight of the hand vacuum 100, while still providing a desired level of power when operating in the floor cleaning mode. Optionally, all of the energy storage members 142 can provide at least some power to the suction motor 130 and at least some power to the surface cleaning head 104. This may help provide longer run times, higher suction levels or both as compared to only using the power supplied from the hand vacuum 100.

In addition to functioning as a nozzle, the air inlet conduit 144 can be connected or directly connected to the downstream end of any suitable accessory tool such as a rigid air flow conduit (e.g., the wand 106), crevice tool, mini brush or the like. The hand vacuum 100 can include an electrical connector 224 provided proximate the front end 108, such as on the upper end 112, on the lower end 114, or on the front end 108 proximate the air inlet conduit 144. The downstream end of the accessory, such as the wand 106, can include another electrical connector (not shown) detachably matingly connectable to the electrical connector 224 of the hand vacuum 100. The electrical connectors 224 may be of any suitable configuration, such as mating pins and sockets. Power can thereby be communicated between the surface cleaning head 104 and the hand vacuum 100 via the wand 106.

For example, FIGS. 1, 5, 9, 13, and 17 are exemplary embodiments of a stickvac cleaning apparatus (e.g. a stickvac) that incorporates hand vacuum 100 and is configured so that the air inlet conduit 144 is directly mechanically, and optionally electrically, connected to the upper end 226 of the wand 106. The lower end 228 of the wand 106 is pivotally, and optionally pivotally and steeringly, connected to the surface cleaning head 104. In this arrangement, the handle 120 can be used to manipulate the hand vacuum 100 when detached from the wand 106, and can be used to manipulate the combination of the hand vacuum 100 and the wand 106, or the combination of the hand vacuum 100, wand 106, and surface cleaning head 104 (i.e. the stickvac), depending on the mode in which the hand vacuum 100 is used. The wand 106 may be any suitable member that can provide the desired structural connection and airflow communication between the hand vacuum 100 and the surface cleaning head 104. Preferably, the wand 106 can be configured as a rigid air flow conduit that provides the fluid communication between the surface cleaning head 104 and the hand vacuum 100. The wand 106 may be made from metal, plastic and/or any other suitable material. Any wand known in the art may be used.

In the illustrated examples, the surface cleaning head 104 may be any known in the art. As exemplified, the surface cleaning head includes a body 230, a pair of rear wheels 232 connected to the body 230 to rollingly support the surface cleaning head 104 above a surface to be cleaned, and a cleaning head dirty air inlet 234 in the downward facing lower body surface. The surface cleaning head 104 also includes an upflow duct 236 that is pivotally connected to the body 230. The lower end 228 of the wand 106 can be connected to the upflow duct 236, whereby the wand 106 is movable relative to the surface cleaning head 104. In the illustrated example, the upflow duct 236 is in fluid communication with the cleaning head dirty air inlet 234. The lower end 228 of the wand 106 is configured to receive the upflow duct 236 (or optionally vice versa) and to fluidly connect the surface cleaning head 104 to the hand vacuum 100. Optionally, the lower end 228 of the wand 106 can be detachably connected to the upflow duct 236, using any means, including a friction fit, suitable latch, locking mechanism or the like. Providing a detachable connection may allow the wand 106 to be separate from the surface cleaning head 104 for maintenance and/or for use in above floor cleaning. In such a configuration, the lower end 228 of the wand 106 can function as an auxiliary dirty air inlet, and the wand 106 as an extension of the air inlet conduit 144.

Preferably, the hand vacuum 100 can be detachably connected to the opposing upper end 226 of the wand 106, for example using a latch, so that the hand vacuum 100 can be detached and used independently from the wand 106 and/or surface cleaning head 104. Providing detachable connections at both ends of the wand 106 may help facilitate use of the hand vacuum 100 in at least three different operating modes: (i) an upright cleaning mode in which both the surface cleaning head and hand vacuum are attached to the wand and there is an airflow path extending from the dirty air inlet in the surface cleaning head to the hand vacuum and including the wand; (ii) a first above floor cleaning mode in which the wand is detached from the surface cleaning head and an airflow path extends from the auxiliary dirty air inlet of the wand to the hand vacuum cleaner; and (iii) a second above floor cleaning mode in which the hand vacuum is detached from the upper end of the wand and the nozzle is used to directly clean a surface and/or is connected to one or more auxiliary cleaning tools (such as a hose, crevice tool, upholstery brush and the like).

Optionally, the hand vacuum 100 may include one or more information display devices to provide information to a user. For example, the hand vacuum 100 may include one or more lights to indicate when the suction motor is on, and its current power level (if applicable), current battery charge level and the like. The hand vacuum may also include one or more display screens 238, such as an LCD display, LED screen, OLED screen and the like. The screen, and associated electronics, may be used to display status information. Optionally, the information display device may be connectable to other apparatuses, for example if the hand vacuum 100 is connected to a different apparatus, such as a tool or the wand 106 and/or surface cleaning head 104, the information displayed may be customized for each type of apparatus that can be connected to the hand vacuum 100. That is, the screen 238 can optionally be configured to show information about whatever apparatus is connected to the hand vacuum 100 (e.g., via the electrical connector 224), so that the same screen can be used for multiple apparatuses. This may reduce the need to provide screens or the like on each separate apparatus that can be connected to the handle.

As exemplified, the hand vacuum 100 may include an information display device in the form of a display screen 238 that is provided on the rear end 110 of the hand vacuum 100 (see e.g., FIGS. 3, 11), the upper end 206 (optionally upper member 218) of the pistol grip-style handle 120 (see e.g., FIG. 7), upper end 112 of the hand vacuum 100 (see e.g., FIG. 15), forward end 220 of the wand-style handle 120 (see e.g., FIG. 19), or any other suitable location allowing the user to monitor the status information displayed on the screen 238 (e.g., the power mode, operation mode, battery charge status).

Optionally, a power switch 240 that controls operation of the suction motor 130 (either on/off or variable power levels or both) can be provided on the handle 120, for example by establishing a power connection between the energy storage members 142 and the suction motor 130 (or other portion of the hand vacuum). The power switch 240 can be provided in any suitable configuration and location, including a button (see e.g., FIG. 7 on rearward side at upper end 206 of handle 120), a rotary switch (see e.g., FIGS. 9, 10 at upper end 206 on lateral side of handle 120), a sliding switch (see e.g., FIG. 15 on upper side at forward end 220 of handle 120), a trigger-type actuator (see e.g., FIGS. 1, 2 on forward side at upper end 206 of handle 120) and the like. The display screen 238 may also be a touch screen, and the power switch 240 can be provided as a touch button in the display screen 238 (see e.g., FIG. 19 on upper side at forward end 220 of handle 120). The power switch 240 may be provided on or near the handle 120 such that it can be actuated by a finger (e.g., thumb or pointer) of the user on the same hand as is gripping the hand grip portion 204 of the handle 120, allowing true one-handed operation of the hand vacuum 100. Optionally, instead of being provided on the handle 120, the switch 240 may be provided on the main body 116 (such as on the motor housing 198 or other suitable locations) and may be located generally proximate to the handle 120 so that the switch 240 can be operated using the same hand that is holding the hand grip portion 204.

The power switch 240 may also be configured to control other aspects of the hand vacuum 100 (brush motor on/off, etc.) or may be configured entirely as a control switch that controls some functions of the hand vacuum 100 but does not control the suction motor 130 (e.g., an additional switch may be provided to control a brush motor in the surface cleaning head 104). Optionally, the power switch 240 illustrated, or an additional designated power switch, may be used to provide different functions for different powered devices (e.g., the surface cleaning head 104), if the hand vacuum 100 is connected to different devices. For example, the power switch 240 may be used to select different power profiles (high power vs. low power), or other device functions. Optionally, the function of the switch 240 may be displayed on suitable display device, such as the screen 238 described herein. For example, the power switch 240 may be operable to control both the suction motor 130 and the brush motor in the surface cleaning head 104, along with lights and any other electrified elements provided on the wand 106, surface cleaning head 104, or any other tool or attachment.

Optionally, the hand vacuum cleaner 100 may be configurable in two or more different operating modes, having different power profiles. For example, the suction motor 130 in the hand vacuum 100 may be operable at a low power mode and a high power mode, each providing different levels of suction and air flow through the hand vacuum 100. Switching between such power modes may be done manually by a user in some embodiments, or may be done automatically based on the configuration or operation of the hand vacuum in other embodiments. In some embodiments, the apparatus may be operable to automatically change power modes, but may also include a manual option for a user to override the automatic changes.

Suction Motor Nested in Handle

A hand vacuum cleaner using any one or more aspects discussed herein, including one or more of the other aspects set out herein including one or more of the energy storage member forward of the suction motor, energy storage member nested in air treatment member, the suction motor nested in the air treatment member, the post-motor filter nested in the air treatment member, the suction motor forward of the air treatment member, the rearwardly opening air treatment member, the suction motor below the handle, the energy storage member forward of the air treatment member, the suction motor nested in the handle and forward of the air treatment member, the suction motor nested in the first cleaning stage, may have the suction motor at least partially nested in the handle.

Providing the suction motor 130 at least partially in the handle 120 may provide a more compact hand vacuum 100. Providing the suction motor 130 at least partially in the handle 120 may also position the center of gravity of the hand vacuum 100 closer to the hand of the user when gripping the hand grip portion 204. This may reduce the torque experienced by the user when using the hand vacuum 100 in an above-floor cleaning mode when the hand vacuum 100 extends from the user's hand in an unsupported cantilevered length. While the position of suction motor 130 with respect to other components is discussed separately with respect to each other component, and other possible positions of suction motor 130 are discussed separately, it will be appreciated that any embodiment of a hand vacuum 100 discussed herein may utilize the positioning of suction motor 130 with respect to one or more of the other components discussed herein.

In any of the body types of the example hand vacuums 100 described herein, the suction motor 130 may be provided partially or fully nested in the handle 120. For example, as exemplified in FIGS. 21 to 45, the handle 120 may be a pistol-grip style handle, and the suction motor 130 may be provided partially nested (see e.g., FIGS. 22, 25, 27, 31, 37) or fully nested (see e.g., FIGS. 23, 29, 33, 35, 39, 41, 42, 44, 45) in the pistol-grip style handle 120. As exemplified in FIGS. 46 to 50 and 53 to 54, the handle 120 may be a wand style handle, and the suction motor 130 may be provided partially nested (see e.g., FIGS. 48, 53) or fully nested (see e.g., FIGS. 47, 49, 50, 54) in the wand style handle 120.

Figure 90:
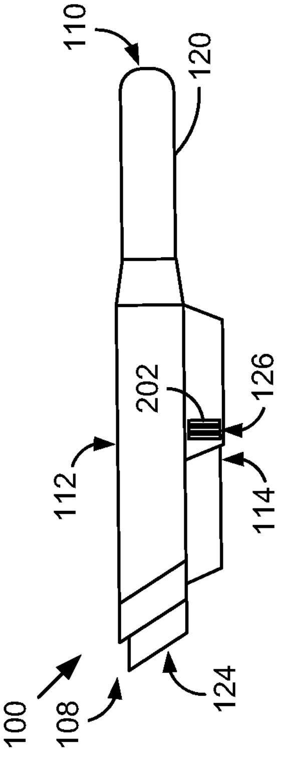
FIG. 90 is a schematic side view of a hand vacuum cleaner similar to the hand vacuum cleaner of FIG. 13.
Figure 92:
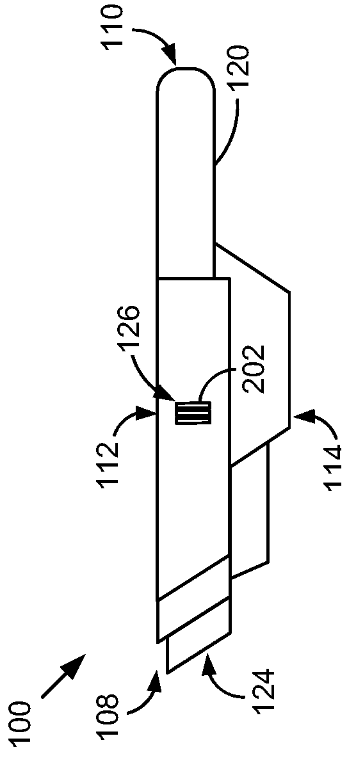
FIG. 92 is a schematic side view of a hand vacuum cleaner similar to the hand vacuum cleaner of FIG. 13.

In any embodiment, having any handle style, the suction motor 130 may be positioned at least partially in the handle 120 such that the motor axis 200 is substantially parallel, and optionally coaxial, with hand grip axis 210. The suction motor 130 may have a motor length in the direction of the axially extending motor axis 200 between a first end and a second end of the suction motor 130. In any embodiment, at least 10% of the motor length (e.g., more than 10%, 25%, 50%, 75%, or more) may be provided within the handle 120. For example, the motor length of the suction motor 130 is exemplified as 25% nested in the handle 120 in FIG. 37, 50% nested in the handle 120 in FIG. 27, 75% nested in the handle FIGS. 22 and 31, and 90% nested in the handle 120 in FIG. 48. Any nested length may be possible. It will be appreciated that the handle may be of any configuration provided is includes a section, which may be linear, that is sized to receive the suction motor. It will also be appreciated that, in such a case, the handle may form part of the air flow path to and/or from the suction motor and, accordingly, the handle may have an air inlet end and an air outlet end. It will be appreciated that air may enter or exit the handle at an end thereof or a portion of a sidewall that may be adjacent an end of the handle.

Figure 22:
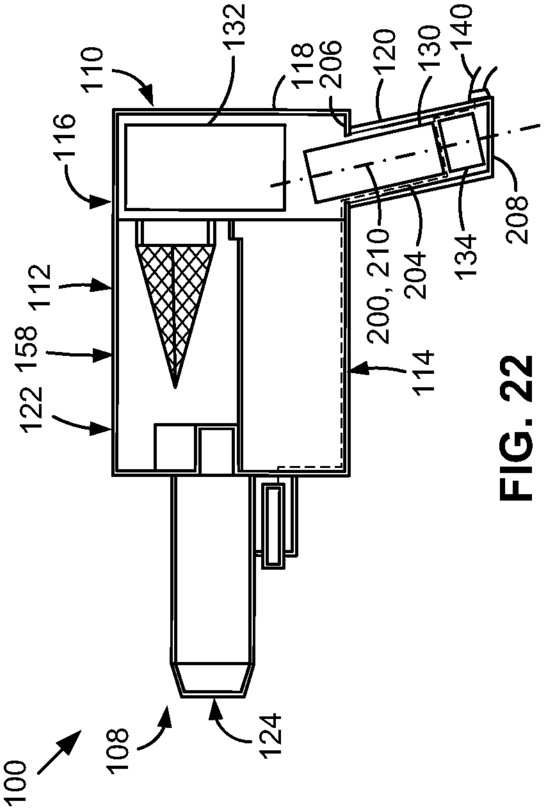
FIG. 22 is a schematic cross-sectional view of the hand vacuum cleaner of FIG. 21 with a motor partially in a handle.
Figure 27:
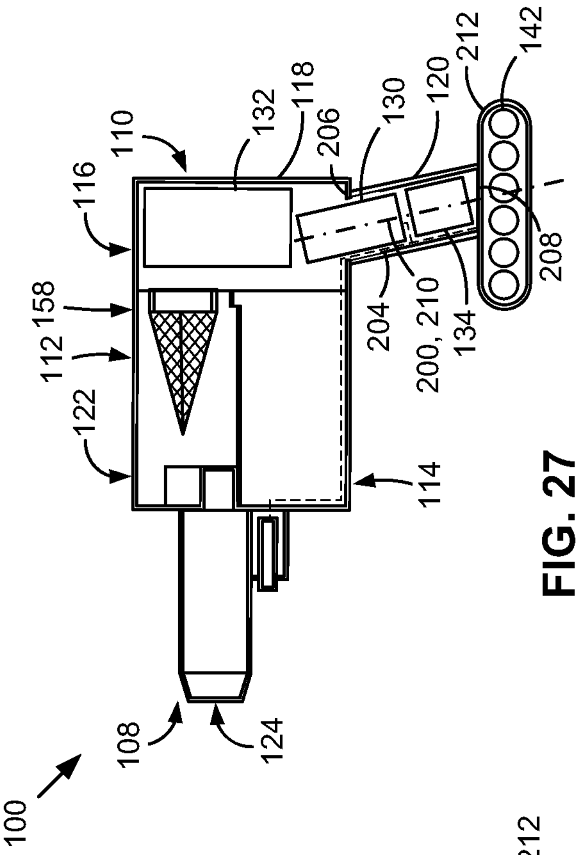
FIG. 27 is a schematic cross-sectional view of the hand vacuum cleaner of FIG. 26 with the motor partially in the handle.
Figure 25:
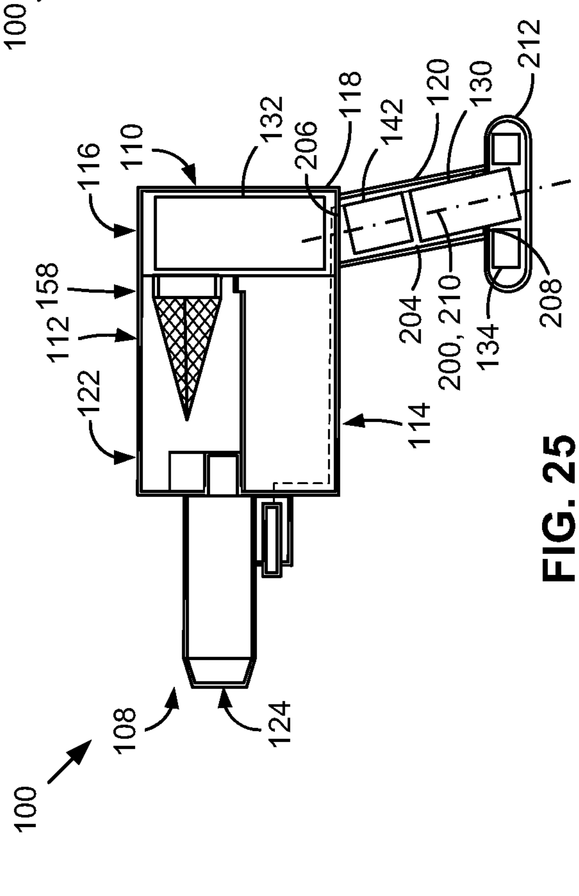
FIG. 25 is a schematic cross-sectional view of the hand vacuum cleaner of FIG. 24 with the motor in the handle.
Figure 26:
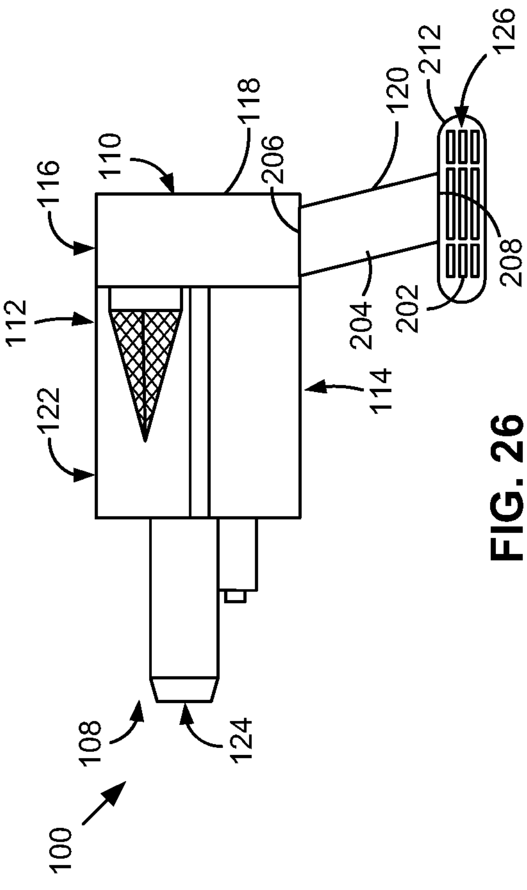
FIG. 26 is a schematic side view of a hand vacuum cleaner similar to the hand vacuum cleaner of FIG. 1.
Figure 28:
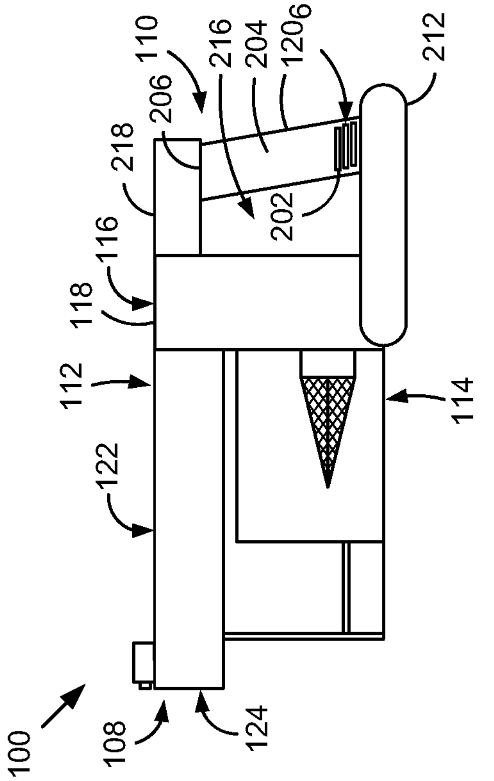
FIG. 28 is a schematic side view of a hand vacuum cleaner similar to the hand vacuum cleaner of FIG. 5.
Figure 29:
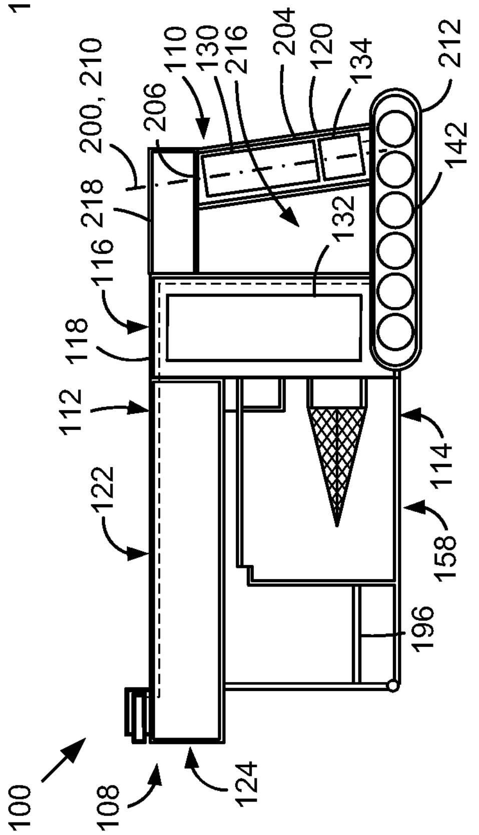
FIG. 29 is a schematic cross-sectional view of the hand vacuum cleaner of FIG. 28 with the motor in the handle.
Figure 30:
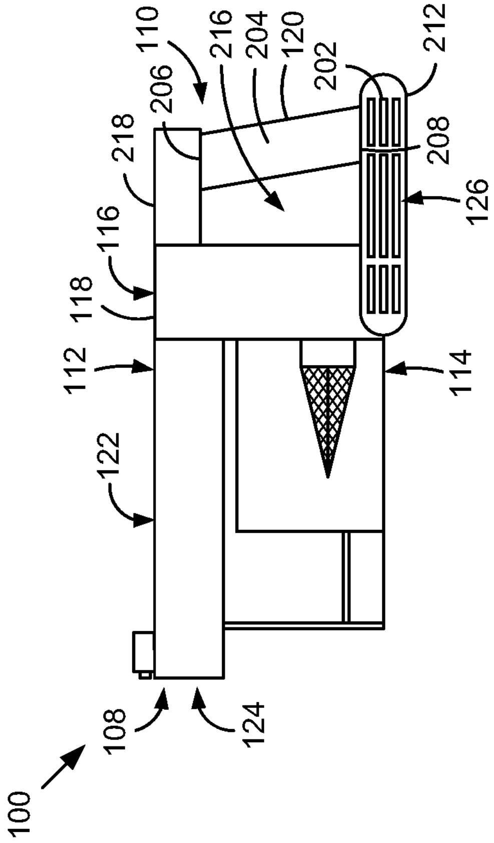
FIG. 30 is a schematic side view of a hand vacuum cleaner similar to the hand vacuum cleaner of FIG. 5.
Figure 37:
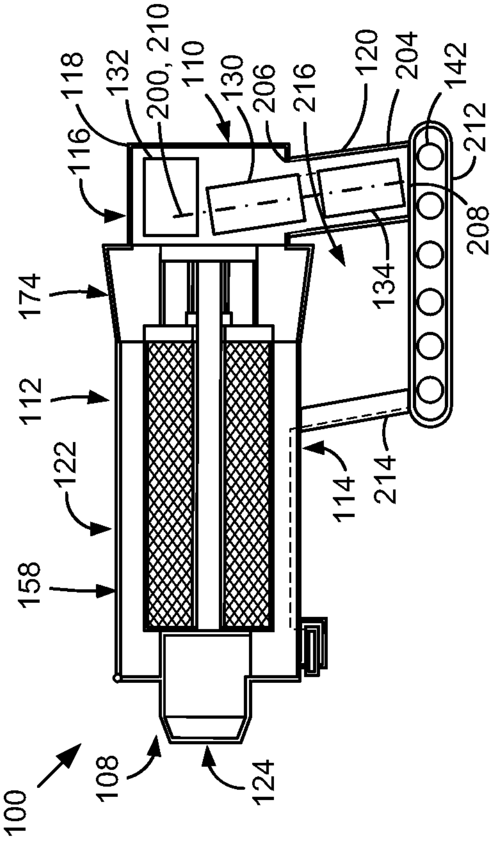
FIG. 37 is a schematic cross-sectional view of the hand vacuum cleaner of FIG. 36 with the motor partially in the handle.
Figure 39:
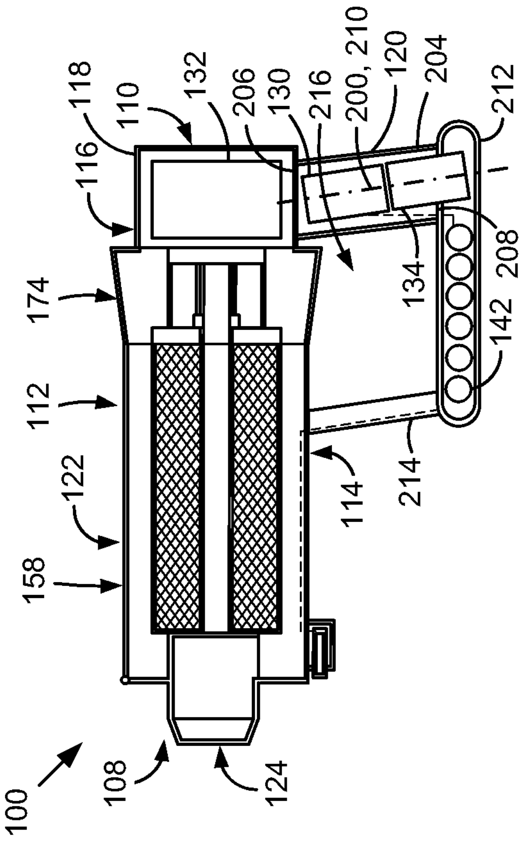
FIG. 39 is a schematic cross-sectional view of the hand vacuum cleaner of FIG. 38 with the motor in the handle.
Figure 36:
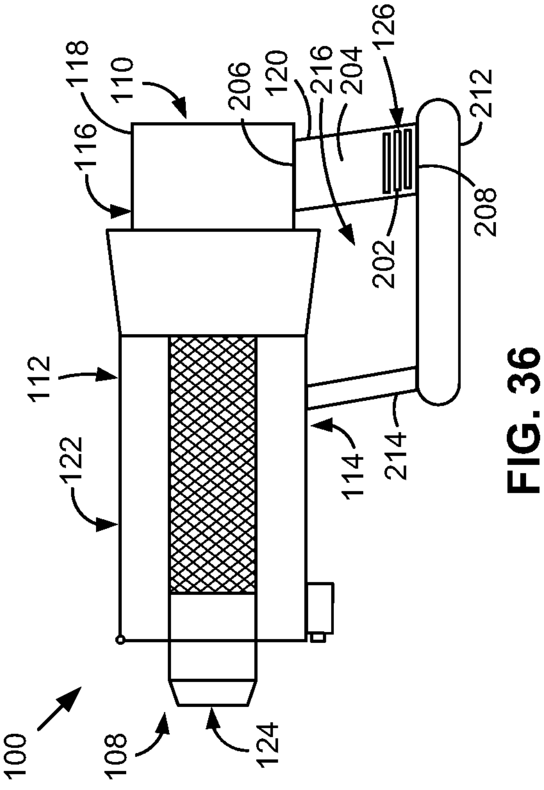
FIG. 36 is a schematic side view of a hand vacuum cleaner similar to the hand vacuum cleaner of FIG. 9.
Figure 38:
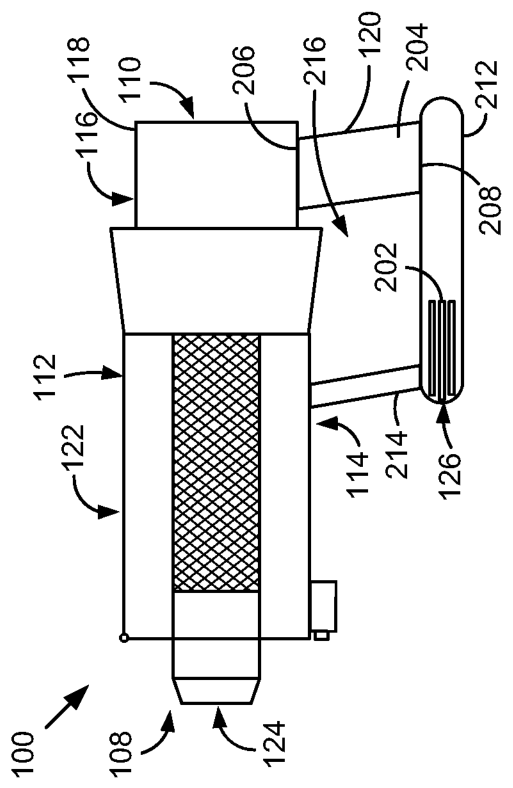
FIG. 38 is a schematic side view of a hand vacuum cleaner similar to the hand vacuum cleaner of FIG. 9.
Figure 41:
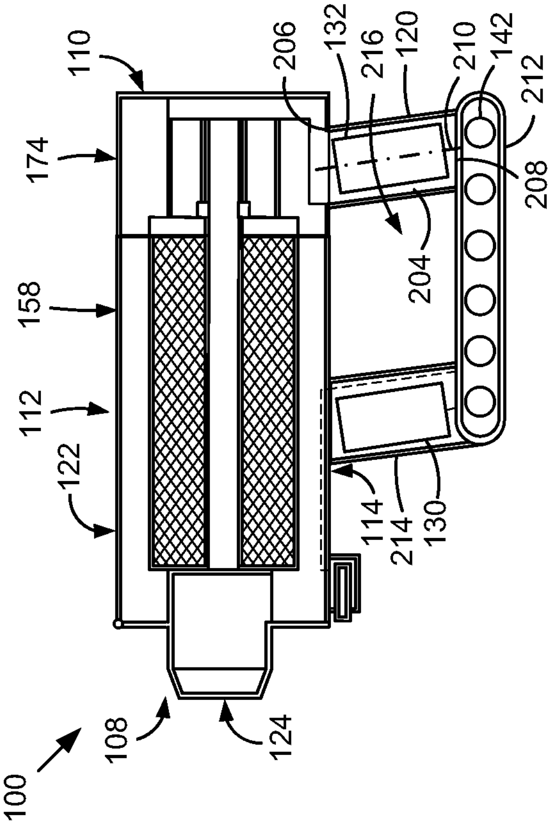
FIG. 41 is a schematic cross-sectional view of the hand vacuum cleaner of FIG. 40 with the motor in the handle.
Figure 42:
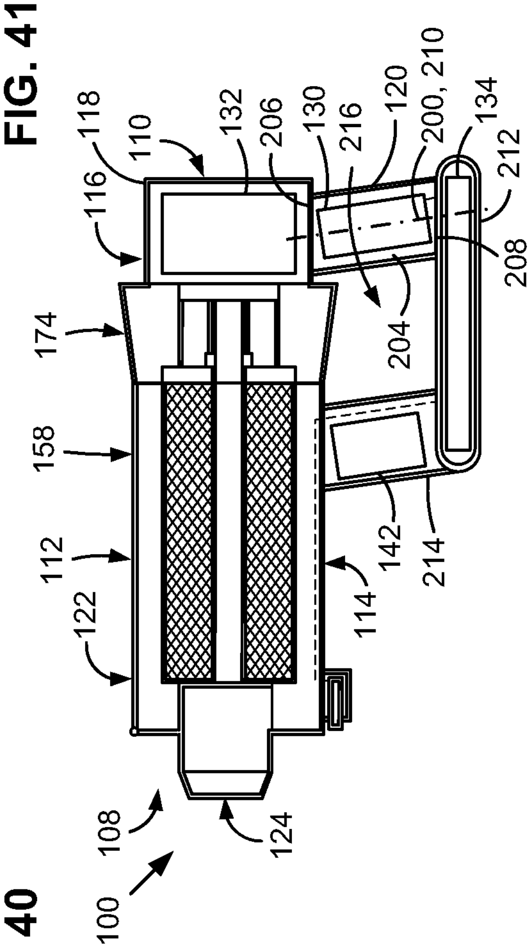
FIG. 42 is a schematic cross-sectional view of the hand vacuum cleaner of FIG. 40 with the motor in the handle.
Figure 40:
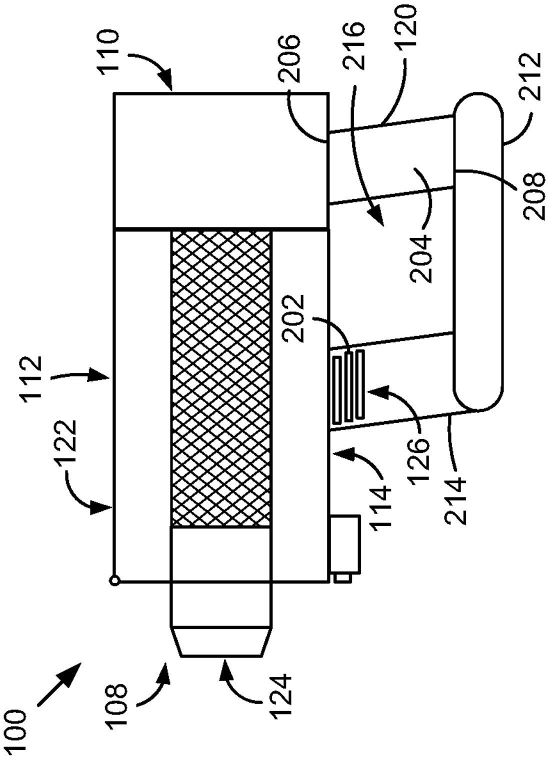
FIG. 40 is a schematic side view of a hand vacuum cleaner similar to the hand vacuum cleaner of FIG. 9.
Figure 44:
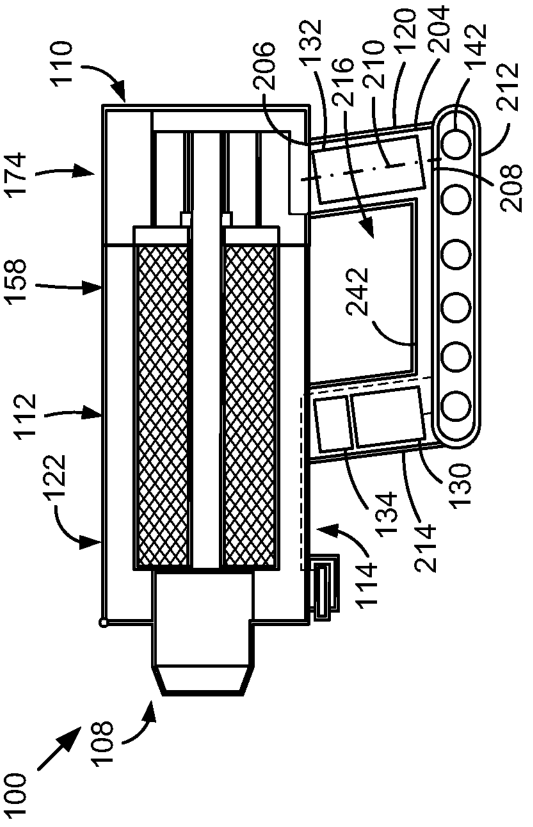
FIG. 44 is a schematic cross-sectional view of the hand vacuum cleaner of FIG. 43 with the motor in the handle.
Figure 43:
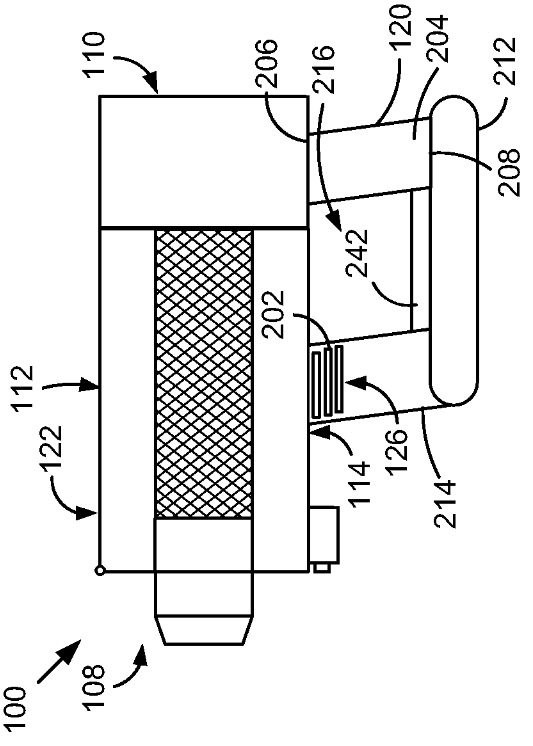
FIG. 43 is a schematic side view of a hand vacuum cleaner similar to the hand vacuum cleaner of FIG. 9.
Figure 45:
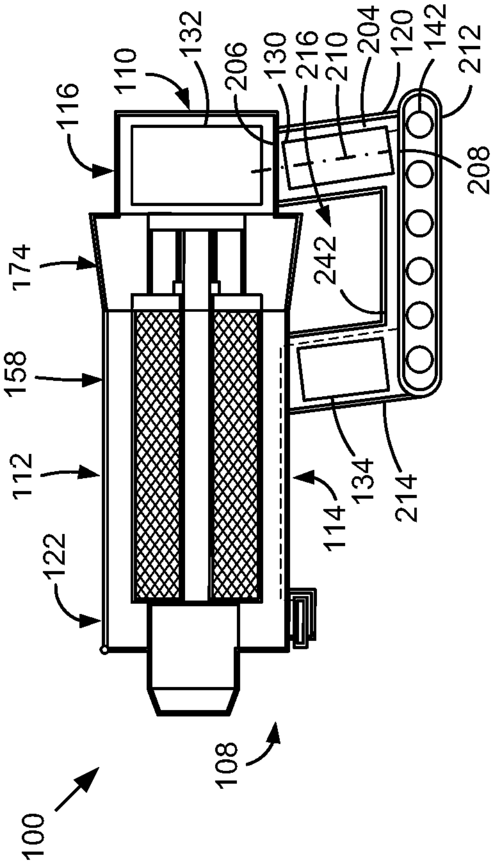
FIG. 45 is a schematic cross-sectional view of the hand vacuum cleaner of FIG. 43 with the motor in the handle.
Figure 46:
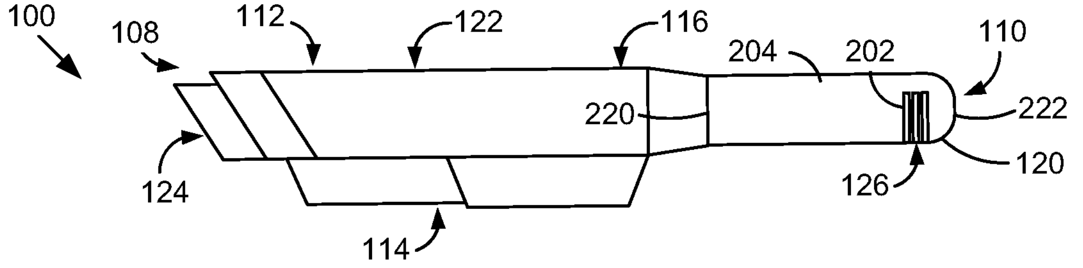
FIG. 46 is a schematic side view of a hand vacuum cleaner similar to the hand vacuum cleaner of FIG. 13.
Figure 47:
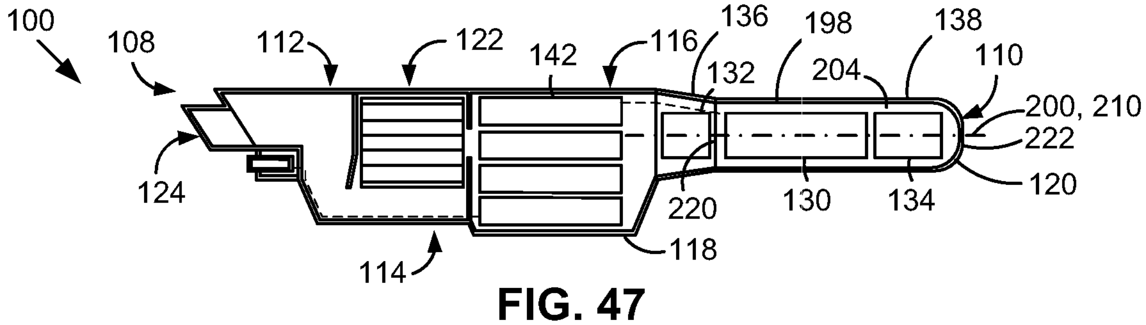
FIG. 47 is a schematic cross-sectional view of the hand vacuum cleaner of FIG. 46 with an energy storage member forward of the motor.

FIGS. 22, 25, 27, and 37 illustrate examples wherein the upper end 206 of the handle 120 is coupled the lower side of the main body 116 such that the handle 120 extends downwardly and rearwardly from the lower side of the main body 116. As shown in FIGS. 22, 27, and 37, the portion of the suction motor 130 extending from the handle 120 may extend upwardly into the main body housing 118. As shown in FIG. 25, the portion of the suction motor 130 extending from the handle 120 may extend downwardly into the lower member 212 (e.g., the stand) below the lower end 208 of the hand grip portion 204. In embodiments wherein the handle 120 includes the lower member 212 and the finger guard 214 extending from the forward end of the lower member 212, such as exemplified in FIGS. 41 to 45, the suction motor 130 may be positioned in the finger guard 214 in a similar fashion as described with respect to the handle 120. That is, the suction motor 130 may be fully nested in the finger guard 214 as exemplified in FIGS. 41 and 44, or may be partially nested in the finger guard 214 and extend into one or both of the main body housing 118 and the lower member 212.

Figure 31:
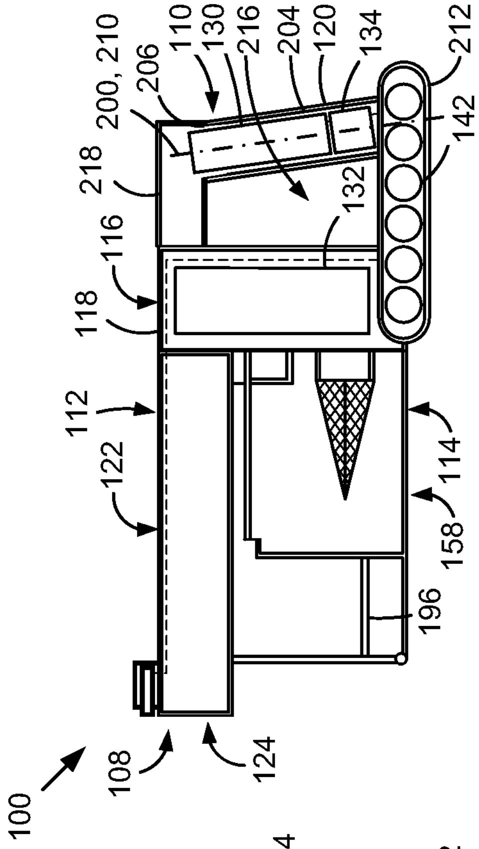
FIG. 31 is a schematic cross-sectional view of the hand vacuum cleaner of FIG. 30 with the motor partially in the handle.
Figure 34:
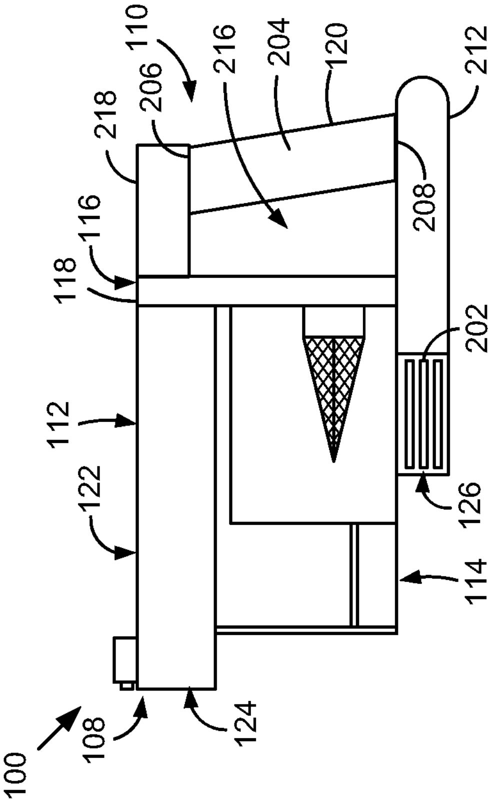
FIG. 34 is a schematic side view of a hand vacuum cleaner similar to the hand vacuum cleaner of FIG. 5.
Figure 35:
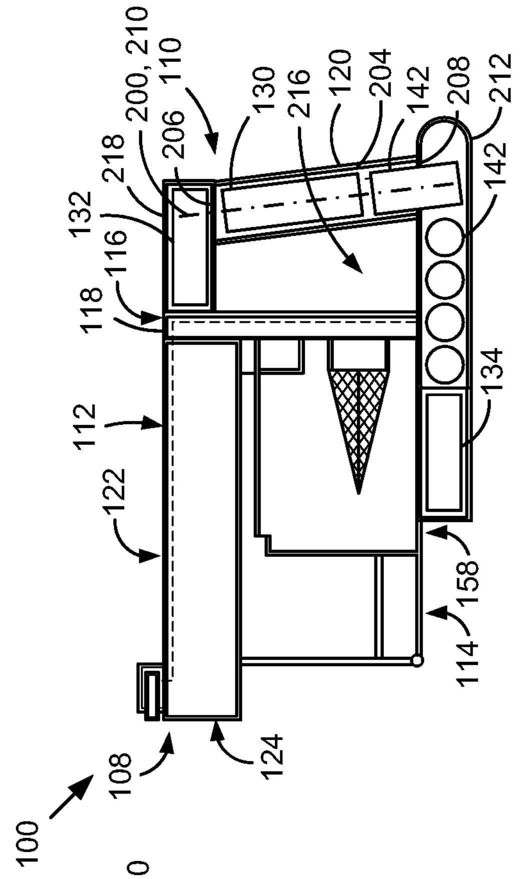
FIG. 35 is a schematic cross-sectional view of the hand vacuum cleaner of FIG. 34 with the motor partially in the handle.
Figure 32:
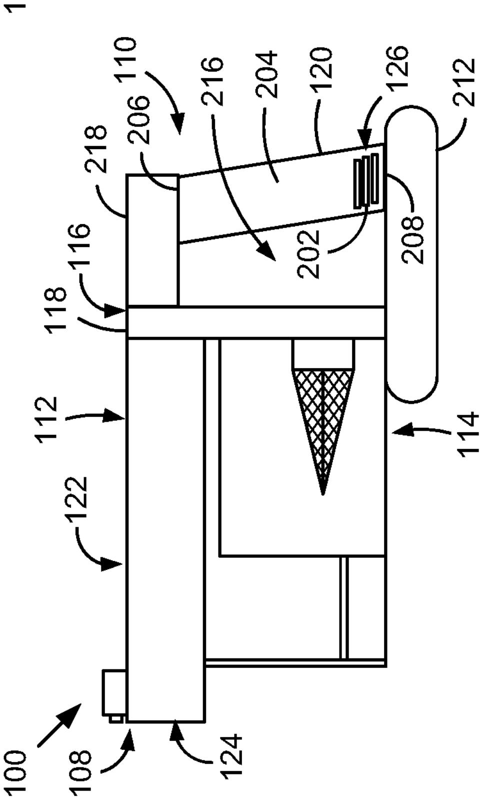
FIG. 32 is a schematic side view of a hand vacuum cleaner similar to the hand vacuum cleaner of FIG. 5.
Figure 33:
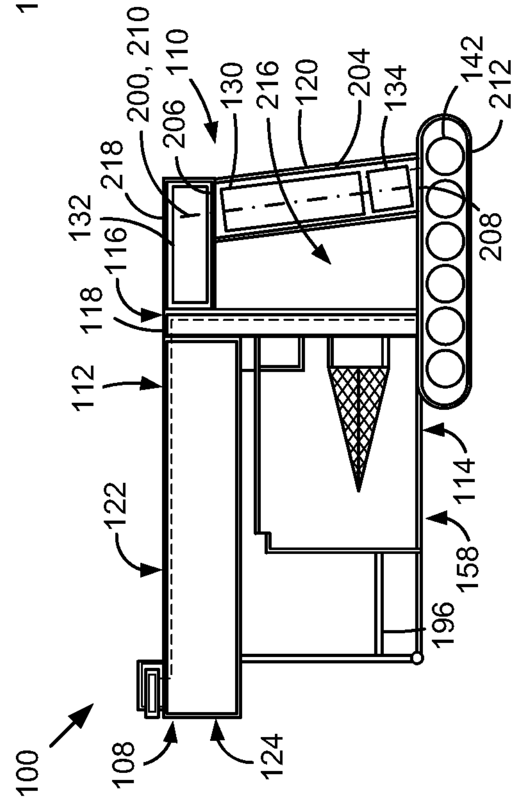
FIG. 33 is a schematic cross-sectional view of the hand vacuum cleaner of FIG. 33 with the motor in the handle.

FIG. 31 illustrates an example wherein the upper end 206 of the hand grip portion 204 includes the upper member 218 and the lower end 208 of the hand grip portion 204 includes the lower member 212. As shown, the portion of the suction motor 130 extending from the handle 120 may extend upwardly into the upper member 218. In alternate embodiments, the portion of the suction motor 130 extending from the handle 120 may extend downwardly into the lower member 212. In such a case the upper member and/or lower member may form part of the air flow path to and/or from the suction motor.

Figure 48:
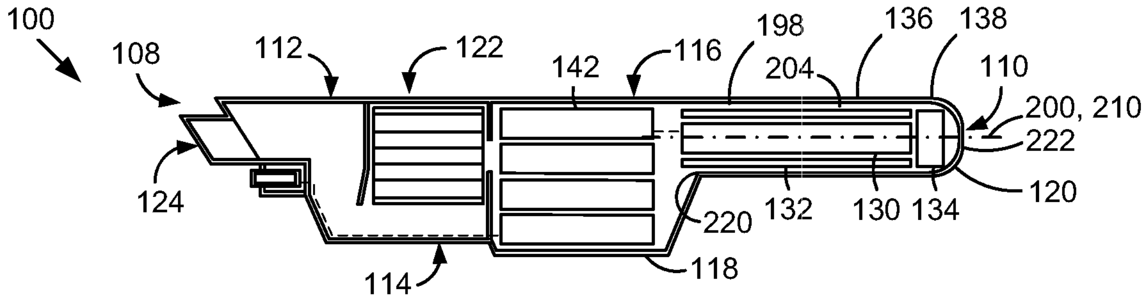
FIG. 48 is a schematic cross-sectional view of the hand vacuum cleaner of FIG. 46 with an energy storage member forward of the motor.
Figure 49:
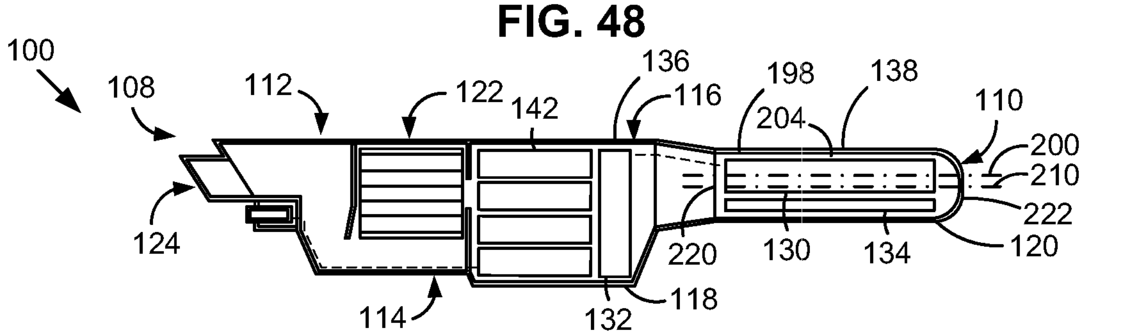
FIG. 49 is a schematic cross-sectional view of the hand vacuum cleaner of FIG. 46 with an energy storage member forward of the motor.
Figure 50:
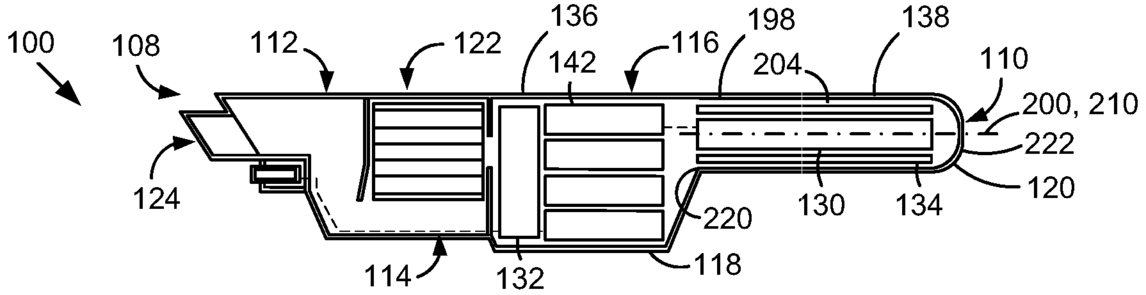
FIG. 50 is a schematic cross-sectional view of the hand vacuum cleaner of FIG. 46 with an energy storage member forward of the motor.
Figure 51:
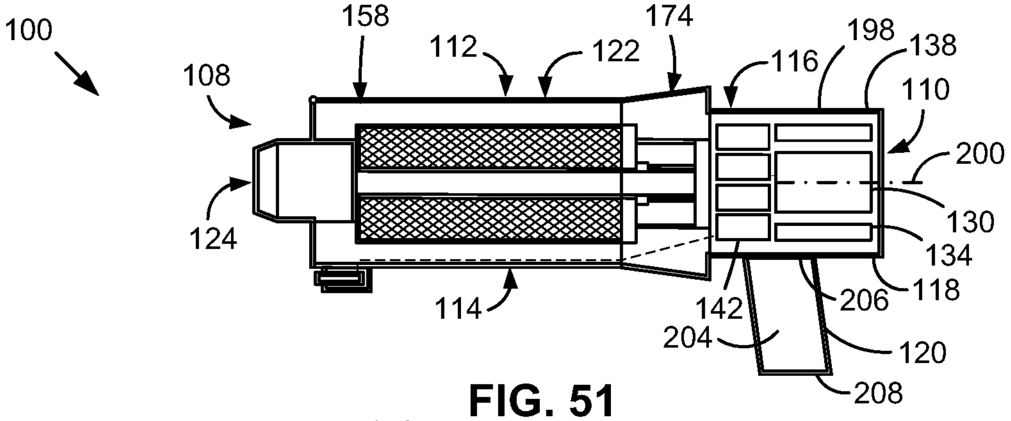
FIG. 51 is a schematic cross-sectional view of a hand vacuum cleaner similar to the hand vacuum cleaner of FIG. 9 with an energy storage member forward of the motor.
Figure 53:
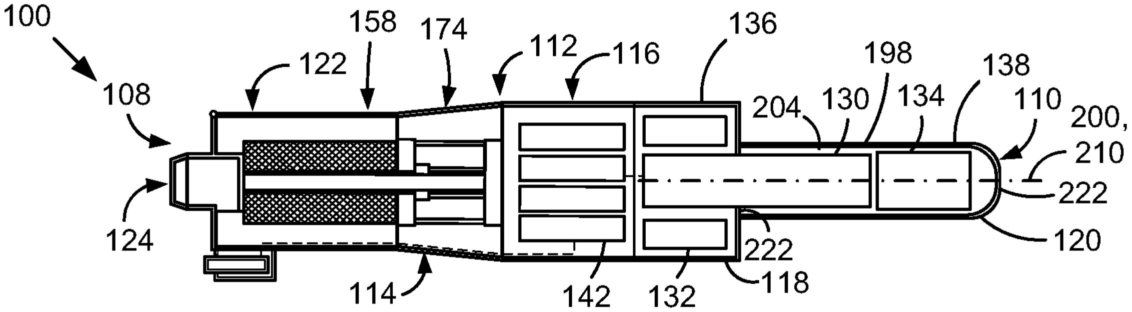
FIG. 53 is a schematic cross-sectional view of a hand vacuum cleaner similar to the hand vacuum cleaner of FIG. 17 with an energy storage member forward of the motor.
Figure 54:
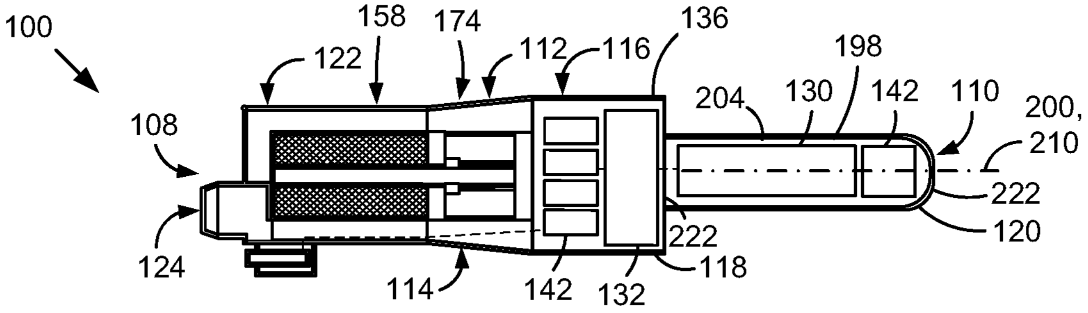
FIG. 54 is a schematic cross-sectional view of a hand vacuum cleaner similar to the hand vacuum cleaner of FIG. 17 with an energy storage member forward of the motor.

FIGS. 48 and 53 illustrate examples wherein the forward end 220 of the handle 120 is coupled to the rear side of the main body 116 such that the handle 120 extends rearwardly from the rear side of the main body housing 118. As shown, the portion of the suction motor 130 extending from the handle 120 may extend forwardly into the main body housing 118.

In the example embodiments wherein the suction motor 130 is positioned at least partially in the pistol-grip style handle 120, the hand grip portion 204 and one or more of the upper member 218 (if present), the lower member 212 (if present) and the finger guard 214 (if present), may be hollow and form part of the airflow path 128 therein. In such embodiments, the clean air outlet 126 may be provided in the sidewall or an end wall of the handle 120, the lower member 212, or the finger guard 214. Optionally, the optional post-motor filter 134 may be provided at any position downstream from the suction motor 130, such as positioned at the clean air outlet 126, the lower member 212, or the finger guard 214 and may be fully nested, partially nested, or not nested in the handle 120. Additionally, or alternatively, the energy storage member 142 (if present) may optionally be provided in the airflow path at any position either upstream or downstream from the suction motor 130 and upstream or downstream from the post-motor filter 134 if present. The energy storage member 142 may further be fully nested, partially nested, or not nested in the handle 120, the upper member, the lower member 212, or the finger guard 214. Providing the energy storage member 142 in the airflow path may beneficially cool the energy storage member 142 by the airflow drawing heat from the energy storage member 142 before exhausting to the external environment.

Figure 21:
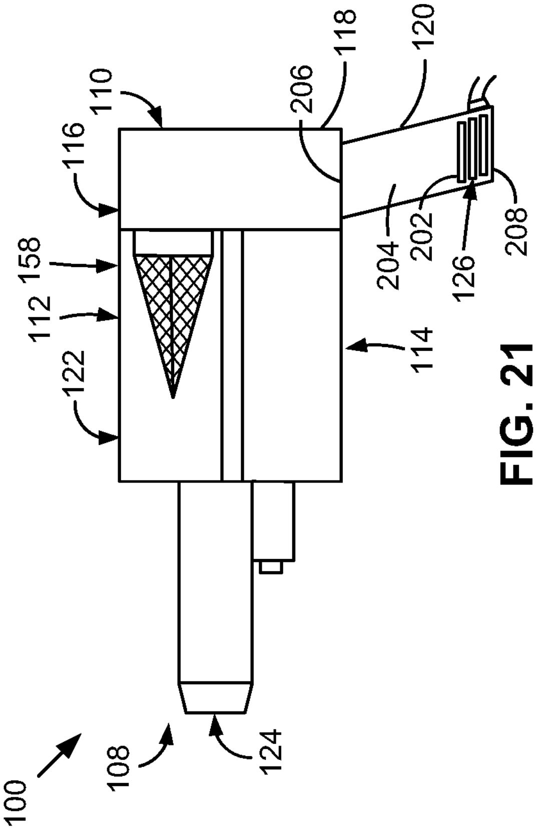
FIG. 21 is a schematic side view of a hand vacuum cleaner similar to the hand vacuum cleaner of FIG. 1.
Figure 24:
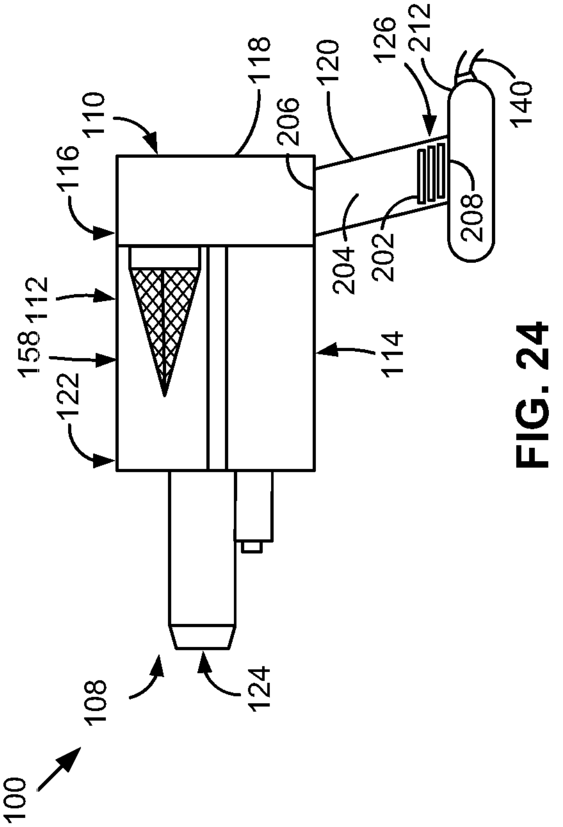
FIG. 24 is a schematic side view of a hand vacuum cleaner similar to the hand vacuum cleaner of FIG. 1.
Figure 23:
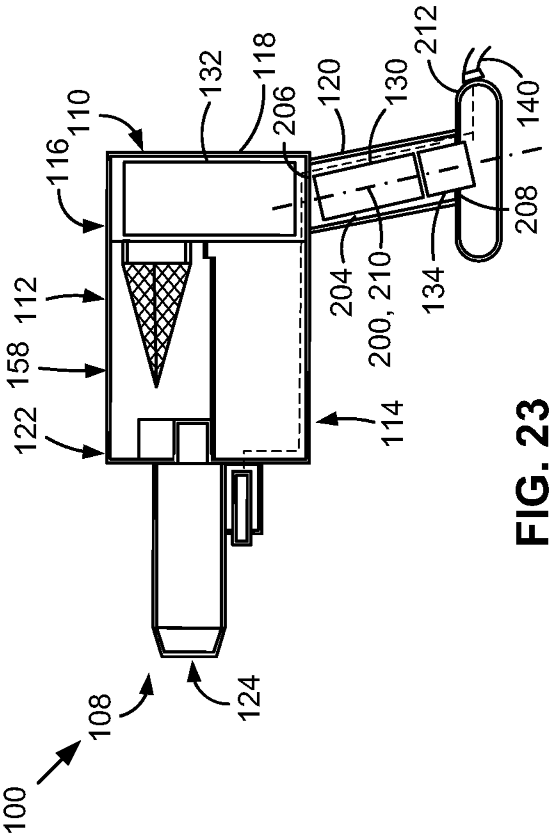
FIG. 23 is a schematic cross-sectional view of the hand vacuum cleaner of FIG. 21 with the motor in the handle.

As exemplified in FIGS. 21 and 22, the airflow path may include the handle 120 only and the clean air outlet 126 may be provided in the sidewall of the handle 120 downstream from the suction motor 130, such as proximate the lower end 208 of the hand grip portion 204 and/or an end wall of the handle. In such examples, the post-motor filter 134 may be provided in the handle 120 downstream from the suction motor 130 at the clean air outlet 126 as shown.

As exemplified in FIGS. 23 to 24 and 36 to 37, the handle 120 may include the lower member 212, and the airflow path may include the handle 120 only. Similarly, as exemplified in FIGS. 28 to 29 and 30 to 32, the handle 120 may include the upper member 218 and the lower member 212, and the airflow path may include the handle 120 and upper member 218 only. In such examples, the clean air outlet 126 may be provided at any position downstream from the suction motor 130, such as in the sidewall of the handle 120 proximate the lower end 208 of the hand grip portion 204 and/or an end wall of the handle. The post-motor filter 134, if present, may be provided at any position downstream from the suction motor 130, such as at the clean air outlet 126 and either fully in the handle 120 (see e.g., FIGS. 29, 33, 37) or partially in both the handle 120 and the lower member 212 (see e.g., FIG. 23).

In alternate examples, such as exemplified in FIGS. 25 to 27 and 38 to 39, both the handle 120 and the lower member 212 may form part of the airflow path. As exemplified in FIGS. 30 to 31 and 34 to 35, the upper member 218 may also form part of the airflow path if present. As shown, the clean air outlet 126 may be provided at any position downstream from the suction motor 130, such as in the sidewall of the lower member 212, such as along the full length of the lower member 212 (see e.g., FIG. 26) or at a forward end thereof (see e.g., FIG. 38). The post-motor filter 134 may be at any position downstream from the suction motor 130 in the handle 120 and/or the lower member 212, such as in the lower member 212 (see e.g., FIGS. 25, 35), in the handle 120 (see e.g., FIGS. 27, 31), or partially in both the handle 120 and the lower member 212 (FIG. 39), for example. The energy storage member 142 may be at any position upstream or downstream from the suction motor 130 and optionally at least partially in the handle 120 and/or the lower member 212, such as in fully in the handle 120 (see e.g., FIG. 25), fully in the lower member 212 (see e.g., FIGS. 27, 31, 39), or partially in both the lower member 212 and the handle 120 (see e.g., FIG. 35).

In some embodiments wherein the finger guard 214 is present, the finger guard 214 may form a portion of the airflow path such that the airflow path includes the hand grip portion 204, the lower member 212, and the finger guard 214. In such embodiments, the clean air outlet 126 may be provided downstream from the suction motor 130, such as in the sidewall of the finger guard 214. Optionally, the post-motor filter 134 may be provided at any position downstream from the suction motor 130 such as positioned at least partially in the finger guard 214. Additionally, or alternatively, the energy storage member 142 may optionally be provided in the airflow path at any position upstream of downstream from the suction motor 130 such as positioned at least partially in the finger guard 214.

As exemplified in FIGS. 40 to 45, if the finger guard 214 forms a portion of the airflow path, the clean air outlet 126 may be provided in the sidewall of the finger guard 214, such as at an upper end thereof. The suction motor 130 may be provided at least partially in or, as exemplified, fully in the handle 120 (see e.g., FIGS. 42, 45). The post-motor filter 134, if present, may be provided at any position downstream from the suction motor 130, such as at least partially, shown as fully, in the lower member (see e.g., FIG. 42) or at least partially in the finger guard 214. Alternatively, the suction motor 130 may be provided at least partially in or, as exemplified, fully in the finger guard 214 (see e.g., FIGS. 41, 44) and the post-motor filter 134, if present, may be provided at least partially, shown as fully, in the finger guard 214 (see e.g., FIGS. 44, 45). The energy storage member 142 may be provided at any position upstream or downstream from the suction motor 130, such as at least partially, shown as fully, in the lower member (see e.g., FIG. 41) or at least partially, shown as fully, in the finger guard 214 (see e.g., FIG. 42). In some embodiments, as exemplified in FIGS. 43 to 45, the lower member 212 may be bypassed by an airflow duct 242 provided along an upper side of the lower member 212. In such examples, the lower member 212 may not form part of the airflow path such that the airflow bypasses the components housed therein, shown to be the energy storage member 142 in the illustrated example.

Referring to FIGS. 46 to 50 and 53 to 54, example embodiments of the hand vacuum 100 are shown wherein the suction motor 130 is positioned at least partially in the wand-style handle 120. As exemplified, the hand grip portion 204 may be hollow and form part of the airflow path 128 therein, and the clean air outlet 126 may be provided in the sidewall of the handle 120, such as at the rearward end 222 thereof or in a rear end wall thereof. Optionally, the post-motor filter 134 may be provided at any position downstream from the suction motor 130, such as positioned at the rearward end 222 (see e.g., FIGS. 47, 48, 53), annularly about the suction motor 130 (see e.g., FIG. 50), above the suction motor 130, and/or below the suction motor 130 (see e.g., FIG. 49). Optionally, the energy storage member 142 may be provided at any position upstream or downstream from the suction motor 130, such as in the main body 116 (see e.g., FIGS. 47 to 50, 53, 54) and/or handle 120 (see e.g., FIG. 54).

In the examples described herein, the pre-motor filter 132 may have any suitable positioning upstream from the suction motor 130 in the airflow path. For example, the pre-motor filter 132 may be positioned downstream (e.g., rearward) from the air treatment member 122 in the main body housing 118 such that the central axis 152 of the air treatment member 122 intersects the pre-motor filter 132 (see e.g., FIGS. 22, 23, 25, 27, 29, 31, 39, 42, 45, 47, 49, 50, 54) or the pre-motor filter housing, e.g., if the filter is annular. In some examples, the pre-motor filter 132 may be offset from the central axis 152. For example, the pre-motor filter 132 may be positioned in the main body housing 118 offset from the central axis 152 to accommodate other components in the main body housing 118 such as if the suction motor 130 extends from the handle 120 into the main body housing 118 (see e.g., FIG. 37). As another example, in the wand-style handle 120 described herein, the pre-motor filter 132 may be provided annularly about the portion of the suction motor 130 extending from the handle 120 into the main body 116 such that the central axis 152 passes through a central opening of the pre-motor filter 132 (see e.g., FIG. 53).

The pre-motor filter 132 may be provided at any other position in the hand vacuum 100 upstream from the suction motor 130, which may depend on the type of handle 120 used in the particular embodiment of the hand vacuum 100. For example, in the various pistol grip-style handles 120 described herein, the pre-motor filter 132 may be provided at least partially in the upper member 218 of the handle 120 (see e.g., FIGS. 33, 35), if present, and/or at least partially in the handle 120 (see e.g., FIG. 44). In embodiments wherein the suction motor 130 is positioned at least partially in the finger guard 214, the pre-motor filter 132 may additionally or alternatively be provided at least partially in the lower member 212 and/or at least partially in the finger guard 214. As another example, in the wand-style handle 120 described herein, the pre-motor filter 132 may be provided at least partially in the handle 120 at the forward end 220, annularly about the suction motor 130, above the suction motor 130, and/or below the suction motor 130.

It will be appreciated that any portion of the suction motor may be provided in the handle. For example, the fan may be located upstream of the motor such that, if the suction motor is partially be nested in the handle, the fan may be located exterior the handle in the main body. It will also be appreciated that the motor section may be located partially or fully exterior of the handle and the fan may be located in the handle.

The figures described in this section are exemplary of the suction motor nested in the handle. It will be appreciated that other figures not discussed within this section may also show the suction motor nested in the handle in accordance with this aspect.

Energy Storage Member Forward of Suction Motor

A hand vacuum cleaner using any one or more aspects discussed herein, including one or more of the other aspects set out herein including one or more of the suction motor nested in the handle, the energy storage member nested in air treatment member, the suction motor nested in the air treatment member, the post-motor filter nested in the air treatment member, the suction motor forward of the air treatment member, the rearwardly opening air treatment member, the suction motor below the handle, the energy storage member forward of the air treatment member, the suction motor nested in the handle and forward of the air treatment member, the suction motor nested in the first cleaning stage, may have the energy storage member forward of the suction motor.

In any embodiment, the hand vacuum 100 may optionally have a generally linear layout of two or more components. A linear layout in the hand vacuum 100 may provide a straighter (fewer bends) and/or shorter airflow path through the hand vacuum 100 from the air treatment member 122 to the clean air outlet 126. In a linear layout, the airflow path may travel through fewer or less dramatic bends, optionally without passing through any bends, thereby reducing the backpressure created by airflow through the hand vacuum.

In any embodiment, the linear layout may include the energy storage member 142 and the air treatment member 122. In such embodiments, the energy storage member 142 may be positioned in the main body housing 118 rearward of the air treatment member 122 such that the central axis 152 of the air treatment member 122 extends through the energy storage member 142, and optionally centrally therethrough. The linear layout may further include the suction motor housing 198, and the energy storage member 142 may further be positioned forward of the suction motor housing 198 such that the motor axis 200 of rotation of the suction motor 130 extends through the energy storage member 142, and optionally centrally therethrough. The central axis 152 and the motor axis 200 may be parallel, and optionally coaxial, providing a generally straight airflow path from the outlet of the air treatment member 122 to the rearward end of the suction motor 130. Optionally, if included, the linear layout may further include the pre-motor filter 132 forward or rearward of the energy storage member 142, and the central axis 152 and the motor axis 200 may also extend through the pre-motor filter housing 136, and optionally centrally therethrough.

Figure 52:
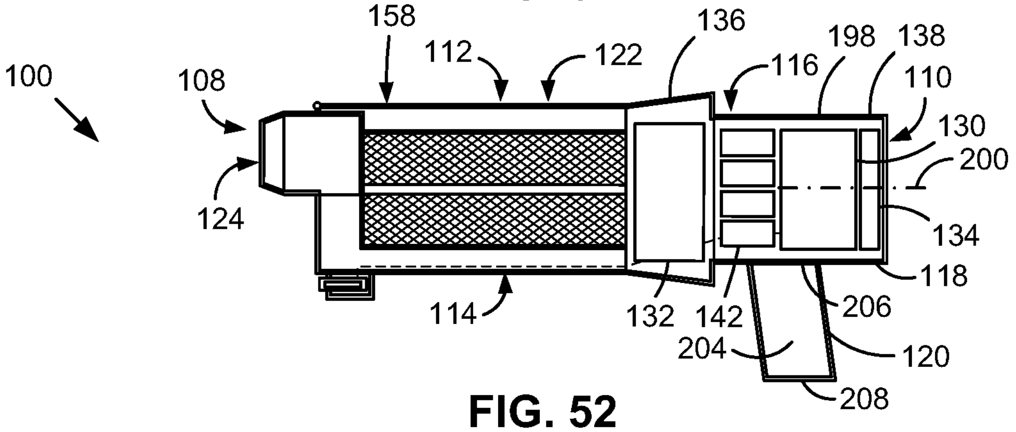
FIG. 52 is a schematic cross-sectional view of a hand vacuum cleaner similar to the hand vacuum cleaner of FIG. 9 with an energy storage member forward of the motor.

For example, as exemplified in FIGS. 47 to 51, 53 to 54, and 70 to 77, the energy storage member 142 may be positioned in the main body housing 118 rearward of the air treatment member 122 and forward of the suction motor housing 198 such that the central axis 152 and motor axis 200 extend through the housing for the energy storage member 142 (e.g., a battery pack). Alternatively, as exemplified in FIG. 52, the energy storage member 142 may be positioned rearward of both the air treatment member 122 and the suction motor housing 198 such that the central axis 152 and motor axis 200 extend through the housing for the energy storage member 142 (e.g., a battery pack).

Optionally, the pre-motor filter 132 provided in the pre-motor filter housing 136 may be positioned in the main body 116 downstream from the air treatment member 122 such that the central axis 152 and motor axis 200 extend through the pre-motor filter housing 136 and, optionally, the pre-motor filter 132 therein, e.g., if the pre-motor filter is planar and not annular. In such embodiments, the pre-motor filter housing 136 may be included in the linear layout. The pre-motor filter housing 136 may be positioned upstream or downstream from the energy storage member 142. If provided downstream from the energy storage member 142, the suction motor 130 may extend into the pre-motor filter housing 136 and the pre-motor filter 132 may be positioned annularly about at least a portion of the suction motor 130.

For example, as exemplified in FIGS. 47, 49, 50, 52 to 54, 70, 71, 74, and 75, the pre-motor filter housing 136 and the pre-motor filter 132 may be positioned in the main body 116 rearward of the air treatment member 122 (or at least partially rearward, see e.g., FIGS. 72, 73, 76, 77) and forward of the suction motor housing 198 such that the central axis 152 and motor axis 200 extend through the pre-motor filter housing 136. As exemplified in FIG. 48, the pre-motor filter housing 136 and the suction motor housing 198 may be a common housing such that the pre-motor filter housing 136 and the pre-motor filter 132 are positioned rearward of the air treatment member 122 and neither forward nor rearward of the suction motor housing 198. As shown, the pre-motor filter housing 136 may be forward of the energy storage member 142 (see e.g., FIGS. 50, 52), rearward of the energy storage member 142 (see e.g., FIGS. 47, 48, 53, 54), or with the energy storage member 142 provided at least partially within the pre-motor filter housing 136 as described subsequently herein (see e.g., FIGS. 70 to 75). As exemplified in FIGS. 47, 49, 50, 52, 54, 70, and 71, the central axis 152 and motor axis 200 may extend through the pre-motor filter 132. Alternately, if the pre-motor filter housing 136 is rearward of the energy storage member 142 or has the energy storage member 142 at least partially nested therein, and if the suction motor 130 extends into the pre-motor filter housing 136 (see e.g., FIGS. 53, 76, 77) or shares a common housing with the pre-motor filter 132 (see e.g., FIGS. 48, 74, 75), the pre-motor filter 132 may be positioned annularly about at least a portion of the suction motor 130, and the central axis 152 and motor axis 200 may extend through a central opening in the pre-motor filter 132.

Optionally, if a post-motor filter is provided, then the post-motor filter housing 138 having the post-motor filter 134 provided therein may be positioned in the main body 116 or the wand-style handle 120 downstream from the suction motor 130 such that the central axis 152 and motor axis 200 extend through the post-motor filter housing 138 and, optionally, the post-motor filter 134 therein. In such embodiments, the post-motor filter housing 138 may be included in the linear layout. The post-motor filter 134 may be positioned rearward of the suction motor 130. Additionally, or alternatively, the suction motor 130 may extend into the post-motor filter housing 138 and the post-motor filter 134 may be positioned above, below, or annularly about at least a portion of the suction motor 130. The post-motor filter housing 138 may be positioned rearward of the energy storage member 142 and/or the suction motor 130.

For example, as exemplified in FIGS. 51, 52, 71, 72, and 74 to 77, the post-motor filter housing 138 having the post-motor filter 134 provided therein may be positioned in the main body 116. As exemplified in FIGS. 47 to 50, and 53, the post-motor filter housing 138 having the post-motor filter 134 provided therein may be positioned in the handle 120. As shown, the post-motor filter housing 138 may be rearward of the suction motor 130 (see e.g., FIGS. 47, 48, 52, 53, 74, 75) such that the central axis 152 and motor axis 200 extend through the post-motor filter housing 138 and the post-motor filter 134 therein. As exemplified in FIGS. 49, 50, 51, 76, and 77 the post-motor filter housing 138 and the suction motor housing 198 may be a common housing such that the post-motor filter housing 138 and the post-motor filter 134 are positioned rearward of the air treatment member 122 and neither forward nor rearward of the suction motor housing 198. In such examples, the post-motor filter 134 may be positioned above, below (see e.g., FIG. 49), or annularly (see e.g., FIGS. 50, 51, 76, 77) about at least a portion of the suction motor 130. If positioned annularly as exemplified, the central axis 152 and motor axis 200 may extend through a central opening in the post-motor filter 134.

Optionally, the pre-motor filter 132 and/or post-motor filter 134, and further optionally the suction motor 130, may be removable from the main body 116 or handle 120, such as for cleaning or replacement. For example, the pre-motor filter 132 and/or post-motor filter 134 may be radially removable, such as through an openable portion of the sidewall of the main body housing 118. As another example, the pre-motor filter 132 and/or the post-motor filter 134 may be rearwardly removable, such as axially rearwardly removable from the rear end of the main body 116 or rearward end of the wand-style handle 120. The suction motor 130 may remain in the main body 116 or be removed with the pre-motor filter 132 and/or the post-motor filter 134.

For example, as exemplified in FIGS. 70 to 77, the pre-motor filter housing 136 (see e.g., FIGS. 72, 73) and/or post-motor filter housing 138 (see e.g., FIGS. 70, 71) may be axially rearwardly removable from the main body 116 for removing the pre-motor filter 132 and/or post-motor filter 134. As shown in FIGS. 74 to 77, the suction motor 130 may be removable with the pre-motor filter 132 and/or post-motor filter 134, such as if the suction motor 130 shares a common housing with the pre-motor filter 132 (see e.g., FIGS. 74, 75), post-motor filter 134, or both (see e.g., FIG. 76, 77).

Optionally, the removable pre-motor filter housing 136 and/or post-motor filter housing 138 can be secured the to the rest of the main body housing 118 by any suitable type of locking mechanism, including a latch mechanism that can be released by a user or a bayonet mount. The actuator for releasing the filter housing 136, 138 can be provided on the main body housing 118 or on any other portion of the hand vacuum 100. Removing the pre-motor filter housing 136 and/or post-motor filter housing 138 from the rest of the main body housing 118 may further provide access to additional components remaining in the main body 116, such as the pre-motor filter 132, suction motor 130, energy storage member 142, or air treatment member 122, for cleaning, replacement, or other maintenance, for example. It will be appreciated that the pre-motor filter housing 136 and/or post-motor filter housing 138 may be axially rearwardly removable from the rearward end of the wand-style handle 120 in a fashion similar to as described. It will be appreciated that a filter may be removable with all or a portion of the filter housing that is moved to reveal the volume of the filter housing.

Optionally, if the handle 120 is a wand-style handle extending generally axially rearwardly from the rear end of the main body 116 (see e.g., FIGS. 46 to 50, 53, 54), the hand grip axis 210 may extend through one or more of the air treatment member 122, pre-motor filter housing 136 (or central opening thereof), energy storage member 142, suction motor 130, and/or post-motor filter housing 138 (or central opening thereof), as described previously with respect to the central axis 152 and motor axis 200. The hand grip axis 210 may be parallel to, and optionally coaxial with, the central axis 152 and/or motor axis 200.

The figures described in this section are exemplary of the energy storage member forward of the suction motor. It will be appreciated that other figures not discussed within this section may also show the energy storage member forward of the suction motor in accordance with this aspect.

Energy Storage Member Nested in Air Treatment Member

A hand vacuum cleaner using any one or more aspects discussed herein, including one or more of the other aspects set out herein including one or more of the suction motor nested in the handle, the energy storage member forward of the suction motor, the suction motor nested in the air treatment member, the post-motor filter nested in the air treatment member, the suction motor forward of the air treatment member, the rearwardly opening air treatment member, the suction motor below the handle, the energy storage member forward of the air treatment member, the suction motor nested in the handle and forward of the air treatment member, the suction motor nested in the first cleaning stage, may have the energy storage member at least partially nested in air treatment member.

Providing the energy storage member 142 at least partially in the air treatment member 122 may provide a more compact hand vacuum 100. Providing the energy storage member 142 at least partially in the air treatment member 122 may also position the energy storage member 142 directly in the airflow path, advantageously allowing the airflow to cool the energy storage member 142. While the position of energy storage member 142 with respect to other components is discussed separately with respect to each other component, it will be appreciated that any embodiment of a hand vacuum 100 may utilize the positioning of the energy storage member 142 with respect to one or more of the other components discussed herein. It will also be appreciated that any air treatment member 122 discussed herein may be used.

In any of the body types of the example hand vacuums 100 described herein, the energy storage member 142 may be provided partially nested or fully nested in the air treatment member 122. In any embodiment, the air treatment member 122 may include a first cleaning stage and optionally a second cleaning stage. The first cleaning stage may include the first stage cyclone chamber 158 or a non-cyclonic cleaning stage (e.g., a non-cyclonic momentum separator, pleated filter, filter bag, etc.). The second cleaning stage may include the one or more second stage cyclone chambers 180 or optionally a non-cyclonic cleaning stage (e.g., a non-cyclonic momentum separator, pleated filter, filter bag, etc.). The energy storage member 142 may be provided fully nested or partially nested in the first cleaning stage, fully nested or partially nested in the second cleaning stage, or fully nested or partially nested in both the first and second cleaning stages. Each cleaning stage may comprise one or more cyclones or one or more non-cyclonic air treatment chambers Accordingly, the energy storage member 142 may be provided in one or more air treatment chambers.

Figures 59, 60, 61, 62, 63, 64:
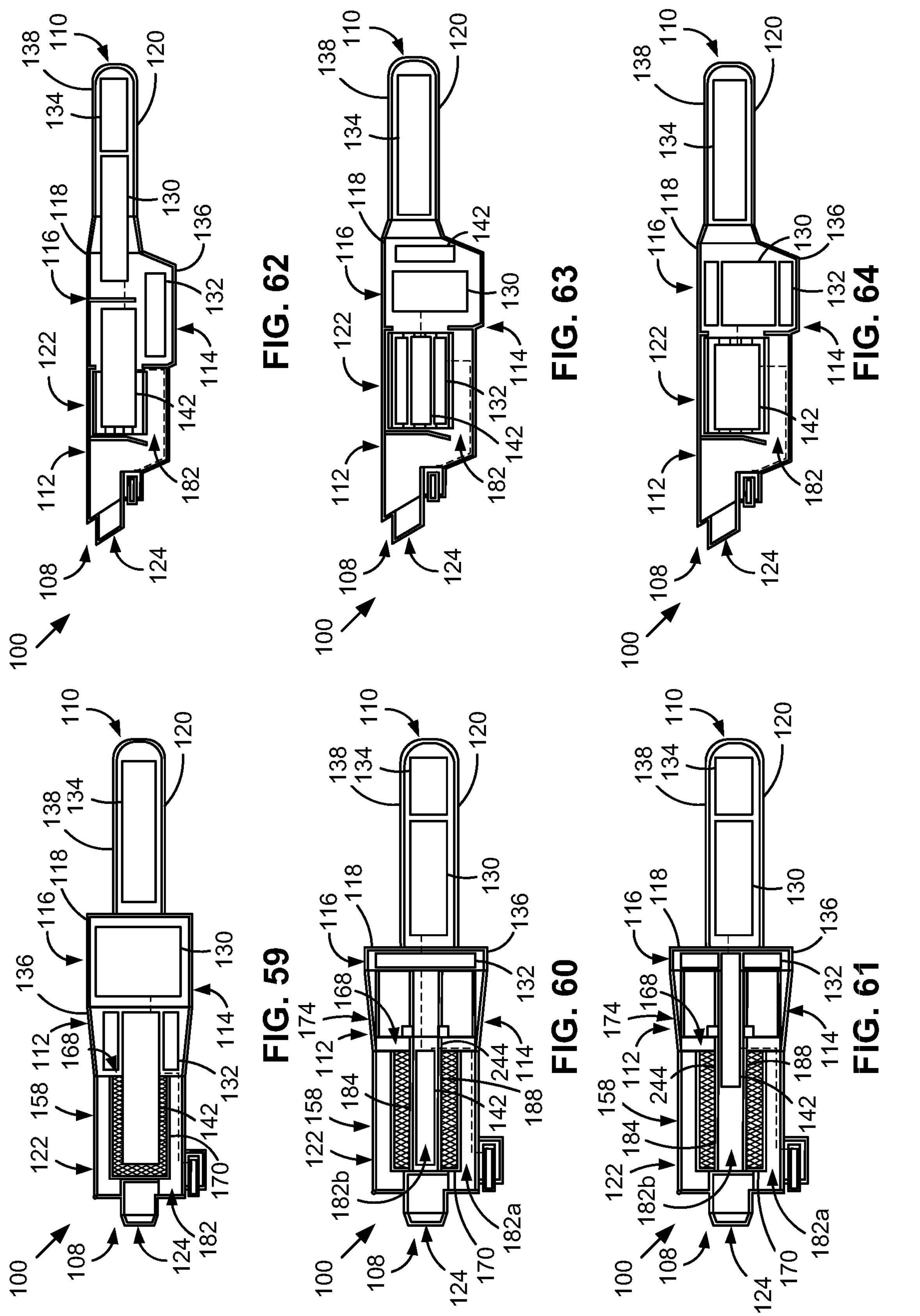
FIG. 59 is a schematic cross-sectional view of a hand vacuum cleaner similar to the hand vacuum cleaner of FIG. 17 with the energy storage member nested in the air treatment member.
FIG. 60 is a schematic cross-sectional view of a hand vacuum cleaner similar to the hand vacuum cleaner of FIG. 17 with the energy storage member nested in the air treatment member.
FIG. 61 is a schematic cross-sectional view of a hand vacuum cleaner similar to the hand vacuum cleaner of FIG. 17 with the energy storage member nested in the air treatment member.
FIG. 62 is a schematic cross-sectional view of a hand vacuum cleaner similar to the hand vacuum cleaner of FIG. 13 with the energy storage member nested in the air treatment member.
FIG. 63 is a schematic cross-sectional view of a hand vacuum cleaner similar to the hand vacuum cleaner of FIG. 13 with the energy storage member nested in the air treatment member.
FIG. 64 is a schematic cross-sectional view of a hand vacuum cleaner similar to the hand vacuum cleaner of FIG. 13 with the energy storage member nested in the air treatment member.

As exemplified in FIGS. 60 and 64, the energy storage member 142 may be fully nested in the first cleaning stage. As shown in FIG. 60, the energy storage member 142 may be positioned interior of the porous member 170. In the example shown, the energy storage member 142 is further positioned in a housing 244 interior of the central conduit 188 forming the dirt collection chamber 184 of the second cyclonic stage 174 such that the dirt collection region 182 of the second cyclonic stage 174 is defined annularly about the housing 244 of the energy storage member 142 between the housing 244 and the central conduit 188 As shown in FIG. 64, the energy storage member 142 may be positioned interior of the porous member 170 of the non-cyclonic air treatment member 122 (i.e., the pleated filter).

Figure 68:
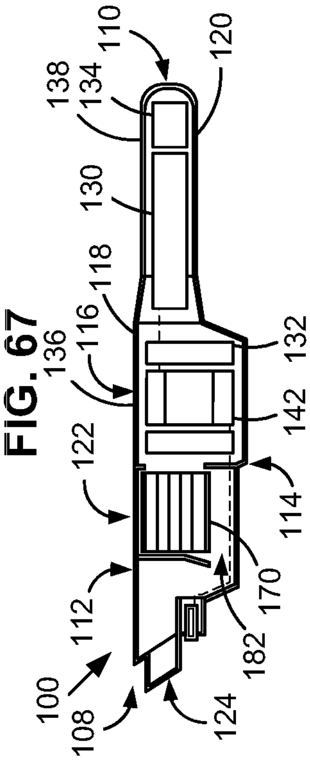
FIG. 68 is a schematic cross-sectional view of a hand vacuum cleaner similar to the hand vacuum cleaner of FIG. 13 with the energy storage member nested in the air treatment member.
Figure 69:
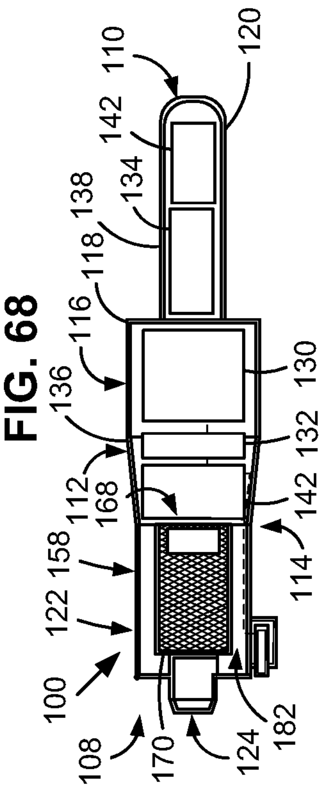
FIG. 69 is a schematic cross-sectional view of a hand vacuum cleaner similar to the hand vacuum cleaner of FIG. 17 with the energy storage member nested in the air treatment member.
Figure 65:
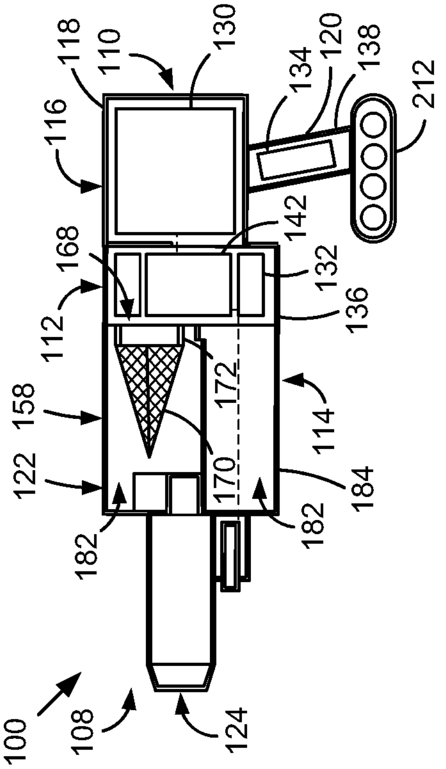
FIG. 65 is a schematic cross-sectional view of a hand vacuum cleaner similar to the hand vacuum cleaner of FIG. 1 with the energy storage member nested in the air treatment member.
Figure 66:
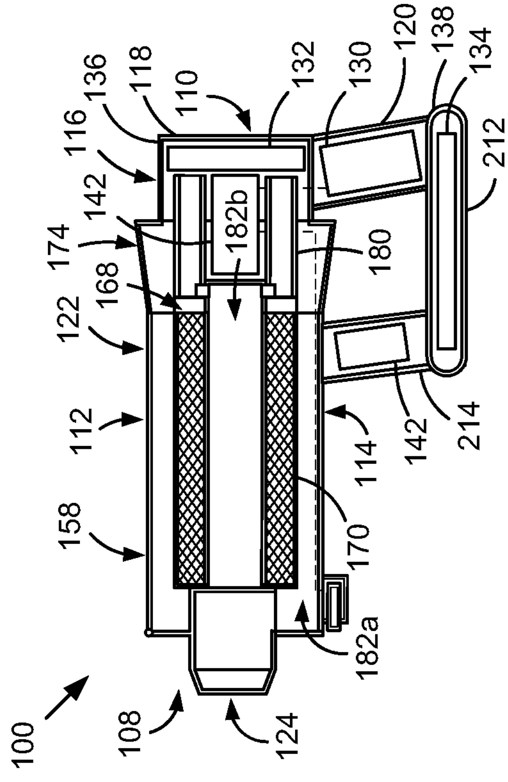
FIG. 66 is a schematic cross-sectional view of a hand vacuum cleaner similar to the hand vacuum cleaner of FIG. 9 with the energy storage member nested in the air treatment member.
Figure 70:
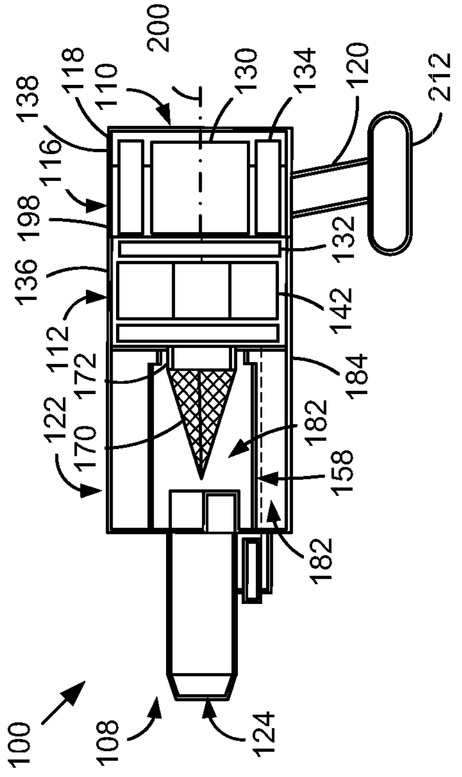
FIG. 70 is a schematic cross-sectional view of a hand vacuum cleaner similar to the hand vacuum cleaner of FIG. 1 with a removable rear end.
Figure 71:
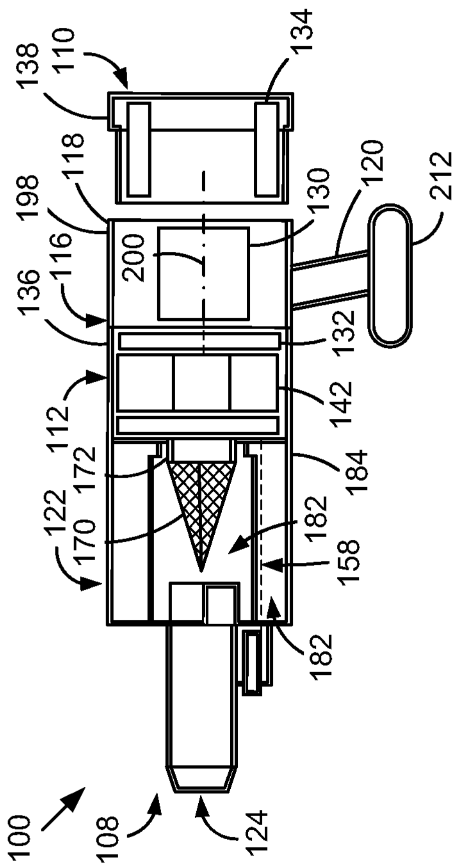
FIG. 71 is a schematic cross-sectional view of the hand vacuum cleaner of FIG. 70 with the rear end removed.
Figure 72:
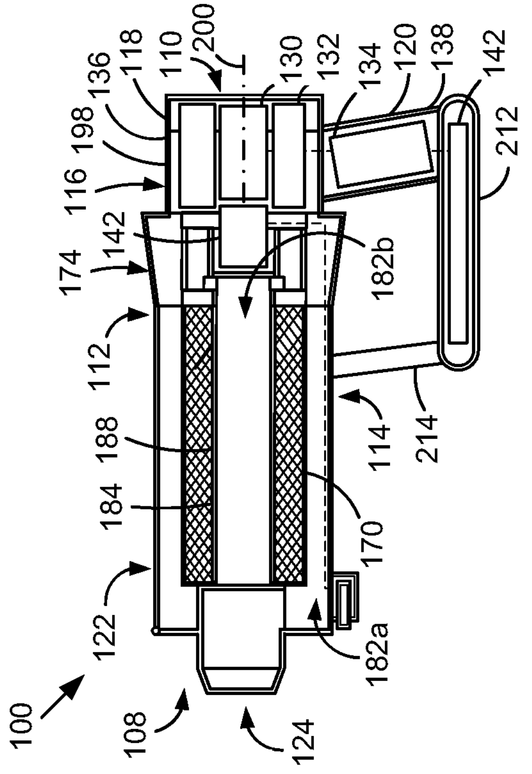
FIG. 72 is a schematic cross-sectional view of a hand vacuum cleaner similar to the hand vacuum cleaner of FIG. 9 with a removable rear end.
Figure 73:
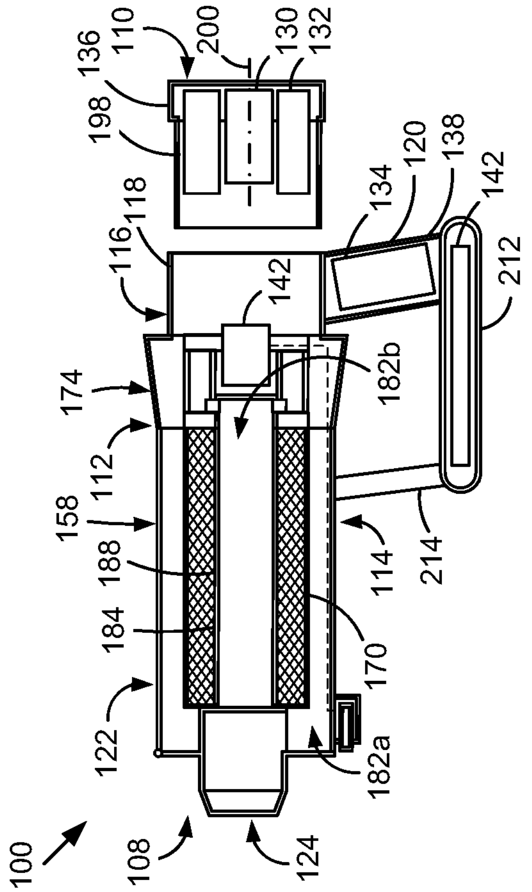
FIG. 73 is a schematic cross-sectional view of the hand vacuum cleaner of FIG. 72 with the rear end removed.
Figure 75:
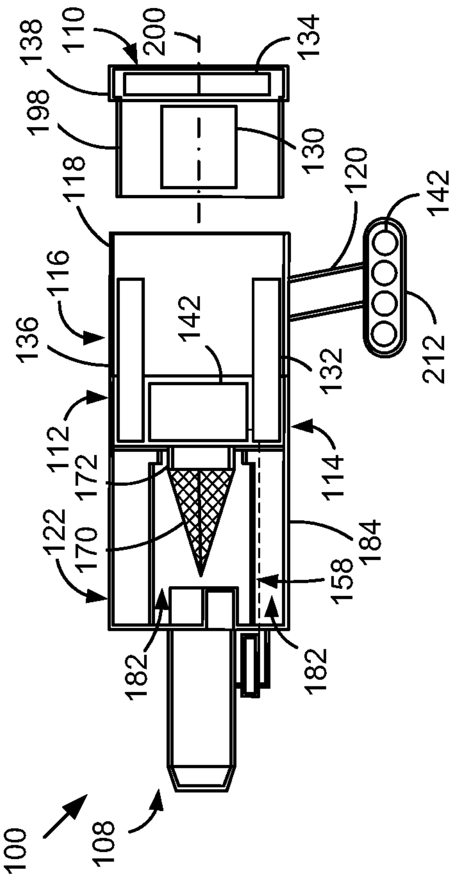
FIG. 75 is a schematic cross-sectional view of the hand vacuum cleaner of FIG. 74 with the rear end removed.
Figure 77:
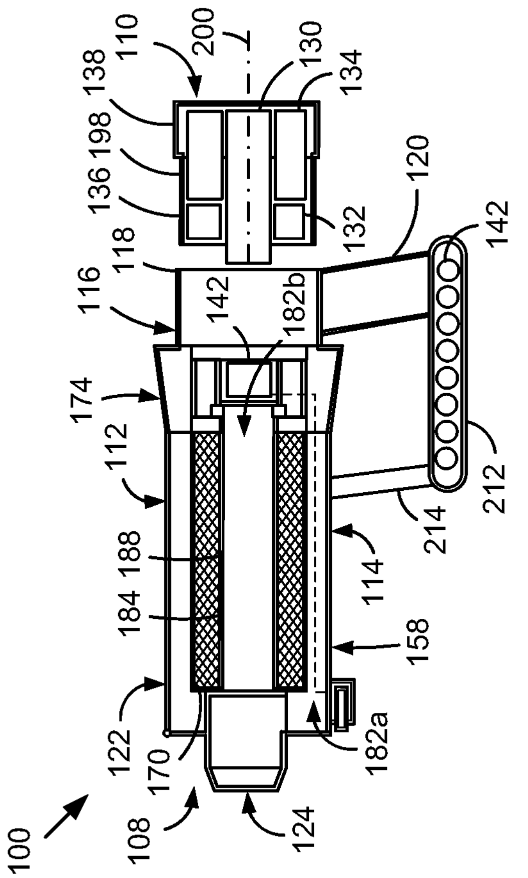
FIG. 77 is a schematic cross-sectional view of the hand vacuum cleaner of FIG. 76 with the rear end removed.
Figure 74:
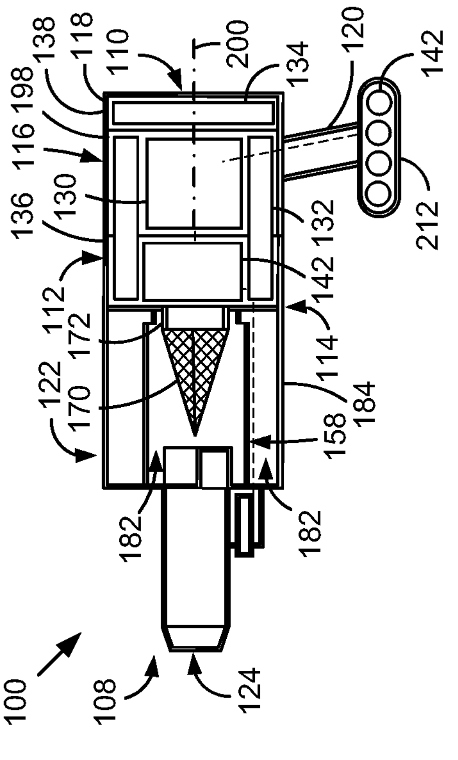
FIG. 74 is a schematic cross-sectional view of a hand vacuum cleaner similar to the hand vacuum cleaner of FIG. 1 with a removable rear end.
Figure 76:
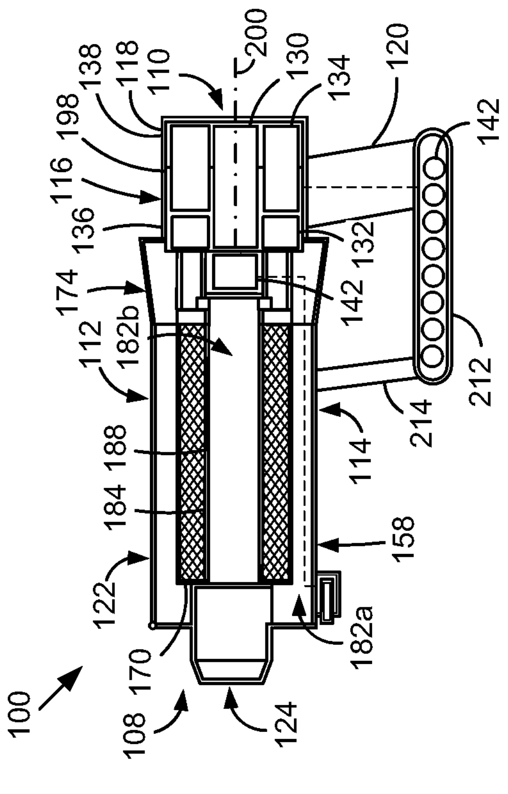
FIG. 76 is a schematic cross-sectional view of a hand vacuum cleaner similar to the hand vacuum cleaner of FIG. 9 with a removable rear end.

As exemplified in FIGS. 65, 66, 68, and 69 the energy storage member 142 may be fully nested in the second cleaning stage. As shown in FIG. 66, the second cleaning stage may be the second cyclonic stage 174 having the plurality of cyclones 180 positioned in parallel to each other, and the energy storage member 142 may be nested within the plurality of cyclones 180 such that the cyclones 180 are, e.g., positioned annularly about the energy storage member 142. As shown in FIGS. 65, 68, and 69, the second cleaning stage may be the pre-motor filter 132 and the energy storage member 142 may be fully nested within the pre-motor filter 132. As exemplified in FIG. 65, the pre-motor filter 132 may be generally cylindrical and provided annularly about the energy storage member 142 such that the energy storage member 142 is positioned in the central opening of the pre-motor filter 132, which is optionally a downstream side of the filter. As exemplified in FIGS. 68 and 69, the pre-motor filter 132 may be a pair of generally flat slabs positioned on upstream and downstream sides of the energy storage member 142 such that the energy storage member 142 is nested therebetween. In any embodiment, the energy storage member 142 may be annularly ring-shaped with a central opening, which forms an airflow passage through the energy storage member 142 (see e.g., FIG. 68), so as to provide a straighter airflow path between the upstream and downstream pre-motor filters 132. Additionally, or alternatively, the pre-motor filter 132 slab upstream of the energy storage member 142 may be at least partially, shown as fully, nested in the first cleaning stage (see e.g., FIG. 69), so as to provide a more compact hand vacuum 100. As exemplified, the upstream pre-motor filter 132 is positioned within the porous member 170 of the first stage cyclone chamber 158 proximate the cyclone air outlet 168.

Figure 55:
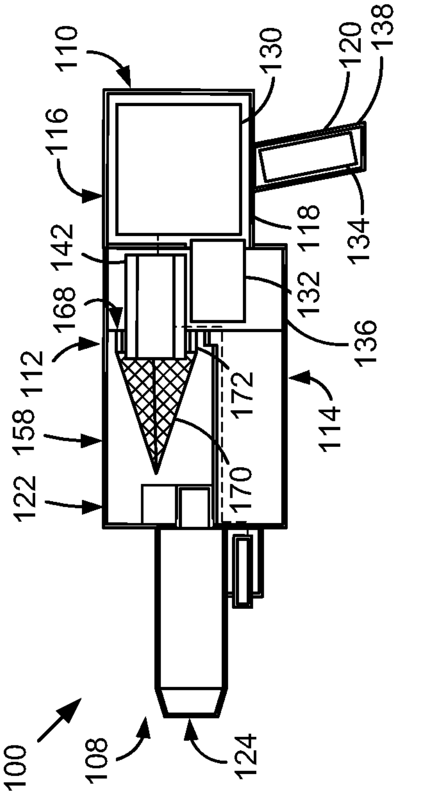
FIG. 55 is a schematic cross-sectional view of a hand vacuum cleaner similar to the hand vacuum cleaner of FIG. 1 with the energy storage member nested in an air treatment member.
Figure 56:
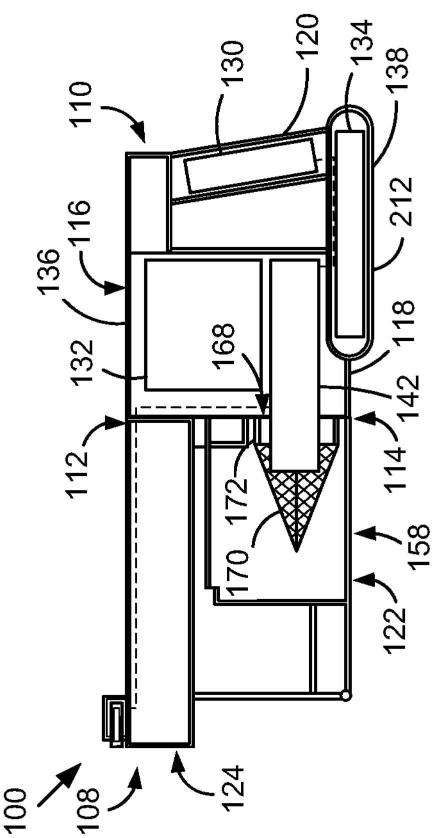
FIG. 56 is a schematic cross-sectional view of a hand vacuum cleaner similar to the hand vacuum cleaner of FIG. 5 with the energy storage member nested in the air treatment member.
Figure 57:
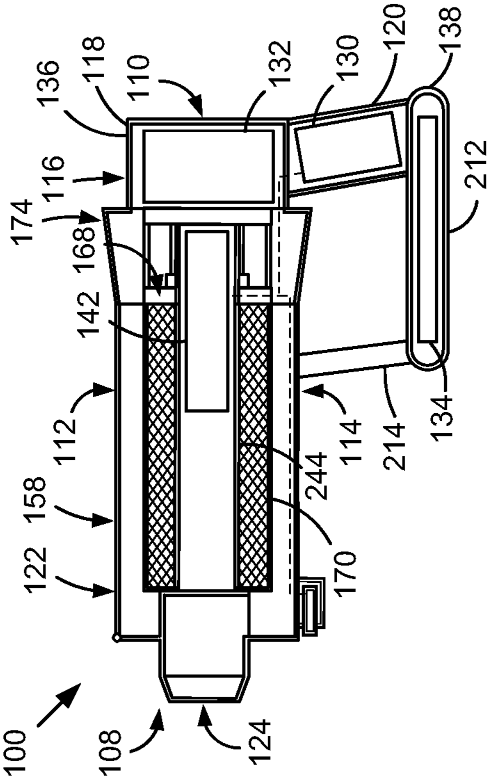
FIG. 57 is a schematic cross-sectional view of a hand vacuum cleaner similar to the hand vacuum cleaner of FIG. 9 with the energy storage member nested in the air treatment member.

As exemplified in FIGS. 55, 56, and 62, the energy storage member 142 may be partially nested in the first cleaning stage. The energy storage member 142 may be positioned in the air outlet of the first cleaning stage such that the energy storage member 142 extends rearwardly from the interior of the first cleaning stage through the air outlet and to the exterior of the first cleaning stage. The energy storage member 142 may extend rearwardly from the first stage cyclone chamber 158 such that at least 10% of the energy storage member 142 (e.g., more than 10%, 25%, 50%, 75%, or more) may be provided within the first stage cyclone chamber 158. In the illustrated examples, the energy storage member 142 extends rearwardly from the first stage cyclone chamber 158 such that 25% (see e.g., FIGS. 55, 56), and 50% (see e.g., FIG. 62) of the energy storage member is nested in the first stage cyclone chamber 158.

As exemplified, the energy storage member 142 may be annularly ring-shaped with a central opening, which forms an airflow passage through the energy storage member 142 (see e.g., FIG. 55), such as to define an air outlet conduit from the first stage cyclone chamber 158. As exemplified, the energy storage member 142 may additionally, or alternatively, be provided in the cyclone air outlet conduit 172 (see e.g., FIG. 56). As shown in FIGS. 55 and 56, the energy storage member 142 may be position interior of the porous member 170 of the first stage cyclone chamber 158 and extend rearwardly through the cyclone air outlet 168 (and cyclone air outlet conduit 172, if present) to the exterior of the first stage cyclone chamber 158. As shown in FIG. 62, the energy storage member 142 may be positioned interior of the porous member 170 (e.g., pleated filter) of the non-cyclonic air treatment member 122 and extend rearwardly through the outlet end of the porous member 170 to the exterior of the air treatment member 122.

Figure 67:
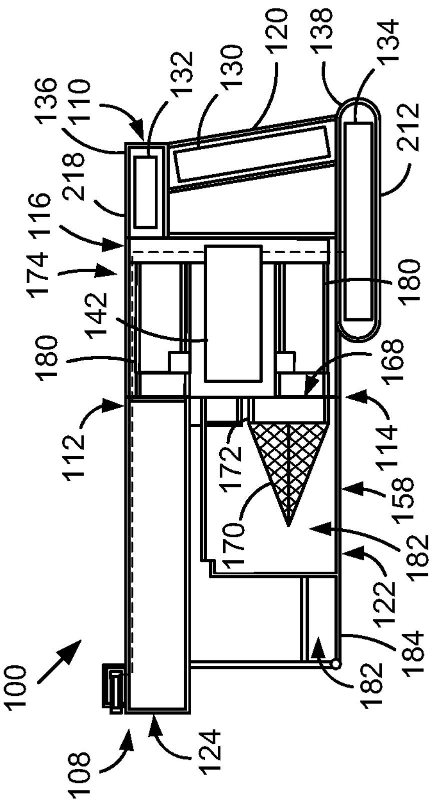
FIG. 67 is a schematic cross-sectional view of a hand vacuum cleaner similar to the hand vacuum cleaner of FIG. 5 with the energy storage member nested in the air treatment member.

As exemplified in FIG. 67, the energy storage member 142 may be partially nested in the second cleaning stage. As shown, the second cleaning stage may be the second cyclonic stage 174, and the energy storage member 142 may be nested within the plurality of cyclones 180 as described previously. The energy storage member 142 may extend rearwardly from the second cyclonic stage 174 such that at least 10% of the energy storage member 142 (e.g., more than 10%, 25%, 50%, 75%, or more) may be provided within the second cyclonic stage 174. In the illustrated examples, the energy storage member 142 extends rearwardly from the second cyclonic stage 174 such that 75% of the energy storage member is nested in the second cyclonic stage 174. It will be appreciated that the second cleaning stage may alternatively be the pre-motor filter 132 (e.g., cylindrical, vertically opposed slabs), and the energy storage member 142 may be partially nested in the pre-motor filter 132 in a similar manner as described previously.

As exemplified in FIGS. 57 to 59, 61, and 63, the energy storage member 142 may be at least partially nested in both the first and the second cleaning stages. As exemplified, the energy storage member 142 may be positioned in the air outlet of the first cleaning stage such that the energy storage member 142 extends rearwardly from the interior of the first cleaning stage through the air outlet and into the second cleaning stage. The energy storage member 142 may extend rearwardly from the first cleaning stage into the second cleaning stage such that at least 10% of the energy storage member 142 (e.g., more than 10%, 25%, 50%, 75%, or more) may be provided within the first cleaning stage, and at least 10% of the energy storage member 142 (e.g., more than 10%, 25%, 50%, 75%, or more) may be provided within the second cleaning stage. As exemplified in FIGS. 57 to 59 and 61, the first cleaning stage is the first stage cyclone chamber 158, and the energy storage member 142 is positioned in the porous member 170 (and cyclone air outlet conduit 172, if present) and extends rearwardly from the cyclone air outlet 168 as described previously. The second cleaning stage may be the second cyclonic stage 174 (see e.g., FIGS. 57, 58, 61) or pre-motor filter 132 (see e.g., FIG. 59) as described previously. The energy storage member 142 may have any relative proportion nested in the first cleaning stage to the second cleaning stage (which need not amount to 100%, such as if the energy storage member 142 extends further rearwardly of the second cleaning stage). For example, as exemplified, the relative proportion of the energy storage member 142 nested in the first cleaning stage to the second cleaning stage may be 50%: 50% (see e.g., FIG. 58), 60%: 40% (see e.g., FIG. 57), 75%: 25% (see e.g., FIG. 59), or 25%: 65% with the remaining 10% extending rearwardly of the second cleaning stage (see e.g., FIG. 61). Any other relative proportions may be possible. As another example, in the example shown in FIG. 63, the first cleaning stage is the non-cyclonic air treatment member 122 having the pleated filter as the porous member 170, the second cleaning stage is the pre-motor filter 132 provided fully nested in porous member 170, and the energy storage member 142 is provided fully nested in the pre-motor filter 132 and, therefore, fully nested in both the first and second cleaning stages.

Figure 58:
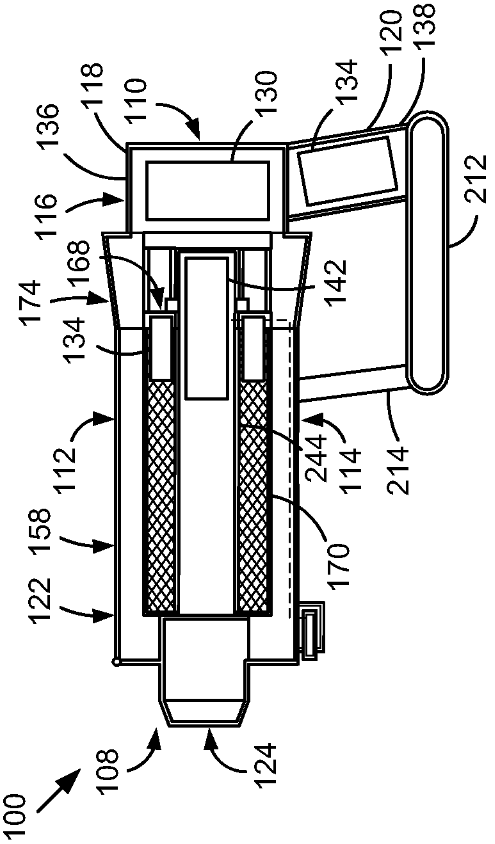
FIG. 58 is a schematic cross-sectional view of a hand vacuum cleaner similar to the hand vacuum cleaner of FIG. 9 with the energy storage member nested in the air treatment member.

It will be appreciated that the energy storage member 142 may optionally be partially nested in the pre-motor filter 132 in addition to the first and second cleaning stages (wherein the second cleaning stage comprises one or more air treatment chambers) such as exemplified in FIGS. 58 and 61. The pre-motor filter 132 in such embodiments may not be considered as forming an additional cleaning stage, may be considered as forming an additional cleaning stage, or may be considered as part of one of the first or second cleaning stages. For example, in the example shown in FIG. 58, the pre-motor filter 132 is nested in the porous member 170 of the first stage cyclone chamber 158 proximate the cyclone air outlet and upstream from the second cyclonic stage 174 such that the energy storage member 142 extends through the pre-motor filter 132 from the first stage cyclone chamber 158 to the second cyclonic stage 174. In such examples, the pre-motor filter 132 may not be considered as forming an additional cleaning stage, may be considered as part of the first cleaning stage (i.e., the first stage cyclone chamber), or may be considered as forming the second cleaning stage, with the downstream second cyclonic stage 174 forming a third cleaning stage. As another example, in the example shown in FIG. 61, the pre-motor filter 132 may be provided rearward of the second cyclonic stage 174 such that the energy storage member 142 extends rearwardly from the second cyclonic stage 174 through the pre-motor filter 132. In such examples, the pre-motor filter 132 may not be considered as forming an additional cleaning stage, may be considered as part of the second cleaning stage (i.e., the second stage cyclone chamber), or may be considered as forming a third cleaning stage downstream of the second cleaning stage.

In any embodiment, an additional energy storage member 142 may be provided at any other position in the hand vacuum 100 as described herein. For example, the additional energy storage member 142 may be provided in the lower member 212 (see e.g., FIG. 65), handle (see e.g., FIG. 69), main body housing (see e.g., FIG. 63), finger guard (see e.g., FIG. 66), or any other suitable location. The suction motor 130 and post-motor filter 134 may be provided in any suitable location in accordance with any of the examples described herein. It will be appreciated that the second cleaning stage may be/include the post-motor filter 134, and the energy storage member 142 may be nested in the post-motor filter 134 similar to as described with respect to the pre-motor filter 132.

The figures described in this section are exemplary of the energy storage member nested in air treatment member. It will be appreciated that other figures not discussed within this section may also show the energy storage member nested in air treatment member in accordance with this aspect.

Suction Motor Nested in Air Treatment Member

A hand vacuum cleaner using any one or more aspects discussed herein, including one or more of the other aspects set out herein including one or more of the suction motor nested in the handle, the energy storage member forward of the suction motor, the energy storage member nested in air treatment member, the post-motor filter nested in the air treatment member, the suction motor forward of the air treatment member, the rearwardly opening air treatment member, the suction motor below the handle, the energy storage member forward of the air treatment member, the suction motor nested in the handle and forward of the air treatment member, the suction motor nested in the first cleaning stage, may have the suction motor at least partially nested in the air treatment member.

Providing the suction motor 130 at least partially in the air treatment member 122 may provide a more compact hand vacuum 100. While the position of suction motor 130 with respect to other components is discussed separately with respect to each other component, and other possible positions of suction motor 130 are discussed separately, it will be appreciated that any embodiment of a hand vacuum 100 may utilize the positioning of the suction motor 130 with respect to one or more of the other components discussed herein.

In any of the body types of the example hand vacuums 100 described herein, the suction motor 130 may be provided partially nested or fully nested in the air treatment member 122. The air treatment member 122 may include one or more cyclonic and/or non-cyclonic cleaning stages as described previously herein. The suction motor 130 may be provided fully nested or partially nested in the first cleaning stage, fully nested or partially nested in the second cleaning stage, or partially nested in both the first and second cleaning stages. Each cleaning stage may comprise one or more cyclones or one or more non-cyclonic air treatment chambers Accordingly, the suction motor may be provided in one or more air treatment chambers.

Figure 91:
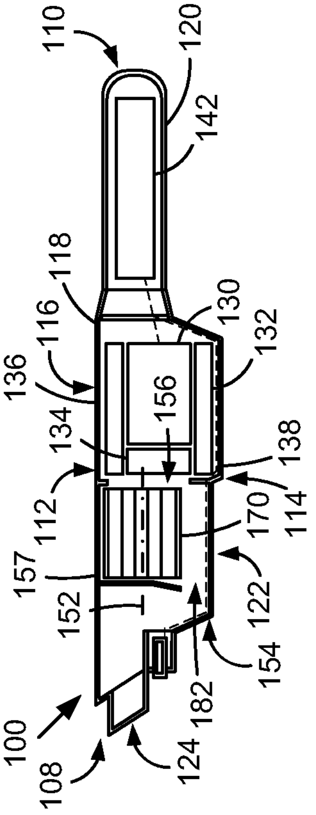
FIG. 91 is a schematic cross-sectional view of the hand vacuum cleaner of FIG. 90 with the motor nested in the air treatment member.

As exemplified in FIGS. 80, 89, 91, 94, and 98, the suction motor 130 may be fully nested in the second cleaning stage. As shown in FIGS. 80, 89, 94, and 98, the second cleaning stage may be the second cyclonic stage 174. As exemplified, the second cyclonic stage 174 may be a plurality of cyclones 180 positioned in parallel to each other, and the suction motor 130 may be nested within the plurality of cyclones 180 such that the cyclones 180 are positioned around, e.g., annularly around, the suction motor 130. As shown in FIG. 91, the second cleaning stage may be the pre-motor filter 132 and the suction motor 130 may be fully nested within the pre-motor filter 132. As exemplified, the pre-motor filter 132 may be generally cylindrical and provided annularly about the suction motor 130 such that the suction motor 130 is positioned in the central opening of the pre-motor filter 132.

As exemplified in FIGS. 79, 81, 83, 85, 87, 88, 93, and 96, the suction motor 130 may be partially nested in the second cleaning stage. As shown, the second cleaning stage may be the second cyclonic stage 174, and the suction motor 130 may be nested within the plurality of cyclones 180 as described previously or within a plurality of non-cyclonic air treatment chambers. The suction motor 130 may extend rearwardly from the second cyclonic stage 174 (see e.g., FIGS. 79, 81, 83, 87, 88, 93, and 96) or forwardly from the second stage cyclone chamber (see e.g., FIG. 85) such that at least 10% of the suction motor 130 (e.g., more than 10%, 25%, 50%, 75%, or more) may be provided within the second cyclonic stage 174. In the illustrated examples, the suction motor 130 extends rearwardly (or forwardly, in FIG. 85) from the second cyclonic stage 174 such that 25% (see e.g., FIGS. 81, 93), 50% (see e.g., FIG. 79, 83, 85, 96), 75% (see e.g., FIGS. 87, 88) of the suction motor 130 is nested in the second cyclonic stage 174. It will be appreciated that the second cleaning stage may alternatively be the pre-motor filter 132 (e.g., cylindrical) or other cleaning stage using one or more non-cyclonic air treatment chambers, and the suction motor 130 may be partially nested in the pre-motor filter 132 or within the non-cyclonic air treatment chambers in a similar manner as described previously.

It will be appreciated that the suction motor 130 may optionally be partially nested in the pre-motor filter 132 in addition to the second cleaning stage such as exemplified in FIGS. 79, 81, 83, 87, 88, 93, and 96. In the examples shown, the pre-motor filter 132 is provided rearward of the second cyclonic stage 174 such that the suction motor 130 extends rearwardly from the second cyclonic stage 174 through the pre-motor filter 132. In such examples, the pre-motor filter 132 may not be considered as forming an additional cleaning stage, may be considered as part of the second cleaning stage (i.e., with the second stage cyclone chamber), or may be considered as forming a third cleaning stage downstream of the second cleaning stage.

As exemplified in FIGS. 78 to 98, along the airflow path between the second cleaning stage and the suction motor 130, the airflow may travel rearwardly from the rear end wall 178 of the second cyclonic stage 174 and then travel forwardly to the suction motor 130. The pre-motor filter 132 may be positioned rearward of the second cleaning stage such that the airflow passes rearwardly through the pre-motor filter 132 and/or forwardly through the pre-motor filter 132. The airflow may pass through the pre-motor filter 132 once in the forward direction or rearward direction, or once in a continuous path internal to the pre-motor filter 132 in both the forward direction and the rearward direction. The pre-motor filter 132 may also be provided as two separate pre-motor filters and the airflow may pass rearwardly though a first pre-motor filter 132*a* and then forwardly through a second pre-motor filter 132*b*.

Figure 81:
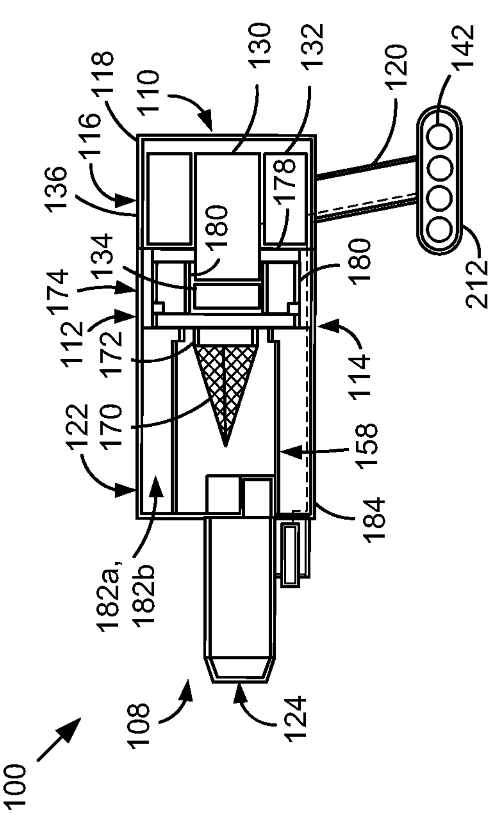
FIG. 81 is a schematic cross-sectional view of the hand vacuum cleaner of FIG. 80 with the motor nested in the air treatment member.
Figure 78:
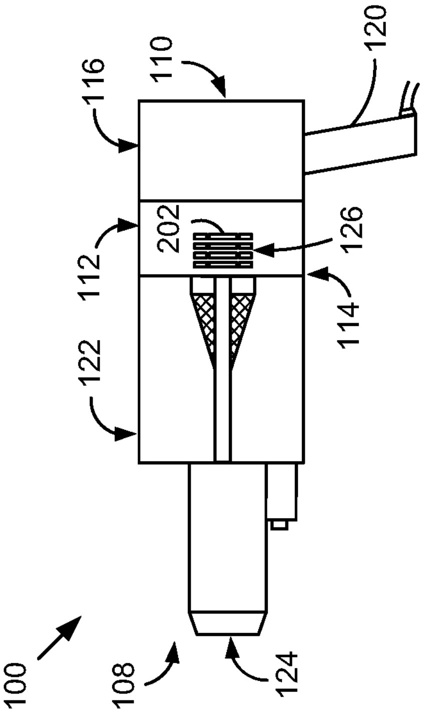
FIG. 78 is a schematic side view of a hand vacuum cleaner similar to the hand vacuum cleaner of FIG. 1.
Figure 80:
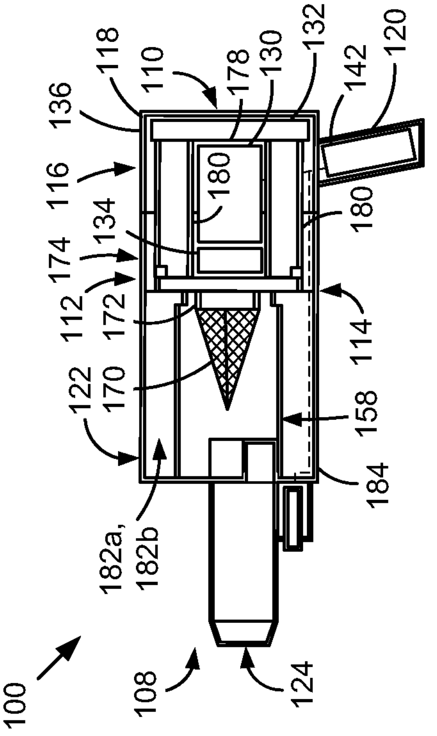
FIG. 80 is a schematic cross-sectional view of a hand vacuum cleaner similar to the hand vacuum cleaner of FIG. 1 with the motor nested in the air treatment member.
Figure 82:
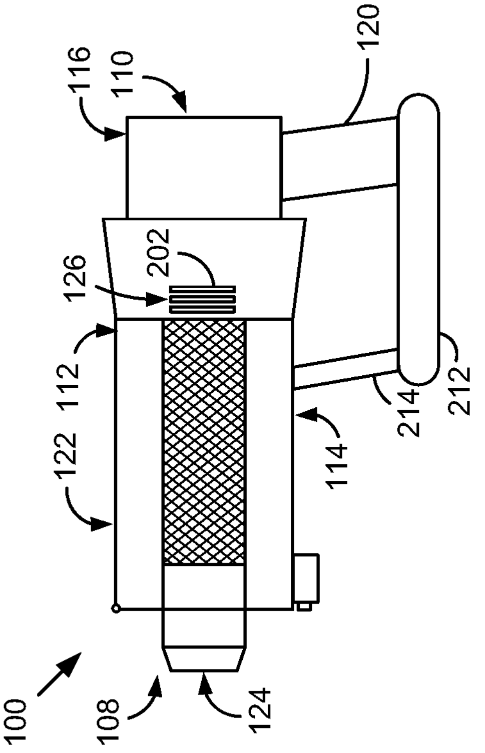
FIG. 82 is a schematic side view of a hand vacuum cleaner similar to the hand vacuum cleaner of FIG. 9.
Figure 93:
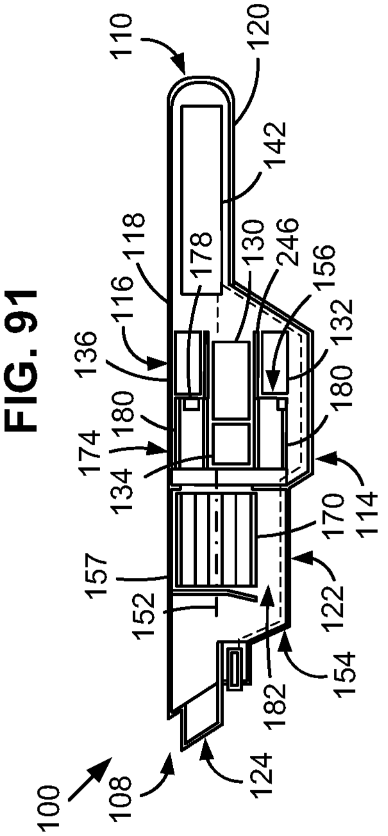
FIG. 93 is a schematic cross-sectional view of the hand vacuum cleaner of FIG. 92 with the motor nested in the air treatment member.
Figure 94:
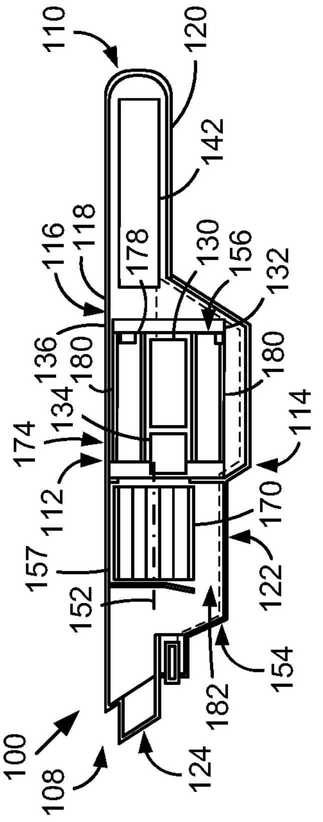
FIG. 94 is a schematic cross-sectional view of the hand vacuum cleaner of FIG. 92 with the motor nested in the air treatment member.

As exemplified in FIGS. 81, 91, and 93, the pre-motor filter 132 may be positioned rearward of the second cyclonic stage 174 such that the airflow passes rearwardly through the pre-motor filter 132 only. As shown, the pre-motor filter 132 may be generally cylindrical in shape and provided rearward of the second cyclonic stage 174 at the downstream end of the plurality of cyclones 180. The cylindrical pre-motor filter 132 may have a central opening such that the suction motor 130 extends rearwardly from the second cyclonic stage 174 between the plurality of cyclones 180 and through the central opening of the pre-motor filter 132. The rearward end of the suction motor 130 may generally align with the rearward end of the pre-motor filter 132 as shown such that the airflow passes rearwardly from the rearward end of the pre-motor filter 132 before turning and travelling in the forward direction to the suction motor 130.

As exemplified in FIGS. 80, 85, 87, 88, 94, and 98, the pre-motor filter 132 may be positioned rearward of the second cyclonic stage 174 such that the airflow passes rearwardly and forwardly through the pre-motor filter 132 in a continuous travel path internal to the pre-motor filter 132. As shown, the pre-motor filter 132 may be a generally flat slab positioned at the rearward end of the suction motor 130 and/or at the downstream end of the plurality of cyclones 180 of the second cyclonic stage 174. As exemplified, the airflow my enter the pre-motor filter 132 in the rearward direction, turn within the pre-motor filter 132, and exit the pre-motor filter 132 in the forward direction toward the suction motor 130.

Figure 79:
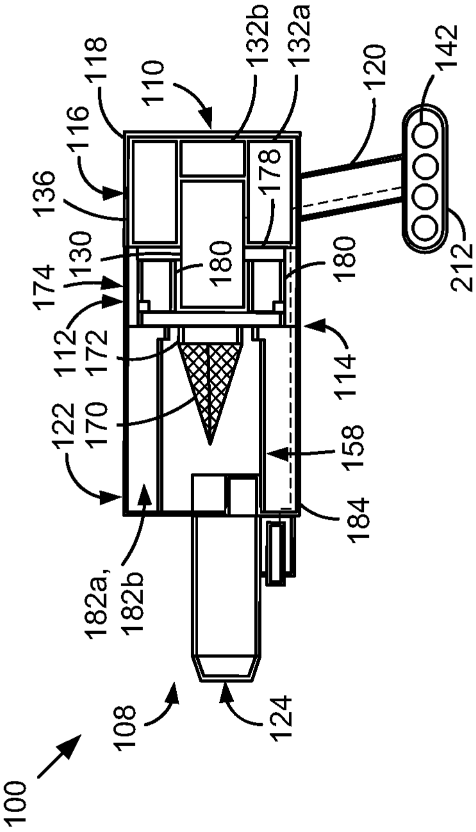
FIG. 79 is a schematic cross-sectional view of the hand vacuum cleaner of FIG. 78 with the motor nested in the air treatment member.
Figure 83:
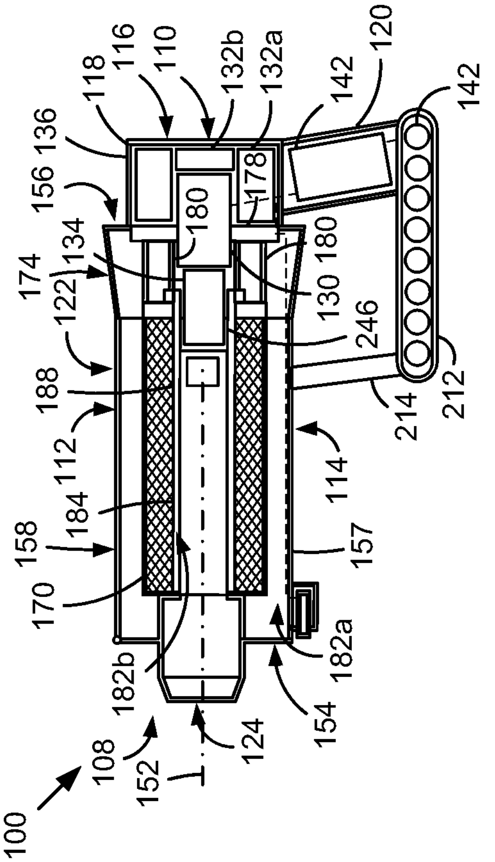
FIG. 83 is a schematic cross-sectional view of the hand vacuum cleaner of FIG. 82 with the motor nested in the air treatment member.
Figure 96:
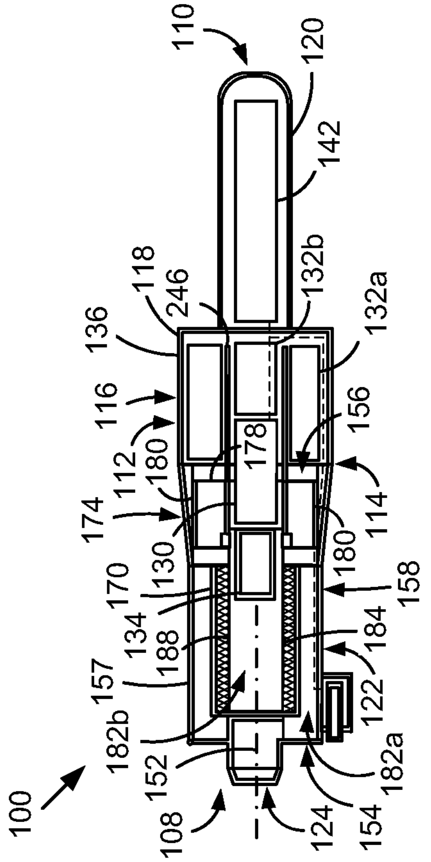
FIG. 96 is a schematic cross-sectional view of the hand vacuum cleaner of FIG. 95 with the motor nested in the air treatment member.
Figure 98:
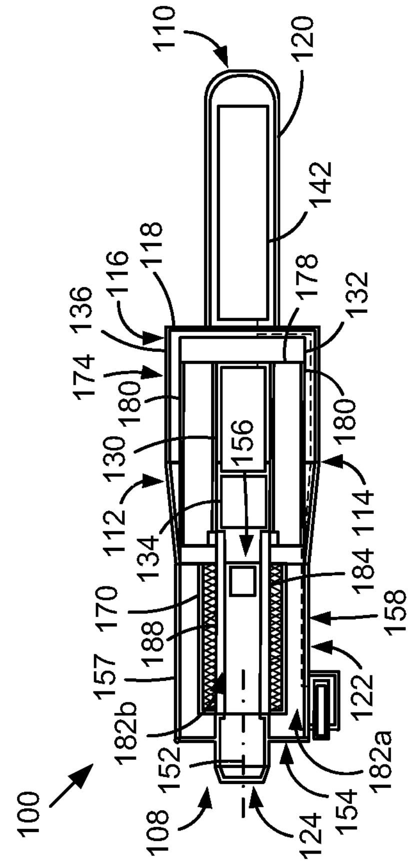
FIG. 98 is a schematic cross-sectional view of the hand vacuum cleaner of FIG. 97 with the motor nested in the air treatment member.
Figure 95:
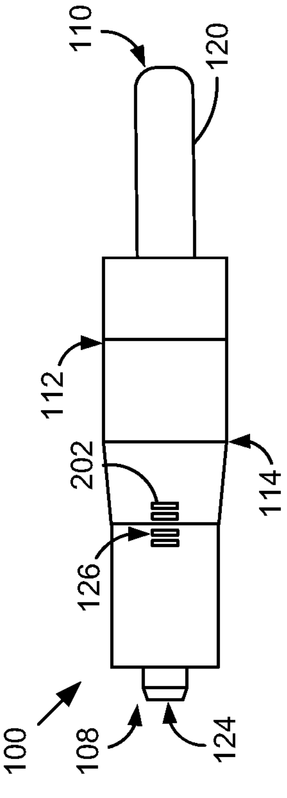
FIG. 95 is a schematic side view of a hand vacuum cleaner similar to the hand vacuum cleaner of FIG. 17.
Figure 97:
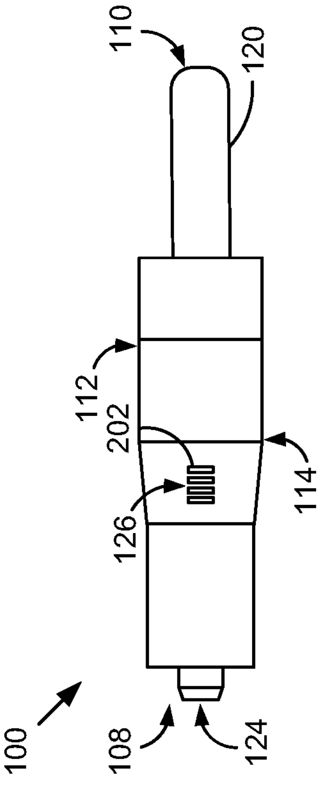
FIG. 97 is a schematic side view of a hand vacuum cleaner similar to the hand vacuum cleaner of FIG. 17.
Figure 100:
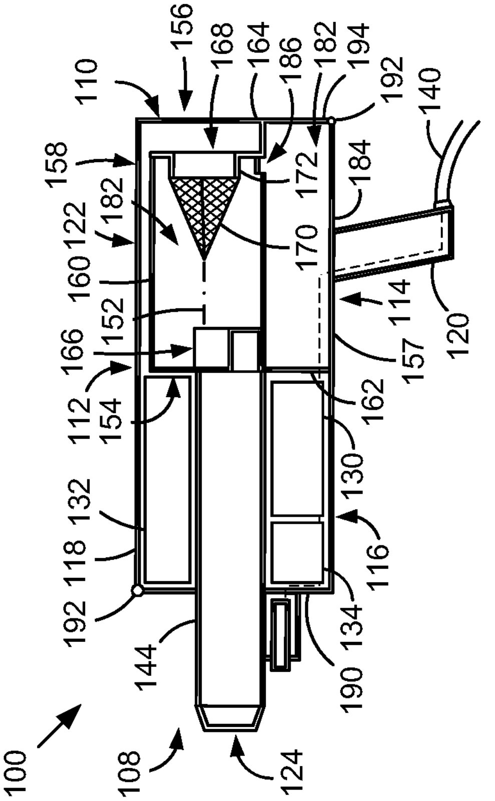
FIG. 100 is a schematic cross-sectional view of the hand vacuum cleaner of FIG. 99 with the motor forward of the air treatment member.

As exemplified in FIGS. 79, 83, and 96, the pre-motor filter 132 may be provided as the first pre-motor filter 132*a* and the second pre-motor filter 132*b*, the second pre-motor filter 132*b* separate or discrete from the first pre-motor filter 132*a*. The first pre-motor filter 132*a* may be positioned rearward of the second cyclonic stage 174 and the second pre-motor filter 132*b* may be downstream from the first pre-motor filter 132*a* such that the airflow may pass rearwardly though the first pre-motor filter 132*a* and then forwardly through a second pre-motor filter 132*b* to the suction motor 130.

Figure 85:
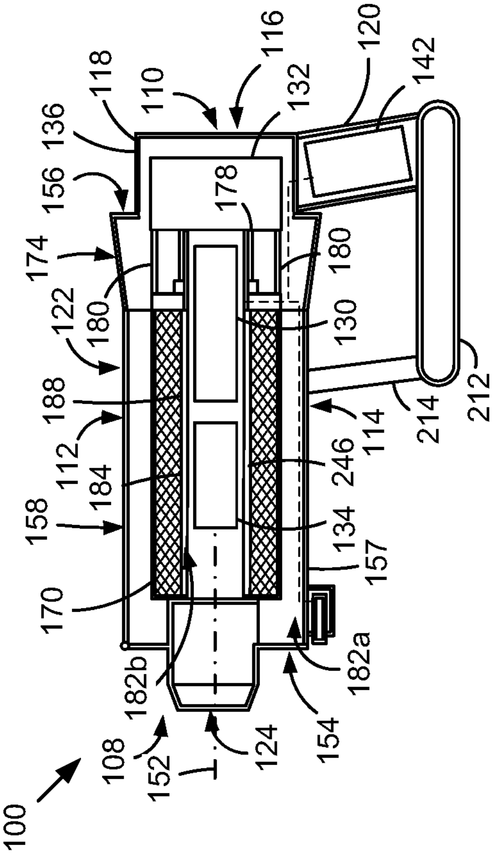
FIG. 85 is a schematic cross-sectional view of the hand vacuum cleaner of FIG. 84 with the motor nested in the air treatment member.
Figure 86:
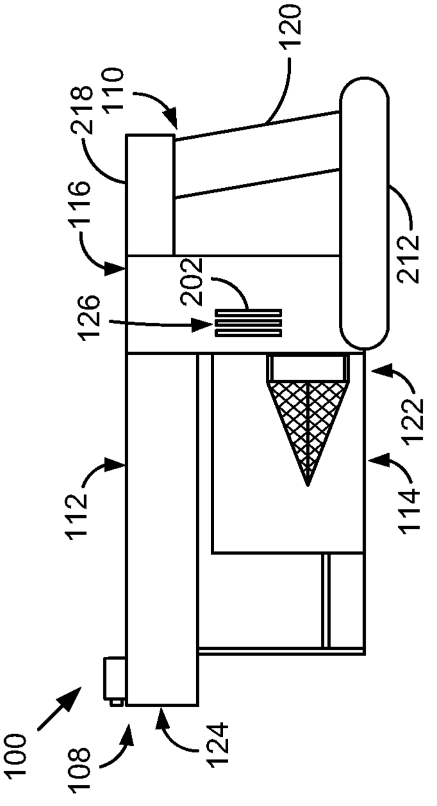
FIG. 86 is a schematic side view of a hand vacuum cleaner similar to the hand vacuum cleaner of FIG. 5.
Figure 87:
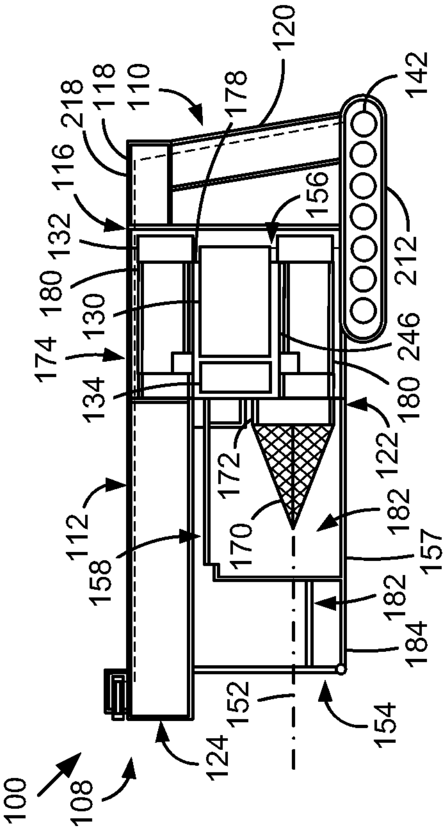
FIG. 87 is a schematic cross-sectional view of the hand vacuum cleaner of FIG. 86 with the motor nested in the air treatment member.
Figure 88:
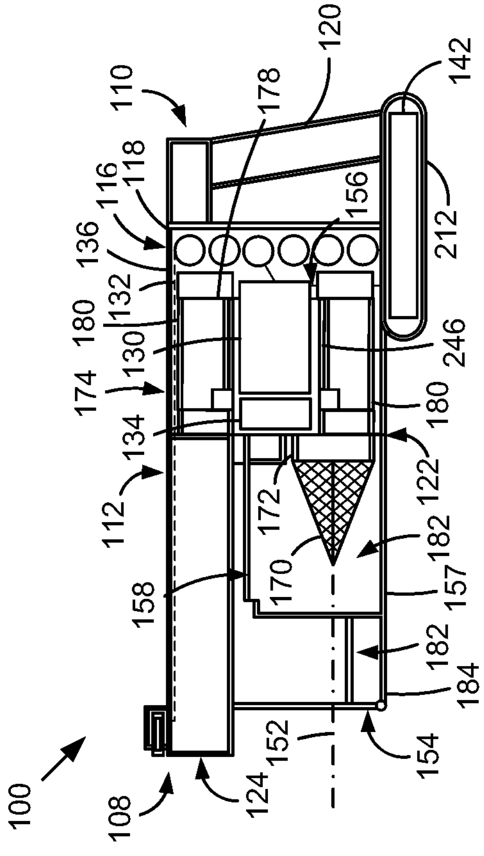
FIG. 88 is a schematic cross-sectional view of a hand vacuum cleaner similar to the hand vacuum cleaner of FIG. 5 with the motor nested in the air treatment member.
Figure 89:
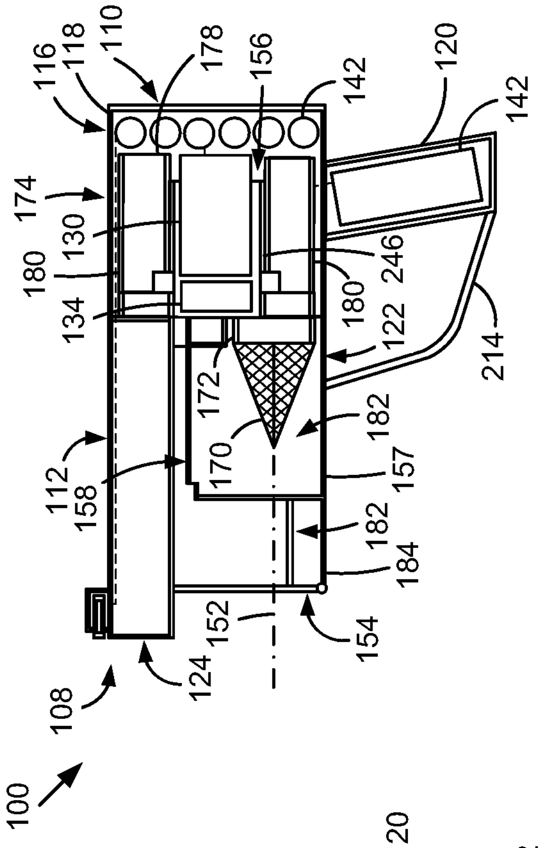
FIG. 89 is a schematic cross-sectional view of a hand vacuum cleaner similar to the hand vacuum cleaner of FIG. 1 with the motor nested in the air treatment member.

In any embodiment, such as exemplified in FIGS. 85, 93, and 96, the airflow may pass rearwardly through the pre-motor filter 132, or first pre-motor filter 132*a*, and then travel forwardly through an air outlet conduit 246 to the suction motor 130 positioned within the air outlet conduit 246. As exemplified, the air outlet conduit 246 may extend centrally through the second cyclonic stage 174 between the plurality of cyclones 180 and, optionally, into the first stage cyclone chamber 158. As expanded upon subsequently, if the air outlet conduit 246 extends into the first stage cyclone chamber 158, it may extend internal to the porous member 170 and further internal to the central conduit 188. The second pre-motor filter 132*b* and/or post-motor filter 134 may also be positioned in the air outlet conduit 246 upstream or downstream of the suction motor 130, respectively.

In any embodiment, such as exemplified in FIG. 91, the post-motor filter 134 may also be at least partially nested, shown as fully nested, in the pre-motor filter 132. This may allow for a more compact hand vacuum 100.

As exemplified in FIGS. 80 to 98, the clean air outlet 126 may be provided forward of the suction motor 130, e.g., in the main body housing 118, and the post-motor filter 134 may be provided forward of the suction motor 130 at the clean air outlet 126. It will be appreciated that, in the examples shown, the positioning of the filters may be reversed such that the post-motor filter(s) 134 may be at the location shown for the pre-motor filter(s) 132, and the pre-motor filter 132 may be at the location shown for the post-motor filter 134, and the airflow may travel in reverse to the pattern described with respect to these examples. That is, the airflow may travel forwardly from the downstream end of the plurality of cyclones 180 of the second cyclonic stage 174 to the forward end of the suction motor 130 (optionally through the pre-motor filter 132 forward of the suction motor 130), rearwardly through the suction motor 130, and then travel in reverse to the airflow path previously described from the rearward end of the suction motor 130 through the post-motor filter(s) 134.

As described previously with respect to FIGS. 70 to 77, and as exemplified therein, the pre-motor filter housing 136 and/or post-motor filter housing 138 may be axially rearwardly removable from the main body 116 for removing the pre-motor filter(s) 132, post-motor filter 134, and/or the suction motor 130. Alternately, one or more of the filters may be radially removable as previously discussed.

In any embodiment, the energy storage member 142, and optionally an additional energy storage member 142, may be provided at any position in the hand vacuum 100 as described herein. For example, the energy storage member 142 may be provided in the lower member 212 (see e.g., FIGS. 79, 81, 87), handle (see e.g., FIGS. 80, 83, 85, 91, 93, 94, 96, 98), main body housing (see e.g., FIGS. 88, 89), finger guard, or any other suitable location, and the additional energy storage member 142 may be provided in the lower member 212 (see e.g., FIGS. 83, 88), handle (see e.g., FIG. 89), main body housing, finger guard, or any other suitable location. The energy storage member 142 and/or the additional energy storage member 142 may be provided in the airflow path such that the airflow may pass over/through the energy storage member 142 for cooling.

The figures described in this section are exemplary of the suction motor nested in the air treatment member. It will be appreciated that other figures not discussed within this section may also show the suction motor nested in the air treatment member in accordance with this aspect.

Post-Motor Filter Nested in Air Treatment Member

A hand vacuum cleaner using any one or more aspects discussed herein, including one or more of the other aspects set out herein including one or more of the suction motor nested in the handle, the energy storage member forward of the suction nested in the air treatment member, the suction motor forward of the air treatment member, the rearwardly opening air treatment member, the suction motor below the handle, the energy storage member forward of the air treatment member, the suction motor nested in the handle and forward of the air treatment member, the suction motor nested in the first cleaning stage, may have the post-motor filter at least partially nested in the air treatment member.

Providing the post-motor filter 134 at least partially in the air treatment member 122 may provide a more compact hand vacuum 100. While the position of the post-motor filter 134 with respect to other components is discussed separately with respect to each other component, it will be appreciated that any embodiment of a hand vacuum 100 may utilize the positioning of the post-motor filter 134 with respect to one or more of the other components discussed herein.

In any of the body types of the example hand vacuums 100 described herein, the post-motor filter 134 may be provided partially nested or fully nested in the air treatment member 122. The air treatment member 122 may include one or more cyclonic and/or non-cyclonic cleaning stages, each of which may comprise one or more cyclones or one or more non-cyclonic air treatment chambers as described previously herein. The post-motor filter 134 may be provided fully nested or partially nested in the first cleaning stage, fully nested or partially nested in the second cleaning stage, or partially nested in both the first and second cleaning stages. Each cleaning stage may comprise one or more cyclones or one or more non-cyclonic air treatment chambers Accordingly, the post-motor filter 134 may be provided in one or more air treatment chambers.

As exemplified in the example embodiments shown in FIGS. 78 to 81, 86 to 89, 92 to 94, and 97 to 98, the post-motor filter 134 may be fully nested in the second cyclonic stage 174. The post-motor filter 134 may be positioned downstream from the suction motor 130 and nested between the plurality of cyclones 180 of the second cyclonic stage 174 and, in some embodiments, the air outlet conduit 246, as described in the previous section. As exemplified in the example embodiment shown in FIGS. 90 to 91, the post-motor filter 134 may be fully nested in the pre-motor filter 132 if the second cleaning stage is/includes the pre-motor filter 132. The clean air outlet 126 may be provided at any location downstream from the suction motor 130, such as at the location of the post-motor filter 134 proximate the rearward end of the first stage cyclone chamber 158 (see e.g., FIGS. 78, 86, 90, 92, 97).

Figure 84:
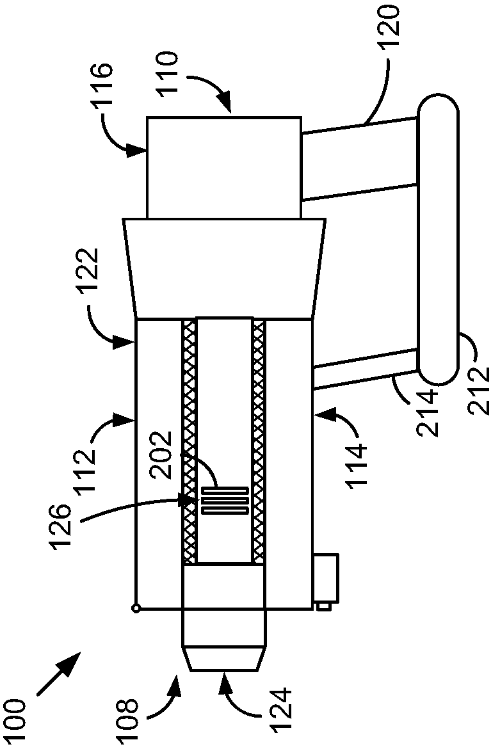
FIG. 84 is a schematic side view of a hand vacuum cleaner similar to the hand vacuum cleaner of FIG. 9.

As exemplified in the example embodiment shown in FIGS. 84 to 85, the post-motor filter 134 may be fully nested in the first cyclonic stage e.g., the first stage cyclone chamber 158. As described previously, the suction motor 130 may be positioned in the air outlet conduit 246 and the airflow may travel through the air outlet conduit 246 forwardly to the suction motor 130. The post-motor filter 134 may also be positioned in the air outlet conduit 246 downstream from the suction motor 130. As exemplified in FIG. 85, the air outlet conduit 246 may extend into the first stage cyclone chamber 158 within the porous member 170. The air outlet conduit 246 may further be internal to the central conduit 188 defining the dirt collection chamber 184 of the second cyclonic stage 174 such that the dirt collection region 182*b* of the second cyclonic stage 174 is the annular volume between the air outlet conduit 246 and central conduit 188. The clean air outlet 126 may be provided at any location downstream from the suction motor 130, such as proximate the forward end of the porous member 170. An additional outlet conduit (not shown) may extend radially outwardly from the air outlet conduit 246 housing the post-motor filter 134, through the central conduit 188 and the porous member 170, to the grills 202 in the sidewall 157 of the air treatment member 122.

As exemplified in the example embodiments shown in FIGS. 82 to 83 and 95 to 96, the post-motor filter 134 may be partially nested in both first and second cleaning stages each of which has one or more air treatment chamber, such as first and second stage cyclone chambers 158, 174. Similar to the example embodiment in FIGS. 84 to 85, the air outlet conduit 246 housing the post-motor filter 134 (see e.g., FIGS. 82 to 83) and optionally the suction motor 130 (see e.g., FIGS. 95 to 96) may extend partially into the first stage cyclone chamber 158. The post-motor filter 134 may be positioned in the air outlet conduit 246 downstream from the suction motor 130. The clean air outlet 126 may be provided at any location downstream from the suction motor 130, such as proximate the rear end wall 164 of the first stage cyclone chamber 158, and may include an additional outlet conduit (not shown) extending through the first or second stage cyclone chamber to the grills 202 in the main body housing 118 or sidewall 157 of the air treatment member 122 as described previously. Providing the clean air outlet 126 in the main body housing 118 rearward of the first stage cyclone chamber 158 may avoid the additional outlet conduit (not shown) passing through the second stage dirt collection chamber 184, porous member 170, and first stage cyclone chamber 158, which may disrupt the airflow or dirt collection within these components.

In any embodiment, the energy storage member 142, optional additional energy storage member 142, suction motor 130, and pre-motor filter 132 may be provided at any other position in the hand vacuum 100 as described herein, such as described in the previous section.

The figures described in this section are exemplary of the post-motor filter at least partially nested in the air treatment member. It will be appreciated that other figures not discussed within this section may also show the post-motor filter at least partially nested in the air treatment member in accordance with this aspect.

Rearwardly Opening Air Treatment Member

A hand vacuum cleaner using any one or more aspects discussed herein, including one or more of the other aspects set out herein including one or more of the suction motor nested in the handle, the energy storage member forward of the suction motor, the energy storage member nested in air treatment member, the suction motor nested in the air treatment member, the post-motor filter at least partially nested in the air treatment member, the suction motor forward of the air treatment member, the suction motor below the handle, the energy storage member forward of the air treatment member, the suction motor nested in the handle and forward of the air treatment member, the suction motor nested in the first cleaning stage, may have the air treatment member being rearwardly openable.

In any of the body types of the example hand vacuums 100 described herein, the air treatment member 122 may be provided rearward of the main body 116. The air treatment member 122 may include one or more cyclonic and/or non-cyclonic cleaning stages as described previously herein. In any embodiment, the air treatment member 122 may include the first cleaning stage and optionally the second cleaning stage, and the second cleaning stage may be at least partially forward or rearward of the first cleaning stage. Each cleaning stage may comprise one or more cyclones or one or more non-cyclonic air treatment chambers, one or both stages of which are rearwardly openable.

In accordance with this aspect, in some embodiments, the air inlet conduit 144 may extend through the main body 116 to the front end wall 162 or rear end wall 164 (or any position therebetween) of the first stage cyclone chamber 158 as described previously herein. In alternate embodiments, the air inlet conduit 144 may extend along the upper or lower end 112, 114 of the hand vacuum 100 across the main body 116 to the front or rear end walls 162, 164 (or any position therebetween) of the first stage cyclone chamber 158 as described previously herein. The cyclone air inlet 166 may be axial or tangential at the front or rear end wall 162, 164, and the cyclone air outlet 168 may be at the same end wall or opposed end wall so as to produce a uniflow or an inverted cyclone as described previously.

In embodiments in which the second cyclonic stage 174 is provided forward of the first stage cyclone chamber 158, the air inlet conduit 144 may also extend through the second cyclonic stage 174. One or more of the suction motor 130, the optional pre-motor filter 132, the optional post-motor filter 134, and the optional energy storage member 142, may be provided in the main body housing 118 forward of the air treatment member 122. As expanded upon in the subsequent section, one or more of the pre-motor filter 132, the post-motor filter 134, and the energy storage member 142 may be provided in an annular ring about the air inlet conduit 144 within the main body 116 such that the air inlet conduit 144 also extends through the pre-motor filter 132, the post-motor filter 134, and/or the energy storage member 142. In any embodiment, the optional energy storage member 142, the optional additional energy storage member 142, the suction motor 130, the optional pre-motor filter 132, and optional the post-motor filter 134 may be provided at any other position in the hand vacuum 100 as described herein.

As exemplified in FIGS. 99 to 106 and 111 to 116, the air treatment member 122 may be provided rearward of the main body 116. As shown, the air treatment member 122 may include the first stage cyclone chamber 158 with the first dirt collection region 182*a* provided internal to the first stage cyclone chamber 158 (see e.g., FIGS. 111 to 116) and/or provided in the external dirt collection chamber 184 (see e.g., FIGS. 99 to 106) in communication with the first stage cyclone chamber 158 through one or more dirt outlets 186 provided in the sidewall 160 of the first stage cyclone chamber 158.

Optionally, as exemplified in FIGS. 102, 104, 106, 111, 112, 114, and 115, the air treatment member 122 may further include a second stage comprising at least one air treatment chamber, such as the second cyclonic stage 174 positioned forward of the first stage cyclone chamber 158 (or alternatively rearward). As shown, the second cyclonic stage 174 may include the plurality of cyclones 180 arranged in parallel. Each of the cyclones 180 may have a dirt outlet 186 in communication with one or more external dirt collection chambers 184 defining the second dirt collection region 182*b*. As described previously, the second dirt collection region 182*b* may be the annular volume defined between the central conduit 188 and the air inlet conduit 144 within the first stage cyclone chamber 158 (see e.g., FIGS. 111, 114). Alternately, the dirt collection chamber 184 defining the second dirt collection region 182*b* may be provided at least partially surrounding the first stage cyclone chamber 158. In such embodiments, the second dirt collection region 182*b* may be defined between the sidewall 160 of the first stage cyclone chamber 158 and the sidewall 157 of the air treatment member 122 (see e.g., FIGS. 102, 104, 106, 112, 115).

As exemplified in FIGS. 100, 102 to 104, and 111 to 116, the air inlet conduit 144 may extend through the main body 116 to the cyclone air inlet 166 at the front end wall 162 (FIGS. 100, 102 to 104) or rear end wall 164 (FIGS. 111 to 116) of the first stage cyclone chamber 158 as described previously herein. As exemplified, if the second cyclonic stage 174 is provided forward of the first stage cyclone chamber 158, the air inlet conduit 144 may also extend through the second cyclonic stage 174 (see e.g., FIGS. 102, 104, 111, 112, 114, 115). As shown, the second cyclonic stage 174 includes the plurality of cyclones 180 arranged in parallel and positioned annularly about the air inlet conduit 144. As exemplified in FIGS. 105 and 106, the air inlet conduit 144 may extend along the upper end 112 of the hand vacuum 100 across the main body 116 to the cyclone air inlet 166 at the front end wall 162 or, as shown, the rear end 164 of the first stage cyclone chamber 158 as described previously herein.

As exemplified in FIGS. 100, 102 to 104, and 111 to 116, the cyclone air outlet 168 may be provided at the rear end wall 164 of the first stage cyclone chamber 158. In such embodiments, the airflow may exit the first stage cyclone chamber 158 in the rearward direction and travel in the forward direction to the second cyclonic stage 174, if present, and/or the further downstream components of the hand vacuum 100. As exemplified in FIGS. 105 and 106, the cyclone air outlet 168 may be provided at the front end wall 162 of the first stage cyclone chamber 158. In such embodiments, the airflow may exit the first stage cyclone chamber 158 in the forward direction and travel in the forward direction to the second cyclonic stage 174, if present, and/or the further downstream components of the hand vacuum 100.

Similar to as described previously with respect to the front end wall 162 of the air treatment member 122 being a front door 190, as exemplified in FIGS. 99 to 106 and 111 to 116, the rearward end wall 156 of the air treatment member 122 may be a rear door 194 moveably, e.g., pivotally mounted to the air treatment member 122 by, e.g., a pivot, such as hinge 192. As exemplified, the rear end wall 164 of the first stage cyclone chamber 158 may be a common wall with the rearward end wall 156 of the air treatment member 122 (see e.g., FIGS. 105, 106, 111 to 116). In such embodiments, opening the rear door 194 may open the first stage cyclone chamber 158 for emptying the dirt collection region 182 therein. Alternately, the rear end wall 164 of the first stage cyclone chamber 158 may be discrete and fixedly coupled to the rearward end wall 156 of air treatment member 122 (see e.g., FIGS. 100 to 104) by the connecting member 196 such that opening the rear door 194 simultaneously opens the rear end wall 164 of the first stage cyclone chamber 158 for emptying the dirt collection region 182 therein. Similarly, the rear end wall 164 of the air treatment member 122 may enclose the external dirt collection chamber(s) described herein at the respective rearward ends thereof. As exemplified, opening the rear door 194 may therefore open the dirt collection chamber 184 defining the first dirt collection region 182*a* (see e.g., FIGS. 100 to 106) and/or the dirt collection chamber 184 defining the second dirt collection region 182*b* (see e.g., FIGS. 102, 104, 106, 111, 112, 114, 115). The rear door 194 may be secured in the closed position using any suitable type of locking mechanism, including a latch mechanism that can be released by a user as described previously with respect to the front door 190.

Accordingly, in the example embodiments described herein, opening the rear door 194 of the air treatment member 122 concurrently opens first stage cyclone chamber 158 and dirt collection chamber(s) 184 for simultaneously emptying the dirt collection regions 182*a*, 182*b* therein. In this arrangement, a user may hold the hand vacuum 100 via the handle 120 with one hand and open the rear door 194 with the other hand to empty the dirt collection regions 182*a*, 182*b*.

As exemplified in FIGS. 100 to 106 and 111 to 113, the hand vacuum 100 in accordance with this aspect may have a pistol grip-style handle 120 extending downwardly and rearwardly from the lower surface of the air treatment member 122 or, alternatively, the main body 116, and the rear door 194 may have the information display screen 238. In alternate embodiments, as exemplified in FIGS. 114 to 116, the hand vacuum 100 in accordance with this aspect may have a wand-style handle 120 extending axially rearwardly from the rear door 194, and the information display screen 238 may be provided at an alternate location, such as on the handle 120. In such examples, the handle 120 may pivot with the rear door 194 between the open and closed positions.

In any embodiment described herein, the suction motor 130, pre-motor filter 132, post-motor filter 134, energy storage member 142, and optional additional energy storage member 142, may have any position relative to the air treatment member 122 in accordance with embodiments described herein, such as one or more being forward of the air treatment member and/or in the handle.

The figures described in this section are exemplary of the air treatment member being rearwardly openable. It will be appreciated that other figures not discussed within this section may also show the air treatment member being rearwardly openable in accordance with this aspect.

Suction Motor Forward of the Air Treatment Member

A hand vacuum cleaner using any one or more aspects discussed herein, including one or more of the other aspects set out herein including one or more of the suction motor nested in the handle, the energy storage member forward of the suction motor, the energy storage member nested in air treatment member, the suction motor nested in the air treatment member, the post-motor filter at least partially nested in the air treatment member, the rearwardly opening air treatment member, the suction motor below the handle, the energy storage member forward of the air treatment member, the suction motor nested in the handle and forward of the air treatment member, the suction motor nested in the first cleaning stage, may have the suction motor forward of the air treatment member.

In any of the body types of the example hand vacuums 100 described herein, such as any of the example embodiments wherein the air treatment member 122 is provided rearward of the main body 116, the suction motor 130 may be provided forward of the air treatment member 122. Each cleaning stage may comprise one or more cyclones or one or more non-cyclonic air treatment chambers Accordingly, the suction motor 130 may be provided forward of one or more of, and optionally all of, the air treatment chambers. In such examples, the air inlet conduit 144 may extend through the main body 116 to the air treatment member 122 as described previously herein, and the suction motor 130 may be provided at any position in the main body housing 118 around the air inlet conduit 144, such as above or below the air inlet conduit 144. Alternately, the air inlet conduit 144 may extend along the upper end 112 of the hand vacuum 100 across the main body 116 to the air treatment member 122 as described previously herein, and the suction motor 130 may be provided at any position in the main body housing 118, such as positioned centrally therein.

One or more of the optional pre-motor filter 132, the optional post-motor filter 134, and the optional energy storage member 142 may be provided in the main body housing 118 with the suction motor 130. In embodiments wherein the air inlet conduit 144 extends through the main body 116, the pre-motor filter 132, post-motor filter 134, and/or energy storage member 142 may be provided at any position in the main body housing 118 around the air inlet conduit 144, such as above, below, or beside the air inlet conduit 144, or annularly or semi-annularly about the air inlet conduit 144, for example. In embodiments wherein the air inlet conduit 144 does not extend through the main body 116, the pre-motor filter 132, post-motor filter 134, and/or energy storage member 142 may be provided at any position in the main body housing 118, such as above, below, beside, forward, or rearward of the suction motor 130, or annularly or semi-annularly about the suction motor 130, for example.

As exemplified in FIGS. 100, 102 to 104, and 111 to 116, the air treatment member 122 may be rearward of the main body 116, the air inlet conduit 144 may extend through the main body 116 to the air treatment member 122, and the suction motor 130 may be positioned in the main body housing 118 adjacent to the air inlet conduit. In such embodiments, the suction motor 130 may be positioned above the air inlet conduit 144 (see e.g., FIGS. 102, 112, 113, 115, 116), below the air inlet conduit 144 (see e.g., FIGS. 100, 103, 104, 111, 114), or at any other position around the air inlet conduit 144.

As exemplified, the pre-motor filter 132 may be provided at any position in the main body housing 118 around the air inlet conduit 144, such as above (see e.g., FIGS. 100, 111), below (see e.g., FIGS. 113, 116), or beside the air inlet conduit 144, or annularly (see e.g., FIGS. 102, 104, 112, 115) or semi-annularly (see e.g., FIGS. 103, 114) about the air inlet conduit 144. As exemplified, the post-motor filter 134 may be provided at any position in the main body housing 118 around the air inlet conduit 144, such as above (see e.g., FIG. 104), below (see e.g., FIGS. 100, 103, 111), or beside the air inlet conduit 144, or annularly (see e.g., FIGS. 113, 114) or semi-annularly (see e.g., FIGS. 102, 112, 115) about the air inlet conduit 144. As exemplified, the energy storage member 142 may be provided at any position in the main body housing 118 around the air inlet conduit 144, such as above (see e.g., FIG. 103), below, or beside the air inlet conduit 144, or in an annular (see e.g., FIGS. 113, 116) or semi-annular ring about the air inlet conduit 144.

As exemplified in FIGS. 105 to 110, the air treatment member 122 may be rearward of the main body 116, the air inlet conduit 144 may extend along the upper end 112 of the hand vacuum 100 across the main body 116 to the air treatment member 122, and the suction motor 130 may be positioned in the main body housing 118. In such embodiments, the suction motor 130 may be positioned centrally within the main body housing 118 in the lateral direction and/or the direction transverse to both the lateral and longitudinal directions (i.e., vertical, when the hand vacuum 100 is oriented with the upper end 112 above the lower end 114). Optionally, the suction motor 130 may be positioned centrally such that the motor axis 200 and the central axis 152 of the air treatment member 122 are coaxial (see e.g., FIGS. 106 to 110).

As exemplified, the pre-motor filter 132 may be provided at any position in the main body housing 118 upstream from the suction motor 130, such as above (see e.g., FIG. 109), below, beside, forward (see e.g., FIGS. 106, 107), or rearward (see e.g., FIG. 105) of the suction motor 130, or annularly (see e.g., FIGS. 108, 110) or semi-annularly about the suction motor 130. As exemplified, the post-motor filter 134 may be provided at any position in the main body housing 118 downstream from the suction motor 130, such as above, below (see e.g., FIG. 109), beside, forward (see e.g., FIG. 105), or rearward (see e.g., FIGS. 106, 107, 108) of the suction motor 130, or annularly (see e.g., FIG. 110) or semi-annularly about the suction motor 130. As exemplified, the energy storage member 142 may be provided at any position in the main body housing 118, such as above, below, beside, forward (see e.g., FIG. 110), or rearward (see e.g., FIGS. 105, 109) of the suction motor 130, or in an annular (see e.g., FIG. 107) or semi-annular ring about the suction motor 130.

As exemplified in FIGS. 117 to 120, if the or one of the air treatment members 122 is non-cyclonic, such as a pleated filter porous member 170, the suction motor 130 may be provided forward of the porous member 170. As shown, the suction motor 130 may be provided forward of the porous member 170 such that the airflow path travels radially inwardly into an interior of the porous member 170, axially upwardly out of the porous member 170, and forwardly to the suction motor 130. Similar to the examples shown in FIGS. 105 to 110, as exemplified in FIGS. 117 to 120, the pre-motor filter 132, post-motor filter 134, and/or energy storage member 142 may be provided at any position in the main body housing 118 relative to the suction motor 130, such as above, below, beside, forward, or rearward of the suction motor 130, or annularly or semi-annularly about the suction motor 130, for example.

As exemplified in FIGS. 99 to 120, a front end 108 of the hand vacuum 100 may include the front door 190 at the forward end of the main body 116, which may open the main body housing 118. As shown, the front door 190 may be openable, such as pivotably coupled by the hinge 192 or any suitable mechanism, to the main body housing 118. Optionally, an openable front door 190 can be secured in the closed position using any suitable type of locking mechanism, including a latch mechanism that can be released by a user as described previously. As exemplified, the front door 190 may provide access to the interior of the main body housing 118 and the elements housed therein, such as to access the pre-motor filter 132, post-motor filter 134, energy storage member(s) 142, and/or suction motor 130, such as for cleaning, replacement, inspection, or other maintenance purposes, or any other reason. As exemplified in FIGS. 117 to 120, if the dirt collection region 182 is in the air treatment member 122 forward of the pleated filter porous member 170, the front door 190 may also be opened to empty the dirt collection region 182.

In any embodiment described herein, the pre-motor filter 132, post-motor filter 134, energy storage member 142, and optional additional energy storage member 142, may have any position within the hand vacuum 100 in accordance with any of the embodiments described herein.

The figures described in this section are exemplary of the suction motor forward of the air treatment member. It will be appreciated that other figures not discussed within this section may also show the suction motor forward of the air treatment member in accordance with this aspect.

Suction Motor Below the Handle

A hand vacuum cleaner using any one or more aspects discussed herein, including one or more of the other aspects set out herein including one or more of the suction motor nested in the handle, the energy storage member forward of the suction motor, the energy storage member nested in air treatment member, the suction motor nested in the air treatment member, the post-motor filter at least partially nested in the air treatment member, the rearwardly opening air treatment member, the suction motor forward of the air treatment member, the energy storage member forward of the air treatment member, the suction motor nested in the handle and forward of the air treatment member, the suction motor nested in the first cleaning stage, may have the suction motor at least partially below the handle.

Providing the suction motor 130 below or underlying the handle 120 or at least partially below the handle 120, such as at least partially below the lower end 208 of the hand grip portion 204 in the lower member 212 or underlying the lower end 208 of the hand grip portion 204 such as in the lower member 212, may provide a more compact hand vacuum 100. Providing the suction motor 130 in the lower member 212 may also position the center of gravity of the hand vacuum 100 closer to the hand of the user when gripping the hand grip portion 204. This may reduce the torque experienced by the user when using the surface cleaning apparatus 100 in an above-floor cleaning mode wherein the hand vacuum 100 extends from the user's hand in an unsupported cantilevered length. While the position of suction motor 130 with respect to other components is discussed separately with respect to each other component, and other possible positions of suction motor 130 are discussed separately, it will be appreciated that any embodiment of a hand vacuum 100 may utilize the positioning of suction motor 130 with respect to one or more of the other components discussed herein.

In any of the body types of the example hand vacuums 100 described herein, in any of the example embodiments having a pistol grip-style handle 120, the handle 120 may include the lower member 212 at the lower end 208 of the hand grip portion 204, and the suction motor 130 may be provided in the lower member 212. It will be appreciated that, as described previously, any one or more of the upper member 218 (if present), handle 120, lower member 212, and finger guard 214 (if present) may be hollow and form part of the airflow path therein. In some examples, the airflow path may travel through the handle 120 to the lower member 212. In other examples, the airflow path may travel through the finger guard 214 to the lower member 212.

It will further be appreciated that, in accordance with any of the example embodiments discussed herein, the optional pre-motor filter 132 may be at any position upstream from the suction motor 130, the optional post-motor filter 134 may be at any position downstream from the suction motor 130, and the optional energy storage member 142 (and optional additional energy storage member) may be at any position upstream or downstream from the suction motor 130 (e.g., for cooling the energy storage member by airflow around or through the energy storage member), or not in the airflow path. In accordance with any of the example embodiments discussed herein, the clean air outlet 126 may be provided at any location downstream from the suction motor 130, such as in the sidewall of the lower member 212, the handle 120, the finger guard 214, or the upper member 218. Nesting the suction motor 130 and other elements as described herein may provide a more compact hand vacuum 100 and/or permit a larger amount of the volume of the hand vacuum 100 to be dedicated to the air treatment member 122, which may improve quality of the air treatment and/or increase the dirt collection capacity.

Figure 123:
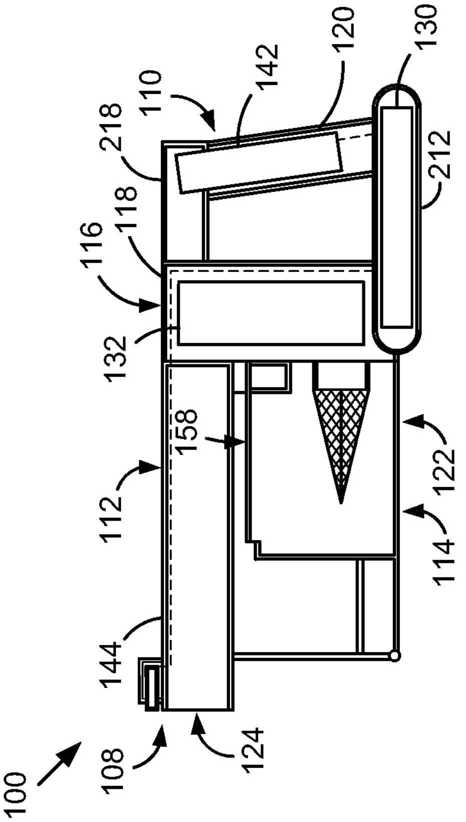
Figure 124:
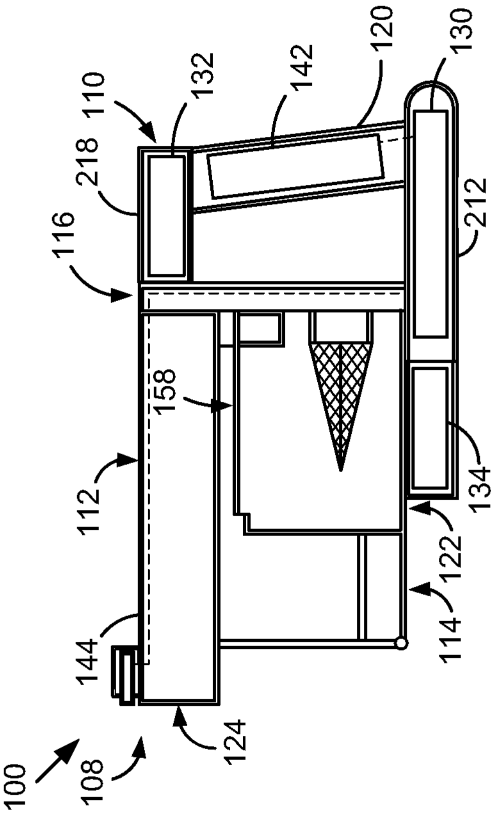
Figure 125:
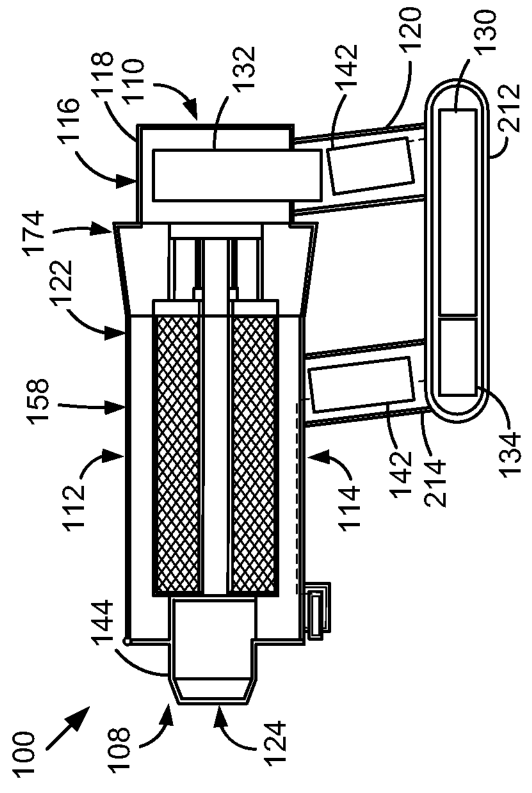
FIGS. 125-128 are schematic cross-sectional views of a hand vacuum cleaner similar to the hand vacuum cleaner of FIG. 9 with the motor provided below a lower end of the handle.
Figure 126:
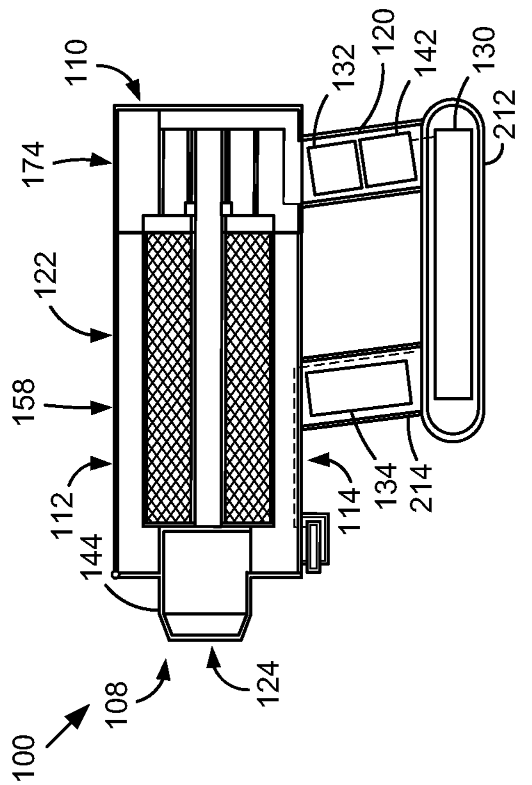
Figure 127:
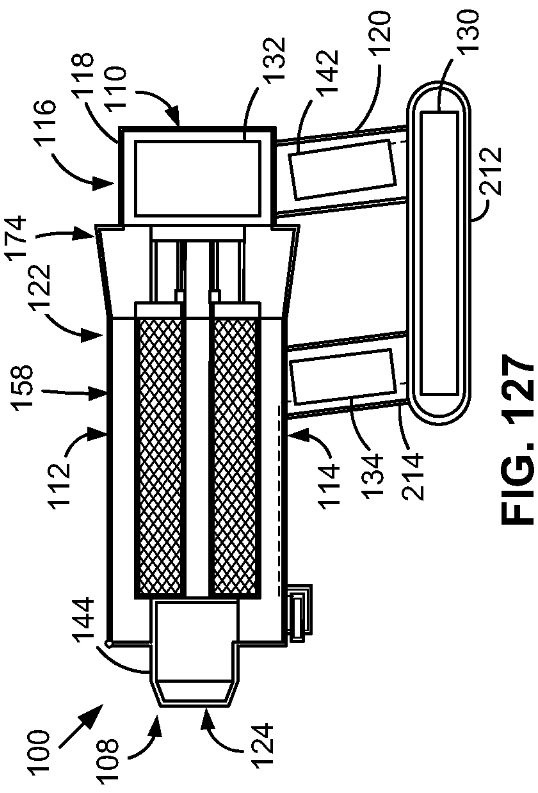
Figure 128:
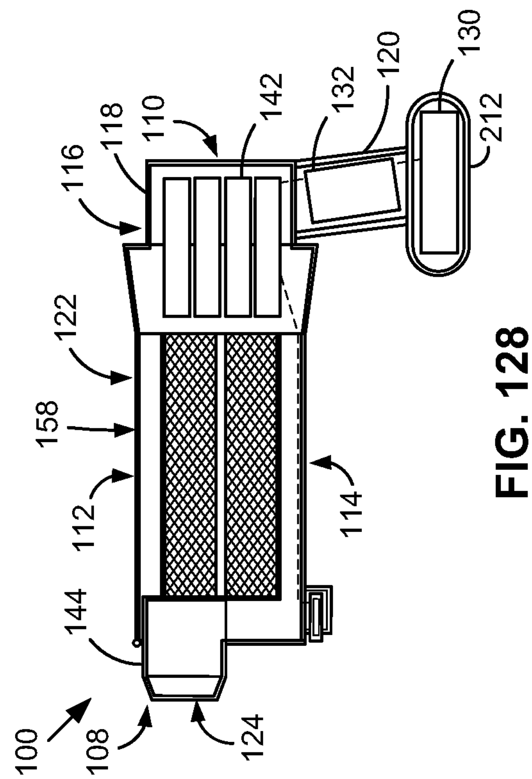
Figure 130:
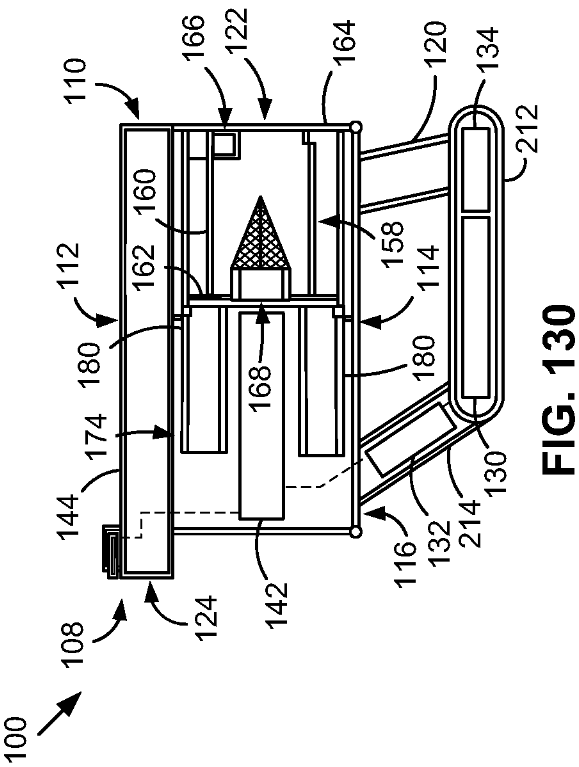
FIGS. 129-132 are schematic cross-sectional views of a hand vacuum cleaner similar to the hand vacuum cleaner of FIG. 1 with the motor provided below a lower end of the handle and the energy storage member forward of the air treatment member.
Figure 129:
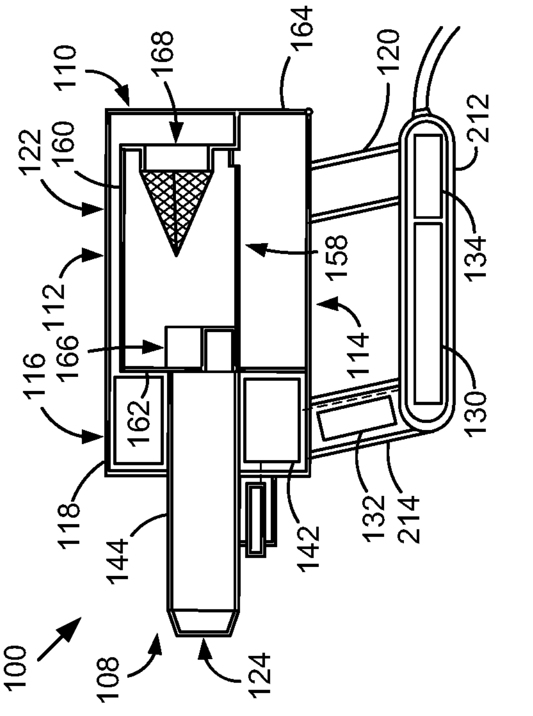
Figure 132:
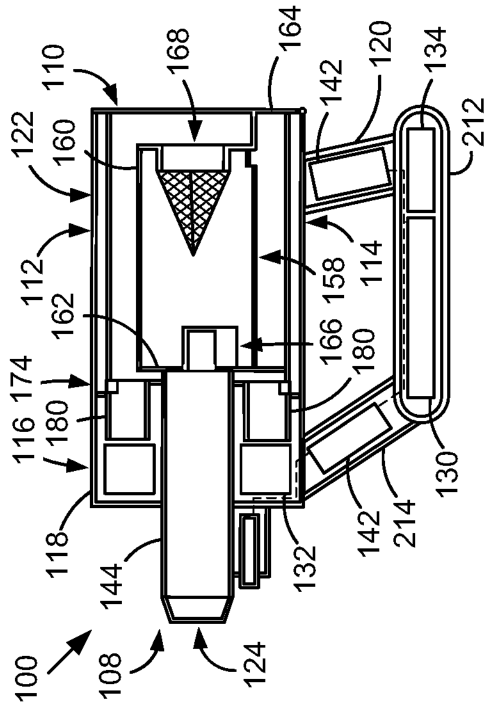
Figure 131:
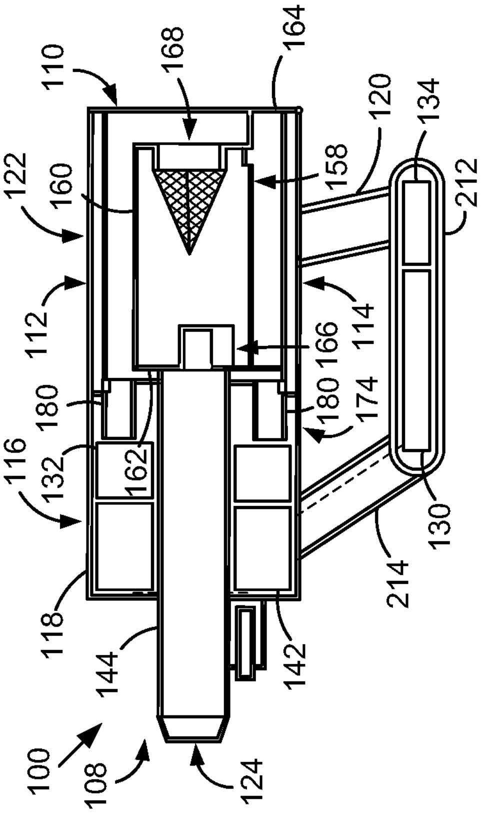
Figure 133:
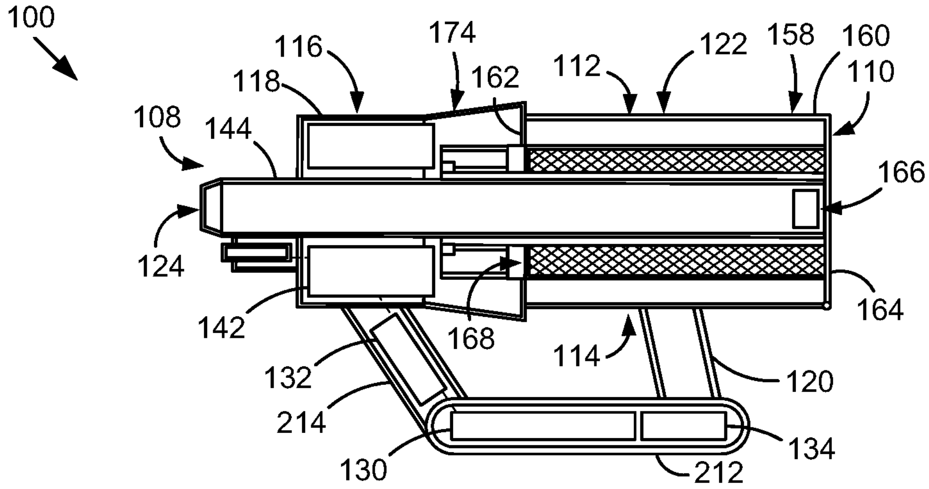
FIGS. 133-135 are schematic cross-sectional views of a hand vacuum cleaner similar to the hand vacuum cleaner of FIG. 9 with the motor provided below a lower end of the handle and the energy storage member forward of the air treatment member.
Figure 134:
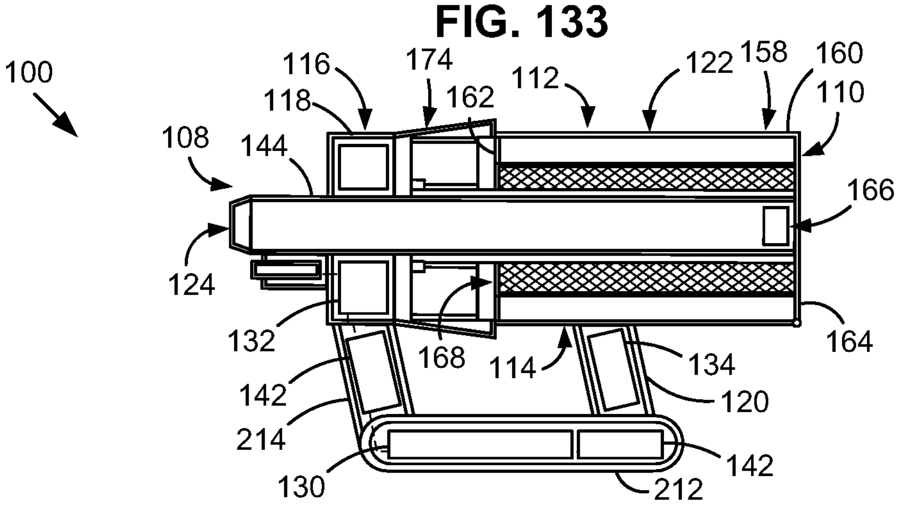
Figure 135:
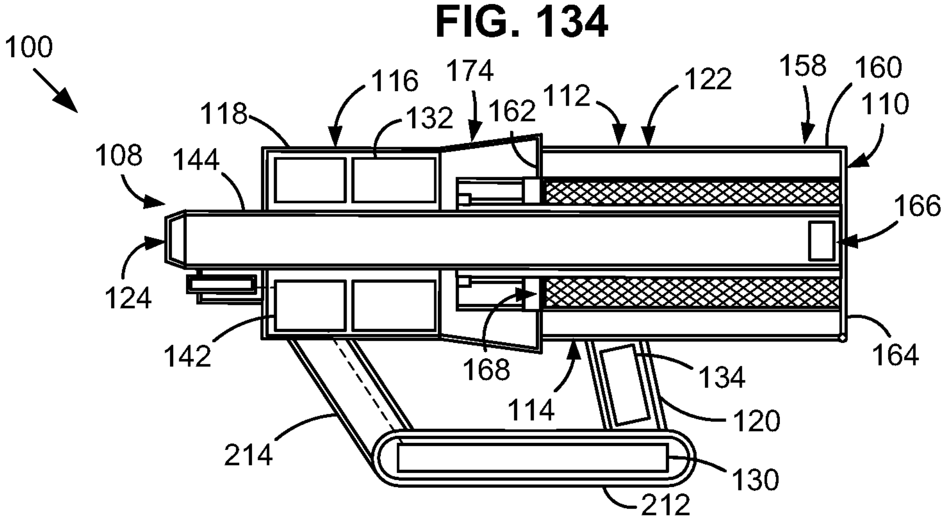
Figure 136:
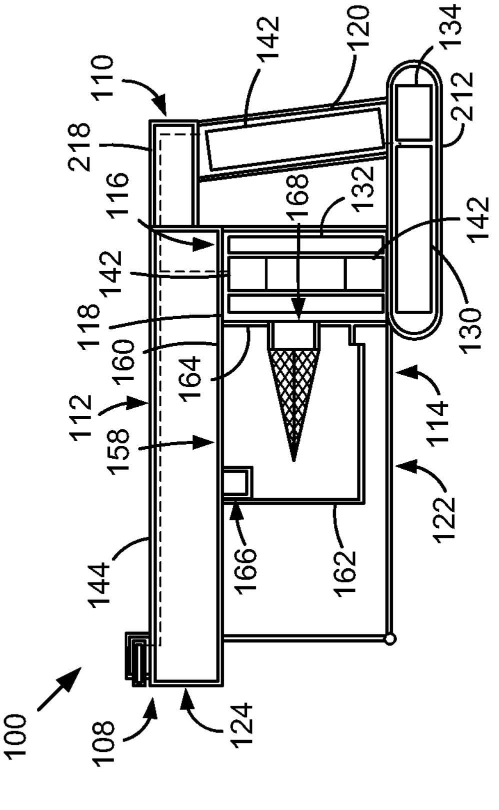
FIGS. 136-139 are schematic cross-sectional views of a hand vacuum cleaner similar to the hand vacuum cleaner of FIG. 5 with the motor provided below a lower end of the handle and the energy storage member forward of the air treatment member.
Figure 137:
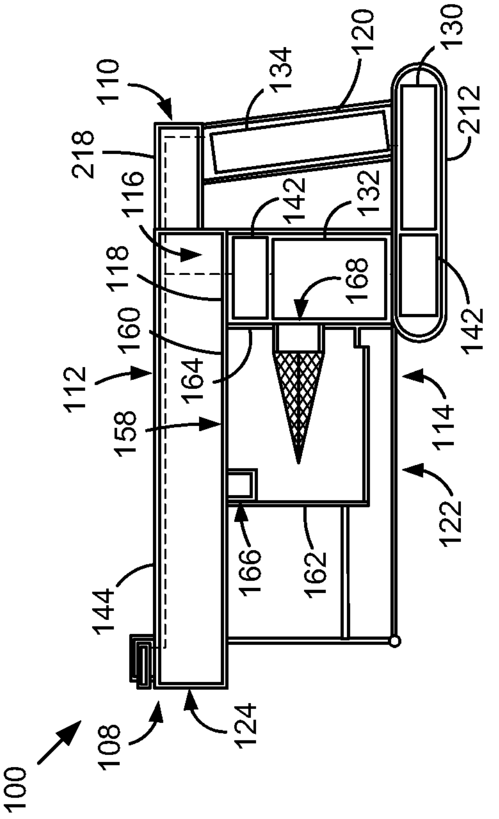
Figure 138:
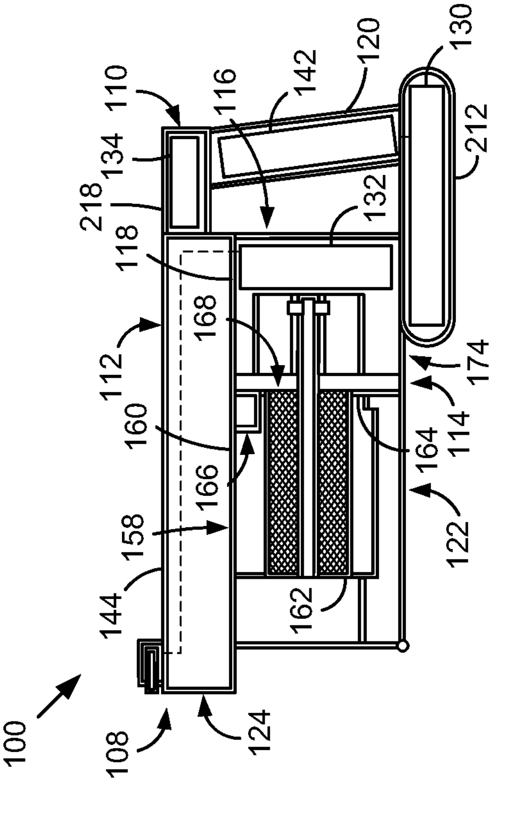

As exemplified in FIGS. 121 to 128, if the air treatment member 122 is provided at the front of the hand vacuum 100 forward of the main body 116, the airflow may travel generally rearwardly from air treatment member 122 through the main body 116 to the handle 120 (see e.g., FIGS. 121, 122, 125 to 128) or generally rearwardly upwardly to the upper member 218 (see e.g., FIGS. 123, 124). As exemplified, the airflow may then travel through the handle 120 to the suction motor 130 in the lower member 212 and exit the clean air outlet 126 in the sidewall of the lower member 212 (see e.g., FIGS. 121 to 125, 128) or, optionally, of the finger guard 214 (see e.g., FIGS. 126, 127) if the finger guard 214 is hollow and forms part of the airflow path.

Optionally, as exemplified, wherein the airflow path passes through the handle 120 to the suction motor 130 in the lower member 212, the pre-motor filter 132 may be at any position upstream from the suction motor 130, such as at least partially in the handle 120 (see e.g., FIGS. 125, 126, 128), the upper member 218 (see e.g., FIG. 124), or the main body housing 118 (see e.g., FIGS. 121 to 123, 125, 127). Optionally, as exemplified, the post-motor filter 134 may be at any position downstream from the suction motor 130 such as at least partially in the lower member 212 (see e.g., FIGS. 122, 124, 125) or the finger guard 214 (see e.g., FIGS. 126, 127). As exemplified, the energy storage member 142 may be at any position upstream or downstream from the suction motor 130, or optionally not in the airflow path, such as at least partially in the handle 120 (see e.g., FIGS. 121 to 124, 126, 127), the upper member 218 (see e.g., FIG. 123), the finger guard 214 (see e.g., FIG. 125), or the main body housing 118 (see e.g., FIG. 128).

As exemplified in FIGS. 129 to 135, if the air treatment member 122 is provided at the rear end 110 of the hand vacuum 100 rearward of the main body 116, the airflow may travel generally forwardly after exiting the air treatment member 122 to the main body 116 and through the main body 116 to the finger guard 214. As exemplified, the airflow may then travel through the finger guard 214 to the suction motor 130 in the lower member 212 and exit the clean air outlet 126 in the sidewall of the lower member 212 (see e.g., FIGS. 129 to 131, 133) or, optionally, of the handle 120 (see e.g., FIGS. 132, 134, 135) if the handle 120 is hollow and forms part of the airflow path.

Optionally, as exemplified, if the airflow path passes through the finger guard 214 to the suction motor 130 in the lower member 212, the pre-motor filter 132 may be at any position upstream from the suction motor 130, such as at least partially in the finger guard 214 (see e.g., FIGS. 129, 130, 133) or the main body housing 118 (see e.g., FIGS. 131, 132, 134, 135). Optionally, as exemplified, the post-motor filter 134 may be at any position downstream from the suction motor 130 such as at least partially in the lower member 212 (see e.g., FIGS. 129 to 133) or the handle 120 (see e.g., FIGS. 134, 135). As exemplified, the energy storage member 142 may be at any position upstream or downstream from the suction motor 130, or optionally not in the airflow path, such as at least partially in the main body housing 118 (see e.g., FIGS. 129 to 131, 133), the finger guard 214 (see e.g., FIGS. 132, 134), the lower member 212 (see e.g., FIG. 134), or the handle 120 (see e.g., FIG. 132). In embodiments wherein the air inlet conduit 144 extends through the main body 116 (see e.g., FIGS. 129, 131 to 135) and the pre-motor filter 132, energy storage member 142, or both are provided in the main body housing 118, the pre-motor filter 132 and/or energy storage member 142 may be at any position in the main body housing around the air inlet conduit 144 as described previously such as above, below, or beside the air inlet conduit 144, or annularly or semi-annularly about the air inlet conduit 144.

As exemplified in FIGS. 136 to 139, if the air treatment member 122 is provided at the front end 108 of the hand vacuum 100 forward of the main body 116, the airflow may travel generally rearwardly downwardly from air treatment member 122 through the main body 116 directly to the lower member 212 to the suction motor 130 therein. The airflow may then exit the clean air outlet 126 in the sidewall of the lower member 212 (see e.g., FIG. 136) or, optionally, of the handle 120 (see e.g., FIGS. 137, 139) if the handle 120 is hollow and forms part of the airflow path. Optionally, the clean air outlet 126 may be provided in the sidewall of the upper member 218 (see e.g., FIG. 138) if the handle 120 and upper member 218 are both hollow and form part of the airflow path.

Figure 139:
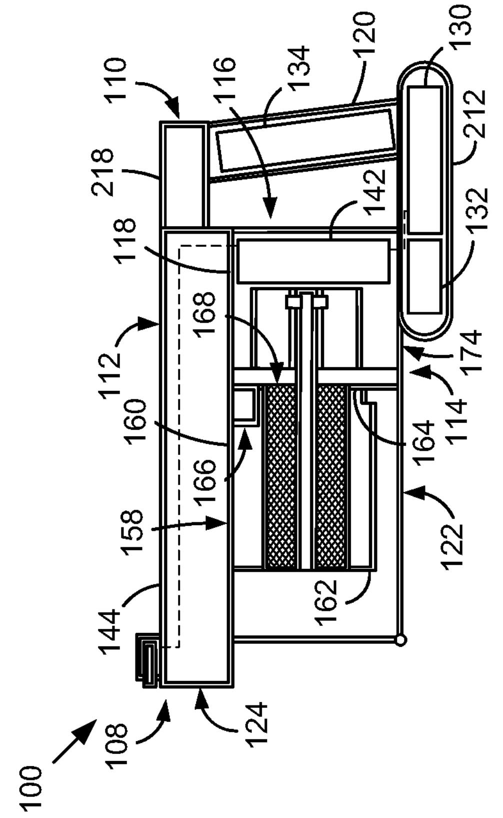
Figure 140:
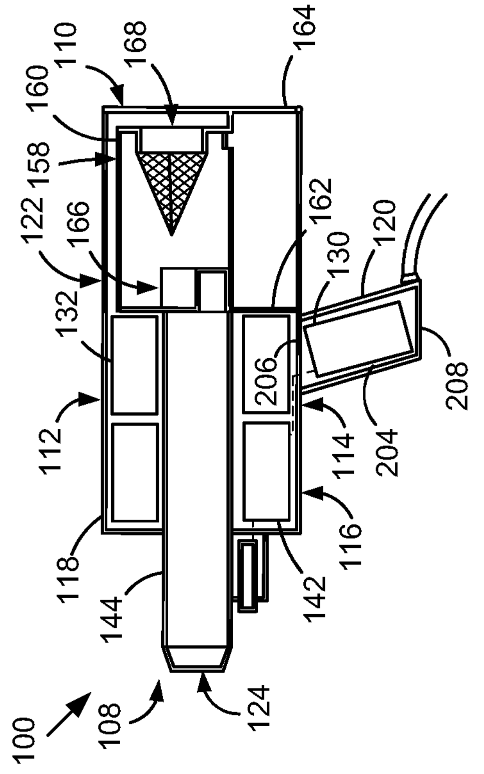
FIGS. 140-143 are schematic cross-sectional views of a hand vacuum cleaner similar to the hand vacuum cleaner of FIG. 1 with the motor in the handle and forward of the air treatment member.
Figure 141:
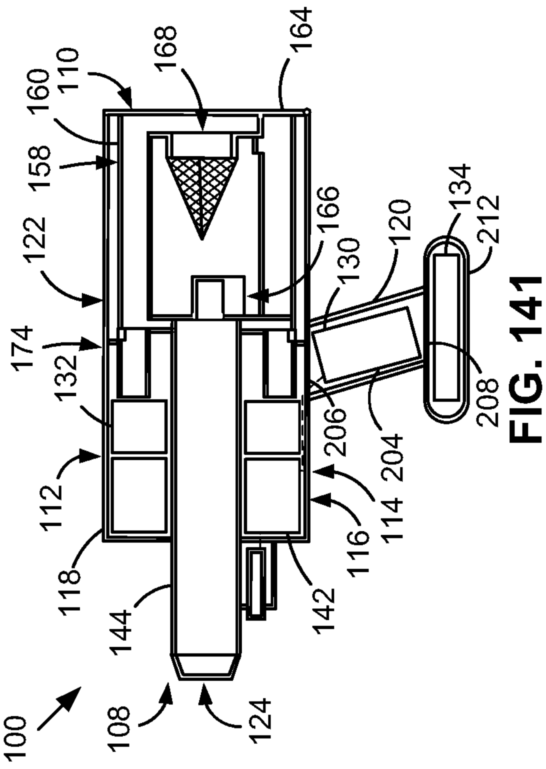
Figure 142:
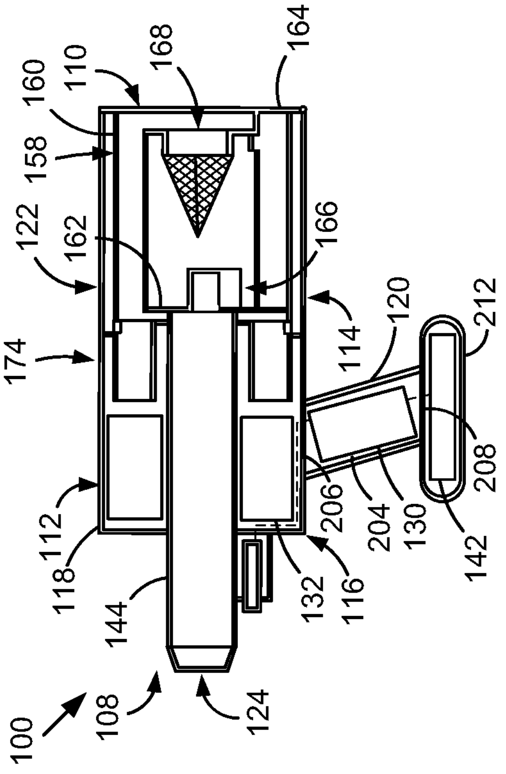
Figure 143:
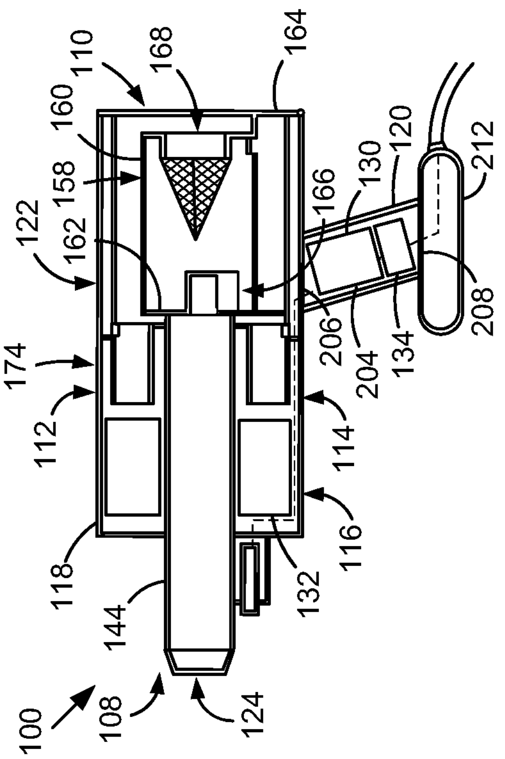
Figure 144:
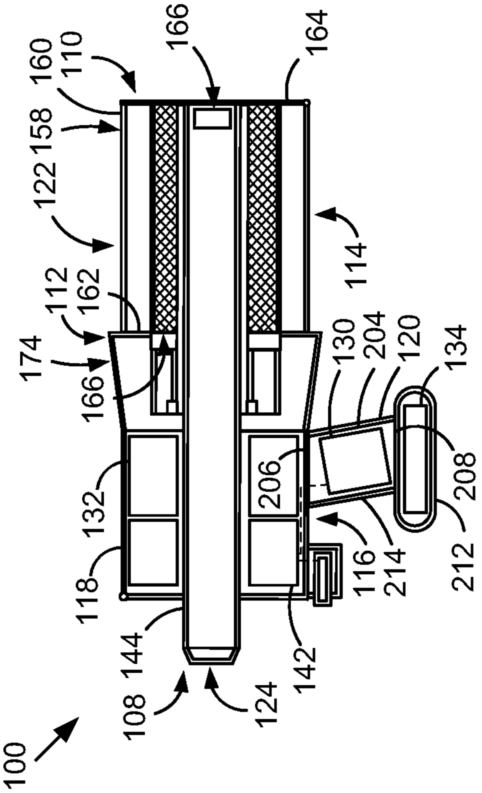
FIGS. 144-147 are schematic cross-sectional views of a hand vacuum cleaner similar to the hand vacuum cleaner of FIG. 9 with the motor in the handle and forward of the air treatment member.
Figure 145:
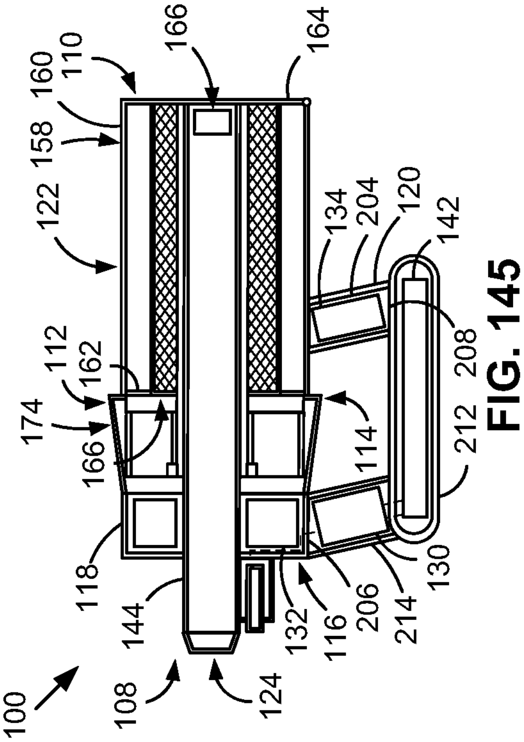
Figure 146:
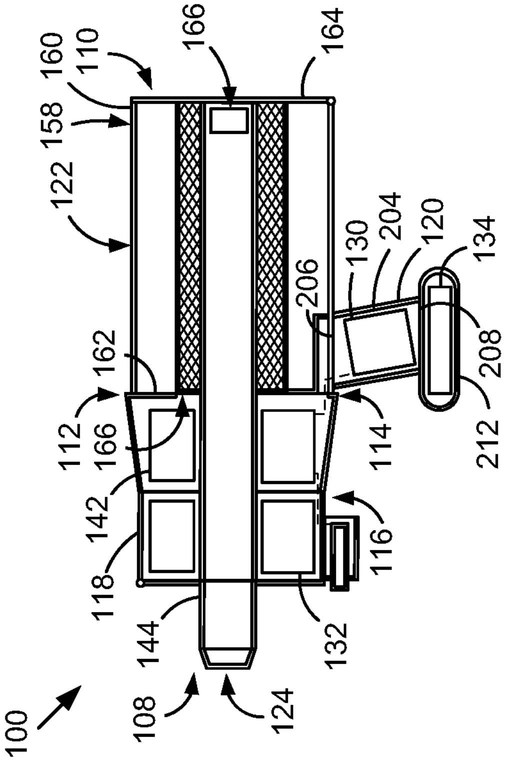
Figure 147:
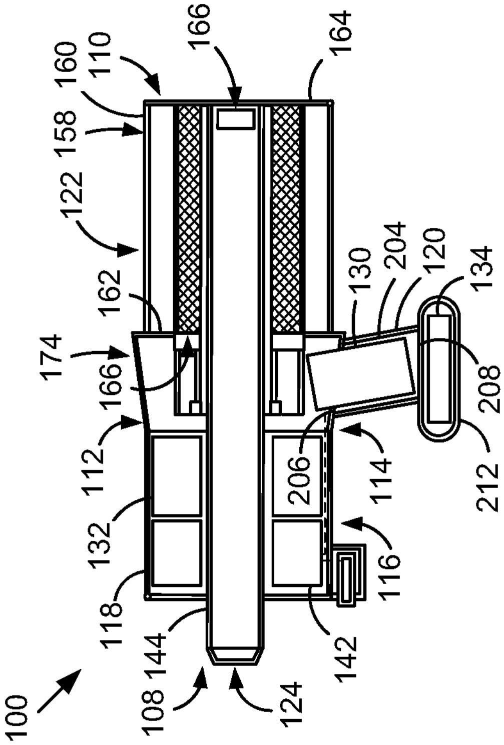
Figure 148:
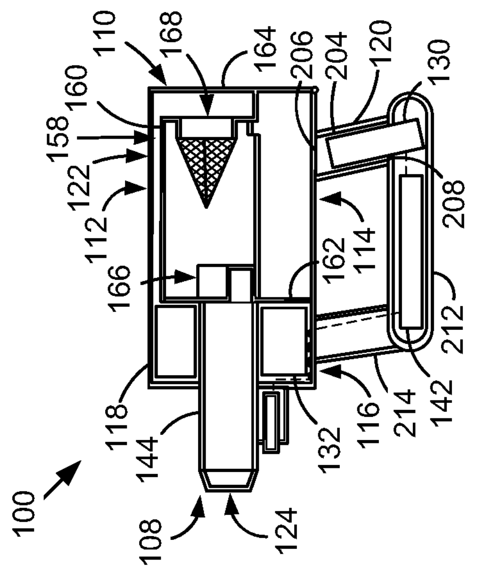
FIGS. 148-152 are schematic cross-sectional views of a hand vacuum cleaner similar to the hand vacuum cleaner of FIG. 1 with the motor in the handle and forward of the air treatment member.
Figure 149:
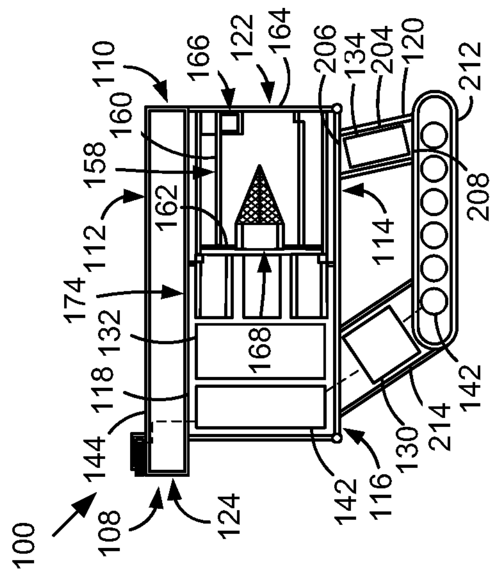
Figure 150:
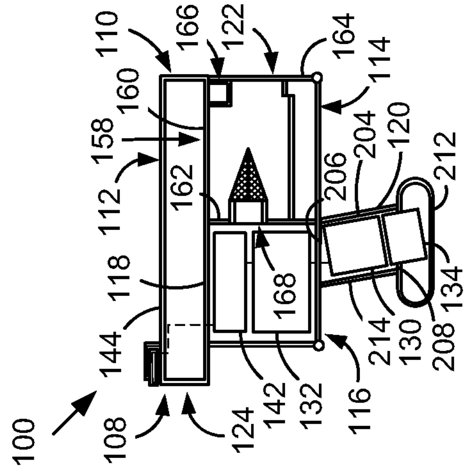
Figure 151:
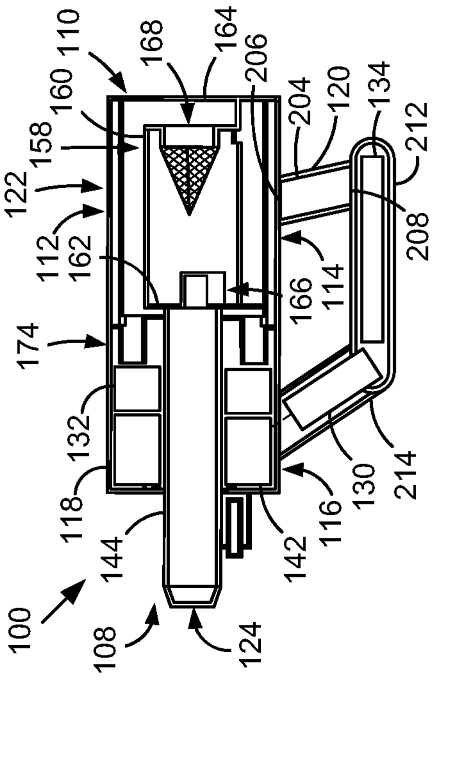
Figure 152:
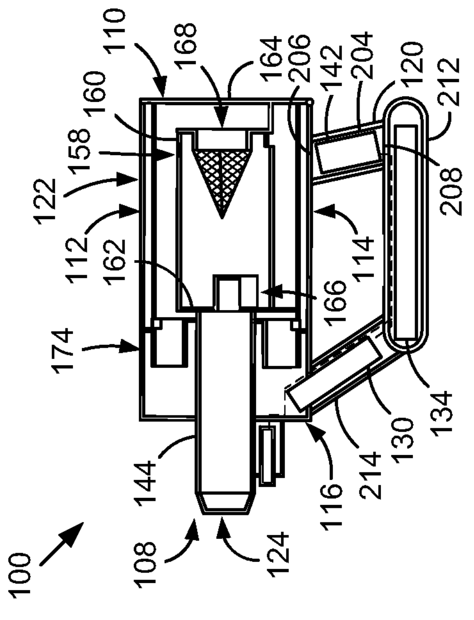
Figure 154:
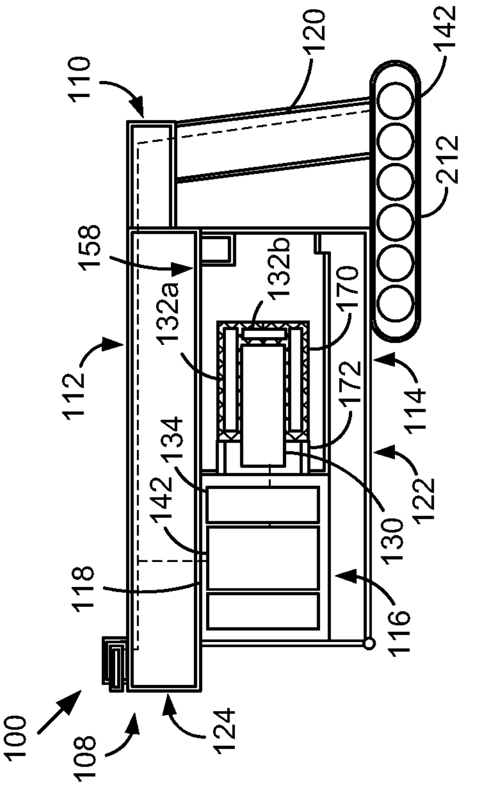
FIGS. 153-156 are schematic cross-sectional views of a hand vacuum cleaner similar to the hand vacuum cleaner of FIG. 5 with the motor nested in the air treatment member.

Optionally, as exemplified, if the airflow path passes directly from the main body 116 to the suction motor 130 in the lower member 212 (i.e., without the airflow first passing through the handle or finger guard), the pre-motor filter 132 may be at any position upstream from the suction motor 130, such as at least partially in the main body housing 118 (see e.g., FIGS. 136 to 138) or the lower member 212 (see e.g., FIG. 139). Optionally, as exemplified, the post-motor filter 134 may be at any position downstream from the suction motor 130 such as at least partially in the lower member 212 (see e.g., FIG. 136), the handle 120 (see e.g., FIGS. 137, 139), or the upper member 218 (see e.g., FIG. 138). Optionally, as exemplified, the energy storage member 142 may be at any position upstream or downstream from the suction motor 130, or not in the airflow path, such as at least partially in the handle 120 (see e.g., FIGS. 136, 138), the upper member 218, the lower member 212 (see e.g., FIG. 137), or the main body housing 118 (see e.g., FIGS. 136, 137, 139).

In any embodiment described herein, the pre-motor filter 132, post-motor filter 134, energy storage member 142, and optional additional energy storage member 142, may have any position within the hand vacuum 100 in accordance with any of the embodiments described herein.

The figures described in this section are exemplary of the suction motor below the handle. It will be appreciated that other figures not discussed within this section may also show the suction motor below the handle in accordance with this aspect.

Energy Storage Member Forward of the Air Treatment Member

A hand vacuum cleaner using any one or more aspects discussed herein, including one or more of the other aspects set out herein including one or more of the suction motor nested in the handle, the energy storage member forward of the suction nested in the air treatment member, the post-motor filter at least partially nested in the air treatment member, the rearwardly opening air treatment member, the suction motor forward of the air treatment member, the suction motor below the handle, the suction motor nested in the handle and forward of the air treatment member, the suction motor nested in the first cleaning stage, may have the energy storage member forward of the air treatment member.

In any of the body types of the example hand vacuums 100 described herein, in any of the example embodiments wherein the air treatment member 122 is provided rearward of the main body 116, the energy storage member 142 may be provided forward of the air treatment member 122. In such examples, the air treatment member 122 may include the first stage cyclone chamber 158, and the energy storage member 142 may be provided forward of the rear end wall 164 of the first stage cyclone chamber 158 or forward of the front end wall 162 of the first stage cyclone chamber 158. Optionally, the air treatment member 122 may include the second cyclonic stage 174 forward of the first stage cyclone chamber 158, and the energy storage member 142 may be provided forward of the front end wall 162 of the first stage cyclone chamber 158 (e.g., at least partially nested in the second stage cyclone chamber) or further forward of the forward end of the second cyclonic stage 174.

In such examples, as described previously herein, the air inlet conduit 144 may extend through the main body 116 to the air treatment member 122, and the energy storage member 142 may be provided at any position in the main body housing 118 around the air inlet conduit 144, such as above, below, beside, or in an annular or semi-annular ring around the air inlet conduit 144. Alternately, as described previously herein, the air inlet conduit 144 may extend along the upper end 112 of the hand vacuum 100 across the main body 116 to the air treatment member 122, and the energy storage member 142 may be provided at any position in the main body housing 118.

The energy storage member 142 may be provided in the main body housing 118 alone or, optionally, one or more of the pre-motor filter 132, post-motor filter 134, and suction motor 130 may be provided in the main body housing 118 with the energy storage member 142. The pre-motor filter 132, post-motor filter 134, suction motor 130, and/or additional energy storage member 142 may be provided at any other location in the hand vacuum 100 such as at least partially in the handle 120 or, if present, the finger guard 214, lower member 212, or upper member 218. The positioning of the pre-motor filter 132, post-motor filter 134, and/or additional energy storage member 142 may depend, for example, on the position of the suction motor 130, type of handle 120, and the direction of airflow through the air treatment member 122, main body 116, and optionally the handle 120. Such positioning is described elsewhere herein with respect to the suction motor 130 and omitted in this section for brevity.

As exemplified in FIGS. 113, 116, 129, 131, 133, and 135, the air treatment member 122 may be rearward of the main body 116, the air inlet conduit 144 may extend through the main body 116 to the air treatment member 122, and the energy storage member 142 may be positioned in the main body housing 118 adjacent to the air inlet conduit 144. In such embodiments, the energy storage member 142 may be provided at any position in the main body housing 118 around the air inlet conduit 144, as described previously herein. As exemplified, the energy storage member 142 may be provided in an annular ring about the air inlet conduit 144. If the energy storage member 142 is provided as an annular ring about the air inlet conduit 144 within the main body housing 118, at least 10% of the length of the air inlet conduit 144 between the dirty air inlet 124 and the air treatment member 122 (e.g., more than 10%, 25%, 50%, 75%, or more) may be surrounded by the energy storage member 142. For example, the length of the air inlet conduit 144 surrounded by the energy storage member 142 between the dirty air inlet 124 and the air treatment member 122 is exemplified as 15% in FIGS. 113 and 116, 25% in FIGS. 131 and 135, and 50% in FIGS. 129 and 133. Any surrounded length may be possible.

Figure 113:
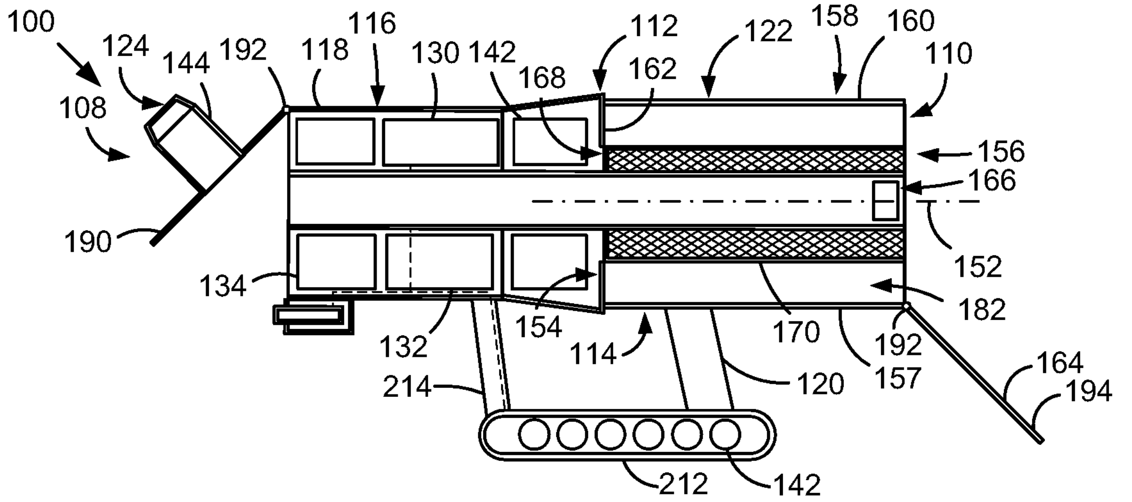
Figure 114:
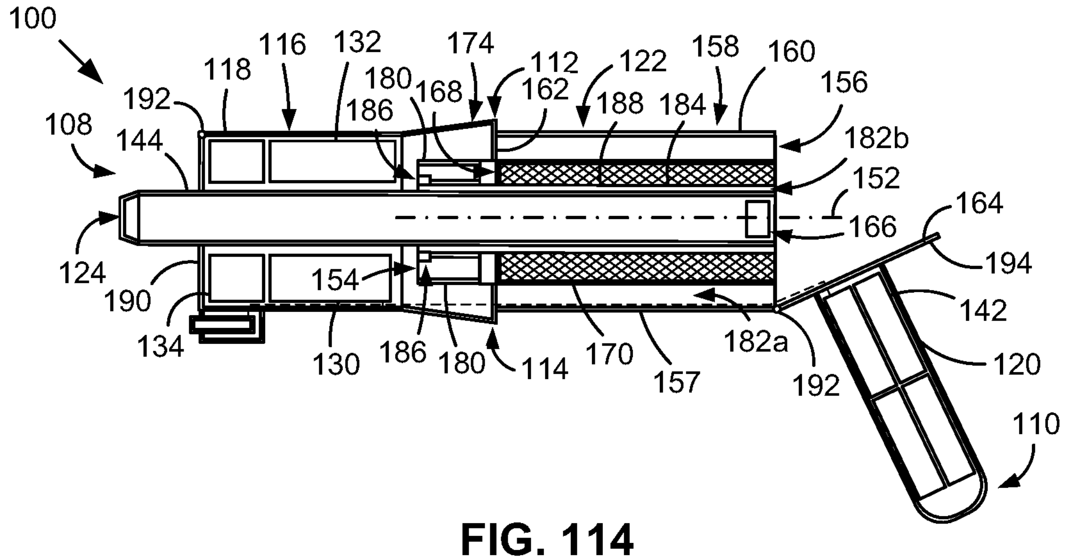
FIG. 114-116 are schematic cross-sectional views of a hand vacuum cleaner similar to the hand vacuum cleaner of FIG. 17 with the motor forward of the air treatment member.
Figure 115:
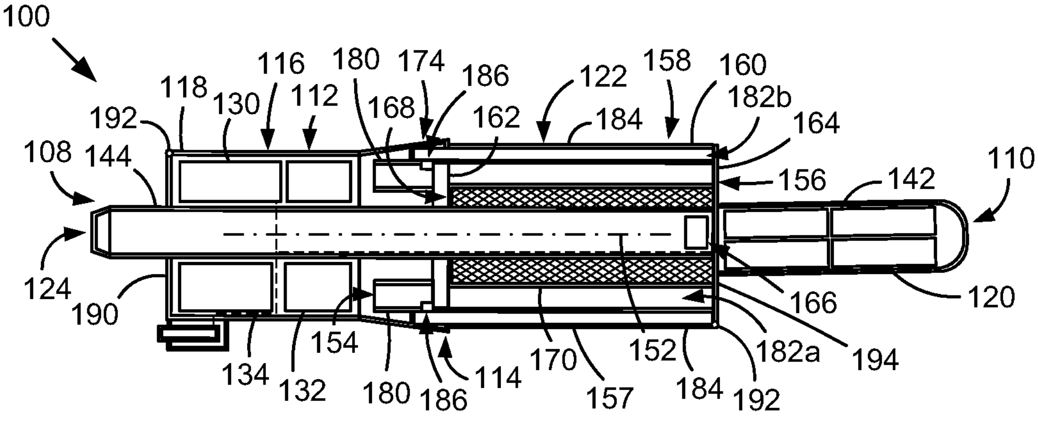
Figure 116:
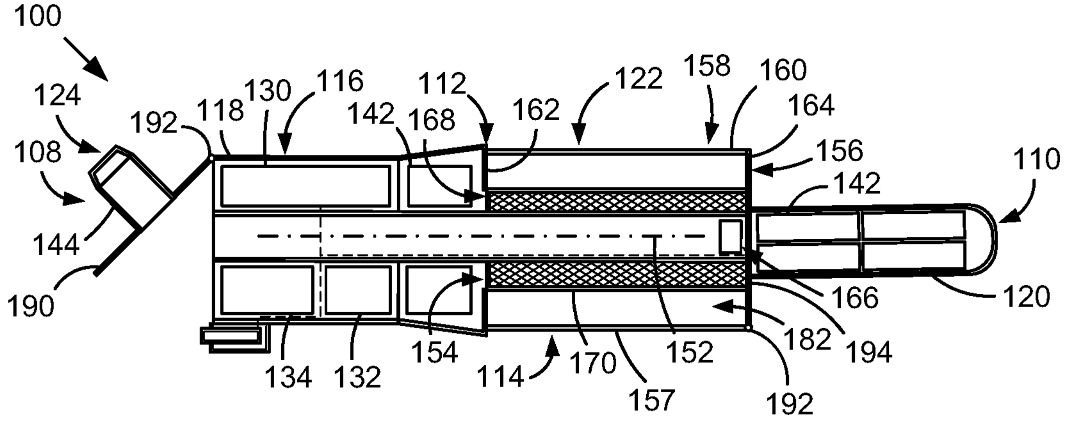
Figure 117:
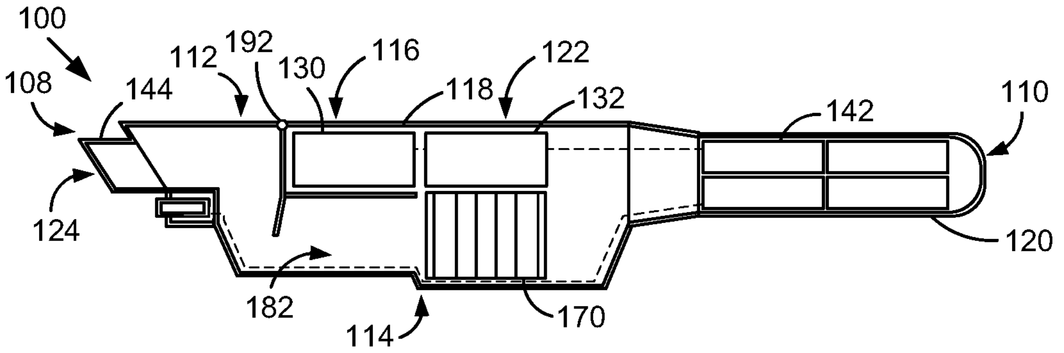
FIGS. 117-120 are schematic cross-sectional views a hand vacuum cleaner similar to the hand vacuum cleaner of FIG. 13 with the motor forward of the air treatment member.
Figure 118:
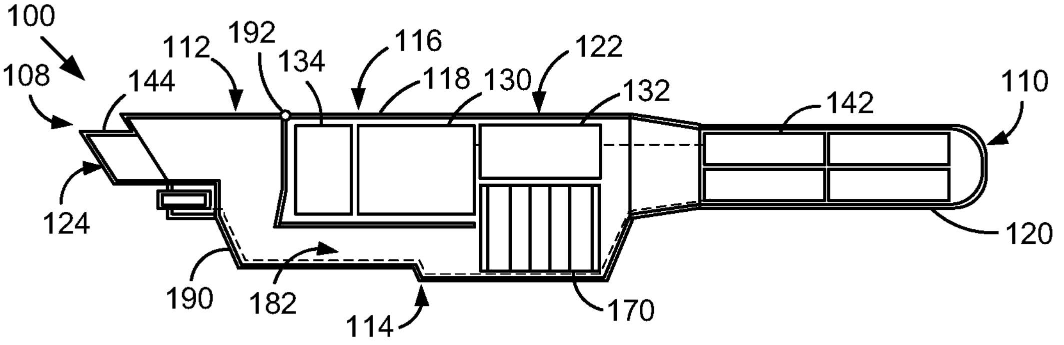
Figure 119:
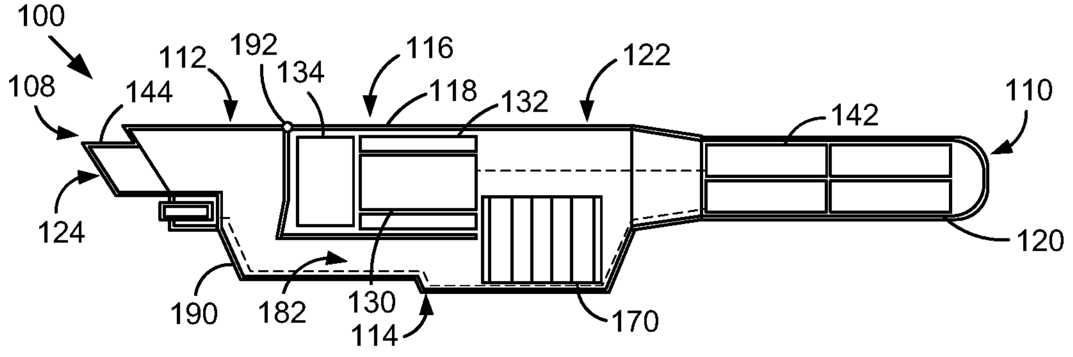
Figure 120:
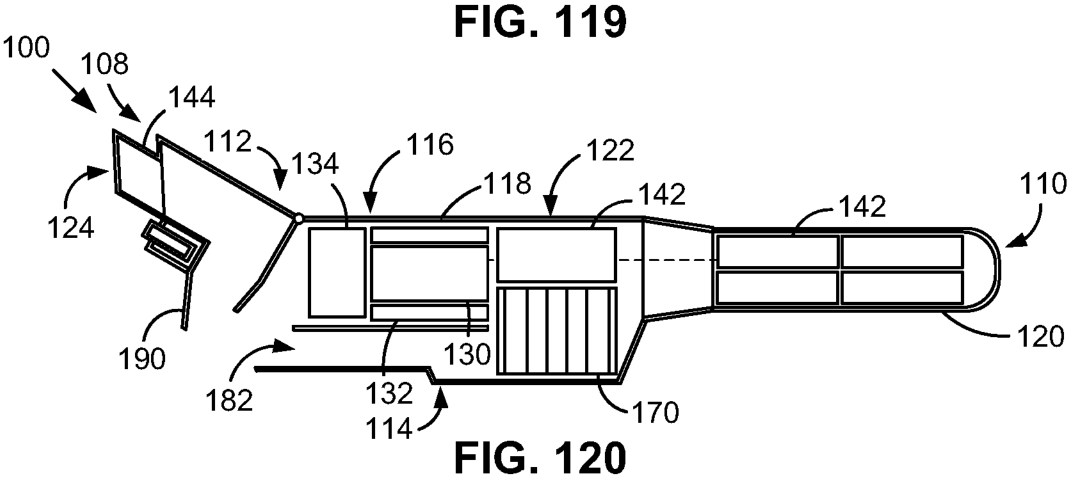
Figure 121:
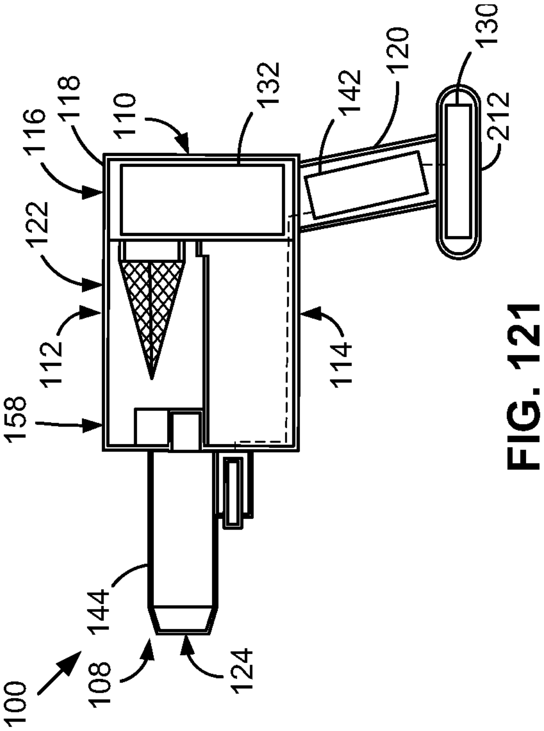
FIGS. 121-124 are schematic cross-sectional views of a hand vacuum cleaner similar to the hand vacuum cleaner of FIG. 1 with the motor provided below a lower end of the handle.
Figure 122:
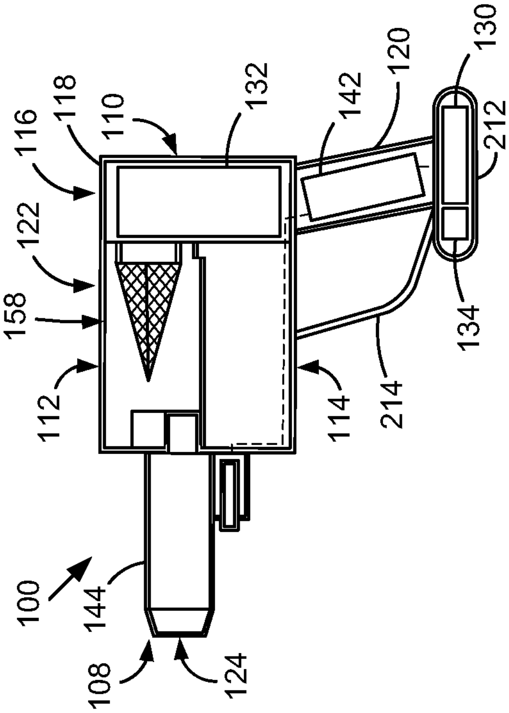

As exemplified, the air treatment member 122 may include the first stage cyclone chamber 158, and the energy storage member 142 may be provided forward of the front end wall 162 of the first stage cyclone chamber 158 (see e.g., FIGS. 113, 116, 119). Optionally, as exemplified, the air treatment member 122 may include the second cyclonic stage 174 forward of the first stage cyclone chamber 158, and the energy storage member 142 may be provided forward of the forward end of the second cyclonic stage 174 (see e.g., FIGS. 131, 133, 135).

As exemplified in FIGS. 105, 107, 109, 110, and 130, the air treatment member 122 may be rearward of the main body 116, the air inlet conduit 144 may extend along the upper end 112 of the hand vacuum 100 across the main body 116 to the air treatment member 122, and the energy storage member 142 may be positioned in the main body housing 118. In such embodiments, the energy storage member 142 may be provided at any position in the main body housing 118, such as positioned centrally within the main body housing 118 in the lateral direction and/or the direction transverse to both the lateral and longitudinal directions (i.e., vertical, when the hand vacuum 100 is oriented with the upper end 112 above the lower end 114). Optionally, as exemplified, the energy storage member 142 may be positioned centrally such that the central axis 152 of the air treatment member 122 extends centrally through the energy storage member 142.

Figure 109:
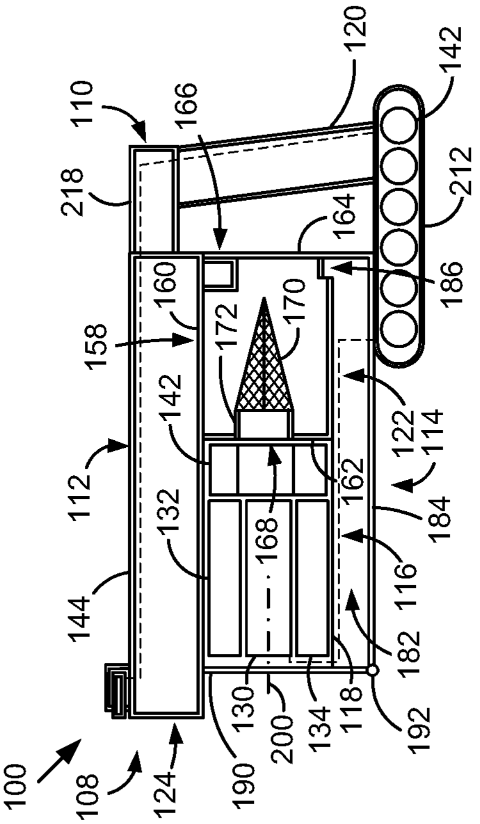
Figure 110:
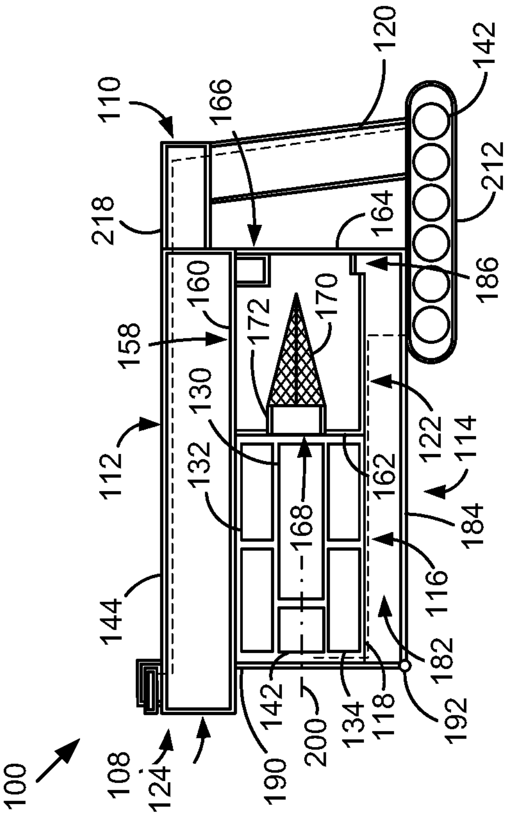
Figure 111:
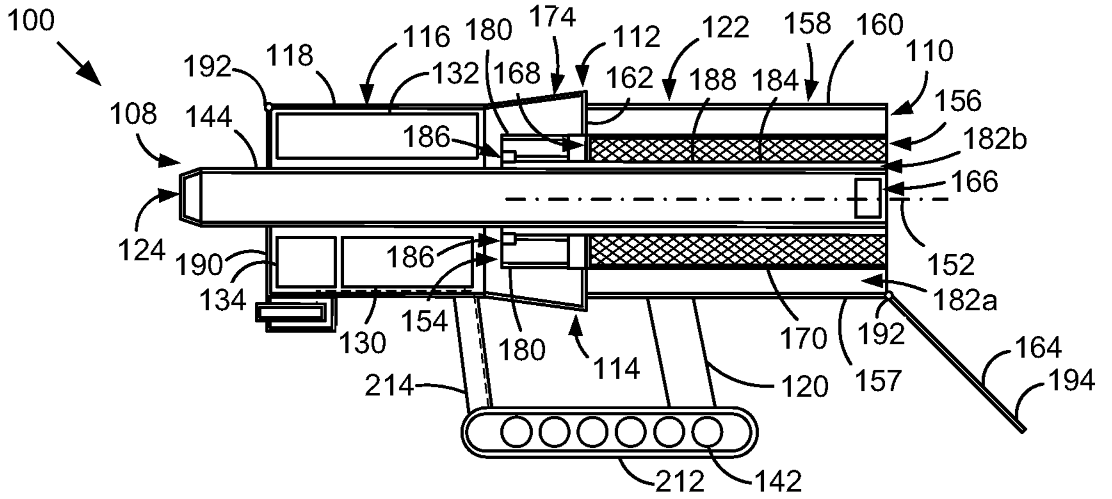
FIGS. 111-113 are schematic cross-sectional views of a hand vacuum cleaner similar to the hand vacuum cleaner of FIG. 9 with the motor forward of the air treatment member.
Figure 112:
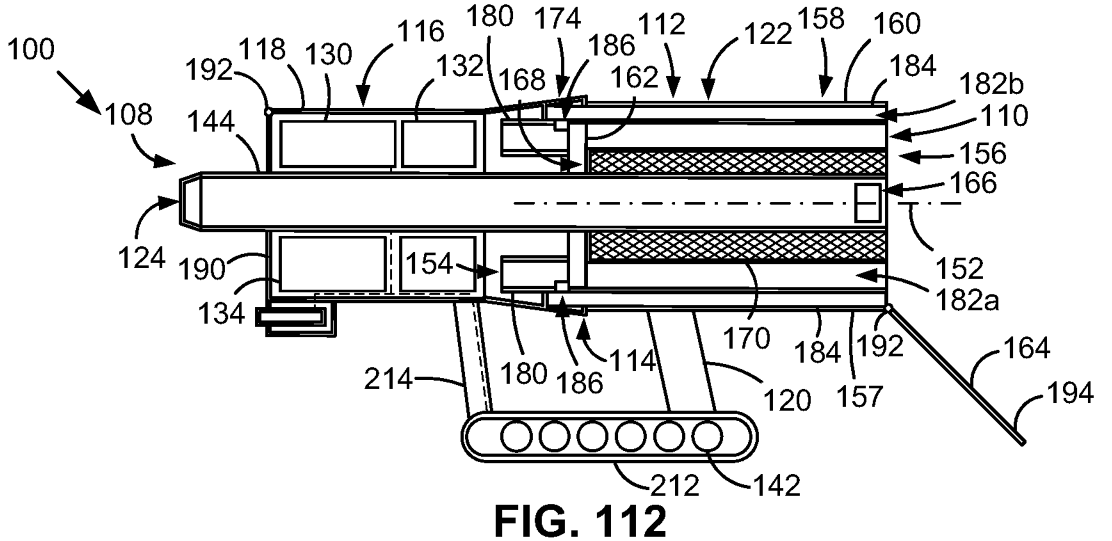

As exemplified, the air treatment member 122 may include the first stage cyclone chamber 158, and the energy storage member 142 may be provided forward of the rear end wall 164 of the first stage cyclone chamber 158 (see e.g., FIG. 105) or forward of the front end wall 162 of the first stage cyclone chamber 158 (see e.g., FIGS. 109, 110). As exemplified in FIG. 105, wherein the cyclone air outlet 168 is provided at the front end wall 162 of the first stage cyclone chamber 158, the energy storage member 142 may be nested in the porous member 170 in the first stage cyclone chamber 158 and extend forwardly through the cyclone air outlet 168. Optionally, the air treatment member 122 may include the second cyclonic stage 174 forward of the first stage cyclone chamber 158, and the energy storage member 142 may be provided forward of the front end wall 162 of the first stage cyclone chamber 158 (see e.g., FIG. 130) or forward of the forward end of the second cyclonic stage 174 (see e.g., FIG. 107). As exemplified in FIG. 130, wherein the second cyclonic stage 174 is provided as the plurality of cyclones 180 arranged in an annular ring, the energy storage member 142 may be at least partially nested in the second cyclonic stage 174.

In any embodiment described herein, the suction motor 130, pre-motor filter 132, post-motor filter 134, and optional additional energy storage member 142, may have any position within the hand vacuum 100 in accordance with any of the embodiments described herein. The figures described in this section are exemplary of the energy storage member forward of the air treatment member. It will be appreciated that other figures not discussed within this section may also show the energy storage member forward of the air treatment member in accordance with this aspect.

Suction Motor Nested in Handle or Finger Guard and Forward of the Air Treatment Member A hand vacuum cleaner using any one or more aspects discussed herein, including one or more of the other aspects set out herein including one or more of the suction motor nested in the handle, the energy storage member forward of the suction motor, the energy storage member nested in air treatment member, the suction motor nested in the air treatment member, the post-motor filter at least partially nested in the air treatment member, the rearwardly opening air treatment member, the suction motor forward of the air treatment member, the suction motor below the handle, the energy storage member forward of the air treatment member, the suction motor nested in the first cleaning stage, may have the suction motor nested in the handle or finger guard and forward of at least a rearward end of the air treatment member.

In any of the body types of the example hand vacuums 100 described herein, including any of the example embodiments wherein the air treatment member 122 is provided rearward of the main body 116, the suction motor 130 may be at least partially nested in the handle 120 or the finger guard. The handle 120 may be the pistol grip style handle 120 extending downwardly and rearwardly from the lower side of the main body 116 or air treatment member 122. It will be appreciated that the handle or fingerguard may extend downwardly only, downwardly and forwardly or downwardly and rearwardly and need not be a pistol grip style handle.

In any embodiment, the air treatment member 122 may include the first stage cyclone chamber 158. In such examples, the upper end 206 of the handle 120 housing the suction motor 130 may be provided forward of the rear end wall 164 of the first stage air treatment chamber 158, e.g., a cyclone chamber, (e.g., below the main body 116 or the first stage cyclone chamber 158) or forward of the front end wall 162 of the first stage cyclone chamber 158 (e.g., below the main body 116). Optionally, the air treatment member 122 may include a second stage comprising one or more air treatment chambers such as the second cyclonic stage 174 which may be positioned forward of the first stage cyclone chamber 158. In such examples, the upper end 206 of the handle 120 housing the suction motor 130 may be provided forward of the rear end wall 164 of the first stage cyclone chamber 158 (e.g., below the main body 116, the first stage cyclone chamber 158, or the second cyclonic stage 174), forward of the front end wall 162 of the first stage cyclone chamber 158 only (e.g., below the main body 116 or the second cyclonic stage 174), or further forward of the forward end of the second cyclonic stage 174 (e.g., below the main body 116). The positioning of the handle 120 may depend, for example, on the location of the center of gravity of the hand vacuum 100. It may be desirable to position the handle 120 close to the center of gravity to minimize torque experienced by the user when holding the hand grip portion 204 of the handle 120.

As exemplified in FIGS. 140, 146, 148, and 150, the air treatment member 122 may only include a first stage air treatment chamber such as the first stage cyclone chamber 158. In such examples, the handle 120 housing the suction motor 130 may be provided extending downwardly and rearwardly from the lower end 114 of the hand vacuum 100 below the main body 116 such that the upper end 206 of the handle 120 is positioned forward of the front end wall 162 of the first stage cyclone chamber 158 (see e.g., FIGS. 140, 150). Alternately, the handle 120 may be provided below the first stage cyclone chamber 158 such that the upper end 206 of the handle 120 is positioned forward of the rear end wall 164 of the first stage cyclone chamber 158 (see e.g., FIGS. 146, 148).

As exemplified in FIGS. 141 to 144, and 147, the air treatment member 122 may include the first stage cyclone chamber 158 and the second cyclonic stage 174 forward of the first stage cyclone chamber. In such examples, the handle 120 housing the suction motor 130 may be provided extending downwardly and rearwardly from the lower end 114 of the hand vacuum 100 below the main body 116 such that the upper end 206 of the handle 120 is positioned forward of the forward end of the second cyclonic stage 174 (see e.g., FIGS. 142, 144). Alternately, the handle 120 may be provided below the second cyclonic stage 174 such that the upper end 206 of the handle 120 is positioned forward of the front end wall 162 of the first stage cyclone chamber 158 (see e.g., FIGS. 141, 147). As another alternative, the handle 120 may be provided below the first stage cyclone chamber 158 such that the upper end 206 of the handle 120 is positioned forward of the rear end wall 164 of the first stage cyclone chamber 158 (see e.g., FIG. 143).

As exemplified in FIGS. 145, 149, 151, and 152, the suction motor 130 may instead be positioned in the finger guard 214 similar to as described with respect to the handle 120. This may enable the handle 120 to be positioned closer to the rear end 110 of the hand vacuum 100. As exemplified, the finger guard 214 housing the suction motor 130 may be provided extending downwardly and rearwardly from the lower end 114 of the hand vacuum 100 below the main body 116 such that the upper end of the finger guard 214 is positioned forward of the forward end of the second cyclonic stage 174. As exemplified, the handle 120, which may optionally house other components, may be provided below the first stage cyclone chamber 158 such that the upper end 206 of the handle 120 is positioned forward of the rear end wall 164 of the first stage cyclone chamber 158. Any other positioning may be possible, such as one of the finger guard 214 and the handle 120 positioned below the second cyclonic stage 174. As described previously, the finger guard 214 may also function as a second handle (e.g., for one handed use) or as a supplementary handle (e.g., for two-handed use). It will be appreciated that the finger guard may extend downwardly only, downwardly and forwardly or downwardly and rearwardly.

As described previously the suction motor 130 may positioned such that at least 10% of the motor length (e.g., more than 10%, 25%, 50%, 75%, or more) may be provided within the handle 120 (or, alternatively, finger guard 214). For example, the motor length of the suction motor 130 is exemplified as 50% nested in the handle 120 in FIG. 148, 75% nested in the handle FIGS. 147 and 151, and 90% nested in the handle FIG. 152. Any nested length may be possible. As exemplified, the unnested length may extend downwardly into the lower member 212 (see e.g., FIGS. 148, 151) and/or upwardly into the main body housing 118 (see e.g., FIG. 152), second cyclonic stage 174 (see e.g., FIG. 147), or first stage cyclone chamber 158.

As exemplified the airflow may travel forwardly into the main body housing 118 and generally downwardly to the suction motor 130 in the handle 120 or, alternatively, the finger guard 214. The airflow may then travel to the clean air outlet 126, which may be provided at any location downstream from the suction motor 130 such as in the sidewall of the handle 120 (see e.g., FIGS. 140, 143, 150) such as at the lower end 208 thereof, the sidewall of the lower member 212 (see e.g., FIGS. 141, 142, 144, 146, 147, 151), or the sidewall of the handle 120 rearward of the finger guard 214 (see e.g., FIGS. 145, 148, 149, 152) such as at the upper end 206 thereof. Optionally, as described previously, the post-motor filter 134 may be at any position downstream from the suction motor 130 such as at least partially in the handle 120 (see e.g., FIGS. 143, 145, 149, 150), the lower member 212 (see e.g., FIGS. 141, 144, 146, 147, 150, 151, 152) or the finger guard 214 (see e.g., FIG. 152).

Optionally, as described previously, a pre-motor filter 132 may be at any position upstream from the suction motor 130. For example, a pre-motor filter 132 may be at least partially in the handle 120, the finger guard 214, the lower member 212, or the main body housing 118 (see e.g., FIGS. 140 to 151). Optionally, as described previously, the energy storage member 142 may be at any position upstream or downstream from the suction motor 130, or not in the airflow path, such as at least partially in the main body housing 118 (see e.g., FIGS. 140, 141, 144, 146, 147, 150, 151), the finger guard 214 (see e.g., FIGS.), the lower member 212 (see e.g., FIGS. 142, 145, 148, 149), or the handle 120 (see e.g., FIG. 152). In embodiments wherein the air inlet conduit 144 extends through the main body 116 (see e.g., FIGS. 140 to 148, 151, 152) and the pre-motor filter 132, the energy storage member 142, or both, are provided in the main body housing 118, as described previously, the pre-motor filter 132 and/or energy storage member 142 may be at any position in the main body housing 118 around the air inlet conduit 144, such as above, below, or beside the air inlet conduit 144, or annularly or semi-annularly about the air inlet conduit 144.

In any embodiment described herein, pre-motor filter 132, post-motor filter 134, energy storage member 142, and optional additional energy storage member 142, may have any position within the hand vacuum 100 in accordance with any of the embodiments described herein.

The figures described in this section are exemplary of the suction motor nested in the handle and forward of at least a rearward end of the air treatment member. It will be appreciated that other figures not discussed within this section may also show the suction motor nested in the handle and forward of at least a rearward end of the air treatment member in accordance with this aspect.

Suction Motor Nested in the First Cleaning Stage

A hand vacuum cleaner using any one or more aspects discussed herein, including one or more of the other aspects set out herein including one or more of the suction motor nested in the handle, the energy storage member forward of the suction motor, the energy storage member nested in air treatment member, the suction motor nested in the air treatment member, the post-motor filter at least partially nested in the air treatment member, the rearwardly opening air treatment member, the suction motor forward of the air treatment member, the suction motor below the handle, the energy storage member forward of the air treatment member, the suction motor nested in the handle and forward of at least a rearward end of the air treatment member, may have the suction motor nested in the first cleaning stage.

Providing the suction motor 130 at least partially in the air treatment member 122 may provide a more compact hand vacuum 100. While the position of suction motor 130 with respect to other components is discussed separately with respect to each other component, and other possible positions of suction motor 130 are discussed separately, it will be appreciated that any embodiment of a hand vacuum 100 may utilize the positioning of the suction motor 130 with respect to one or more of the other components discussed herein.

In any of the body types of the example hand vacuums 100 described herein, the suction motor 130 may be provided partially nested or fully nested in the first cleaning stage of the air treatment member 122. The first cleaning stage may include the first stage cyclone chamber 158 or a non-cyclonic cleaning stage (e.g., a non-cyclonic air treatment chamber, pleated filter, filter bag, etc.). It will be appreciated that each cleaning stage may comprise one or more cyclones or one or more non-cyclonic air treatment chambers. In any embodiment, the air treatment member 122 may optionally include a second cleaning stage of any suitable cyclonic (e.g., single cyclone, plurality of cyclones) or non-cyclonic configuration (e.g., pre-motor filter and/or post-motor filter) described herein. The suction motor 130 may be provided fully nested in the first cleaning stage or, as described previously, partially nested in both the first and second cleaning stages.

Figure 153:
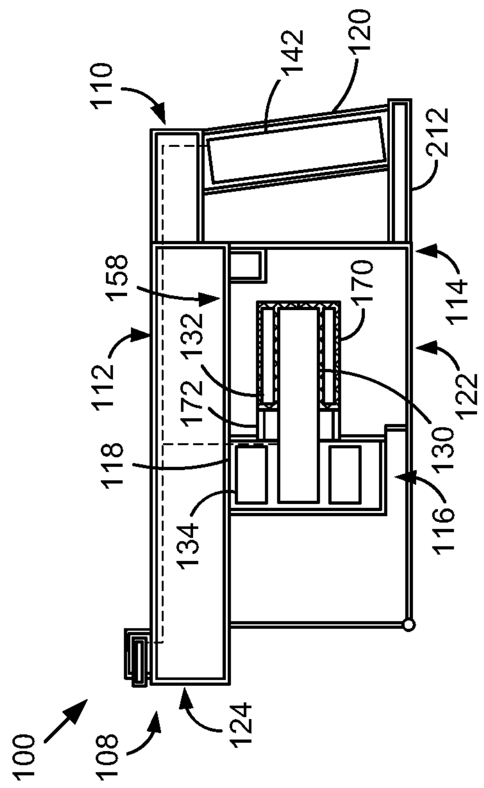
Figure 155:
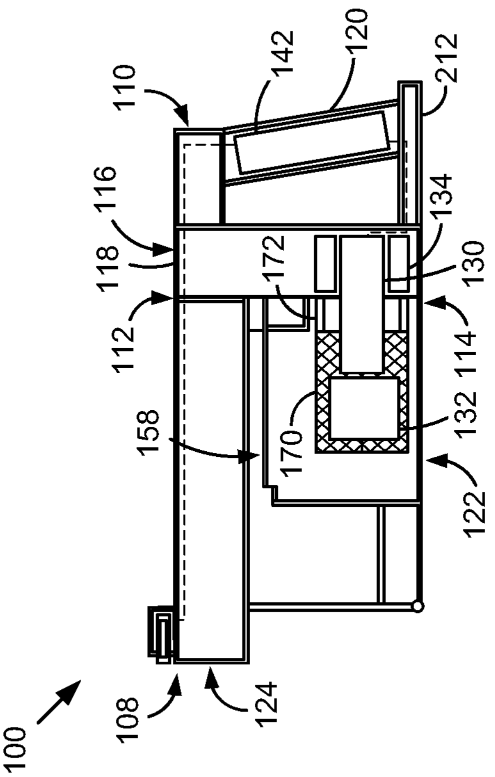
Figure 158:
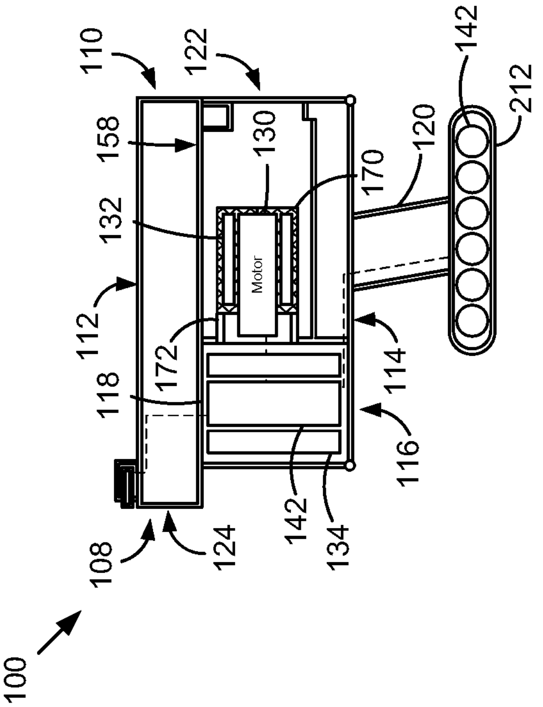
FIGS. 157-159 are schematic cross-sectional views of a hand vacuum cleaner similar to the hand vacuum cleaner of FIG. 1 with the motor nested in the air treatment member.
Figure 161:
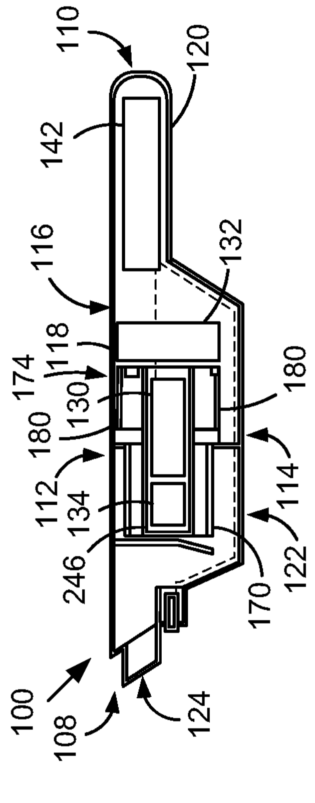
Figure 162:
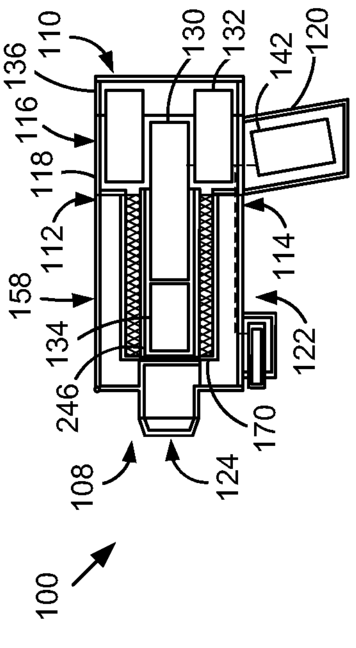
Figure 163:
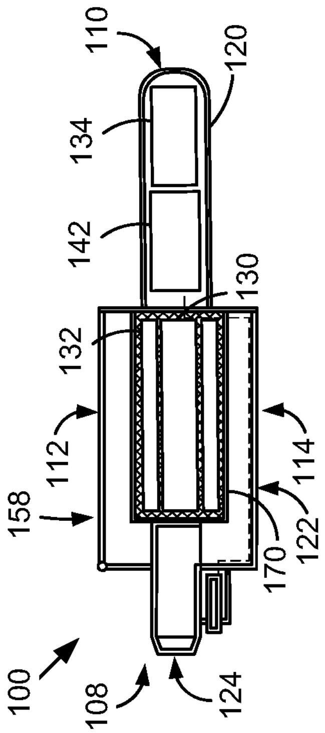
Figure 164:
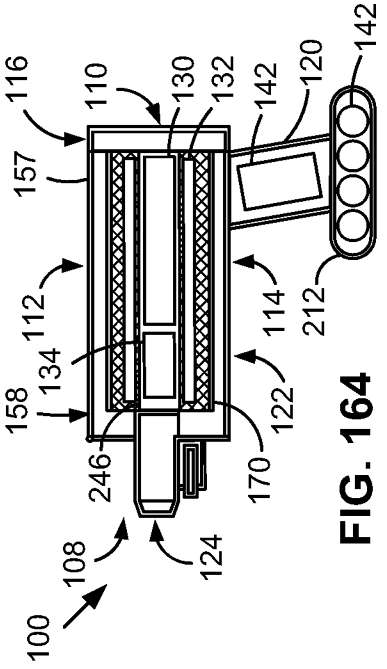
Figure 165:
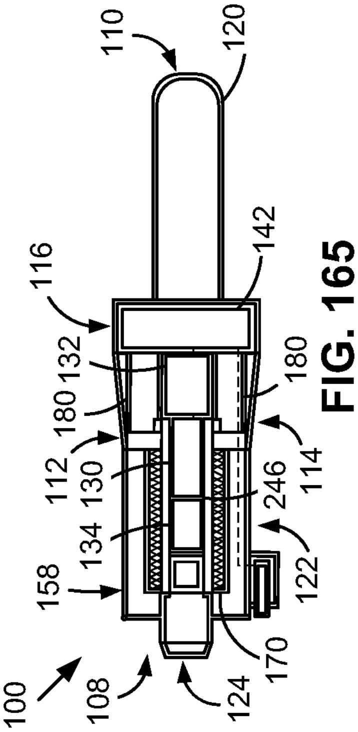

The suction motor 130 may be fully nested (see e.g., FIGS. 154, 156, 158, 159, 163, 164, 167) in the first stage cyclone chamber 158 or partially nested therein and extend rearwardly (see e.g., FIGS. 155, 160, 161, 162, 165, 166, 168) or forwardly (see e.g., FIGS. 153, 157) from the first stage cyclone chamber such that at least 10% of the suction motor 130 (e.g., more than 10%, 25%, 50%, 75%, or more) may be provided within the first stage cyclone chamber 158. In the illustrated examples, the suction motor 130 extends from the first stage cyclone chamber 158 such that 25% (see e.g., FIG. 161), 50% (see e.g., FIG. 155, 162, 168), 75% (see e.g., FIGS. 153, 157, 165, 166), 90% (see e.g., FIG. 60) of the suction motor 130 is nested in the first stage cyclone chamber 158. Any other nested amount may be possible.

As exemplified in FIGS. 153 to 168, the first cleaning stage may be cyclonic (see e.g., FIGS. 153 to 159, 162 to 168), shown as the first stage cyclone chamber 158, or a non-cyclonic air treatment chamber (see e.g., FIGS. 160, 161), and the suction motor 130 may be fully nested or partially nested in the first cleaning stage, whether cyclonic or non-cyclonic. The suction motor 130 may be provided within the porous member 170 which may be at or the air outlet of the first stage cyclone chamber 158 such that the airflow travels through the porous member 170 to the suction motor 130 before exiting the first stage cyclone chamber 158 (see e.g., FIGS. 153 to 156, 158, 160, 163, 167). In alternate embodiments, the suction motor 130 may be provided within the air outlet conduit 246, as described previously herein, interior to the first stage cyclone chamber 158 such that the airflow travels through the porous member 170 and exits the first stage cyclone chamber 158 before entering the air outlet conduit 246 and traveling back into the first stage cyclone chamber 158 to the suction motor 130 within the air outlet conduit 246 (see e.g., FIGS. 157, 159, 161, 162, 164, 165, 166, 168). It will be appreciated that the suction motor 130 may be provided in the pleated filter porous member 170 in the example embodiments of FIGS. 160 and 161 similarly to as described with respect to the porous member 170 in the first stage cyclone chamber 158, and the description herein may be understood to apply similarly to those embodiments.

As exemplified in FIGS. 154, 156, 158, 159, 160, 163, 164, and 167, the suction motor 130 may be positioned fully within the first stage cyclone chamber 158 interior of the porous member 170 positioned at the cyclone air outlet 168. Optionally, the porous member 170 may extend axially inwardly into the first stage cyclone chamber 158 from the cyclone air outlet conduit 172 (see e.g., FIGS. 154, 156, 158), and the suction motor 130 may also be positioned within the cyclone air outlet conduit 172. The suction motor 130 may further be positioned fully within the first stage cyclone chamber 158 interior to the air outlet conduit 246 within the porous member 170 (see e.g., FIGS. 159, 164). As described previously, the air outlet conduit 246 extends through the cyclone air outlet 168 permitting airflow therethrough from exterior to the first stage cyclone chamber 158 back into the interior of the first stage cyclone chamber 158, and an additional air outlet conduit (not shown) may extend radially outwardly from the air outlet conduit 246 through the porous member 170 to the clean air outlet 126 in the sidewall 157 of the air treatment member 122.

As exemplified in FIGS. 153, 155, 157, 161, 162, 165, 166, and 168, the suction motor 130 may be positioned partially within the first stage cyclone chamber 158 interior of the porous member 170 and extending through the cyclone air outlet 168. Optionally, the suction motor 130 may also be positioned partially within the cyclone air outlet conduit 172, if present (see e.g., FIGS. 153, 155, 157). The suction motor 130 may further be positioned partially within the first stage cyclone chamber 158 interior to the air outlet conduit 246 within the porous member 170 (see e.g., FIGS. 157, 161, 162, 165, 166, 168).

Figure 156:
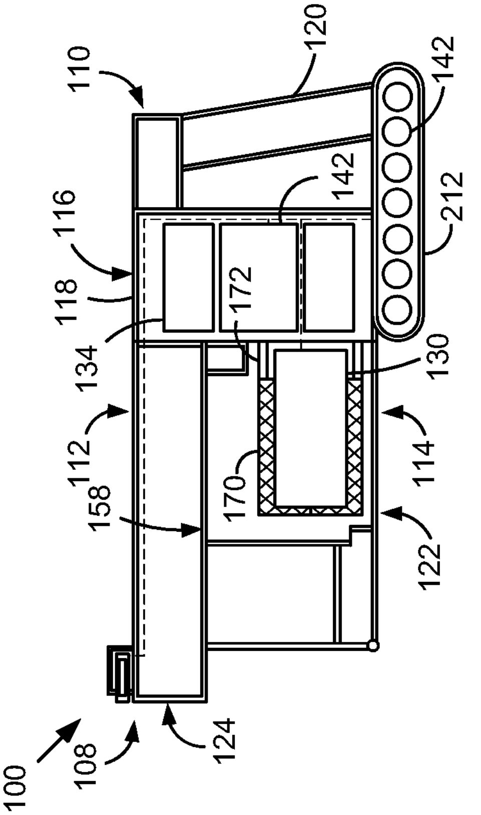
Figure 157:
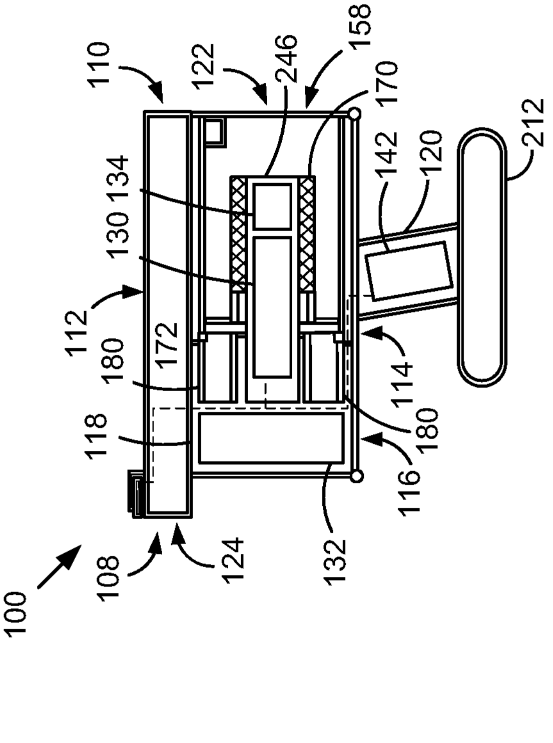
Figure 159:
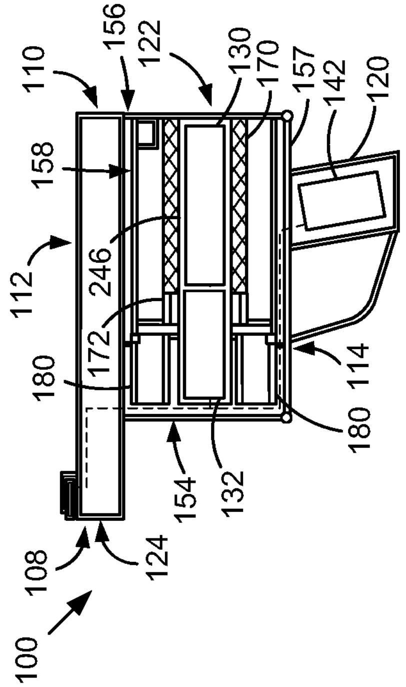
Figure 160:
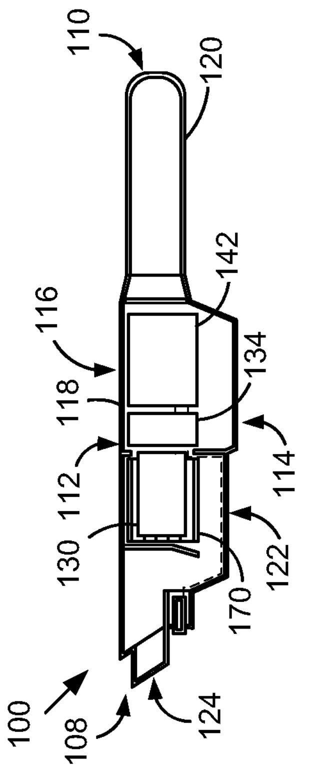
FIGS. 160-163 are schematic cross-sectional views of a hand vacuum cleaner similar to the hand vacuum cleaner of FIG. 13 with the motor nested in the air treatment member.
Figure 167:
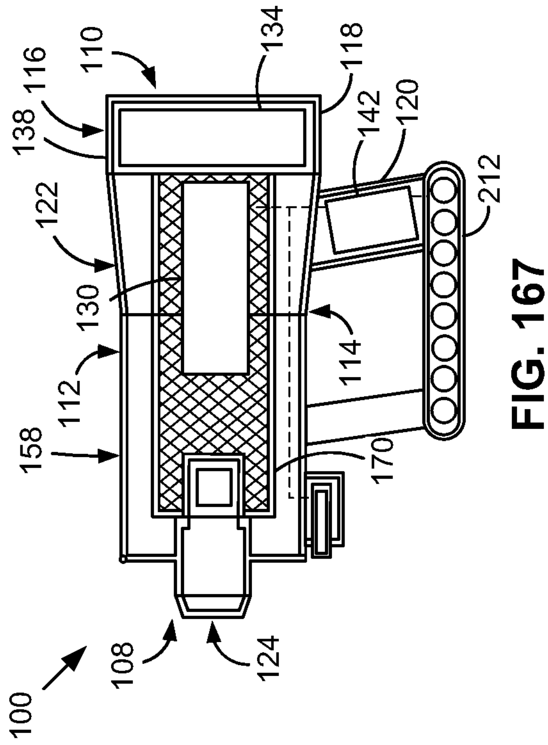
Figure 166:
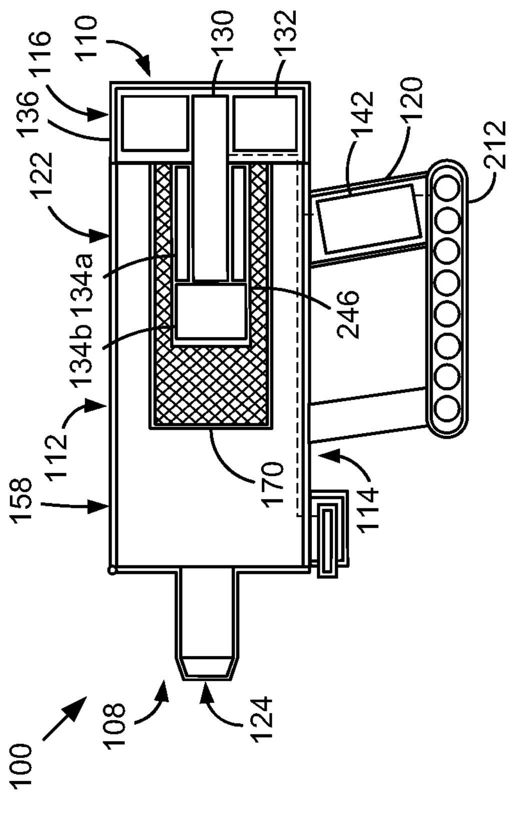
Figure 168:
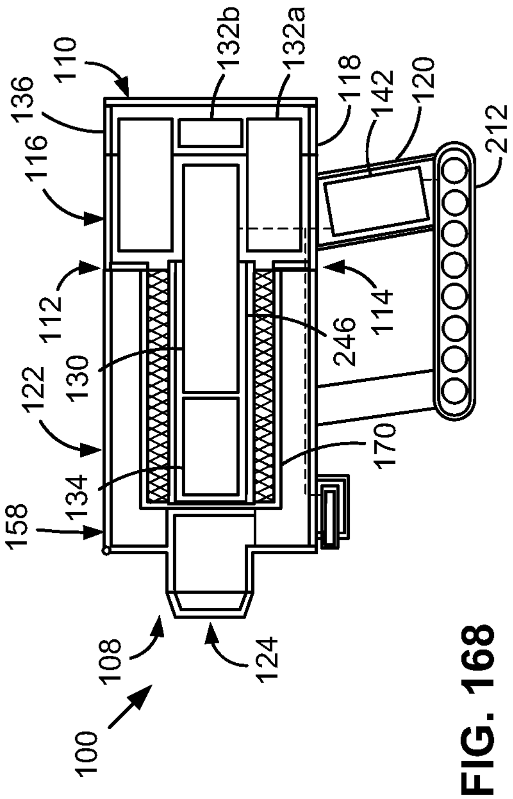

As exemplified in FIGS. 156, 160, and 167, the airflow may travel through the porous member 170 directly to the suction motor 130. Optionally, as exemplified in FIGS. 153 to 155, 158, and 163, the pre-motor filter 132 may also be nested within the porous member 170 (and optional cyclone air outlet conduit 172) in the first stage cyclone chamber 158, and the airflow may pass through the porous member 170 and the pre-motor filter 132 prior to reaching the suction motor 130. The pre-motor filter 132 may be provided annularly about the suction motor 130 within the porous member 170 (see e.g., FIGS. 153, 154, 158, 163) and/or at the upstream end of the suction motor 130 (see e.g., FIG. 154, 155). The airflow may then pass through the cyclone air outlet 168 and travel to the clean air outlet 126 through any additional intervening cleaning stages, such as the second cyclonic stage 174 and/or post-motor filter 134 (see e.g., FIGS. 153 to 156, 158, 160, 163, 165).

As exemplified in FIGS. 157, 159, 161, 162, 164, 165, 166, and 168, the airflow may travel through the porous member 170 directly to the cyclone air outlet 168 and exit the first stage cyclone chamber 158 between the annular space defined between the cyclone air outlet 168 and the air outlet conduit 246. Optionally, as exemplified in FIG. 164, the pre-motor filter 132 may be nested within the porous member 170, shown as annularly surrounding the air outlet conduit 246, in the first stage cyclone chamber 158, and the airflow may pass through the porous member 170 and the pre-motor filter 132 prior to exiting the first stage cyclone chamber 158. Optionally, as exemplified, the airflow may then travel forwardly (see e.g., FIGS. 157, 159) or rearwardly (see e.g., FIGS. 161, 162, 164 to 166, 168), depending on the location of the cyclone air outlet 168, from the cyclone air outlet 168 and through any additional intervening cleaning stages, such as the second cyclonic stage 174 (see e.g., FIGS. 157, 159, 161, 165), and/or pre-motor filter 132 (see e.g., FIGS. 157, 159, 161, 162, 165, 166, 168). For example, as shown in FIGS. 157, 159, 161, and 165, the second cyclonic stage 174 may include the plurality of cyclones 180 positioned in an annular ring about the suction motor 130 such that the suction motor 130 is partially nested therein as described previously. The pre-motor filter 132 may be provided as a generally flat slab upstream from the suction motor 130 (see e.g., FIGS. 157, 159, 161, 165), as a cylinder positioned annularly about the suction motor 130 partially nested therein (see e.g., FIGS. 162, 166), or as a first pre-motor filter 132*a* and a second pre-motor filter 132*b* (see e.g., FIG. 168), with the airflow passing in one or two direction through the pre-motor filter(s) 132 as described previously herein. The airflow may then travel inwardly into the air outlet conduit 246 to the suction motor 130 upstream therein at least partially in the first stage cyclone chamber 158 and to the clean air outlet 126. Optionally, one or more post-motor filters 134 may be provided in the air outlet conduit 246 such as proximate the downstream end of the suction motor 130 (see e.g., FIGS. 157, 161, 162, 164, 165, 166, 168) and/or annularly about the suction motor 130 (see e.g., FIG. 166).

As described previously with respect to FIGS. 70 to 77, and as exemplified therein, the pre-motor filter housing 136 (see e.g., FIGS. 162, 166, 168) or post-motor filter housing 138 (see FIG. 167) may be axially rearwardly removable from the main body 116 for removing the pre-motor filter 132, post-motor filter 134, and/or the suction motor 130, such as for cleaning, replacement, or any other purpose.

In any embodiment, the energy storage member 142, and optionally an additional energy storage member 142, may be provided at any position in the hand vacuum 100 as described herein. For example, the energy storage member 142 and/or additional energy storage member 142 may be provided in the lower member 212 (see e.g., FIGS. 154, 156, 158, 166 to 168), handle 120 (see e.g., FIGS. 153, 155, 157, 159, 161 to 164, 166 to 168), main body housing (see e.g., FIGS. 154, 156, 158, 160, 165), finger guard, or any other suitable location. The energy storage member 142 and/or the additional energy storage member 142 may be provided in the airflow path (see e.g., FIGS. 154, 156, 158, 160, 163, 165) such that the airflow may cool the energy storage member 142 as described elsewhere herein.

In any embodiment described herein, pre-motor filter 132, post-motor filter 134, energy storage member 142, and optional additional energy storage member 142, may have any position within the hand vacuum 100 in accordance with any of the embodiments described herein.

The figures described in this section are exemplary of the suction motor at least partially nested in the first cleaning stage. It will be appreciated that other figures not discussed within this section may also show the suction motor at least partially nested in the first cleaning stage in accordance with this aspect.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

This specification also includes the subject matter of the following clause sets:

Clause Set A

1. A hand vacuum cleaner comprising:

(a) an airflow path from a dirty air inlet to a clean air outlet;

(b) an air treatment member provided in the airflow path, the air treatment member having a front end, a rear end and a centrally positioned longitudinal axis extending between the front and rear ends;

(c) an energy storage member housing positioned rearward of the air treatment member wherein the longitudinal axis extends through the energy storage member housing; and, (d) a motor and fan assembly positioned rearward of the energy storage member housing, the motor and fan assembly having a motor axis of rotation, wherein the longitudinal axis extends through the motor and fan assembly.

2. The hand vacuum cleaner of clause 1 wherein the longitudinal axis and the motor axis of rotation extend in a common direction.

3. The hand vacuum cleaner of clause 2 wherein the longitudinal axis extends through the energy storage member housing.

4. The hand vacuum cleaner of clause 1 wherein the longitudinal axis extends through the energy storage member housing.

5. The hand vacuum cleaner of clause 1 further comprising a pre-motor filter housing positioned downstream of the air treatment member and the longitudinal axis extends through the pre-motor filter housing.

6. The hand vacuum cleaner of clause 5 wherein the pre-motor filter housing is positioned forward of the energy storage member housing.

7. The hand vacuum cleaner of clause 5 wherein, when a pre-motor filter is located in the pre-motor filter housing, the motor and fan assembly is at least partially positioned forward interior of the pre-motor filter.

8. The hand vacuum cleaner of clause 1 further comprising a post-motor filter housing positioned downstream of the motor and fan assembly and the longitudinal axis extends through the post-motor filter housing.

9. The hand vacuum cleaner of clause 8 wherein the post-motor filter housing is positioned rearward of the energy storage member housing.

10. The hand vacuum cleaner of clause 8 wherein the post-motor filter housing is positioned rearward of the motor and fan assembly.

11. The hand vacuum cleaner of clause 8 wherein, when a port-motor filter is located in the post-motor filter housing, the motor and fan assembly is at least partially positioned interior of the post-motor filter.

12. The hand vacuum cleaner of clause 1 further comprising a rearwardly removable post-motor filter.

13. The hand vacuum cleaner of clause 1 further comprising a radially removable post-motor filter.

14. The hand vacuum cleaner of clause 1 wherein air flows over the energy storage member housing at a location upstream of the clean air outlet.

15. The hand vacuum cleaner of clause 1 wherein air flows through the energy storage member housing at a location upstream of the clean air outlet.

16. The hand vacuum cleaner of clause 1 further comprising an information display on a rear panel of the hand vacuum cleaner.

17. The hand vacuum cleaner of clause 1 further comprising an information display on a sidewall at a rear end of the hand vacuum cleaner.

18. The hand vacuum cleaner of clause 1 wherein the air treatment member comprises a cyclone chamber.

19. The hand vacuum cleaner of clause 1 wherein the air treatment member comprises a first stage cyclone chamber and the hand vacuum cleaner further comprises at least one second stage cyclone chamber.

20. The hand vacuum cleaner of clause 1 further comprising a handle that extends generally axially and positioned rearward of the energy storage member housing.

Clause Set B

1. A hand vacuum cleaner comprising:

(a) an airflow path from a dirty air inlet to a clean air outlet;

(b) an air treatment member provided in the airflow path, the air treatment member having a front end, a rear end and a centrally positioned longitudinal axis extending between the front and rear ends;

(c) an energy storage member housing positioned at least partially internal of the air treatment member; and, (d) a motor and fan assembly, the motor and fan assembly having a motor axis of rotation.

2. The hand vacuum cleaner of clause 1 wherein the air treatment member comprises an air treatment member air inlet and an air treatment member air outlet, the air treatment member air outlet comprises a passage located interior the air treatment member and the energy storage member housing is positioned at least partially internal of the passage.

3. The hand vacuum cleaner of clause 2 wherein the air treatment member air outlet comprises a porous member located internal of the air treatment member and the energy storage member housing is positioned at least partially internal of the porous member.

4. The hand vacuum cleaner of clause 1 wherein the air treatment member comprises a cyclone chamber.

5. The hand vacuum cleaner of clause 1 wherein the air treatment member comprises a first stage cyclone chamber, the hand vacuum cleaner further comprises a second stage cyclone chamber having a dirt outlet and a dirt collection chamber that is in communication with the second stage cyclone chamber through the dirt outlet wherein a plane that is transverse to the longitudinal axis extends through the dirt collection chamber and the energy storage member housing.

6. The hand vacuum cleaner of clause 1 wherein the air treatment member comprises a first stage cyclone chamber, the hand vacuum cleaner further comprises a second stage cyclone chamber having a dirt outlet and a dirt collection chamber that is in communication with the second stage cyclone chamber through the dirt outlet wherein a plane that is transverse to the longitudinal axis extends through the second stage cyclone chamber and the energy storage member housing.

7. The hand vacuum cleaner of clause 1 further comprising a pre-motor filter positioned rearward of the energy storage member housing.

8. The hand vacuum cleaner of clause 1 wherein the motor and fan assembly is positioned rearward of the energy storage member housing.

9. The hand vacuum cleaner of clause 1 wherein the motor axis of rotation extends through the energy storage member housing.

10. The hand vacuum cleaner of clause 9 wherein the motor and fan assembly is positioned rearward of the energy storage member housing.

11. The hand vacuum cleaner of clause 8 further comprising a handle that extends generally axially and positioned rearward of the energy storage member housing.

12. The hand vacuum cleaner of clause 1 further comprising a pistol grip handle, the motor and fan assembly having a volume and at least 50% of the volume is positioned in the pistol grip handle.

13. The hand vacuum cleaner of clause 12 wherein the motor and fan assembly has a first end, an axially opposed send end and a length between the first and second ends and at least 50% of the length is positioned in the pistol grip handle.

14. The hand vacuum cleaner of clause 13 wherein at least 75% of the length is positioned in the pistol grip handle.

15. The hand vacuum cleaner of clause 12 further comprising a generally axially extending stand provided at a lower end of the pistol grip handle.

16. The hand vacuum cleaner of clause 1 wherein air flows over the energy storage member housing.

17. The hand vacuum cleaner of clause 1 wherein air flows through the energy storage member housing outlet.

18. The hand vacuum cleaner of clause 1 further comprising a post-motor filter housing positioned downstream of the motor and fan assembly and the longitudinal axis extends through the post-motor filter housing.

19. The hand vacuum cleaner of clause 1 further comprising a rearwardly removable post-motor filter.

Clause Set C

1. A hand vacuum cleaner comprising:

(a) an airflow path from a dirty air inlet to a clean air outlet;

(b) a first air treatment stage comprising a first stage air treatment member provided in the airflow path, the first stage air treatment member having a front end, a rear end and a centrally positioned longitudinal axis extending between the front and rear ends;

(c) a second air treatment stage comprising a second stage air treatment member provided in the airflow path;

(d) an energy storage member housing positioned at least partially internal of the second air treatment stage; and, (e) a motor and fan assembly, the motor and fan assembly having a motor axis of rotation.

2. The hand vacuum cleaner of clause 1 wherein the second air treatment stage comprises a plurality of air treatment members in parallel.

3. The hand vacuum cleaner of clause 2 wherein the plurality of air treatment members are arranged around a central volume and the energy storage member housing is positioned at least partially internal of the central volume.

4. The hand vacuum cleaner of clause 1 wherein the second air treatment stage comprises an annular array of a plurality of cyclone chambers in parallel and the energy storage member housing is positioned at least partially internal of the annular array.

5. The hand vacuum cleaner of clause 1 further comprising a pre-motor filter housing positioned rearward of the second air treatment stage.

6. The hand vacuum cleaner of clause 1 further comprising a pre-motor filter housing positioned downstream of the second air treatment stage and the energy storage member housing is positioned at least partially internal of the pre-motor filter housing.

7. The hand vacuum cleaner of clause 6 wherein the pre-motor filter housing is positioned rearward of the second air treatment stage.

8. The hand vacuum cleaner of clause 1 further comprising a rearwardly removable pre-motor filter.

9. The hand vacuum cleaner of clause 1 further comprising a radially removable pre-motor filter.

10. The hand vacuum cleaner of clause 1 further comprising a pistol grip handle, the motor and fan assembly having a volume and at least 50% of the volume is positioned in the pistol grip handle.

11. The hand vacuum cleaner of clause 10 further comprising a generally axially extending stand provided at a lower end of the pistol grip handle.

12. The hand vacuum cleaner of clause 1 further comprising a pistol grip handle and the motor and fan assembly is positioned at a lower end of the pistol grip handle.

13. The hand vacuum cleaner of clause 12 further comprising a generally axially extending stand provided at a lower end of the pistol grip handle and the motor and fan assembly is provided in the stand.

14. The hand vacuum cleaner of clause 1 further comprising a pistol grip handle and, when the hand vacuum cleaner is oriented with the dirty air inlet above the pistol grip handle, the motor and fan assembly is positioned below the energy storage member and the motor axis of rotation extends through the energy storage member housing.

15. A hand vacuum cleaner comprising:

(a) an airflow path from a dirty air inlet to a clean air outlet;

(b) an air treatment stage comprising a plurality of air treatment members in parallel provided in the airflow path;

(c) an energy storage member housing positioned at least partially internal of the air treatment stage; and, (d) a motor and fan assembly, the motor and fan assembly having a motor axis of rotation.

16. The hand vacuum cleaner of clause 15 wherein the second air treatment stage comprises an annular array of a plurality of cyclone chambers in parallel and the energy storage member housing is positioned at least partially internal of the annular array.

17. The hand vacuum cleaner of clause 15 further comprising a filter housing positioned rearward of the second air treatment stage.

18. The hand vacuum cleaner of clause 15 further comprising a filter housing positioned downstream of the second air treatment stage and the energy storage member housing is positioned at least partially internal of the filter housing.

19. The hand vacuum cleaner of clause 18 wherein the filter housing is positioned rearward of the second air treatment stage.

20. The hand vacuum cleaner of clause 15 further comprising a pistol grip handle and, when the hand vacuum cleaner is oriented with the dirty air inlet above the pistol grip handle, the motor and fan assembly is positioned below the energy storage member.

Clause Set D

1. A hand vacuum cleaner comprising:

(a) an airflow path from a dirty air inlet, which is provided at a front end of the hand vacuum cleaner, to a clean air outlet;

(b) a first air treatment stage comprising a first stage air treatment member provided in the airflow path, the first stage air treatment member having a front end, a rear end and a centrally positioned longitudinal axis extending between the front and rear ends;

(c) a second air treatment stage comprising a second stage air treatment member provided in the airflow path; and, (d) a motor and fan assembly positioned at least partially internal of the second air treatment stage, the motor and fan assembly having a motor axis of rotation.

2. The hand vacuum cleaner of clause 1 wherein the second air treatment stage comprises a plurality of air treatment members in parallel.

3. The hand vacuum cleaner of clause 2 wherein the plurality of air treatment members are arranged around a central volume and the motor and fan assembly is positioned at least partially internal of the central volume.

4. The hand vacuum cleaner of clause 1 wherein the second air treatment stage comprises an annular array of a plurality of cyclone chambers in parallel and the motor and fan assembly is positioned at least partially internal of the annular array.

5. The hand vacuum cleaner of clause 1 further comprising a pre-motor filter housing positioned rearward of the second air treatment stage.

6. The hand vacuum cleaner of clause 1 further comprising a pre-motor filter housing positioned downstream of the second air treatment stage and the motor and fan assembly is positioned at least partially internal of the pre-motor filter housing.

7. The hand vacuum cleaner of clause 6 wherein the pre-motor filter housing is positioned rearward of the second air treatment stage.

8. The hand vacuum cleaner of clause 1 further comprising a rearwardly removable pre-motor filter.

9. The hand vacuum cleaner of clause 1 further comprising a radially removable pre-motor filter.

10. The hand vacuum cleaner of clause 1 wherein air flows forwardly from the second stage air treatment member to the motor and fan assembly.

11. The hand vacuum cleaner of clause 1 wherein the longitudinal axis and the motor axis of rotation extend in a common direction.

12. The hand vacuum cleaner of clause 1 further comprising a pistol grip handle which houses an energy storage member.

13. The hand vacuum cleaner of clause 1 further comprising a pistol grip handle and an energy storage member housing is positioned at a lower end of the pistol grip handle.

14. The hand vacuum cleaner of clause 1 further comprising a pistol grip handle and, when the hand vacuum cleaner is oriented with the dirty air inlet above the pistol grip handle, the pistol grip handle extends downwardly from a lower surface of the hand vacuum cleaner.

15. The hand vacuum cleaner of clause 1 wherein, when a post-motor filter is positioned in a post-motor filter housing, the motor and fan assembly is at least partially positioned interior of the post-motor filter.

16. A hand vacuum cleaner comprising:

(a) an airflow path from a dirty air inlet to a clean air outlet;

(b) an air treatment stage comprising a plurality of air treatment members in parallel provided in the airflow path; and, (c) a motor and fan assembly positioned at least partially internal of the air treatment stage, the motor and fan assembly having a motor axis of rotation.

17. The hand vacuum cleaner of clause 16 wherein the second air treatment stage comprises an annular array of a plurality of cyclone chambers in parallel and the motor and fan assembly is positioned at least partially internal of the annular array.

18. The hand vacuum cleaner of clause 16 further comprising a filter housing positioned rearward of the second air treatment stage.

19. The hand vacuum cleaner of clause 16 further comprising a filter housing positioned downstream of the second air treatment stage and the motor and fan assembly is positioned at least partially internal of the filter housing.

20. The hand vacuum cleaner of clause 16 further comprising a pistol grip handle and, when the hand vacuum cleaner is oriented with the dirty air inlet above the pistol grip handle, the pistol grip handle extends downwardly from a lower surface of the hand vacuum cleaner.

Clause Set E

1. A hand vacuum cleaner comprising:

(a) an airflow path from a dirty air inlet, which is provided at a front end of the hand vacuum cleaner, to a clean air outlet;

(b) a first air treatment stage comprising a first stage air treatment member provided in the airflow path, the first stage air treatment member having a front end, a rear end and a centrally positioned longitudinal axis extending between the front and rear ends;

(c) a second air treatment stage comprising a second stage air treatment member provided in the airflow path;

(d) a motor and fan assembly having a motor axis of rotation; and, (e) a post-motor filter housing positioned at least partially internal of the second air treatment stage.

2. The hand vacuum cleaner of clause 1 wherein the second air treatment stage comprises a plurality of air treatment members in parallel.

3. The hand vacuum cleaner of clause 2 wherein the plurality of air treatment members are arranged around a central volume and the post-motor filter housing is positioned at least partially internal of the central volume.

4. The hand vacuum cleaner of clause 1 wherein the second air treatment stage comprises an annular array of a plurality of cyclone chambers in parallel and the post-motor filter housing is positioned at least partially internal of the annular array.

5. The hand vacuum cleaner of clause 1 wherein the motor and fan assembly is positioned rearward of the second air treatment stage.

6. The hand vacuum cleaner of clause 1 wherein the motor and fan assembly is positioned at least partially internal of the pre-motor filter housing.

7. The hand vacuum cleaner of clause 6 wherein the pre-motor filter housing is positioned rearward of the second air treatment stage.

8. The hand vacuum cleaner of clause 1 further comprising a rearwardly removable pre-motor filter.

9. The hand vacuum cleaner of clause 1 further comprising a radially removable pre-motor filter.

10. The hand vacuum cleaner of clause 1 wherein air flows forwardly from the second stage air treatment member to the motor and fan assembly.

11. The hand vacuum cleaner of clause 1 wherein the longitudinal axis and the motor axis of rotation extend in a common direction.

12. The hand vacuum cleaner of clause 1 further comprising a pistol grip handle which houses an energy storage member.

13. The hand vacuum cleaner of clause 1 further comprising a pistol grip handle and an energy storage member housing is positioned at a lower end of the pistol grip handle.

14. The hand vacuum cleaner of clause 1 further comprising a pistol grip handle and, when the hand vacuum cleaner is oriented with the dirty air inlet above the pistol grip handle, the pistol grip handle extends downwardly from a lower surface of the hand vacuum cleaner.

15. The hand vacuum cleaner of clause 1 wherein a post-motor filter, which is positioned in the post-motor filter housing, is rearwardly removable.

16. A hand vacuum cleaner comprising:

(a) an airflow path from a dirty air inlet to a clean air outlet;

(b) an air treatment stage comprising a plurality of air treatment members in parallel provided in the airflow path;

(c) a motor and fan assembly having a motor axis of rotation; and, (d) a post-motor filter housing positioned at least partially internal of the air treatment stage.

17. The hand vacuum cleaner of clause 16 wherein the second air treatment stage comprises an annular array of a plurality of cyclone chambers in parallel and the post-motor filter housing is positioned at least partially internal of the annular array.

18. The hand vacuum cleaner of clause 16 wherein the motor and fan assembly is positioned rearward of the second air treatment stage.

19. The hand vacuum cleaner of clause 16 wherein the motor and fan assembly is positioned at least partially internal of a pre-motor filter housing.

20. The hand vacuum cleaner of clause 16 further comprising a pistol grip handle and, when the hand vacuum cleaner is oriented with the dirty air inlet above the pistol grip handle, the pistol grip handle extends downwardly from a lower surface of the hand vacuum cleaner.

Clause Set F

1. A hand vacuum cleaner comprising:
(a) a first air treatment stage comprising a first stage air treatment member, the first stage air treatment member having a first stage air treatment member air inlet, a first stage air treatment member air outlet, a front end, a rear end and a centrally positioned longitudinal axis extending between the front and rear ends;
(b) an airflow path from a dirty air inlet, which is provided at a front end of the hand vacuum cleaner, to a clean air outlet, the airflow path including an inlet passage upstream of the first stage air treatment member air inlet;
(c) a motor and fan assembly having a motor axis of rotation, the motor and fan assembly is positioned forward of a rear end of the first stage air treatment member; and,
(d) a pistol grip handle and, when the hand vacuum cleaner is oriented with the dirty air inlet above the pistol grip handle, the pistol grip handle extends downwardly from a lower surface of the hand vacuum cleaner.

2. The hand vacuum cleaner of clause 1 wherein the motor and fan assembly is positioned forward of the first stage air treatment member.

3. The hand vacuum cleaner of clause 1 further comprising a pre-motor filter that is positioned forward of a rear end of the first stage air treatment member.

4. The hand vacuum cleaner of clause 3 wherein the pre-motor filter is annular and a plane that is transverse to the longitudinal axis extends through the motor and fan assembly and the pre-motor filter.

5. The hand vacuum cleaner of clause 1 wherein the inlet passage has an inlet axis and the motor axis of rotation and the inlet axis extend in a common direction.

6. The hand vacuum cleaner of clause 1 wherein the rear end of the first stage air treatment member is openable.

7. The hand vacuum cleaner of clause 6 wherein an information display is provided on the rear openable door.

8. The hand vacuum cleaner of clause 1 wherein an information display is provided on a rear panel of the hand vacuum cleaner.

9. The hand vacuum cleaner of clause 1 wherein the first stage air treatment member air outlet is provided at the front end of the first stage air treatment member.

10. The hand vacuum cleaner of clause 1 further comprising a second air treatment stage comprising a second stage air treatment member and the second air treatment stage is openable concurrently with the first air treatment stage.

11. The hand vacuum cleaner of clause 10 wherein the rear end of the first stage air treatment member is openable.

12. The hand vacuum cleaner of clause 1 further comprising a second air treatment stage comprising a second stage air treatment member and a plane that is transverse to the longitudinal axis extends through the second air treatment stage and the first air treatment stage.

13. The hand vacuum cleaner of clause 1 further comprising an energy storage member housing provided at a lower end of the pistol grip handle.

14. The hand vacuum cleaner of clause 1 further comprising a post-motor filter that is positioned forward of a rear end of the first stage air treatment member.

15. The hand vacuum cleaner of clause 14 wherein the post-motor filter is annular and a plane that is transverse to the longitudinal axis extends through the motor and fan assembly and the pre-motor filter.

16. The hand vacuum cleaner of clause 1 further comprising a filter that is removable forwardly.

17. The hand vacuum cleaner of clause 1 further comprising a filter that is removable radially.

18. The hand vacuum cleaner of clause 1 further comprising a second air treatment stage comprising a plurality of cyclones in parallel and the first stage air treatment member comprises a first stage cyclone.

19. The hand vacuum cleaner of clause 1 further comprising a main body that houses the motor and fan assembly and the pistol grip handle extends downwardly from a lower surface of the main body.

20. The hand vacuum cleaner of clause 19 wherein the first stage air treatment member is provided rearwardly of the main body.

21. The hand vacuum cleaner of clause 1 wherein the motor and fan assembly is positioned forward of the first stage air treatment member.

Clause Set G

1. A hand vacuum cleaner comprising:
(a) a first air treatment stage comprising a first stage air treatment member, the first stage air treatment member having a first stage air treatment member air inlet, a first stage air treatment member air outlet, a front end, a rear end and a centrally positioned longitudinal axis extending between the front and rear ends, wherein the rear end of the first stage air treatment member is openable;
(b) an airflow path from a dirty air inlet, which is provided at a front end of the hand vacuum cleaner, to a clean air outlet, the airflow path including an inlet passage upstream of the first stage air treatment member air inlet;
(c) a motor and fan assembly having a motor axis of rotation, the motor and fan assembly is positioned forward of a rear end of the first stage air treatment member; and,
(d) a pistol grip handle.

2. The hand vacuum cleaner of clause 1 wherein the motor and fan assembly is positioned forward of the first stage air treatment member.

3. The hand vacuum cleaner of clause 1 further comprising a pre-motor filter that is positioned forward of a rear end of the first stage air treatment member.

4. The hand vacuum cleaner of clause 3 wherein the pre-motor filter is annular and a plane that is transverse to the longitudinal axis extends through the motor and fan assembly and the pre-motor filter.

5. The hand vacuum cleaner of clause 1 wherein the inlet passage has an inlet axis and the motor axis of rotation and the inlet axis extend in a common direction.

6. The hand vacuum cleaner of clause 1 wherein an information display is provided on the rear openable door.

7. The hand vacuum cleaner of clause 1 wherein an information display is provided on a rear panel of the hand vacuum cleaner.

8. The hand vacuum cleaner of clause 1 wherein the first stage air treatment member air outlet is provided at the front end of the first stage air treatment member.

9. The hand vacuum cleaner of clause 1 further comprising a second air treatment stage comprising a second stage air treatment member and the second air treatment stage is openable concurrently with the first air treatment stage.

10. The hand vacuum cleaner of clause 9 wherein the rear end of the first stage air treatment member is openable.

11. The hand vacuum cleaner of clause 1 further comprising a second air treatment stage comprising a second stage air treatment member and a plane that is transverse to the longitudinal axis extends through the second air treatment stage and the first air treatment stage.

12. The hand vacuum cleaner of clause 1 further comprising an energy storage member housing provided in the pistol grip handle.

13. The hand vacuum cleaner of clause 1 further comprising a post-motor filter that is positioned forward of a rear end of the first stage air treatment member.

14. The hand vacuum cleaner of clause 13 wherein the post-motor filter is annular and a plane that is transverse to the longitudinal axis extends through the motor and fan assembly and the pre-motor filter.

15. The hand vacuum cleaner of clause 1 further comprising a filter that is removable forwardly.

16. The hand vacuum cleaner of clause 1 further comprising a filter that is removable radially.

17. The hand vacuum cleaner of clause 1 further comprising a second air treatment stage comprising a plurality of cyclones in parallel and the first stage air treatment member comprises a first stage cyclone.

18. The hand vacuum cleaner of clause 1 further comprising a main body that houses the motor and fan assembly and the pistol grip handle is mounted to the main body.

19. The hand vacuum cleaner of clause 18 wherein the first stage air treatment member is provided rearwardly of the main body.

20. The hand vacuum cleaner of clause 1 wherein the motor and fan assembly is positioned forward of the first stage air treatment member.

Clause Set H

1. A hand vacuum cleaner comprising:

(a) an airflow path from a dirty air inlet to a clean air outlet;

(b) a main body;

(c) a first stage air treatment member provided in the airflow path rearward of the main body, the first stage air treatment member having a front end, a rear end and a centrally positioned longitudinal axis extending between the front and rear ends;

(d) a handle having a lower end that is positioned below the dirt air inlet;

(e) a finger grip area positioned forward of the handle; and, (f) a motor and fan assembly, the motor and fan assembly having a motor axis of rotation, wherein a plane that is transverse to the longitudinal axis extends through one of the main body and the air treatment member, the finger grip area, and the motor and fan assembly.

2. The hand vacuum cleaner of clause 1 wherein the plane extends through the first stage air treatment member.

3. The hand vacuum cleaner of clause 1 wherein the main body houses at least one of a pre-motor filter and a second stage air treatment member.

4. The hand vacuum cleaner of clause 1 wherein the motor and fan assembly is provided at the lower end of the handle.

5. The hand vacuum cleaner of clause 1 wherein the handle extends downwardly from a lower surface of one of the main body and the air treatment member.

6. The hand vacuum cleaner of clause 1 further comprising an energy storage member housing provided in the handle.

7. The hand vacuum cleaner of clause 1 further comprising a finger guard positioned forward of the finger grip area.

8. The hand vacuum cleaner of clause 7 wherein the finger guard comprises an air flow conduit.

9. The hand vacuum cleaner of clause 8 wherein the air flow conduit is positioned upstream of the motor and fan assembly.

10. A hand vacuum cleaner comprising:

(a) an airflow path from a dirty air inlet to a clean air outlet;

(b) a first stage air treatment member provided in the airflow path, the first stage air treatment member having a front end, a rear end and a centrally positioned longitudinal axis extending between the front and rear ends;

(c) a handle having a lower end that is positioned below the dirty air inlet;

(d) a finger grip area positioned forward of the handle;

(e) a finger guard positioned forward of the finger grip area; and, (f) a motor and fan assembly, the motor and fan assembly having a motor axis of rotation, wherein a plane that is transverse to the longitudinal axis extends through the finger grip area and the motor and fan assembly.

11. The hand vacuum cleaner of clause 10 wherein the finger guard comprises an air flow conduit.

12. The hand vacuum cleaner of clause 11 wherein the air flow conduit is positioned upstream of the motor and fan assembly.

13. The hand vacuum cleaner of clause 10 wherein the plane extends through the first stage air treatment member.

14. The hand vacuum cleaner of clause 10 further comprising a main body that houses at least one of a pre-motor filter and a second stage air treatment member.

15. The hand vacuum cleaner of clause 14 wherein the plane extends through the main body.

16. The hand vacuum cleaner of clause 10 wherein the motor and fan assembly is provided at the lower end of the handle.

17. The hand vacuum cleaner of clause 14 wherein the handle extends downwardly from a lower surface of one of the main body and the air treatment member.

18. The hand vacuum cleaner of clause 10 further comprising an energy storage member housing provided in the handle.

19. A hand vacuum cleaner comprising:

(a) an airflow path from a dirty air inlet to a clean air outlet;

(b) a first stage air treatment member provided in the airflow path;

(c) a second stage air treatment member provided in the airflow path;

(d) a handle having a lower end that is positioned below the dirty air inlet;

(e) a finger grip area positioned forward of the handle; and, (f) a motor and fan assembly, wherein a plane that is transverse to the longitudinal axis extends through the second stage air treatment member, the finger grip area, and the motor and fan assembly.

20. The hand vacuum cleaner of clause 19 further comprising a finger guard positioned forward of the finger grip area.

Clause Set I

1. A hand vacuum cleaner comprising:

(a) an airflow path from a dirty air inlet to a clean air outlet;

(b) an air treatment member provided in the airflow path, the air treatment member having a front end, a rear end and a centrally positioned longitudinal axis extending between the front and rear ends;

(c) an energy storage member housing positioned forward of the air treatment member wherein the longitudinal axis extends through the energy storage member housing; and, (d) a motor and fan assembly having a motor axis of rotation.

2. The hand vacuum cleaner of clause 1 wherein the motor and fan assembly is positioned rearward of the energy storage member housing, wherein the longitudinal axis extends through the motor and fan assembly.

3. The hand vacuum cleaner of clause 1 wherein the longitudinal axis and the motor axis of rotation extend in a common direction.

4. The hand vacuum cleaner of clause 3 wherein the longitudinal axis extends through the energy storage member housing.

5. The hand vacuum cleaner of clause 1 further comprising a pistol grip handle and the motor and fan assembly is at least partially positioned in the pistol grip handle.

6. The hand vacuum cleaner of clause 5 wherein the motor and fan assembly have a volume, and at least 50% of the volume is positioned in the pistol grip handle.

7. The hand vacuum cleaner of clause 1 further comprising a pistol grip handle and the motor and fan assembly is positioned at a lower end of the pistol grip handle.

8. The hand vacuum cleaner of clause 1 further comprising a main body that houses at least one of a pre-motor filter, the energy storage member housing and a post motor filter housing, and the handle extends downwardly from a lower surface of one of the main body and the air treatment member.

9. The hand vacuum cleaner of clause 1 wherein the energy storage member housing is annular.

10. The hand vacuum cleaner of clause 9 further comprising an inlet conduit located downstream of the dirty air inlet and upstream of the air treatment member and energy storage member housing surrounds at least 50% of the inlet conduit.

11. A hand vacuum cleaner comprising:

(a) an airflow path from a dirty air inlet to a clean air outlet;

(b) a first stage air treatment member provided in the airflow path, the air treatment member having a front end, a rear end and a centrally positioned longitudinal axis extending between the front and rear ends;

(c) a second stage air treatment member provided in the airflow path downstream of the first stage air treatment member;

(d) an energy storage member housing positioned forward of a rear end of the second stage air treatment member wherein the longitudinal axis extends through the energy storage member housing;

(e) a motor and fan assembly having a motor axis of rotation; and (f) a main body that houses at least one of a pre-motor filter, the energy storage member housing and a post motor filter housing, and a handle extends downwardly from a lower surface of one of the main body and the first stage air treatment member and the second stage air treatment member.

12. The hand vacuum cleaner of clause 11 wherein the motor and fan assembly is at least partially positioned in the handle.

13. The hand vacuum cleaner of clause 12 wherein the motor and fan assembly have a volume, and at least 50% of the volume is positioned in the handle.

14. The hand vacuum cleaner of clause 12 wherein the motor and fan assembly is positioned at a lower end of the handle.

15. The hand vacuum cleaner of clause 11 further comprising a finger guard positioned forward of the handle wherein a finger grip area is provided between the handle and the finger guard.

16. A hand vacuum cleaner comprising:

(a) an airflow path from a dirty air inlet to a clean air outlet;

(b) a first stage air treatment member provided in the airflow path, the air treatment member having a front end, a rear end and a centrally positioned longitudinal axis extending between the front and rear ends;

(c) an energy storage member housing positioned forward of a rear end of the first stage air treatment member wherein the longitudinal axis extends through the energy storage member housing;

(d) a motor and fan assembly having a motor axis of rotation; and (e) a main body that houses at least one of a pre-motor filter, the energy storage member housing and a post motor filter housing, and a handle extends downwardly from a lower surface of one of the main body and the first stage air treatment member, wherein the motor and fan assembly is at least partially positioned in the handle or wherein the motor and fan assembly is positioned at a lower end of the handle.

17. The hand vacuum cleaner of clause 16 wherein the motor and fan assembly have a volume, and at least 50% of the volume is positioned in the handle.

18. The hand vacuum cleaner of clause 16 wherein the motor and fan assembly is positioned at a lower end of the handle.

19. The hand vacuum cleaner of clause 16 further comprising a finger guard positioned forward of the handle wherein a finger grip area is provided between the handle and the finger guard.

Clause Set J

1. A hand vacuum cleaner comprising:

(a) an airflow path from a dirty air inlet, which is provided at a front end of the hand vacuum cleaner, to a clean air outlet;

(b) a first air treatment stage comprising a first stage air treatment member, the first stage air treatment member having, a first stage air treatment member air inlet, a first stage air treatment member air outlet, a front end, a rear end and a centrally positioned longitudinal axis extending between the front and rear ends, the first stage air treatment member provided at a rear end of the hand vacuum cleaner;

(c) a main body that houses at least one of a pre-motor filter, an energy storage member housing, a post motor filter housing and a second stage air treatment member;

(d) a motor and fan assembly having a motor axis of rotation; and, (e) a pistol grip handle and, when the hand vacuum cleaner is oriented with the dirty air inlet above the pistol grip handle, the pistol grip handle extends downwardly from a lower surface of one of the main body and the first stage air treatment member and the second stage air treatment member, wherein the motor and fan assembly is at least partially positioned in the handle.

2. The hand vacuum cleaner of clause 1 wherein the motor and fan assembly has a first end, an axially opposed send end and a length between the first and second ends and at least 50% of the length is positioned in the pistol grip handle.

3. The hand vacuum cleaner of clause 2 wherein at least 75% of the length is positioned in the pistol grip handle.

4. The hand vacuum cleaner of clause 1 wherein an upper end of the handle is positioned forward of the first stage air treatment member.

5. The hand vacuum cleaner of clause 1 wherein the pre-motor filter is positioned forward of a rear end of the first stage air treatment member.

6. The hand vacuum cleaner of clause 1 wherein the rear end of the first stage air treatment member is openable.

7. The hand vacuum cleaner of clause 6 wherein an information display is provided on the rear openable door.

8. The hand vacuum cleaner of clause 1 wherein an information display is provided on a rear panel of the hand vacuum cleaner.

9. The hand vacuum cleaner of clause 1 wherein the first stage air treatment member air outlet is provided at the front end of the first stage air treatment member.

10. The hand vacuum cleaner of clause 1 wherein the second air treatment stage comprises a second stage air treatment member and the second air treatment stage is openable concurrently with the first air treatment stage.

11. The hand vacuum cleaner of clause 10 wherein the rear end of the first stage air treatment member is openable.

12. The hand vacuum cleaner of clause 1 wherein the second air treatment stage comprises a second stage air treatment member and a plane that is transverse to the longitudinal axis extends through the second air treatment stage and the first air treatment stage.

13. The hand vacuum cleaner of clause 1 further comprising an energy storage member housing provided at a lower end of the pistol grip handle.

14. The hand vacuum cleaner of clause 1 wherein the post-motor filter is positioned forward of a rear end of the first stage air treatment member.

15. The hand vacuum cleaner of clause 1 further comprising at least one of the pre-motor filter and the post-motor filter and the at least one of the pre-motor filter and the post-motor filter is removable forwardly.

16. The hand vacuum cleaner of clause 1 further comprising at least one of the pre-motor filter and the post-motor filter and the at least one of the pre-motor filter and the post-motor filter is removable radially.

17. The hand vacuum cleaner of clause 1 further comprising the second air treatment stage, the second air treatment stage comprises a plurality of cyclones in parallel and the first stage air treatment member comprises a first stage cyclone.

Clause Set K

1. A hand vacuum cleaner comprising:

(a) an airflow path from a dirty air inlet, which is provided at a front end of the hand vacuum cleaner, to a clean air outlet;

(b) a first air treatment stage comprising a first stage air treatment member provided in the airflow path, the first stage air treatment member having a front end, a rear end and a centrally positioned longitudinal axis extending between the front and rear ends; and, (c) a motor and fan assembly positioned at least partially internal of the first air treatment stage, the motor and fan assembly having a motor axis of rotation.

2. The hand vacuum cleaner of clause 1 wherein the first air treatment stage comprises a single air treatment member.

3. The hand vacuum cleaner of clause 2 wherein the longitudinal axis extends through the motor and fan assembly.

4. The hand vacuum cleaner of clause 1 wherein the air treatment member comprises an air treatment member air inlet and an air treatment member air outlet, the air treatment member air outlet comprises a passage located interior the air treatment member and the motor and fan assembly is positioned at least partially internal of the passage.

5. The hand vacuum cleaner of clause 4 wherein the air treatment member air outlet comprises a porous member located internal of the air treatment member and the motor and fan assembly positioned at least partially internal of the porous member.

6. The hand vacuum cleaner of clause 1 further comprising a pre-motor filter housing positioned rearward of the first air treatment stage.

7. The hand vacuum cleaner of clause 1 further comprising a pre-motor filter housing positioned downstream of the first air treatment stage and the motor and fan assembly is positioned at least partially internal of the pre-motor filter housing.

8. The hand vacuum cleaner of clause 7 wherein the pre-motor filter is annular.

9. The hand vacuum cleaner of clause 1 further comprising a rearwardly removable pre-motor filter.

10. The hand vacuum cleaner of clause 1 further comprising a radially removable pre-motor filter.

11. The hand vacuum cleaner of clause 1 wherein air flows forwardly from the first stage air treatment member to the motor and fan assembly.

12. The hand vacuum cleaner of clause 1 wherein the longitudinal axis and the motor axis of rotation extend in a common direction.

13. The hand vacuum cleaner of clause 1 further comprising a pistol grip handle which houses an energy storage member.

14. The hand vacuum cleaner of clause 1 further comprising a pistol grip handle and an energy storage member housing is positioned at a lower end of the pistol grip handle.

15. The hand vacuum cleaner of clause 1 further comprising a pistol grip handle and, when the hand vacuum cleaner is oriented with the dirty air inlet above the pistol grip handle, the pistol grip handle extends downwardly from a lower surface of the hand vacuum cleaner.

16. The hand vacuum cleaner of clause 1 wherein, when a post-motor filter is positioned in a post-motor filter housing, the motor and fan assembly is at least partially positioned interior of the post-motor filter.

17. The hand vacuum cleaner of clause 1 wherein the first stage air treatment member is a cyclone.

18. The hand vacuum cleaner of clause 17 wherein the cyclone is the only cyclone of the hand vacuum cleaner.

19. The hand vacuum cleaner of clause 1 further comprising a second stage air treatment member.

20. The hand vacuum cleaner of clause 1 wherein the dirty air inlet is centrally positioned on the front end of the first air treatment member.

The invention claimed is:

1. A hand vacuum cleaner comprising:

a) an airflow path from a dirty air inlet to a clean air outlet;

b) an air treatment member provided in the airflow path, the air treatment member having a front end, a rear end and a centrally positioned longitudinal axis extending between the front and rear ends;

c) a pistol grip handle; and, d) a motor and fan assembly, the motor and fan assembly having a volume and a motor axis of rotation, and at least 50% of the volume is positioned in the pistol grip handle.

2. The hand vacuum cleaner of claim 1 wherein the motor and fan assembly has a first end, an axially opposed second end and a length between the first and second ends and at least 50% of the length is positioned in the pistol grip handle.

3. The hand vacuum cleaner of claim 2 wherein at least 75% of the length is positioned in the pistol grip handle.

4. The hand vacuum cleaner of claim 1 further comprising an energy storage member housing provided at an end of the pistol grip handle.

5. The hand vacuum cleaner of claim 4 wherein air flows over or through the energy storage member housing at a location upstream of the clean air outlet.

6. The hand vacuum cleaner of claim 4 further comprising a post-motor filter housing and, when the hand vacuum cleaner is oriented with the dirty air inlet above the pistol grip handle, the post-motor filter housing is located at a lower end of the pistol grip handle or below the lower end of the pistol grip handle.

7. The hand vacuum cleaner of claim 1 wherein the dirty air inlet is located at an upper end of the hand vacuum cleaner and an energy storage member is provided at a lower end of the pistol grip handle.

8. The hand vacuum cleaner of claim 1 further comprising a pre-motor filter positioned in a pre-motor filter housing downstream of the air treatment member, the longitudinal axis extends through the air treatment member and the pre-motor filter housing, and, when the hand vacuum cleaner is oriented with the dirty air inlet above the pistol grip handle, the pistol grip handle extends downwardly from a lower surface of the hand vacuum cleaner and an energy storage member is provided at a lower end of the pistol grip handle.

9. The hand vacuum cleaner of claim 8 further comprising a main body, the main body comprising the pre-motor filter housing and the pistol grip handle extends downwardly from a lower surface of the main body.

10. The hand vacuum cleaner of claim 8 wherein at least a portion of the air treatment member is moveable relative to the main body.

11. The hand vacuum cleaner of claim 8 wherein the air treatment member is removably mounted to the main body.

12. The hand vacuum cleaner of claim 1 wherein, when the hand vacuum cleaner is oriented with the dirty air inlet above the pistol grip handle, the clean air outlet is at a lower end of the pistol grip handle or below the lower end of the pistol grip handle.

13. The hand vacuum cleaner of claim 1 wherein the longitudinal axis extends through the pistol grip handle.

14. The hand vacuum cleaner of claim 13 wherein the pistol grip handle is provided at the rear end of the hand vacuum cleaner and a finger grip area is provided forward of the pistol grip handle and rearward of the air treatment member.

15. The hand vacuum cleaner of claim 13 further comprising an energy storage member housing provided at an end of the pistol grip handle.

16. The hand vacuum cleaner of claim 15 wherein air flows over or through the energy storage member housing at a location upstream of the clean air outlet.

17. The hand vacuum cleaner of claim 13 further comprising a pre-motor filter positioned in a pre-motor filter housing downstream of the air treatment member, the longitudinal axis extends through the air treatment member and the pre-motor filter housing, and, when the hand vacuum cleaner is oriented with the dirty air inlet above the pistol grip handle, an energy storage member is provided at a lower end of the pistol grip handle.

18. The hand vacuum cleaner of claim 13 further comprising a post-motor filter housing and, when the hand vacuum cleaner is oriented with the dirty air inlet above the pistol grip handle, the post-motor filter housing is located at a lower end of the pistol grip handle or below the lower end of the pistol grip handle.

19. The hand vacuum cleaner of claim 13 wherein the dirty air inlet is located at an upper end of the hand vacuum cleaner and an energy storage member is provided at a lower end of the pistol grip handle.

20. The hand vacuum cleaner of claim 13 further comprising a main body, the main body comprising the pre-motor filter housing and the pistol grip handle is located rearward of the main body.

* * * * *